United States Patent
Sawa et al.

(10) Patent No.: US 10,777,850 B2
(45) Date of Patent: Sep. 15, 2020

(54) NONAQUEOUS ELECTROLYTIC SOLUTION AND NONAQUEOUS ELECTROLYTE SECONDARY BATTERY USING THE SAME

(71) Applicant: Mitsubishi Chemical Corporation, Chiyoda-ku (JP)

(72) Inventors: Shuhei Sawa, Inashiki-gun (JP); Takashi Fujii, Inashiki-gun (JP); Kanako Ito, Inashiki-gun (JP); Koji Fukamizu, Inashiki-gun (JP); Ryo Yamaguchi, Yokohama (JP); Hiromu Watanabe, Yokohama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 147 days.

(21) Appl. No.: 16/154,826

(22) Filed: Oct. 9, 2018

(65) Prior Publication Data

US 2019/0051941 A1 Feb. 14, 2019

Related U.S. Application Data

(60) Division of application No. 15/210,291, filed on Jul. 14, 2016, now Pat. No. 10,177,414, which is a continuation of application No. PCT/JP2015/051739, filed on Jan. 22, 2015.

(30) Foreign Application Priority Data

Jan. 22, 2014 (JP) .................................. 2014-009687
Mar. 28, 2014 (JP) .................................. 2014-069655

(51) Int. Cl.
*H01M 10/0569* (2010.01)
*H01M 10/0525* (2010.01)
*H01M 10/0567* (2010.01)

(52) U.S. Cl.
CPC ... *H01M 10/0569* (2013.01); *H01M 10/0525* (2013.01); *H01M 10/0567* (2013.01); *H01M 2220/30* (2013.01); *H01M 2300/0025* (2013.01)

(58) Field of Classification Search
CPC ......... H01M 10/0569; H01M 10/0525; H01M 10/0567; H01M 2220/30; H01M 2300/0025
See application file for complete search history.

(56) References Cited

U.S. PATENT DOCUMENTS

| | | | |
|---|---|---|---|
| 6,413,678 | B1 | 7/2002 | Hamamoto et al. |
| 2001/0038949 | A1 | 11/2001 | Hatazaki et al. |
| 2002/0028389 | A1 | 3/2002 | Sonoda et al. |
| 2002/0168576 | A1 | 11/2002 | Hamamoto et al. |
| 2004/0013945 | A1 | 1/2004 | Ueda et al. |
| 2006/0262485 | A1 | 11/2006 | Fujino et al. |
| 2011/0123871 | A1 | 5/2011 | Nakagawa et al. |
| 2012/0219854 | A1 | 8/2012 | Nakagawa et al. |
| 2012/0308883 | A1 | 12/2012 | Nakagawa et al. |
| 2014/0134481 | A1 | 5/2014 | Nakagawa et al. |
| 2015/0140448 | A1 | 5/2015 | Takiguchi et al. |
| 2016/0064738 | A1 | 3/2016 | Higuchi et al. |

FOREIGN PATENT DOCUMENTS

| | | |
|---|---|---|
| CN | 102832408 A | 12/2002 |
| CN | 101622751 A | 1/2010 |
| JP | 10-255836 | 9/1998 |
| JP | 2963898 | 10/1999 |
| JP | 2000-58112 | 2/2000 |
| JP | 2000-173650 | 6/2000 |

(Continued)

OTHER PUBLICATIONS

EPO website (www.espacenet.com) machine translation of the detailed description of JP 2003-243026A. (Year: 2003).*
Extended European Search Report dated Feb. 9, 2017 in Patent Application No. 15740399.9.
Search Report dated Jul. 13, 2018 in the counterpart Chinese patent application No. 201580005344.4 with English Translation.
English Translation of International Search Report dated Mar. 31, 2015 in PCT/JP2015/051739, filed Jan. 22, 2015.

*Primary Examiner* — Gregg Cantelmo
(74) *Attorney, Agent, or Firm* — Oblon, McClelland, Maier & Neustadt, L.L.P.

(57) ABSTRACT

A nonaqueous electrolytic solution, containing an electrolyte, a nonaqueous solvent and an aromatic carboxylate ester of formula (1):

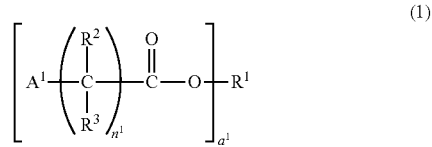

(1)

wherein $A^1$ is an optionally substituted aryl group, $n^1$ is an integer of 1 or greater, $R^2$ and $R^3$ are a hydrogen atom, a halogen atom or an optionally substituted hydrocarbon group having 1 to 12 carbon atoms, $a^1$ is an integer of 1 or 2, and when $a^1$ is 1, $R^1$ is an optionally substituted hydrocarbon group having 1 to 12 carbon atoms, $a^1$ is 2, $R^1$ is an optionally substituted hydrocarbon group having 1 to 12 carbon atoms, $n^1$ is 1, at least one of $R^2$ and $R^3$ is an optionally substituted hydrocarbon group having 1 to 12 carbon atoms, and $n^1$ is 2 and $R^2$s and $R^3$s are all hydrogen atoms, $R^1$ is an optionally substituted aliphatic hydrocarbon group having 1 to 12 carbon atoms.

7 Claims, No Drawings

(56) References Cited

FOREIGN PATENT DOCUMENTS

| | | |
|---|---|---|
| JP | 2000-268831 | 9/2000 |
| JP | 2001-297790 | 10/2001 |
| JP | 2002-33121 | 1/2002 |
| JP | 2003-187862 | 7/2003 |
| JP | 2003-243026 | 8/2003 |
| JP | 2003-338277 | 11/2003 |
| JP | 3463407 | 11/2003 |
| JP | 2005-347222 | 12/2005 |
| JP | 2006-352094 | 12/2006 |
| JP | 3893627 | 3/2007 |
| JP | 2007-335170 A | 12/2007 |
| JP | 4051947 | 2/2008 |
| JP | 2008135273 A | 6/2008 |
| JP | 2009-295507 A | 12/2009 |
| WO | WO 2014/003165 A1 | 1/2014 |
| WO | WO 2014/156094 A1 | 10/2014 |

\* cited by examiner

NONAQUEOUS ELECTROLYTIC SOLUTION AND NONAQUEOUS ELECTROLYTE SECONDARY BATTERY USING THE SAME

CROSS REFERENCE TO RELATED APPLICATIONS

The present application is a divisional of U.S. patent application Ser. No. 15/210,291, filed on Jul. 14, 2016, now U.S. Pat. No. 10,177,414: which is a continuation application of PCT/JP2015/051739, filed on Jan. 22, 2015, which claims priority to Japanese patent applications JP 2014-009687, filed on Jan. 22, 2014 and JP2014-069655, filed on Mar. 28, 2014.

TECHNICAL FIELD

The present invention relates to nonaqueous electrolytic solutions and nonaqueous electrolyte secondary batteries using the same.

BACKGROUND ART

Nonaqueous electrolyte secondary batteries such as lithium secondary batteries are being actually used in various applications ranging from power supplies for so-called consumer products such as mobile phones and notebook computers, to drive power supplies for vehicles such as automobiles. There have recently been increasing demands on higher performances for the nonaqueous electrolyte secondary batteries. In particular, enhancements are desired in various battery characteristics such as high capacity, low-temperature service characteristics, high-temperature storage characteristics, cycle characteristics and overcharge safety.

Electrolytic solutions used in the nonaqueous electrolyte secondary batteries are usually composed of electrolytes and nonaqueous solvents as the main components. Examples of the main nonaqueous solvents include cyclic carbonates such as ethylene carbonate and propylene carbonate; chain carbonates such as dimethyl carbonate, diethyl carbonate and ethyl methyl carbonate; and cyclic carboxylate esters such as γ-butyrolactone and γ-valerolactone.

A number of studies have been carried out on nonaqueous solvents, electrolytes and additives in order to improve characteristics of nonaqueous electrolyte secondary batteries such as load characteristics, cycle characteristics, storage characteristics and overcharge safety.

Patent Literatures 1 to 10 propose that aromatic esters such as methyl benzoate, ethyl benzoate, phenyl propionate, phenyl acetate and benzyl acetate are added to electrolytic solutions in order to enhance properties of batteries such as energy density, long-term durability, small generation of gas during high-temperature storage and low-temperature characteristics.

Patent Literature 11 proposes a technique directed to enhancing the safety of batteries during overcharging by the use of an electrolytic solution containing a specific carboxylic aromatic ester.

Patent Literature 12 proposes a technique in which a specific carboxylic aromatic ester compound is added to a nonaqueous electrolytic solution in order to prevent the swelling of batteries during high-temperature storage without causing a decrease in battery capacity.

CITATION LIST

Patent Literature

Patent Literature 1: Japanese Patent No. 03463407
Patent Literature 2: Japanese Patent No. 03893627
Patent Literature 3: Japanese Patent Application Kokai Publication No. H10-255836
Patent Literature 4: Japanese Patent Application Kokai Publication No. 2000-268831
Patent Literature 5: Japanese Patent Application Kokai Publication No. 2005-347222
Patent Literature 6: Japanese Patent No. 02963898
Patent Literature 7: Japanese Patent No. 4051947
Patent Literature 8: Japanese Patent Application Kokai Publication No. 2001-297790
Patent Literature 9: Japanese Patent Application Kokai Publication No. 2002-033121
Patent Literature 10: Japanese Patent Application Kokai Publication No. 2003-338277
Patent Literature 11: Japanese Patent Application Kokai Publication No. 2000-058112
Patent Literature 12: Japanese Patent Application Kokai Publication No. 2000-173650
Patent Literature 13: WO 2014/003165

DISCLOSURE OF INVENTION

Technical Problem

The use of the electrolytic solutions described in Patent Literatures 1 to 13 which include compounds having an aromatic group and an ester group has a problem in that the reactivity of the compounds is so high that it is difficult for the nonaqueous electrolyte secondary batteries to achieve enhancement in initial battery characteristics such as initial capacity, efficiency, rate characteristics and initial gas production and at the same time enhancement in battery characteristics after durability testing such as capacity after high-temperature storage, efficiency, rate characteristics and overcharge safety.

The present invention has been made in order to solve the problem discussed above. Therefore, objects of the invention are to provide nonaqueous electrolytic solutions that allow nonaqueous electrolyte secondary batteries to achieve improvements in initial battery characteristics and in battery characteristics after durability testing at the same time, and to provide nonaqueous electrolyte secondary batteries containing the nonaqueous electrolytic solutions.

Solution to Problem

The present inventors have conducted various studies to achieve the above objects. As a result, the present inventors have found that the problem discussed above can be solved by adding a specific aromatic carboxylate ester to an electrolytic solution, thereby completing the present invention.

The present inventors have further found that the above problem can be solved by the addition of a specific aromatic carboxylate ester and a specific additive to an electrolytic solution, thereby completing the present invention.

The summary of the first aspect of the present invention is described below.

(a) A nonaqueous electrolytic solution for a nonaqueous electrolyte secondary battery including a positive electrode and a negative electrode capable of storing and releasing metal ions, the nonaqueous electrolytic solution including an electrolyte, a nonaqueous solvent and an aromatic carboxylate ester represented by Formula (1):

[Chem. 1]

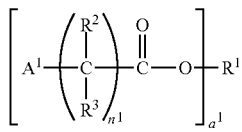
(1)

(in the formula,
$A^1$ is an optionally substituted aryl group,
$n^1$ is an integer of 1 or greater,
$R^2$ and $R^3$ are independently a hydrogen atom, a halogen atom or an optionally substituted hydrocarbon group having 1 to 12 carbon atoms and may be bonded to each other to form a ring, wherein when a plurality of $R^2$s are present, $R^2$s may be the same as or different from one another and when a plurality of $R^3$s are present, $R^3$s may be the same as or different from one another,
$a^1$ is an integer of 1 or 2,
when $a^1$ is 1, $R^1$ is an optionally substituted hydrocarbon group having 1 to 12 carbon atoms,
when $a^1$ is 2, $R^1$ is an optionally substituted hydrocarbon group having 1 to 12 carbon atoms and A's may be the same as or different from each other,
when $n^1$ is 1, at least one of $R^2$ and $R^3$ is an optionally substituted hydrocarbon group having 1 to 12 carbon atoms, and
when $n^1$ is 2, and $R^2$s and $R^3$s are all hydrogen atoms, $R^1$ is an optionally substituted aliphatic hydrocarbon group having 1 to 12 carbon atoms).

(b) The nonaqueous electrolytic solution described in (a), wherein $a^1$ in Formula (1) is 1.

(c) The nonaqueous electrolytic solution described in (a) or (b), wherein $A^1$ in Formula (1) is a phenyl group.

(d) The nonaqueous electrolytic solution described in any of (a) to (c), wherein the nonaqueous electrolytic solution contains the aromatic carboxylate ester represented by Formula (1) in 0.001 mass % to 10 mass %.

(e) The nonaqueous electrolytic solution described in any of (a) to (d), wherein the nonaqueous electrolytic solution further includes at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (1), cyclic carbonates having a carbon-carbon unsaturated bond, carboxylate esters other than those of Formula (1), cyclic compounds having a plurality of ether bonds, isocyanurate skeleton-containing compounds, monofluorophosphate salts, difluorophosphate salts, borate salts, oxalate salts and fluorosulfonate salts.

(f) The nonaqueous electrolytic solution described in any of (a) to (e), wherein the nonaqueous electrolytic solution includes 0.001 mass % to 20 mass % of at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (1), cyclic carbonates having a carbon-carbon unsaturated bond, carboxylate esters other than those of Formula (1), cyclic compounds having a plurality of ether bonds, isocyanurate skeleton-containing compounds, monofluorophosphate salts, difluorophosphate salts, borate salts, oxalate salts and fluorosulfonate salts.

The summary of the second aspect of the present invention is described below.

(f) A nonaqueous electrolytic solution for a nonaqueous electrolyte secondary battery including a positive electrode and a negative electrode capable of storing and releasing metal ions, the nonaqueous electrolytic solution including an electrolyte, a nonaqueous solvent, an aromatic carboxylate ester (I) and a compound (II),
the aromatic carboxylate ester (I) being represented by Formula (2):

[Chem. 2]

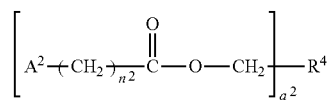
(2)

(in the formula,
$A^2$ is an optionally substituted aryl group,
$n^2$ is an integer of 1 or 2,
$a^2$ is an integer of 1 or 2,
when $a^2$ is 1, $R^4$ is a hydrogen atom, an optionally substituted aliphatic hydrocarbon group having 1 to 12 carbon atoms or an optionally substituted aryl group, with the proviso that when $n^2$ is 2, $R^4$ is an optionally substituted aryl group, and
when $a^2$ is 2, $R^4$ is a single bond, an optionally substituted aliphatic hydrocarbon group having 1 to 12 carbon atoms or an optionally substituted arylene group, and $A^2$s may be the same as or different from each other, with the proviso that when $n^2$ is 2, $R^4$ is an optionally substituted arylene group), the compound (II) being at least one selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), carboxylate esters represented by Formula (3) below, cyclic compounds having a plurality of ether bonds, monofluorophosphate salts, difluorophosphate salts, borate salts, oxalate salts and fluorosulfonate salts,

[Chem. 3]

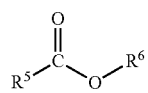
(3)

wherein
$R^5$ is a hydrocarbon group having 1 to 4 carbon atoms, and
$R^6$ is an ethyl group, an n-propyl group or an n-butyl group.

(g) The nonaqueous electrolytic solution described in (f), wherein $a^2$ in Formula (2) is 1.

(h) The nonaqueous electrolytic solution described in (f) or (g), wherein $A^2$ in Formula (2) is a phenyl group.

(i) The nonaqueous electrolytic solution described in any of (f) to (h), wherein the nonaqueous electrolytic solution contains the aromatic carboxylate ester represented by Formula (2) in 0.001 mass % to 10 mass %.

(j) The nonaqueous electrolytic solution described in any of (f) to (i), wherein the nonaqueous electrolytic solution includes 0.001 mass % to 20 mass % of the at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), carboxylate esters represented by Formula (3), cyclic compounds having a plurality of ether bonds, monofluorophosphate salts, difluorophosphate salts, borate salts, oxalate salts and fluorosulfonate salts.

Another aspect of the present invention resides in the following.

(k) A nonaqueous electrolyte secondary battery including a negative electrode and a positive electrode capable of storing and releasing lithium ions, and a nonaqueous electrolytic solution including an electrolyte and a nonaqueous solvent, the nonaqueous electrolytic solution being the nonaqueous electrolytic solution described in any of (a) to (j).

Advantageous Effects of Invention

The nonaqueous electrolytic solutions according to the present invention allow nonaqueous electrolyte secondary batteries to achieve both excellent initial battery characteristics and excellent battery characteristics after durability testing, making it possible to reduce the size of and to enhance the performance and safety of the nonaqueous electrolyte secondary batteries.

The nonaqueous electrolyte secondary batteries manufactured with the inventive nonaqueous electrolytic solutions, and the inventive nonaqueous electrolyte secondary batteries achieve both excellent initial battery characteristics and excellent battery characteristics after durability testing. The mechanisms and principles for such simultaneous enhancement are not fully understood but are probably the following. However, the mechanisms and principles described below do not limit the scope of the invention.

Aromatic carboxylate esters and carboxylic aromatic esters, typically those described in Patent Literatures 1 to 13, usually provide an enhancement in battery characteristics through the formation of film structures on positive electrodes. In the aromatic carboxylate esters or the carboxylic aromatic esters described in Patent Literatures 1 to 10 in which an oxycarbonyl group or a carbonyloxy group is bonded directly on the aromatic ring, however, a vacant orbital of the aromatic ring overlaps with a vacant orbital of the carbonyl group and consequently the compound is reduced very easily on the negative electrode to form a large amount of a film having low $Li^+$ conductivity. As a result, charge discharge characteristics or charge discharge efficiency at high current density may be significantly decreased. Further, the facilitated reductive side reaction may cause a significant decrease in discharge capacity.

In the phenylacetate esters described in Patent Literatures 11 and 12, the carbonyl group and the aromatic ring are so close to each other via a methylene group that their unoccupied orbitals overlap similarly to the case of the above compounds. Consequently, the reductive side reaction takes place on the negative electrode. Thus, these compounds can cause a decrease in battery characteristics similarly to the compounds described in Patent Literatures 1 to 10.

Patent Literature 13 is directed to solving the aforementioned problem by using an aromatic carboxylate ester prone to reduction in combination with a specific additive. However, the aromatic carboxylate esters described in the literature have so low resistance to oxidation that the side reaction occurs on the positive electrode at a normal service voltage possibly to cause a significant decrease in battery characteristics.

Meanwhile, at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), carboxylate esters represented by Formula (3), cyclic compounds having a plurality of ether bonds, monofluorophosphate salts, difluorophosphate salts, borate salts, oxalate salts and fluorosulfonate salts (these compounds are also written as the compounds (II)) forms a film on the negative electrode to provide an enhancement in performance. However, a degradation occurs at the same time due to the oxidative side reaction on the positive electrode. Thus, the addition of these compounds alone provides only an insufficient enhancement in battery characteristics.

The first aspect of the present invention is based on the finding that the above problem can be solved by the incorporation of an aromatic carboxylate ester represented by Formula (1) into a nonaqueous electrolytic solution.

As will be described below, the aromatic carboxylate ester represented by Formula (1) has a carbonyl group and an aromatic ring which are so separated from each other that their vacant orbitals are unlikely to overlap with each other. This configuration is probably the reason why the reductive side reaction on the negative electrode is suppressed from occurring. Specifically, the aromatic carboxylate ester represented by Formula (1) includes a carbon atom having a hydrocarbon group as a substituent between the carbonyl group and the aromatic ring. In such a structure, the overlapping of unoccupied orbitals of the carbonyl group and the aromatic ring is difficult to occur due to the steric hindrance of the hydrocarbon group. As a result, the occurrence of the reductive side reaction on the negative electrode is reduced to the minimum. Thus, the compound can form a film structure on the positive electrode without decrease in battery characteristics, thereby realizing an enhancement in battery characteristics. In another embodiment, the aromatic carboxylate ester represented by Formula (1) may include a carboxylate skeleton having a long alkylene chain between the carbonyl group and the aromatic ring. In such a structure, the carbonyl group and the aromatic ring are so separated from each other that the probability of the overlapping of their vacant orbitals is reduced. Consequently, the occurrence of the reductive side reaction on the negative electrode can be prevented. When the alkylene group is an ethylene group, the carbonyl group and the aromatic ring are separated from each other but their vacant orbitals have slight overlapping. Further, in the case where the ester moiety has an aromatic ring, the compound may have a decreased resistance to reduction because the three groups in the structure, namely, the aromatic ring in the carboxylate skeleton, the carbonyl group and the aromatic ring in the ester moiety interact with one another at the same time. In this case, the reductive side reaction can take place on the negative electrode. Thus, the aromatic carboxylate ester represented by Formula (1) has a requirement that when the alkylene group between the carbonyl group and the aromatic ring in the carboxylate skeleton is an ethylene group, the ester moiety is an aliphatic hydrocarbon group.

The second aspect of the present invention is based on the finding that the problem discussed hereinabove can be solved by the incorporation of both an aromatic carboxylate ester represented by Formula (2) and a compound (II) into a nonaqueous electrolytic solution.

When used alone, the aromatic carboxylate ester represented by Formula (2) will undergo the reductive side reaction on the negative electrode due to the overlapping of unoccupied orbitals of the aromatic ring and the carbonyl group in the carboxylate skeleton similarly to as described hereinabove, and will form a large amount of a film having low $Li^+$ conductivity. When, in contrast, the aromatic carboxylate ester represented by Formula (2) is used together with the compound (II), the compound (II) forms a film on the negative electrode which prevents the reductive side reaction of the aromatic carboxylate ester represented by Formula (2). Further, part of the aromatic carboxylate ester represented by Formula (2) is incorporated during the formation of a film of the compound (II) on the negative electrode. Consequently, a stable composite film having high $Li^+$ conductivity is formed. On the positive electrode, the aromatic carboxylate ester represented by Formula (2) forms a film structure which prevents the oxidative side reaction of the compound (II). As a result, initial battery characteristics and battery characteristics after durability testing can be enhanced at the same time without causing a decrease in battery characteristics.

BEST MODE FOR CARRYING OUT INVENTION

Hereinbelow, embodiments of the invention will be described. However, the scope of the invention is not limited to such embodiments and embraces all modifications without departing from the spirit of the invention.

1. Nonaqueous Electrolytic Solutions

⟨First Aspect of Invention⟩

1-1. Aromatic Carboxylate Esters Represented by Formula (1)

The first aspect of the invention is characterized in that the nonaqueous electrolytic solution includes an aromatic carboxylate ester represented by Formula (1). The aromatic carboxylate ester represented by Formula (1) may be any of optical isomers, that is, may be a single isomer or a mixture of isomers.

[Chem. 4]

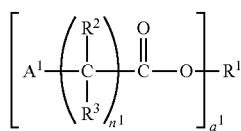

(1)

(In the formula,
$A^1$ is an optionally substituted aryl group,
$n^1$ is an integer of 1 or greater,
$R^2$ and $R^3$ are independently a hydrogen atom, a halogen atom or an optionally substituted hydrocarbon group having 1 to 12 carbon atoms and may be bonded to each other to form a ring wherein when a plurality of $R^2$s are present, $R^2$s may be the same as or different from one another and when a plurality of $R^3$s are present, $R^3$s may be the same as or different from one another, $a^1$ is an integer of 1 or 2, when $a^1$ is 1, $R^1$ is an optionally substituted hydrocarbon group having 1 to 12 carbon atoms, when $a^2$ is 2, $R^1$ is an optionally substituted hydrocarbon group having 1 to 12 carbon atoms and A's may be the same as or different from each other, when $n^1$ is 1, at least one of $R^2$ and $R^3$ is a hydrocarbon group having 1 to 12 carbon atoms, and when $n^1$ is 2 and $R^2$s and $R^3$s are all hydrogen atoms, $R^1$ is an aliphatic hydrocarbon group having 1 to 12 carbon atoms.)

When $n^1$ in Formula (1) is an integer of 2 or greater and/or when $a^1$ is 2, the compound has a plurality of $R^2$s and a plurality of $R^3$s. Such $R^2$s and $R^3$s each may be the same as or different from one another. When $a^1$ is 2, the plurality of $A^1$s may be the same as or different from each other.

In Formula (1), $R^2$ and $R^3$ may be bonded to each other to form a ring. In this case, it is preferable that $R^2$ and $R^3$ on the same carbon atom be bonded to each other to form a ring. In Formula (1), no rings are formed by the bonding of $R^1$ and $R^2$, the bonding of $R^1$ and $R^3$, the bonding of $A^1$ and $R^1$, the bonding of $A^1$ and $R^2$, the bonding of $A^1$ and $R^3$, the bonding of $R^1$, $R^2$ and $A^1$, or the bonding of $R^1$, $R^3$ and $A^1$.

In Formula (1), $R^1$ is an optionally substituted hydrocarbon group having 1 to 12 carbon atoms. When $a^1$ is 1, $R^1$ is a monovalent group. When $a^1$ is 2, $R^1$ is a divalent group. In the optionally substituted hydrocarbon group having 1 to 12 carbon atoms, the number of carbon atoms ranging from 1 to 12 refers to the number of carbon atoms in the hydrocarbon group. When $R^1$ has a substituent, the above number of carbon atoms does not include the number of carbon atoms in the substituent. The number of carbon atoms in the hydrocarbon group $R^1$ is preferably not more than 10, more preferably not more than 9, and still more preferably not more than 5.

Here, the term hydrocarbon groups indicates groups composed of carbon and hydrogen atoms, and specifically refers to aliphatic hydrocarbon groups and aromatic hydrocarbon groups. The aliphatic hydrocarbon groups are acyclic or cyclic hydrocarbon groups composed of carbon and hydrogen atoms without any aromatic structures. The aromatic hydrocarbon groups are hydrocarbon groups composed of carbon and hydrogen atoms with an aromatic structure.

Here, the term substituents refers to groups composed of one or more atoms selected from the group consisting of carbon atoms, hydrogen atoms, nitrogen atoms, oxygen atoms, sulfur atoms, phosphorus atoms and halogen atoms (except those groups composed solely of carbon and hydrogen atoms).

Examples of the substituents include halogen atoms (preferably fluorine atoms); alkoxy groups; halogenated (preferably fluorinated) alkyl groups, alkenyl groups, alkynyl groups, aryl groups or alkoxy groups; cyano groups; isocyanate groups; alkoxycarbonyloxy groups; acyl groups; carboxyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Halogen atoms and halogenated alkyl groups are preferable, and halogen atoms and halogenated alkyl groups are more preferable. Examples of the alkyl groups and the alkoxy groups as the substituents (including such groups constituting parts of the substituents) include those groups having 1 to 6 carbon atoms. Examples of the alkenyl groups and the alkynyl groups include those groups having 2 to 6 carbon atoms. Examples of the aryl groups include those groups having 6 to 12 carbon atoms.

Examples of the hydrocarbon groups will be described below. While the following examples illustrate monovalent hydrocarbon groups (corresponding to when $a^1$ is 1), the corresponding divalent groups may be adopted when $a^1$ is 2. For example, the divalent groups corresponding to alkyl groups, alkenyl groups, alkynyl groups and aryl groups are alkylene groups, alkenylene groups, alkynylene groups and arylene groups, respectively.

Examples of the hydrocarbon groups include aliphatic hydrocarbon groups such as alkyl groups, alkenyl groups and alkynyl groups, and aromatic hydrocarbon groups such as aryl groups and aralkyl groups.

Of these, preferred groups are, for example, alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups having 2 to 5 carbon atoms such as vinyl group, 1-propenyl group, 2-propenyl group, isopropenyl group, 1-butenyl group, 2-butenyl group, 3-butenyl group, 1-pentenyl group, 2-pentenyl group, 3-pentenyl group and 4-pentenyl group; alkynyl groups having 2 to 5 carbon atoms such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group; aryl groups such as phenyl group, tolyl group, xylyl group, ethylphenyl group, n-propylphenyl group, i-propylphenyl group, n-butylphenyl group, sec-butylphenyl group, i-butylphenyl group and tert-butylphenyl group; and aralkyl groups having 7 to 12 carbon atoms such as benzyl group, α-methylbenzyl group, 1-methyl-1-phenylethyl group, phenethyl group, 2-phenylpropyl group, 2-methyl-2-phenylpropyl group, 3-phenylpropyl group, 3-phenylbutyl group, 3-methyl-3-phenylbutyl group, 4-phenylbutyl group, 5-phenylpentyl group and 6-phenylhexyl group. More preferred groups are alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; and aralkyl groups having 7 to 12 carbon atoms such as benzyl group, α-methylbenzyl group, 1-methyl-1-phenylethyl group, phenethyl group, 2-phenylpropyl group, 2-methyl-2-phenylpropyl group, 3-phenylpropyl group, 3-phenylbutyl group, 3-methyl-3-phenylbutyl group, 4-phenylbutyl group, 5-phenylpentyl group and 6-phenylhexyl group. Methyl group, ethyl group, n-propyl group, n-butyl group, benzyl group, phenethyl group, 3-phenylpropyl group and 4-phenylbutyl group are still more preferable, and methyl group, ethyl group, n-propyl group and n-butyl group are particularly preferable.

Substituted hydrocarbon groups are also suitably used. Examples of the substituents include halogen atoms (preferably fluorine atoms) and unsubstituted or halogenated (preferably fluorinated) alkoxy groups. Preferred examples of the substituted hydrocarbon groups include trifluoromethylphenyl group, methoxyphenyl group, ethoxyphenyl group, trifluoromethoxyphenyl group, monofluorophenyl group, difluorophenyl group, trifluorophenyl group and tetrafluorophenyl group.

While the above examples illustrate monovalent hydrocarbon groups and monovalent substituted hydrocarbon groups, the corresponding divalent groups may be adopted when $a^1$ is 2. In particular, preferred examples include alkylene groups having 1 to 5 carbon atoms such as methylene group, ethylene group, trimethylene group, tetramethylene group and pentamethylene group; alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentylene group and 2-pentylene group.

In Formula (1), $R^2$ and $R^3$ are independently a hydrogen atom, a halogen atom (preferably a fluorine atom) or an optionally substituted hydrocarbon group having 1 to 12 carbon atoms and may be bonded to each other to form a ring. Examples of the substituents include those groups mentioned for $R^1$. In particular, they are preferably each a hydrogen atom or an optionally substituted hydrocarbon group having 1 to 12 carbon atoms, more preferably each an optionally substituted hydrocarbon group having 1 to 12 carbon atoms, and still more preferably each an unsubstituted hydrocarbon group having 1 to 12 carbon atoms.

When $R^2$ and $R^3$ are optionally substituted hydrocarbon groups, the number of carbon atoms in the hydrocarbon group is preferably not more than 8, more preferably not more than 4, and still more preferably not more than 2.

Examples of the hydrocarbon groups include aliphatic hydrocarbon groups such as alkyl groups, alkenyl groups and alkynyl groups, and aromatic hydrocarbon groups such as aryl groups and aralkyl groups.

Of these, preferred groups are alkyl groups having 1 to 4 carbon atoms such as methyl group, ethyl group, n-propyl group, i-propyl group, n-butyl group, sec-butyl group, i-butyl group and tert-butyl group; alkenyl groups having 2 to 4 carbon atoms such as vinyl group, 1-propenyl group, 2-propenyl group, isopropenyl group, 1-butenyl group, 2-butenyl group and 3-butenyl group; alkynyl groups having 2 to 4 carbon atoms such as ethynyl group, 1-propynyl group, 2-propynyl group, 1-butynyl group, 2-butynyl group and 3-butynyl group; aryl groups such as phenyl group, tolyl group, xylyl group, ethylphenyl group, n-propylphenyl group, i-propylphenyl group, n-butylphenyl group, sec-butylphenyl group, i-butylphenyl group and tert-butylphenyl group; and aralkyl groups having 7 to 12 carbon atoms such as benzyl group, α-methylbenzyl group, 1-methyl-1-phenylethyl group, phenethyl group, 2-phenylpropyl group, 2-methyl-2-phenylpropyl group, 3-phenylpropyl group, 3-phenylbutyl group, 3-methyl-3-phenylbutyl group, 4-phenylbutyl group, 5-phenylpentyl group and 6-phenylhexyl group. Alkyl groups having 1 to 4 carbon atoms such as methyl group, ethyl group, n-propyl group, i-propyl group, n-butyl group, sec-butyl group, i-butyl group and tert-butyl group are more preferable, and methyl group and ethyl group are still more preferable.

Substituted hydrocarbon groups are also suitably used. Examples of the substituents include halogen atoms (preferably fluorine atoms) and unsubstituted or halogenated (preferably fluorinated) alkoxy groups. Specific examples include trifluoromethylphenyl group, methoxyphenyl group, ethoxyphenyl group and trifluoromethoxyphenyl group.

When $R^2$ and $R^3$ are bonded to each other to form a ring, the ring structure is not particularly limited but is preferably such that the ring skeleton is composed of carbon, nitrogen, oxygen and sulfur atoms, and more preferably composed of carbon atoms. The number of ring member atoms in the ring structure may be 3 to 12, and preferably 4 to 8. When the ring skeleton is composed of carbon atoms, the total number of carbon atoms constituting the ring may be 3 or more, and preferably 4 or more, and may be 12 or less, preferably 8 or less, more preferably 6 or less, and still more preferably 5 or less.

Specific examples of the ring structures include cycloalkane structures, oxacycloalkane structures, azacycloalkane structures and thiacycloalkane structures. Of these, cycloalkane structures having 3 to 12 carbon atoms are preferable, with examples including cyclopropane structure, cyclobutane structure, cyclopentane structure, cyclohexane structure, cycloheptane structure, cyclooctane structure, cyclononane structure, cyclodecane structure, cycloundecane structure and cyclododecane structure. Cyclopropane structure, cyclobutane structure, cyclopentane structure and cyclohexane structure are more preferable, and cyclopentane structure and cyclohexane structure are still more preferable.

In Formula (1), $A^1$ is an optionally substituted aryl group. Examples of the substituents include those groups mentioned for $R^1$. The aryl groups are not particularly limited, but the number of carbon atoms may be 6 or more, preferably 7 or more, and more preferably 8 or more, and may be 12 or less, preferably 11 or less, and more preferably 10 or less.

Examples of the aryl groups include phenyl group, tolyl group, ethylphenyl group, n-propylphenyl group, i-propylphenyl group, n-butylphenyl group, sec-butylphenyl group, i-butylphenyl group, tert-butylphenyl group and xylyl group. Those aryl groups having halogen atoms (preferably fluorine atoms) or unsubstituted or halogenated (preferably fluorinated) alkoxy groups as the substituents are also preferable, with examples including trifluoromethylphenyl group, methoxyphenyl group, ethoxyphenyl group, trifluoromethoxyphenyl group, monofluorophenyl group, difluorophenyl group, trifluorophenyl group, tetrafluorophenyl group and pentafluorophenyl group. Of these, phenyl group, tolyl group, tert-butylphenyl group, methoxyphenyl group and monofluorophenyl group are preferable. Phenyl group and tolyl group are more preferable, and phenyl group is still more preferable.

In Formula (1), $n^1$ is an integer of 1 or greater and may be an integer of 5 or less, preferably 4 or less, more preferably 3 or less, still more preferably 2 or less, and particularly preferably 1.

In Formula (1), $a^1$ is an integer of 1 or 2, and is preferably 1.

When $n^1$ is 1, at least one of $R^2$ and $R^3$ is a hydrocarbon group having 1 to 12 carbon atoms. When $n^1$ is 2 and $R^2$s and $R^3$s are all hydrogen atoms, $R^1$ is an aliphatic hydrocarbon group having 1 to 12 carbon atoms.

Examples of the aromatic carboxylate esters represented by Formula (1) include the following compounds.

《$a^1$=1》

Specific examples of the compounds in which $a^1$=1 are illustrated below. In the examples, $R^1$ represents a hydrocarbon group selected from methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group, 1,2-dimethylpropyl group, benzyl group, α-methylbenzyl group, 1-methyl-1-phenylethyl group, phenethyl group, 2-phenylpropyl group, 2-methyl-2-phenylpropyl group, 3-phenylpropyl group, 3-phenylbutyl group, 3-methyl-3-phenylbutyl group, 4-phenylbutyl group, 5-phenylpentyl group and 6-phenylhexyl group, and $R^1$ is a hydrocarbon group selected from methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group.

$n^1$=1, $R^2$=halogen atom or optionally halogenated hydrocarbon group, $R^3$=hydrogen atom, $A^1$=phenyl group

[Chem. 5]

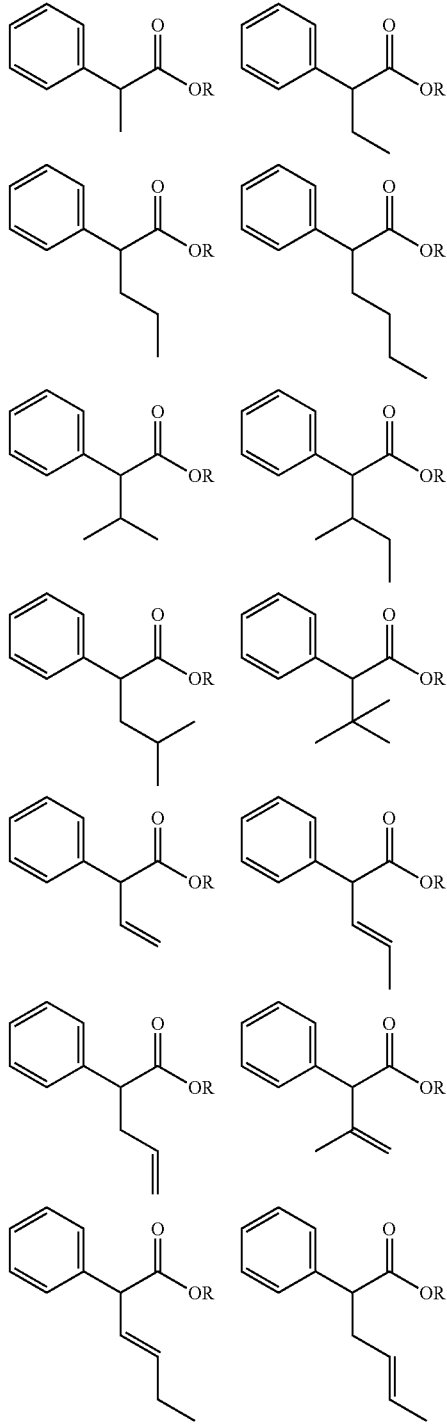

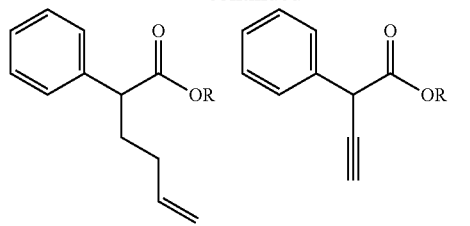
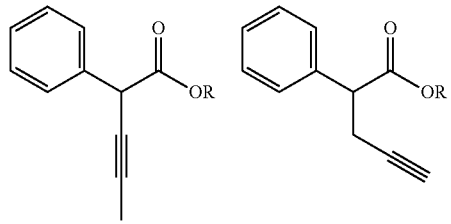
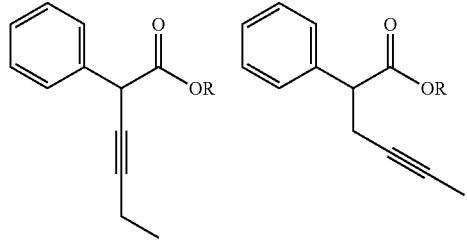
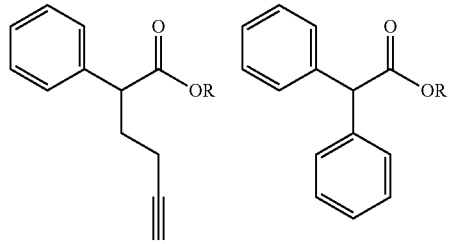
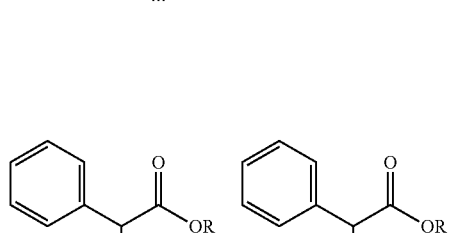
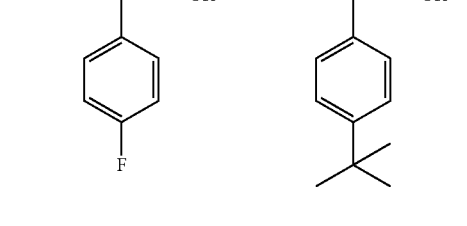
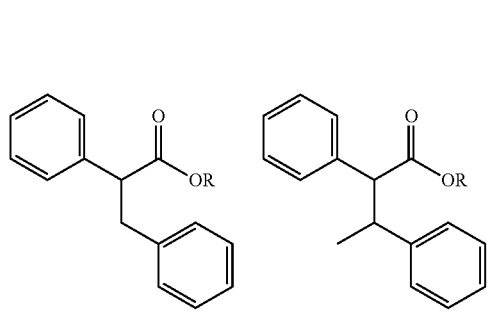
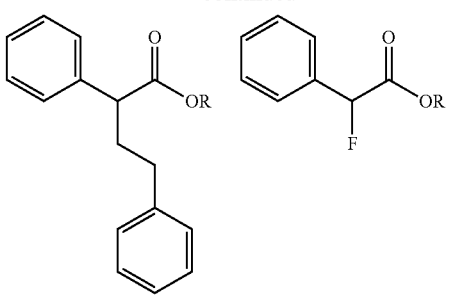
$n^1=1$, $R^2$=halogen atom or hydrocarbon group, $R^3$=hydrogen atom, $A^1$=tolyl group
[Chem. 6]
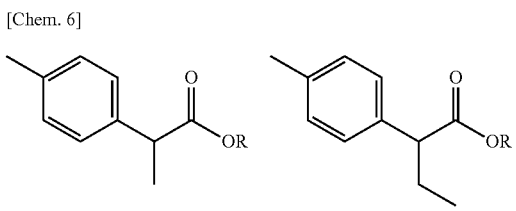
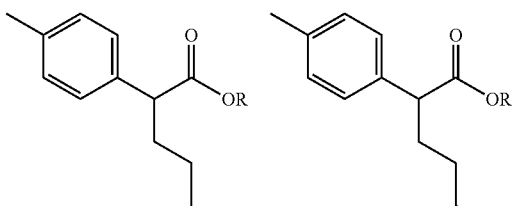
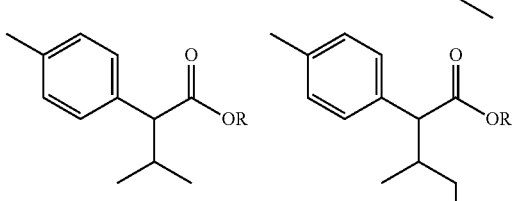
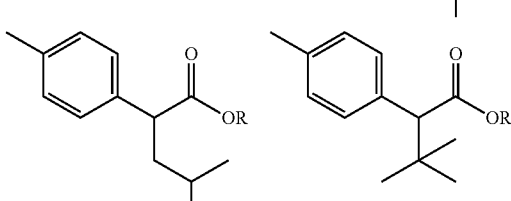
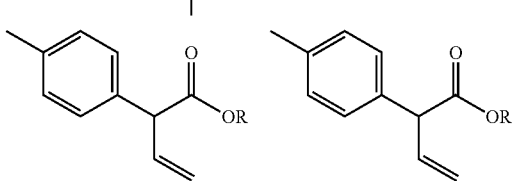
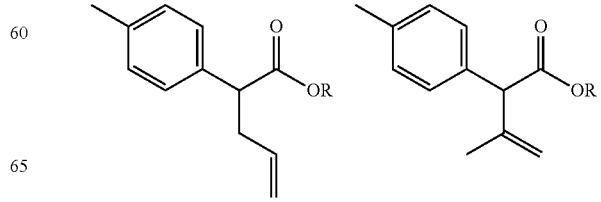

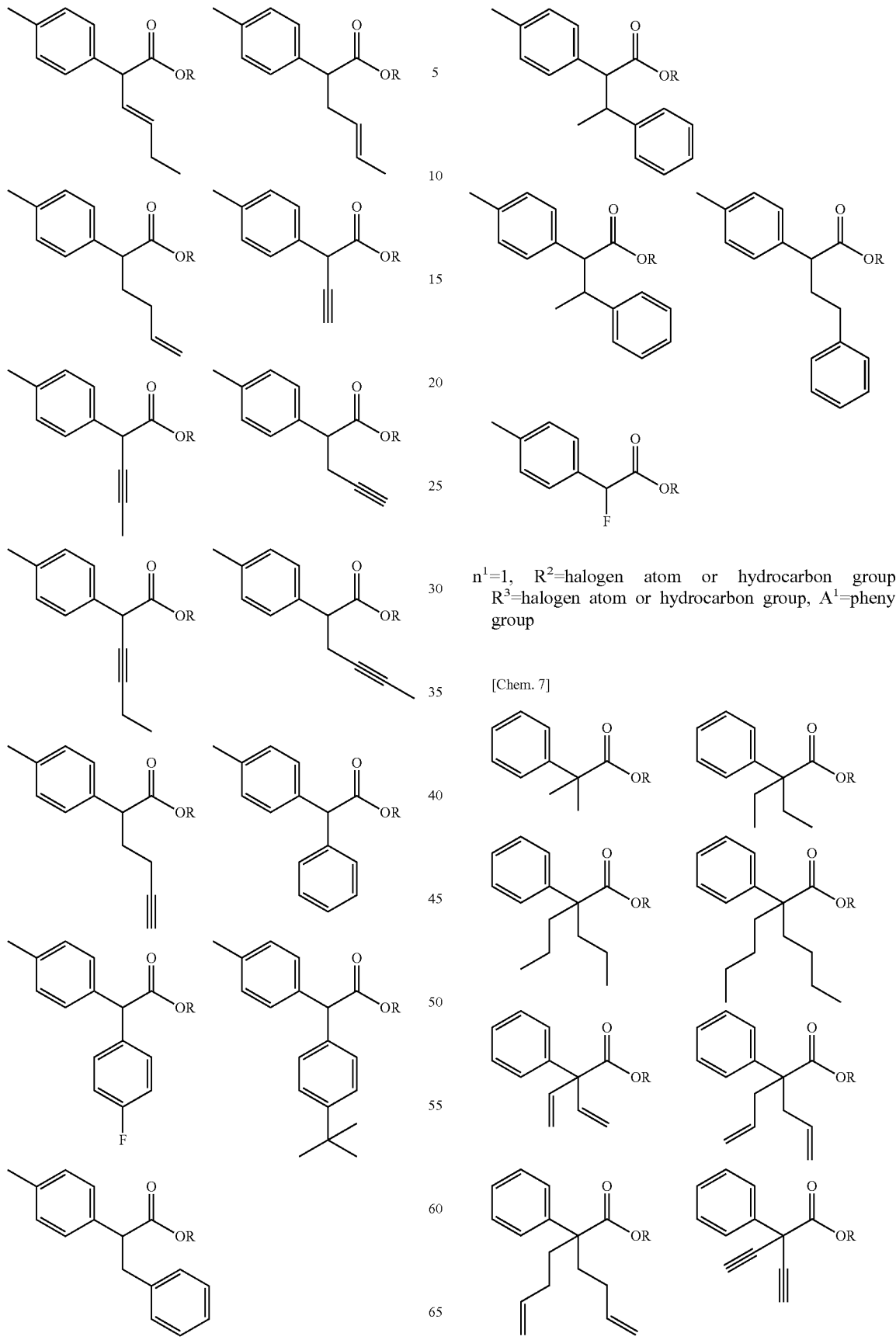
$n^1=1$, $R^2$=halogen atom or hydrocarbon group, $R^3$=halogen atom or hydrocarbon group, $A^1$=phenyl group
[Chem. 7]

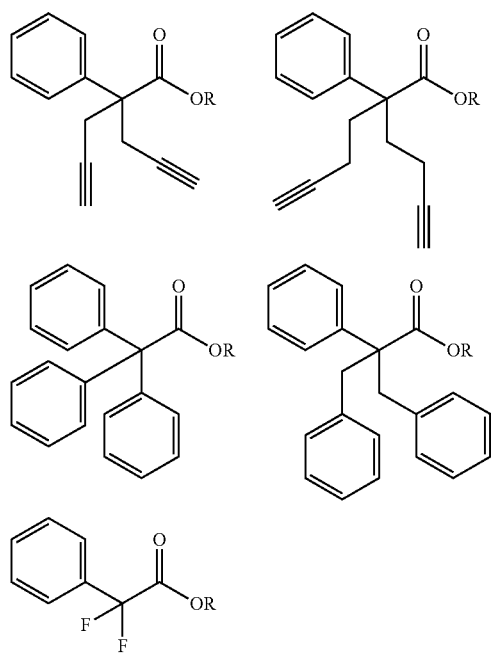
$n^1=1$, $R^2$ and $R^3$ bonded to each other to form a ring, $A^1$=phenyl group
[Chem. 8]
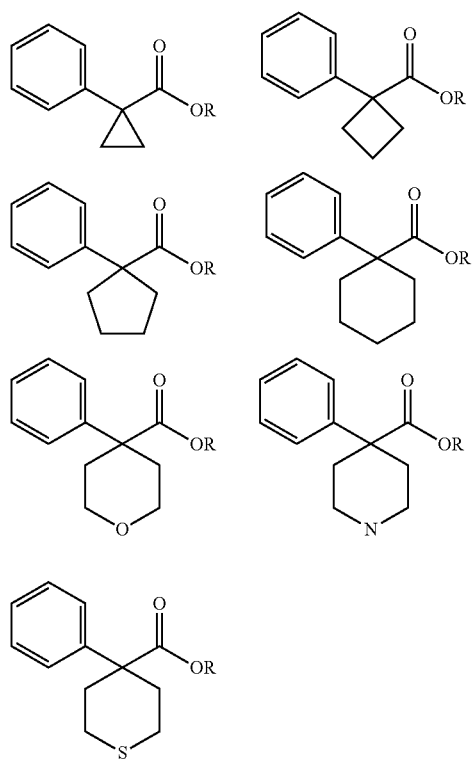
$n^1=1$, $R^2$=halogen atom or hydrocarbon group, $R^3$=halogen atom or hydrocarbon group, $A^1$=tolyl group
[Chem. 9]
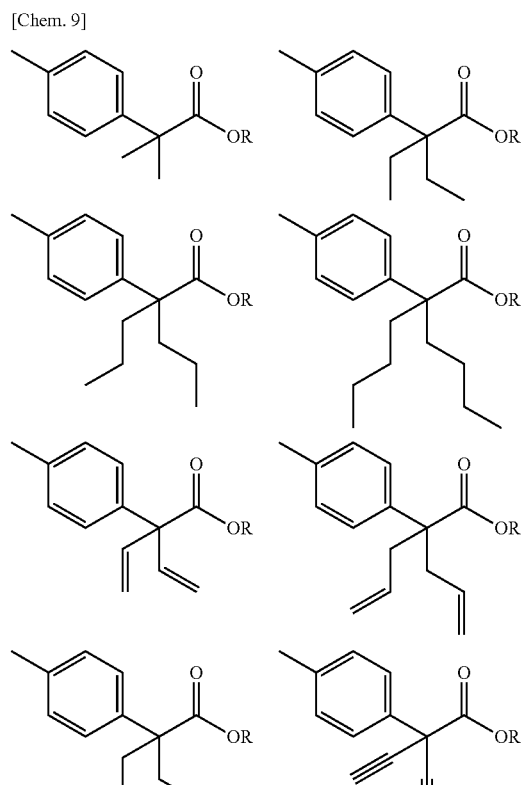
$n^1=1$, $R^2$ and $R^3$ bonded to each other to form a ring, $A^1$=tolyl group

[Chem. 10]
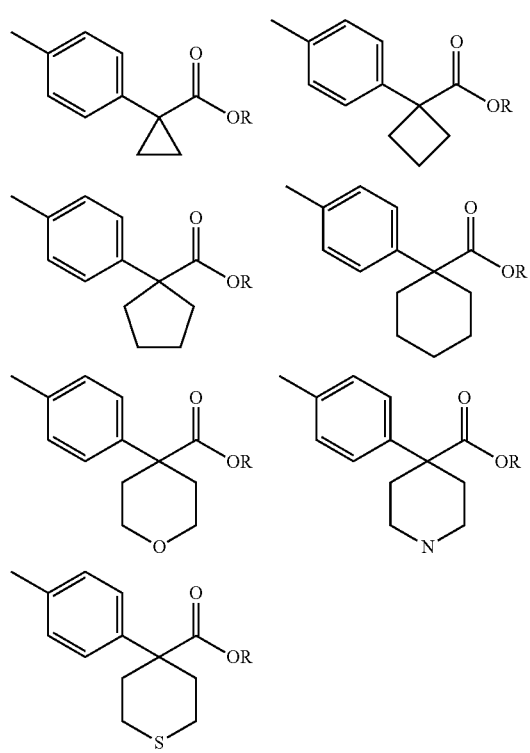
$n^1=2$
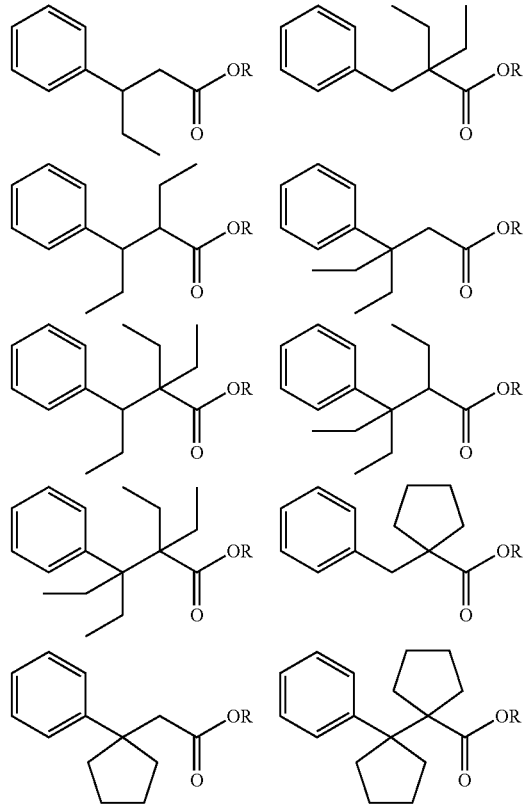
$n^1=3$
[Chem. 11]
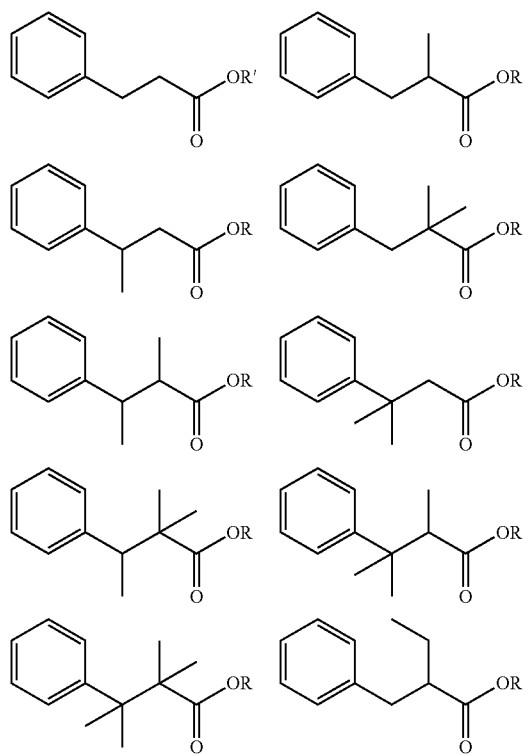
[Chem. 12]
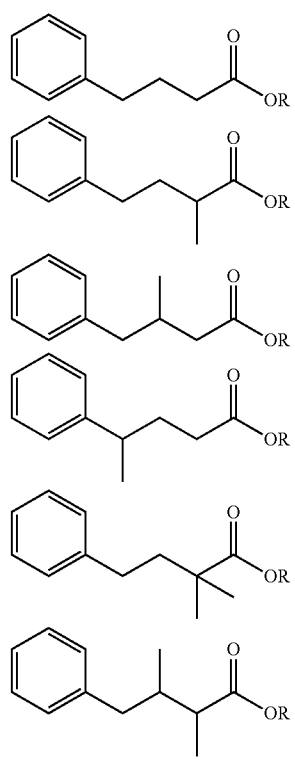

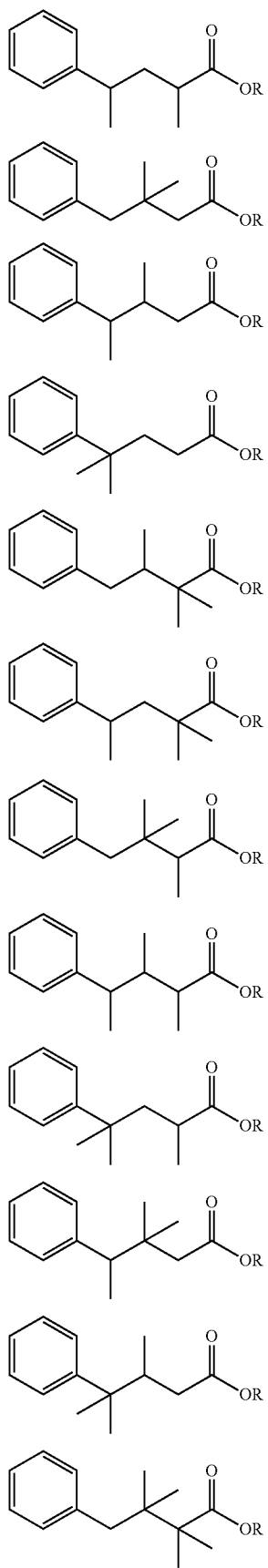
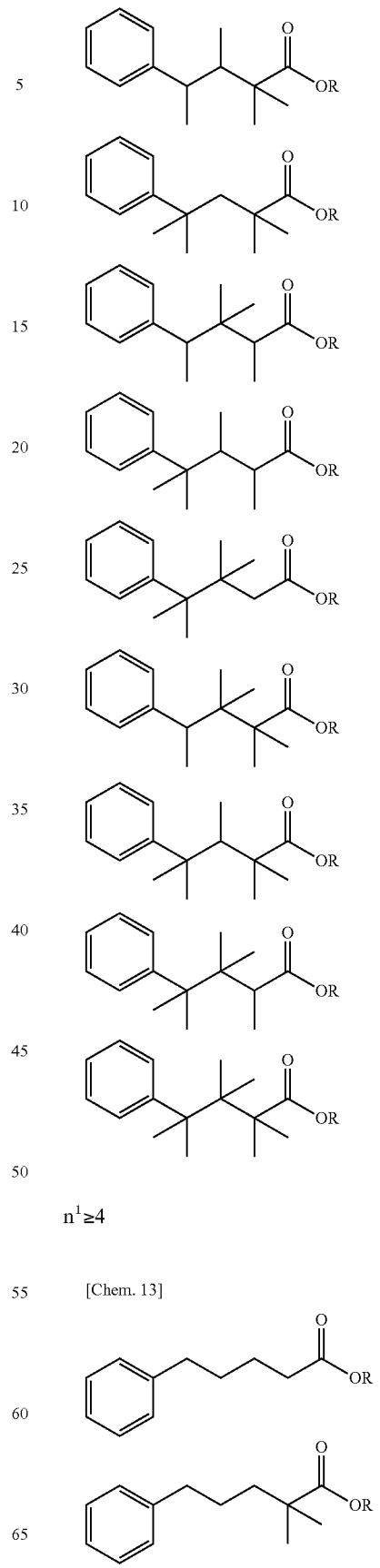
$n^1 \geq 4$
[Chem. 13]

-continued

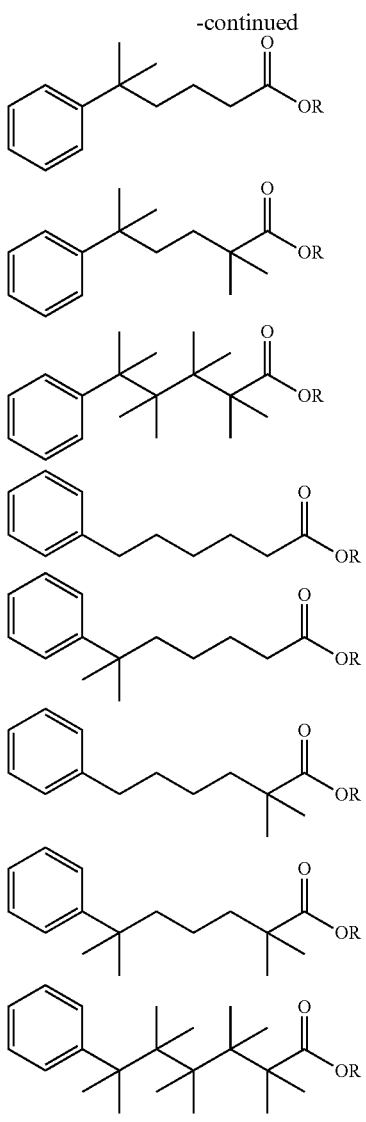

《 $a^1=2$ 》

Specific examples of the compounds in which $a^1=2$ are illustrated below. In the examples, R represents a hydrocarbon group selected from methylene group, ethylene group, trimethylene group, tetramethylene group, pentamethylene group, vinylene group, 1-propenylene group, 2-propenylene group, 1-butenylene group, 2-butenylene group, 1-pentenylene group, 2-pentenylene group, ethynylene group, propynylene group, 1-butynylene group, 2-butynylene group, 1-pentylene group and 2-pentylene group.

[Chem. 14]

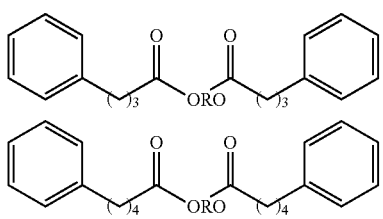

-continued

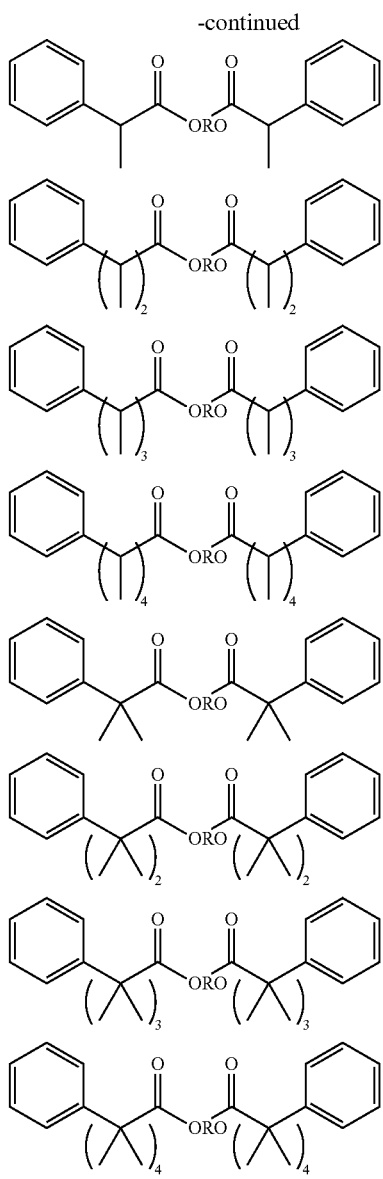

In particular, the following compounds are preferable in view of the fact that they are less prone to the reductive side reaction on the negative electrode.

[Chem. 15]

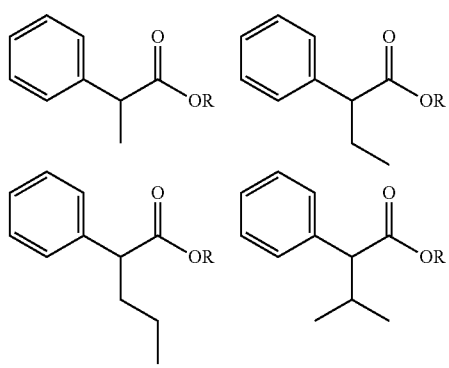

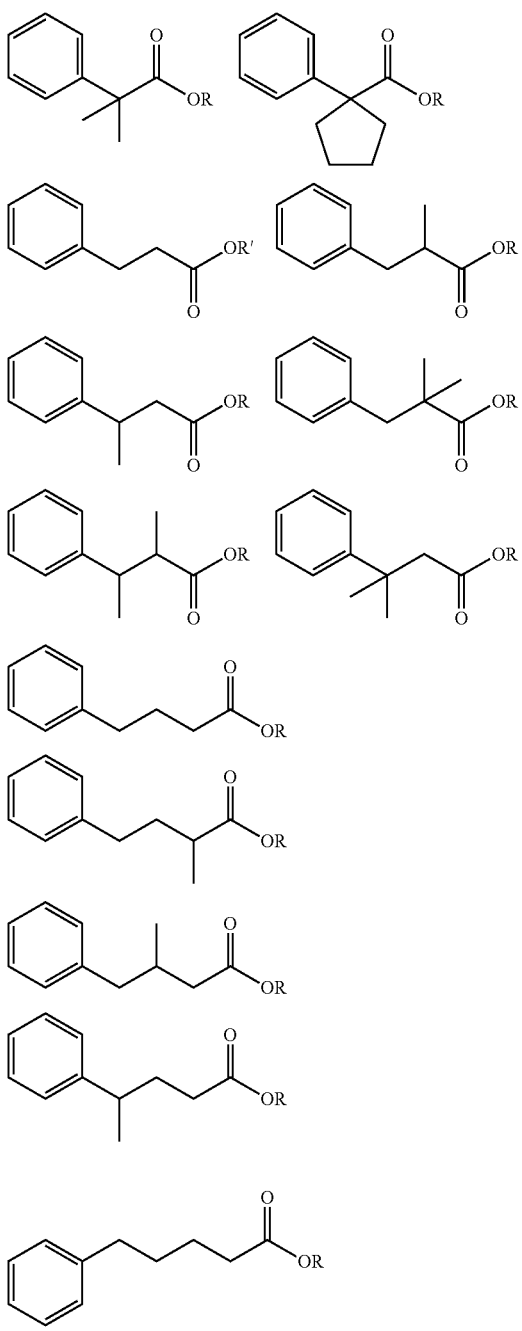

Of the above compounds, the following compounds are more preferable in view of the fact that they are less prone to the oxidative side reaction on the positive electrode.

[Chem. 16]

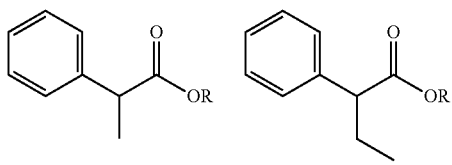

The aromatic carboxylate esters represented by Formula (1) may be used singly, or two or more may be used in combination. In the whole amount of the nonaqueous electrolytic solution (100 mass %), the amount of the aromatic carboxylate ester represented by Formula (1) (the total amount when two or more kinds of the esters are used) may be 0.001 mass % or above, preferably 0.01 mass % or above, more preferably 0.05 mass % or above, and still more preferably 0.1 mass % or above, and may be 10 mass % or below, preferably 8 mass % or below, more preferably 5 mass % or below, still more preferably 3 mass % or below, and particularly preferably 2.5 mass % or below. This amount ensures that the advantageous effects of the invention will be obtained prominently and the increase in battery resistance can be prevented.

The compounds described above may be added to the electrolytic solution of the invention by any methods without limitation. For example, the compounds may be added directly to the electrolytic solution, or a method may be adopted which generates the compounds in the battery or in the electrolytic solution. For example, the compounds may be generated by adding precursor compounds followed by reaction such as oxidation or hydrolysis of the battery components such as the electrolytic solution. Alternatively, the compounds may be generated in the battery by the application of electric loads such as charging and discharging.

In the first aspect of the present invention, the aromatic carboxylate ester represented by Formula (1) may be used in combination with at least one compound selected from the group consisting of aromatic carboxylate esters represented by Formula (2) described later, cyclic carbonates having a carbon-carbon unsaturated bond and compounds (II) described later. Of the compounds (II), the aromatic compounds other than those of Formula (2) do not include the aromatic compounds represented by Formula (1). And carboxylate esters represented by Formula (3) are other than the carboxylate esters of Formula (1). Specific examples and preferred examples of the aromatic carboxylate esters represented by Formula (2) and the compounds (II) as well as preferred amounts in which these compounds are used will be described in the second aspect of the present invention. Examples of the cyclic carbonates having a carbon-carbon unsaturated bond include vinylene carbonate, and the description in "1-6. Auxiliaries" also applies to the cyclic carbonates used here.

⟨Second Aspect of Invention⟩

1-2. Aromatic Carboxylate Esters Represented by Formula (2)

The second aspect of the invention is characterized in that the nonaqueous electrolytic solution includes an aromatic carboxylate ester represented by Formula (2). The aromatic carboxylate ester represented by Formula (2) may be any of optical isomers, that is, may be a single isomer or a mixture of isomers.

[Chem. 17]

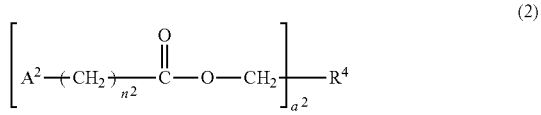

(2)

(In the formula,
$A^2$ is an optionally substituted aryl group,
$n^2$ is an integer of 1 or 2,
$a^2$ is an integer of 1 or 2,
when $a^2$ is 1, $R^4$ is a hydrogen atom, an optionally substituted aliphatic hydrocarbon group having 1 to 12 carbon atoms or an optionally substituted aryl group, with the proviso that when $n^2$ is 2, $R^4$ is an optionally substituted aryl group, and when $a^2$ is 2, $R^4$ is a single bond, an optionally substituted aliphatic hydrocarbon group having 1 to 12 carbon atoms or an optionally substituted arylene group, and $A^2$s may be the same as or different from each other, with the proviso that when $n^2$ is 2, $R^4$ is an optionally substituted arylene group.)

In Formula (2), $R^4$ and $A^2$ are not bonded to each other to form a ring.

When $a^2$ in Formula (2) is 1, $R^4$ is a hydrogen atom, an optionally substituted (monovalent) aliphatic hydrocarbon group having 1 to 12 carbon atoms or an optionally substituted aryl group. Examples of the substituents include those groups mentioned for $R^1$.

The number of carbon atoms in the (monovalent) aliphatic hydrocarbon group is preferably 10 or less, more preferably 9 or less, and still more preferably 5 or less.

Examples of the (monovalent) aliphatic hydrocarbon groups include alkyl groups, alkenyl groups and alkynyl groups.

Of these, preferred groups are, for example, alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups having 2 to 5 carbon atoms such as vinyl group, 1-propenyl group, 2-propenyl group, isopropenyl group, 1-butenyl group, 2-butenyl group, 3-butenyl group, 1-pentenyl group, 2-pentenyl group, 3-pentenyl group and 4-pentenyl group; and alkynyl groups having 2 to 5 carbon atoms such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group. More preferred groups are alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group. Methyl group, ethyl group, n-propyl group and n-butyl group are still more preferable, and methyl group and ethyl group are particularly preferable.

The aliphatic hydrocarbon group may have a substituent but is preferably unsubstituted.

The aryl groups are not particularly limited, but the number of carbon atoms may be 6 or more, preferably 7 or more, and more preferably 8 or more, and may be 12 or less, preferably 11 or less, and more preferably 10 or less.

Examples of the aryl groups include phenyl group, tolyl group, ethylphenyl group, n-propylphenyl group, i-propylphenyl group, n-butylphenyl group, sec-butylphenyl group, i-butylphenyl group, tert-butylphenyl group and xylyl group. Those aryl groups having halogen atoms (preferably fluorine atoms) or unsubstituted or halogenated (preferably fluorinated) alkoxy groups as the substituents are also preferable, with examples including trifluoromethylphenyl group, xylyl group, methoxyphenyl group, ethoxyphenyl group, trifluoromethoxyphenyl group, monofluorophenyl group, difluorophenyl group, trifluorophenyl group, tetrafluorophenyl group and pentafluorophenyl group. Of these, phenyl group, tolyl group, tert-butylphenyl group, methoxyphenyl group and monofluorophenyl group are preferable. Phenyl group and tolyl group are more preferable, and phenyl group is still more preferable.

When $a^2$ is 1, $R^4$ is preferably a hydrogen atom or an optionally substituted (monovalent) aliphatic hydrocarbon group having 1 to 12 carbon atoms, more preferably a hydrogen atom or an unsubstituted (monovalent) aliphatic hydrocarbon group having 1 to 12 carbon atoms, and still more preferably a hydrogen atom. In this case, when $n^2$ is 2, $R^4$ is an optionally substituted aryl group, and is preferably an unsubstituted aryl group.

When $a^2$ in Formula (2) is 2, $R^4$ is a single bond, an optionally substituted (divalent) aliphatic hydrocarbon group having 1 to 12 carbon atoms or an optionally substituted arylene group.

Examples of the (divalent) aliphatic hydrocarbon groups include those divalent groups corresponding to the (monovalent) aliphatic hydrocarbon groups described above. In particular, for example, preferred groups are alkylene groups having 1 to 5 carbon atoms such as methylene group, ethylene group, trimethylene group, tetramethylene group and pentamethylene group; alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentylene group and 2-pentylene group.

Examples of the arylene groups include those divalent groups corresponding to the aryl groups described above. In particular, for example, phenylene group is preferable.

When $a^2$ is 2, $R^4$ is preferably a single bond or an optionally substituted (divalent) aliphatic hydrocarbon group having 1 to 12 carbon atoms, and more preferably a single bond or an unsubstituted (divalent) aliphatic hydrocarbon group having 1 to 12 carbon atoms. In this case, when $n^2$ is 2, $R^4$ is an optionally substituted arylene group, and is preferably an unsubstituted arylene group.

In Formula (2), $A^2$ is an optionally substituted aryl group. Examples of the substituents include those groups mentioned for R1. The aryl groups are not particularly limited, but the number of carbon atoms may be 6 or more, preferably 7 or more, and more preferably 8 or more, and may be 12 or less, preferably 11 or less, and more preferably 10 or less. Examples of the aryl groups include phenyl group, tolyl group, ethylphenyl group, n-propylphenyl group, i-propylphenyl group, n-butylphenyl group, sec-butylphenyl group, i-butylphenyl group, tert-butylphenyl group and xylyl group. Those aryl groups having halogen atoms (preferably fluorine atoms) or unsubstituted or halogenated (preferably fluorinated) alkoxy groups as the substituents are also preferable, with examples including trifluoromethylphenyl group, xylyl group, methoxyphenyl group, ethoxyphenyl group, trifluoromethoxyphenyl group, monofluorophenyl group, difluorophenyl group, trifluorophenyl group, tetrafluorophenyl group and pentafluorophenyl group. Of these, phenyl group, tolyl group, tert-butylphenyl group, methoxyphenyl group and monofluorophenyl group are preferable. Phenyl group and tolyl group are more preferable, and phenyl group is still more preferable.

In Formula (2), $n^2$ is preferably 1. In Formula (2), $a^2$ is preferably 1.

Examples of the aromatic carboxylate esters represented by Formula (2) include the following compounds.

《 $a^2$=1 》

Specific examples of the compounds in which $a^2$=1 are illustrated below. In the examples, R represents a hydrogen atom or a group selected from methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group, 1,2-dimethylpropyl group, phenyl group, tolyl group, tert-butylphenyl group, methoxyphenyl group and monofluorophenyl group, and R' is an aryl group selected from phenyl group, tolyl group, tert-butylphenyl group, methoxyphenyl group and monofluorophenyl group.

[Chem. 18]

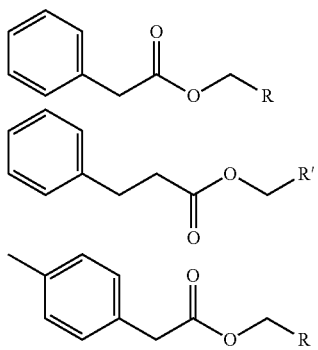

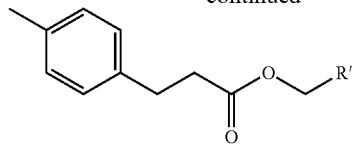

《 $a^2$=2 》

Specific examples of the compounds in which $a^2$=2 are illustrated below. In the examples, R represents a hydrocarbon group selected from methylene group, ethylene group, trimethylene group, tetramethylene group, pentamethylene group, vinylene group and ethynylene group.

[Chem. 19]

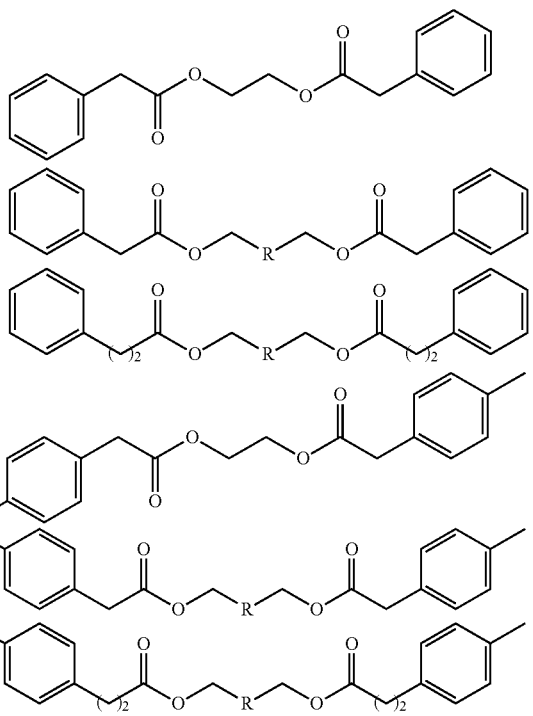

In particular, the following compounds are preferable in view of the fact that the compound is less prone to the reductive side reaction on the negative electrode.

[Chem. 20]

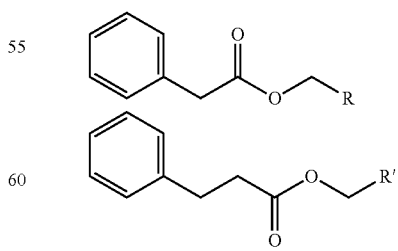

Of the above compounds, the following compound is more preferable in view of the fact that the compound is less prone to the oxidative side reaction on the positive electrode.

[Chem. 21]

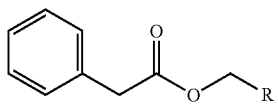

The aromatic carboxylate esters represented by Formula (2) may be used singly, or two or more may be used in combination. In the whole amount of the nonaqueous electrolytic solution (100 mass %), the amount of the aromatic carboxylate ester represented by Formula (2) (the total amount when two or more kinds of the esters are used) may be 0.001 mass % or above, preferably 0.01 mass % or above, more preferably 0.05 mass % or above, and still more preferably 0.1 mass % or above, and may be 10 mass % or below, preferably 8 mass % or below, more preferably 5 mass % or below, still more preferably 3 mass % or below, and particularly preferably 2.5 mass % or below. This amount ensures that the advantageous effects of the invention will be obtained prominently and the increase in battery resistance can be prevented.

The compounds described above may be added to the electrolytic solution of the invention by any methods without limitation. For example, the compounds may be added directly to the electrolytic solution, or a method may be adopted which generates the compounds in the battery or in the electrolytic solution. For example, the compounds may be generated by adding precursor compounds followed by reaction such as oxidation or hydrolysis of the battery components such as the electrolytic solution. Alternatively, the compounds may be generated in the battery by the application of electric loads such as charging and discharging.

1-3. Compounds (II)

The second aspect of the present invention is characterized in that the nonaqueous electrolytic solution includes the aromatic carboxylate ester represented by Formula (2) together with at least one compound (compound (II)) selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), carboxylate esters represented by Formula (3), cyclic compounds having a plurality of ether bonds, monofluorophosphate salts, difluorophosphate salts, borate salts, oxalate salts and fluorosulfonate salts. The combined use makes it possible to efficiently prevent the aromatic carboxylate ester represented by Formula (2) from possible side reactions.

In particular, a quality composite film is advantageously formed on the negative electrode and initial battery characteristics and battery characteristics after durability testing are advantageously enhanced in a balanced manner by using at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), carboxylate esters represented by Formula (3), monofluorophosphate salts, difluorophosphate salts, borate salts, oxalate salts and fluorosulfonate salts. It is more preferable that the compound be at least one selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), carboxylate esters represented by Formula (3), monofluorophosphate salts, difluorophosphate salts, oxalate salts and fluorosulfonate salts. It is still more preferable that the compound be at least one selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of Formula (2), monofluorophosphate salts, difluorophosphate salts, oxalate salts and fluorosulfonate salts. It is particularly preferable that the compound be at least one selected from the group consisting of sulfur-containing organic compounds, phosphonate esters, cyano group-containing organic compounds, isocyanate group-containing organic compounds, silicon-containing compounds, monofluorophosphate salts, difluorophosphate salts, oxalate salts and fluorosulfonate salts. One of the reasons for this preference is because these compounds form relatively low-molecular weight films on the negative electrodes and the negative electrode films formed are so dense that the films can efficiently prevent the aromatic carboxylate ester of Formula (2) from being degraded by side reactions. In this manner, the use of the above compounds effectively suppresses the occurrence of side reactions and also prevents the increase in resistance. The suppression of side reactions during initial stages or during long exposure to high temperatures makes it possible to suppress the occurrence of volume change and to ensure safety after long exposure to high temperatures and also makes it possible to enhance rate characteristics.

The compounds described above may be added to the electrolytic solution of the invention by any methods without limitation. For example, the compounds may be added directly to the electrolytic solution, or a method may be adopted which generates the compounds in the battery or in the electrolytic solution. For example, the compounds may be generated by adding precursor compounds followed by reaction such as oxidation or hydrolysis of the battery components such as the electrolytic solution. Alternatively, the compounds may be generated in the battery by the application of electric loads such as charging and discharging.

Hereinbelow, the compounds (II) will be described. For the monofluorophosphate salts, the difluorophosphate salts, the borate salts, the oxalate salts and the fluorosulfonate salts, reference may be made to the description in "1-4. Electrolytes".

1-3-1. Fluorine-Containing Cyclic Carbonates

Examples of the fluorine-containing cyclic carbonates include fluorides of cyclic carbonates having an alkylene group with 2 to 6 carbon atoms, and derivatives thereof, such as ethylene carbonate fluoride (hereinafter, also written as "fluorinated ethylene carbonate") and derivatives thereof. Examples of the derivatives of ethylene carbonate fluoride include ethylene carbonate fluorides substituted with an alkyl group (for example, an alkyl group having 1 to 4 carbon atoms). In particular, fluorinated ethylene carbonates and derivatives thereof having 1 to 8 fluorine atoms are preferred.

In the electrolytic solution of the invention, the combined use of the aromatic carboxylate ester represented by Formula (2) and the fluorine-containing cyclic carbonate reduces the initial gas production in a battery containing the electrolytic solution, and also increases the overcharge gas production in the battery to make it possible to further enhance the battery safety.

Examples of the fluorinated ethylene carbonates and the derivatives thereof having 1 to 8 fluorine atoms include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate and 4,4-difluoro-5,5-dimethylethylene carbonate.

In particular, monofluoroethylene carbonate, 4,4-difluoroethylene carbonate and 4,5-difluoroethylene carbonate are preferable because they give high ion conductivity to the electrolytic solution and easily form a stable interface protective film.

The fluorinated cyclic carbonate may be used singly, or two or more may be used in combination in an appropriate ratio. In 100 mass % of the electrolytic solution, the amount of the fluorinated cyclic carbonate (the total amount when two or more kinds of the carbonates are used) is preferably 0.001 mass % or above, more preferably 0.01 mass % or above, still more preferably 0.1 mass % or above, and even more preferably 0.4 mass % or above, and is preferably 10 mass % or less, more preferably 7 mass % or less, still more preferably 5 mass % or less, particularly preferably 3 mass % or less, and most preferably 1.5 mass % or less. In the case where the fluorinated cyclic carbonate is used as a nonaqueous solvent, the amount thereof in 100 vol % of the nonaqueous solvent(s) is preferably 1 vol % or above, more preferably 5 vol % or above, and still more preferably 10 vol % or above, and is preferably 50 vol % or less, more preferably 35 vol % or less, and still more preferably 25 vol % or less.

The fluorine-containing cyclic carbonates may be cyclic carbonates having an unsaturated bond and a fluorine atom (hereinafter, also written as "fluorinated unsaturated cyclic carbonates"). The fluorinated unsaturated cyclic carbonates may have one or more fluorine atoms without limitation. The number of fluorine atoms may be 6 or less, preferably 4 or less, and more preferably 1 or 2.

Examples of the fluorinated unsaturated cyclic carbonates include fluorinated vinylene carbonate derivatives, and fluorinated ethylene carbonate derivatives substituted with a substituent having an aromatic ring or a carbon-carbon double bond.

Examples of the fluorinated vinylene carbonate derivatives include 4-fluorovinylene carbonate, 4-fluoro-5-methylvinylene carbonate, 4-fluoro-5-phenylvinylene carbonate, 4-allyl-5-fluorovinylene carbonate and 4-fluoro-5-vinylvinylene carbonate.

Examples of the fluorinated ethylene carbonate derivatives substituted with a substituent having an aromatic ring or a carbon-carbon double bond include 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate and 4,5-difluoro-4-phenylethylene carbonate.

In particular, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate and 4,5-difluoro-4,5-diallylethylene carbonate are preferable because these fluorinated unsaturated cyclic carbonates form stable interface protective films.

The molecular weight of the fluorinated unsaturated cyclic carbonates is not particularly limited. The molecular weight is preferably 50 or more and is preferably 250 or less. This range of molecular weights ensures that the fluorinated cyclic carbonate will exhibit solubility with respect to the nonaqueous electrolytic solution and the advantageous effects of the invention will be obtained prominently. The fluorinated unsaturated cyclic carbonates may be produced by any methods without limitation, and known production methods may be selected appropriately. The molecular weight is more preferably 100 or more, and is more preferably 200 or less.

The fluorinated unsaturated cyclic carbonate may be used singly, or two or more may be used in combination in an appropriate ratio.

In 100 mass % of the electrolytic solution, the amount of the fluorinated unsaturated cyclic carbonate (the total amount when two or more kinds of the carbonates are used) is preferably 0.001 mass % or above, more preferably 0.01 mass % or above, still more preferably 0.1 mass % or above, and particularly preferably 0.2 mass % or above, and is preferably 10 mass % or less, more preferably 5 mass % or less, still more preferably 4 mass % or less, and particularly preferably 3 mass % or less. This amount ensures that the nonaqueous electrolyte secondary batteries will achieve a sufficient enhancement in cycle characteristics and also reduces the risk that high-temperature storage characteristics are decreased to cause a heavy generation of gas and a poor retention of discharge capacity.

In view of the formation of a composite interface protective film on the negative electrode, the mass ratio between the aromatic carboxylate ester represented by Formula (2) and the fluorine-containing cyclic carbonate is preferably 1:99 to 99:1, more preferably 5:95 to 95:5, still more preferably 10:90 to 90:10, particularly preferably 20:80 to 80:20, and highly preferably 30:70 to 70:30. This ratio ensures that side reactions of the additives on the positive and negative electrodes are suppressed efficiently, resulting in an enhancement in battery characteristics. In particular, this ratio of the compounds is useful in order to reduce the initial gas production and to enhance the overcharge safety.

1-3-2. Sulfur-Containing Organic Compounds

The electrolytic solution of the invention may further include a sulfur-containing organic compound. The sulfur-containing organic compounds are not particularly limited as long as the compounds are organic and contain at least one sulfur atom in the molecule. Those organic compounds having a S=O group in the molecule are preferable, with examples including chain sulfonate esters, cyclic sulfonate esters, chain sulfate esters, cyclic sulfate esters, chain sulfite esters and cyclic sulfite esters. Fluorosulfonate salts are not categorized as the sulfur-containing organic compounds (1-3-2.) but are categorized as fluorosulfonate salt electrolytes described later.

In the electrolytic solution of the invention, the combined use of the aromatic carboxylate ester represented by Formula (2) and the sulfur-containing organic compound enhances the initial efficiency of a battery containing the electrolytic solution, and also increases the overcharge gas production in the battery to make it possible to further enhance the battery safety.

In particular, chain sulfonate esters, cyclic sulfonate esters, chain sulfate esters, cyclic sulfate esters, chain sulfite esters and cyclic sulfite esters are preferable, and compounds having a $S(=O)_2$ group are more preferable.

These esters may have a substituent. Here, the substituent is a group composed of one or more atoms selected from the group consisting of carbon atoms, hydrogen atoms, nitrogen atoms, oxygen atoms, sulfur atoms, phosphorus atoms and halogen atoms; preferably a group composed of one or more atoms selected from the group consisting of carbon atoms, hydrogen atoms, oxygen atoms and halogen atoms; and more preferably a group composed of one or more atoms selected from the group consisting of carbon atoms, hydrogen atoms and oxygen atoms. Examples of the substituents include halogen atoms; unsubstituted or halogenated alkyl groups, alkenyl groups, alkynyl groups, aryl groups or alkoxy groups; cyano groups; isocyanate groups; alkoxycarbonyloxy groups; acyl groups; carboxyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Of these, preferred substituents are halogen atoms; alkoxy groups; unsubstituted or halogenated alkyl groups, alkenyl groups or alkynyl groups; isocyanate groups; cyano groups; alkoxycarbonyloxy groups; acyl groups; alkoxycarbonyl groups; and acyloxy groups. Halogen atoms; unsubstituted alkyl groups; alkoxycarbonyloxy groups; acyl groups; alkoxycarbonyl groups; and acyloxy groups are more preferable. Halogen atoms, unsubstituted alkyl groups and alkoxycarbonyl groups are still more preferable. These examples and preferred examples of the substituents are also applied to substituents in the definitions of $A^{12}$ and $A^{13}$ in Formula (3-2-1) and to substituents in the definition of $A^{14}$ in Formula (3-2-2) described later.

Chain sulfonate esters and cyclic sulfonate esters are more preferable. In particular, chain sulfonate esters represented by Formula (3-2-1) and cyclic sulfonate esters represented by Formula (3-2-2) are preferable, and cyclic sulfonate esters represented by Formula (3-2-2) are more preferable.

1-3-2-1. Chain Sulfonate Esters Represented by Formula (3-2-1)

[Chem. 22]

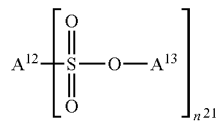

(3-2-1)

(In the formula,
$A^{12}$ is an optionally substituted, $n^{21}$-valent hydrocarbon group having 1 to 12 carbon atoms,
$A^{13}$ is an optionally substituted hydrocarbon group having 1 to 12 carbon atoms,
$n^{21}$ is an integer of 1 to 4, and
when $n^{21}$ is 2, $A^{12}$ and $A^{13}$ may be the same as or different from each other.)

In Formula (3-2-1), $A^{12}$ and $A^{13}$ do not form a ring together, and thus the sulfonate esters of Formula (3-2-1) are chain esters.

$n^{21}$ is preferably an integer of 1 to 3, more preferably 1 to 2, and still more preferably 2.

Examples of the $n^{21}$-valent hydrocarbon groups with 1 to 12 carbon atoms represented by $A^{12}$ include:

monovalent hydrocarbon groups such as alkyl groups, alkenyl groups, alkynyl groups and aryl groups;

divalent hydrocarbon groups such as alkylene groups, alkenylene groups, alkynylene groups and arylene groups;

trivalent hydrocarbon groups such as alkanetriyl groups, alkenetriyl groups, alkynetriyl groups and arenetriyl groups; and tetravalent hydrocarbon groups such as alkanetetrayl groups, alkenetetrayl groups, alkynetetrayl groups and arenetetrayl groups.

Of these, divalent hydrocarbon groups such as alkylene groups, alkenylene groups, alkynylene groups and arylene groups are preferable, and alkylene groups are more preferable. These groups correspond to the formula in which $n^{21}$ is 2.

Of the $n^2$-valent hydrocarbon groups having 1 to 12 carbon atoms, examples of the monovalent hydrocarbon groups include alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups having 2 to 5 carbon atoms such as vinyl group, 1-propenyl group, 2-propenyl group, isopropenyl group, 1-butenyl group, 2-butenyl group, 3-butenyl group, 1-pentenyl group, 2-pentenyl group, 3-pentenyl group and 4-pentenyl group; and alkynyl groups having 2 to 5 carbon atoms such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group.

Examples of the divalent hydrocarbon groups include alkylene groups having 1 to 5 carbon atoms such as methylene group, ethylene group, trimethylene group, tetramethylene group and pentamethylene group; alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentylene group and 2-pentylene group. Alkylene groups having 1 to 5 carbon atoms such as methylene group, ethylene group, trimethylene group, tetramethylene group and pentamethylene group are preferable. Alkylene groups having 2 to 5 carbon atoms such as ethylene group, trimethylene group, tetramethylene group and pentamethylene group are more preferable. Alkylene groups having 3 to 5 carbon atoms such as trimethylene group, tetramethylene group and pentamethylene group are still more preferable.

Examples of the trivalent and tetravalent hydrocarbon groups include those trivalent and tetravalent hydrocarbon groups that correspond to the monovalent hydrocarbon groups described above.

The substituted, $n^{21}$-valent hydrocarbon groups with 1 to 12 carbon atoms that are represented by $A^{12}$ are combinations of the substituents described hereinabove and the $n^{21}$-valent hydrocarbon groups having 1 to 12 carbon atoms. $A^{12}$ preferably represents an unsubstituted, $n^{21}$-valent hydrocarbon group having 1 to 5 carbon atoms.

Preferred examples of the hydrocarbon groups with 1 to 12 carbon atoms represented by $A^{13}$ include monovalent hydrocarbon groups such as alkyl groups, alkenyl groups, alkynyl groups and aryl groups, with alkyl groups being more preferable.

Examples of the hydrocarbon groups having 1 to 12 carbon atoms include alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group. Methyl group, ethyl group, n-propyl group, n-butyl group and n-pentyl group are preferable. Methyl group, ethyl group and n-propyl group are more preferable. Ethyl group and n-propyl group are still more preferable.

The substituted hydrocarbon groups with 1 to 12 carbon atoms that are represented by $A^{13}$ are combinations of the substituents described hereinabove and the hydrocarbon groups having 1 to 12 carbon atoms. $A^{13}$ preferably represents an optionally substituted hydrocarbon group having 1 to 5 carbon atoms, more preferably a substituted hydrocarbon group having 1 to 5 carbon atoms, and still more preferably an alkyl group having an alkoxycarbonyl group as the substituent. In particular, methoxycarbonylmethyl group, ethoxycarbonylmethyl group, 1-methoxycarbonylethyl group, 1-ethoxycarbonylethyl group, 2-methoxycarbonylethyl group, 2-ethoxycarbonylethyl group, 1-methoxycarbonylpropyl group, 1-ethoxycarbonylpropyl group, 2-methoxycarbonylpropyl group, 2-ethoxycarbonylpropyl group, 3-methoxycarbonylpropyl group and 3-ethoxycarbonylpropyl group are preferable, and 1-methoxycarbonylethyl group and 1-ethoxycarbonylethyl group are more preferable.

In 100 mass % of the electrolytic solution, the content of the chain sulfonate ester represented by Formula (3-2-1) (the total content when two or more kinds of the esters are used) may be 0.001 mass % or above, preferably 0.01 mass % or above, more preferably 0.1 mass % or above, still more preferably 0.3 mass % or above, and particularly preferably 0.5 mass % or above, and may be 10 mass % or less, preferably 5 mass % or less, more preferably 3 mass % or less, still more preferably 2 mass % or less, and particularly preferably 1.5 mass % or less. This content ensures good high-temperature storage characteristics.

1-3-2-2. Cyclic Sulfonate Esters Represented by Formula (3-2-2)

[Chem. 23]

(3-2-2)

(In the formula,
$A^{14}$ is an optionally substituted, divalent hydrocarbon group having 1 to 12 carbon atoms.)

Examples of the divalent hydrocarbon groups with 1 to 12 carbon atoms represented by $A^{14}$ include alkylene groups, alkenylene groups, alkynylene groups and arylene groups, with alkylene groups and alkenylene groups being preferable.

Examples of the divalent hydrocarbon groups having 1 to 12 carbon atoms include alkylene groups having 1 to 5 carbon atoms such as methylene group, ethylene group, trimethylene group, tetramethylene group and pentamethylene group; alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentylene group and 2-pentylene group.

Of these, preferred groups are alkylene groups having 1 to 5 carbon atoms such as methylene group, ethylene group, trimethylene group, tetramethylene group and pentamethylene group, and alkenylene groups having 2 to 5 carbon atoms such as vinylene group, 1-propenylene group, 2-propenylene group, 1-butenylene group, 2-butenylene group, 1-pentenylene group and 2-pentenylene group. More preferred groups are alkylene groups having 3 to 5 carbon atoms such as trimethylene group, tetramethylene group and pentamethylene group, and alkenylene groups having 3 to 5 carbon atoms such as 1-propenylene group, 2-propenylene group, 1-butenylene group, 2-butenylene group, 1-pentenylene group and 2-pentenylene group. Trimethylene group, 1-propenylene group and 2-propenylene group are still more preferable.

The substituted, divalent hydrocarbon groups with 1 to 12 carbon atoms that are represented by $A^{14}$ are combinations of the substituents described hereinabove and the divalent hydrocarbon groups having 1 to 12 carbon atoms. $A^{14}$ preferably represents an unsubstituted, divalent hydrocarbon group having 1 to 5 carbon atoms.

Batteries which use the electrolytic solution of the invention additionally including the cyclic sulfonate ester of Formula (3-2-2) exhibit an enhanced initial efficiency and an increased overcharge gas production to achieve a further enhancement in battery safety. In 100 mass % of the electrolytic solution, the content of the cyclic sulfonate ester represented by Formula (3-2-2) (the total content when two or more kinds of the esters are used) may be 0.001 mass % or above, preferably 0.01 mass % or above, more preferably 0.1 mass % or above, still more preferably 0.3 mass % or above, and particularly preferably 0.4 mass % or above, and may be 10 mass % or less, preferably 5 mass % or less, more preferably 3 mass % or less, still more preferably 2 mass % or less, and particularly preferably 1.5 mass % or less.

Examples of the sulfur-containing organic compounds include the following.

《 Chain Sulfonate Esters 》

Examples include fluorosulfonate esters such as methyl fluorosulfonate and ethyl fluorosulfonate;

methanesulfonate esters such as methyl methanesulfonate, ethyl methanesulfonate, 2-propynyl methanesulfonate, 3-butynyl methanesulfonate, busulfan, methyl 2-(methanesulfonyloxy)propionate, ethyl 2-(methanesulfonyloxy)propionate, 2-propynyl 2-(methanesulfonyloxy)propionate, 3-butynyl 2-(methanesulfonyloxy)propionate, methyl methanesulfonyloxyacetate, ethyl methanesulfonyloxyacetate, 2-propynyl methanesulfonyloxyacetate and 3-butynyl methanesulfonyloxyacetate;

alkenylsulfonate esters such as methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate and 1,2-bis(vinylsulfonyloxy)ethane; and alkyldisulfonate esters such as methoxycarbonylmethyl methanedisulfonate, ethoxycarbonylmethyl methanedisulfonate, 1-methoxycarbonylethyl methanedisulfonate, 1-ethoxycarbonylethyl methanedisulfonate, methoxycarbonylmethyl 1,2-ethanedisulfonate, ethoxycarbonylmethyl 1,2-ethanedisulfonate, 1-methoxycarbonylethyl 1,2-ethanedisulfonate, 1-ethoxycarbonylethyl 1,2-ethanedisulfonate, methoxycarbonylmethyl 1,3-propanedisulfonate, ethoxycarbonylmethyl 1,3-propanedisulfonate, 1-methoxycarbonylethyl 1,3-propanedisulfonate, 1-ethoxycarbonylethyl 1,3-propanedisulfonate, methoxycarbonylmethyl 1,3-butanedisulfonate, ethoxycarbonylmethyl 1,3-butanedisulfonate, 1-methoxycarbonylethyl 1,3-butanedisulfonate and 1-ethoxycarbonylethyl 1,3-butanedisulfonate.

《Cyclic Sulfonate Esters》

Examples include sultone compounds such as 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butanesultone and 1,5-pentanesultone;

disulfonate compounds such as methylene methanedisulfonate and ethylene methanedisulfonate;

nitrogen-containing compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 1,2,5-oxathiazolidine-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide and 1,2,4-oxathiazinane-2,2-dioxide; and phosphorus-containing compounds such as 1,2,3-oxathiaphosphorane-2,2-dioxide, 3-methyl-1,2,3-oxathiaphosphorane-2,2-dioxide, 3-methyl-1,2,3-oxathiaphosphorane-2,2,3-trioxide, 3-methoxy-1,2,3-oxathiaphosphorane-2,2,3-trioxide, 1,2,4-oxathiaphosphorane-2,2-dioxide, 1,2,5-oxathiaphosphorane-2,2-dioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 1,2,5-oxathiaphosphinane-2,2-dioxide and 1,2,6-oxathiaphosphinane-2,2-dioxide.

《Chain Sulfate Esters》

Examples include dialkyl sulfate compounds such as dimethyl sulfate, ethylmethyl sulfate and diethyl sulfate.

《Cyclic Sulfate Ester》

Examples include alkylene sulfate compounds such as 1,2-ethylene sulfate, 1,2-propylene sulfate, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate and 1,5-pentylene sulfate.

《Chain Sulfite Esters》

Examples include dialkyl sulfite compounds such as dimethyl sulfite, ethylmethyl sulfite and diethyl sulfite.

《Cyclic Sulfite Ester》

Examples include alkylene sulfite compounds such as 1,2-ethylene sulfite, 1,2-propylene sulfite, 1,3-propylene sulfite, 1,2-butylene sulfite, 1,3-butylene sulfite, 1,4-butylene sulfite, 1,2-pentylene sulfite, 1,3-pentylene sulfite, 1,4-pentylene sulfite and 1,5-pentylene sulfite.

Of these, methyl 2-(methanesulfonyloxy)propionate, ethyl 2-(methanesulfonyloxy)propionate, 2-propynyl 2-(methanesulfonyloxy)propionate, 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propanesultone, 1-propene-1,3-sultone, 1,4-butanesultone, 1,2-ethylene sulfate, 1,2-ethylene sulfite, methyl methanesulfonate and ethyl methanesulfonate are preferable from the point of view of enhancing the initial efficiency. More preferred compounds are 1-methoxycarbonylethyl propanedisulfonate, 1-ethoxycarbonylethyl propanedisulfonate, 1-methoxycarbonylethyl butanedisulfonate, 1-ethoxycarbonylethyl butanedisulfonate, 1,3-propanesultone, 1-propene-1,3-sultone, 1,2-ethylene sulfate and 1,2-ethylene sulfite. 1,3-Propanesultone and 1-propene-1,3-sultone are still more preferable.

The sulfur-containing organic compounds may be used singly, or two or more may be used in combination in an appropriate ratio.

In 100 mass % of the electrolytic solution, the content of the sulfur-containing organic compound (the total content when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, and particularly preferably 2 mass % or less. This content ensures easy control of characteristics such as output characteristics, load characteristics, low-temperature characteristics, cycle characteristics and high-temperature storage characteristics.

The mass ratio between the aromatic carboxylate ester represented by Formula (2) and the sulfur-containing organic compound, namely, the aromatic carboxylate ester of Formula (2):sulfur-containing organic compound ratio is preferably 1:99 to 99:1, more preferably 5:95 to 95:5, still more preferably 10:90 to 90:10, particularly preferably 20:80 to 80:20, and highly preferably 30:70 to 70:30. This ratio ensures that battery characteristics, in particular, initial characteristics will be markedly enhanced. Although the mechanism of this effect is not clear, it is probable that the additives mixed in the above ratio are prevented from side reactions on the electrodes to the maximum extent.

1-3-3. Phosphonate Esters

The electrolytic solution of the invention may further include a phosphonate ester. The phosphonate esters are not particularly limited as long as the compounds are organic and contain at least a phosphonate ester structure in the molecule.

In the electrolytic solution of the invention, the combined use of the aromatic carboxylate ester represented by Formula (2) and the phosphonate ester enhances the initial rate characteristic of a battery containing the electrolytic solution, and also enhances the battery capacity after storage.

The phosphonate esters may have a substituent. Here, the substituent is a group composed of one or more atoms selected from the group consisting of carbon atoms, hydrogen atoms, nitrogen atoms, oxygen atoms, sulfur atoms, phosphorus atoms and halogen atoms; and preferably a group composed of one or more atoms selected from the group consisting of carbon atoms, hydrogen atoms, oxygen atoms and halogen atoms. Examples of the substituents include halogen atoms; unsubstituted or halogenated alkyl groups, alkenyl groups, alkynyl groups, aryl groups or alkoxy groups; cyano groups; isocyanate groups; alkoxycarbonyloxy groups; acyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Of these, for example, preferred substituents are halogen atoms; alkoxy groups; alkoxycarbonyloxy groups; acyl groups; alkoxycarbonyl groups; and acyloxy groups. Halogen atoms and alkoxycarbonyl groups are more preferable, and alkoxycarbonyl groups are still more preferable. Examples of the alkoxycarbonyl groups include methoxycarbonyl group, ethoxycarbonyl group, propoxycarbonyl group, allyloxycarbonyl group and propargyloxycarbonyl group, with ethoxycarbonyl group and propargyloxycarbonyl group being preferable. These examples and preferred examples of the substituents are also applied to substituents in the definitions of $A^9$ to $A^{11}$ in Formula (3-3-1) described below.

In particular, phosphonate esters represented by Formula (3-3-1) are preferable.

[Chem. 24]

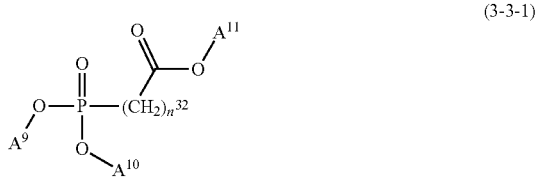

(3-3-1)

(In the formula,
$A^9$, $A^{10}$ and $A^{11}$ are independently an unsubstituted or halogenated alkyl, alkenyl or alkynyl group having 1 to 5 carbon atoms, and
$n^{32}$ is an integer of 0 to 6.)

Examples of the alkyl, alkenyl or alkynyl groups having 1 to 5 carbon atoms include alkyl groups such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group; alkenyl groups such as vinyl group, 1-propenyl group, 2-propenyl group (allyl group), isopropenyl group, 1-butenyl group, 2-butenyl group, 3-butenyl group, 1-pentenyl group, 2-pentenyl group, 3-pentenyl group and 4-pentenyl group; and alkynyl groups such as ethynyl group, 1-propynyl group, 2-propynyl group (propargyl group), 1-butynyl group, 2-butynyl group, 3-butynyl group, 1-pentynyl group, 2-pentynyl group, 3-pentynyl group and 4-pentynyl group. Preferred groups are methyl group, ethyl group, n-propyl group, n-butyl group, n-pentyl group, vinyl group, 2-propenyl group (allyl group), 3-butenyl group, 4-pentenyl group, 2-propynyl group (propargyl group), 3-butynyl group and 4-pentynyl group. Methyl group, ethyl group, 2-propenyl group (allyl group) and 2-propynyl group (propargyl group) are more preferable, and methyl group, ethyl group and 2-propynyl group (propargyl group) are still more preferable.

Examples of the phosphonate esters represented by Formula (3-3-1) include the following compounds.

⟨Compounds of Formula (3-3-1) in which $n^{32}$=0⟩

Examples include trimethyl phosphonoformate, methyl diethylphosphonoformate, methyl dipropylphosphonoformate, methyl dibutylphosphonoformate, triethyl phosphonoformate, ethyl dimethylphosphonoformate, ethyl dipropylphosphonoformate, ethyl dibutylphosphonoformate, tripropyl phosphonoformate, propyl dimethylphosphonoformate, propyl diethylphosphonoformate, propyl dibutylphosphonoformate, tributyl phosphonofonrmate, butyl dimethylphosphonoformate, butyl diethylphosphonoformate, butyl dipropylphosphonoformate, methyl bis(2,2,2-trifluoroethyl)phosphonoformate, ethyl bis(2,2,2-trifluoroethyl) phosphonoformate, propyl bis(2,2,2-trifluoroethyl)phosphonoformate and butyl bis(2,2,2-trifluoroethyl) phosphonoformate.

⟨Compounds of Formula (3-3-1) in which $n^{32}$=1⟩

Examples include trimethyl phosphonoacetate, methyl diethylphosphonoacetate, methyl dipropylphosphonoacetate, methyl dibutylphosphonoacetate, triethyl phosphonoacetate, ethyl dimethylphosphonoacetate, ethyl diethylphosphonoacetate, ethyl dipropylphosphonoacetate, ethyl dibutylphosphonoacetate, tripropyl phosphonoacetate, propyl dimethylphosphonoacetate, propyl diethylphosphonoacetate, propyl dibutylphosphonoacetate, tributyl phosphonoacetate, butyl dimethylphosphonoacetate, butyl diethylphosphonoacetate, butyl dipropylphosphonoacetate, methyl bis(2,2,2-trifluoroethyl)phosphonoacetate, ethyl bis(2,2,2-trifluoroethyl)phosphonoacetate, propyl bis(2,2,2-trifluoroethyl)phosphonoacetate, butyl bis(2,2,2-trifluoroethyl)phosphonoacetate, allyl dimethylphosphonoacetate, allyl diethylphosphonoacetate, 2-propynyl dimethylphosphonoacetate and 2-propynyl diethylphoshonoacetate.

⟨Compounds of Formula (3-3-1) in which $n^{32}$=2⟩

Examples include trimethyl 3-phosphonopropionate, methyl 3-(diethylphosphono)propionate, methyl 3-(dipropylphosphono)propionate, methyl 3-(dibutylphosphono)propionate, triethyl 3-phosphonopropionate, ethyl 3-(dimethylphosphono)propionate, ethyl 3-(dipropylphosphono)propionate, ethyl 3-(dibutylphosphono)propionate, tripropyl 3-phosphonopropionate, propyl 3-(dimethylphosphono)propionate, propyl 3-(diethylphosphono)propionate, propyl 3-(dibutylphosphono)propionate, tributyl 3-phosphonopropionate, butyl 3-(dimethylphosphono)propionate, butyl 3-(diethylphosphono)propionate, butyl 3-(dipropylphosphono)propionate, methyl 3-(bis(2,2,2-trifluoroethyl) phosphono)propionate, ethyl 3-(bis(2,2,2-trifluoroethyl) phosphono)propionate, propyl 3-(bis(2,2,2-trifluoroethyl) phosphono)propionate and butyl 3-(bis(2,2,2-trifluoroethyl) phosphono)propionate.

⟨Compounds of Formula (3-3-1) in which $n^{32}$=3⟩

Examples include trimethyl 4-phosphonobutyrate, methyl 4-(diethylphosphono)butyrate, methyl 4-(dipropylphosphono)butyrate, methyl 4-(dibutylphosphono)butyrate, triethyl 4-phosphonobutyrate, ethyl 4-(dimethylphosphono) butyrate, ethyl 4-(dipropylphosphono)butyrate, ethyl 4-(dibutylphosphono)butyrate, tripropyl 4-phosphonobutyrate, propyl 4-(dimethylphosphono)butyrate, propyl 4-(diethylphosphono)butyrate, propyl 4-(dibutylphosphono)butyrate, tributyl 4-phosphonobutyrate, butyl 4-(dimethylphosphono)butyrate, butyl 4-(diethylphosphono)butyrate and butyl 4-(dipropylphosphono)butyrate.

From the point of view of enhancing battery characteristics, those compounds in which $n^{32}$=0, 1 or 2 are preferable, those compounds in which $n^{32}$=0 or 1 are more preferable, and those compounds in which $n^{32}=1$ are still more preferable. Of the compounds in which $n^{32}=1$, those compounds in which $A^9$ to $A^{11}$ are saturated hydrocarbon groups are preferable.

In particular, trimethyl phosphonoacetate, triethyl phosphonoacetate, 2-propynyl dimethylphosphonoacetate and 2-propynyl diethylphosphonoacetate are preferable.

The phosphonate esters may be used singly, or two or more may be used in combination in an appropriate ratio.

In 100 mass % of the electrolytic solution, the amount of the phosphonate ester (the total amount when two or more kinds of the esters are used) may be 0.001 mass % or above, preferably 0.01 mass % or above, more preferably 0.1 mass % or above, and still more preferably 0.4 mass % or above, and may be 10 mass % or less, preferably 5 mass % or less, more preferably 3 mass % or less, still more preferably 2 mass % or less, particularly preferably 1 mass % or less, and most preferably 0.7 mass % or less. This amount ensures easy control of characteristics such as output characteristics, load characteristics, low-temperature characteristics, cycle characteristics and high-temperature storage characteristics.

The mass ratio between the aromatic carboxylate ester represented by Formula (2) and the phosphonate ester, namely, the aromatic carboxylate ester of Formula (2): phosphonate ester ratio is preferably 1:99 to 99:1, more preferably 5:95 to 95:5, still more preferably 10:90 to 90:10, particularly preferably 20:80 to 80:20, and highly preferably 30:70 to 70:30. This ratio ensures that battery characteristics, in particular, initial characteristics will be markedly enhanced. Although the mechanism of this effect is not clear, it is probable that the additives mixed in the above ratio are prevented from side reactions on the electrodes to the maximum extent.

1-3-4. Cyano Group-Containing Organic Compounds

The electrolytic solution of the invention may further include a cyano group-containing organic compound. The cyano group-containing organic compounds are not particularly limited as long as the compounds are organic and have at least one cyano group in the molecule. Those compounds represented by Formulae (3-4-1), (3-4-2) and (3-4-3) are preferable. Those compounds represented by Formulae (3-4-1) and (3-4-2) are more preferable. Those compounds represented by Formula (3-4-2) are still more preferable. Those cyano group-containing organic compounds which are cyclic compounds having a plurality of ether bonds are categorized into the cyclic compounds having a plurality of ether bonds.

In the electrolytic solution of the invention, the combined use of the aromatic carboxylate ester represented by Formula (2) and the cyano group-containing organic compound enhances the initial charge discharge efficiency of a battery containing the electrolytic solution, and also enhances the charge discharge efficiency after storage of the battery.

1-3-4-1. Compounds Represented by Formula (3-4-1)

$$A^1\text{-CN} \quad (3\text{-}4\text{-}1)$$

(In the formula, $A^1$ is a hydrocarbon group having 2 to 20 carbon atoms.)

The molecular weight of the compounds represented by Formula (3-4-1) is not particularly limited. The molecular weight is preferably 55 or more, more preferably 65 or more, and still more preferably 80 or more, and is preferably 310 or less, more preferably 185 or less, and still more preferably 155 or less. This range of molecular weights ensures that the compound of Formula (3-4-1) will exhibit solubility with respect to the nonaqueous electrolytic solution and the advantageous effects of the invention will be obtained prominently. The compounds of Formula (3-4-1) may be produced by any methods without limitation, and known production methods may be selected appropriately.

Referring to Formula (3-4-1), examples of the hydrocarbon groups having 2 to 20 carbon atoms include alkyl groups, alkenyl groups, alkynyl groups and aryl groups. Preferred examples include alkyl groups such as ethyl group, n-propyl group, isopropyl group, n-butyl group, sec-butyl group, iso-butyl group, tert-butyl group, n-pentyl group, tert-amyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group and eicosyl group; alkenyl groups such as vinyl group, 1-propenyl group, isopropenyl group, 1-butenyl group and 1-pentenyl group; alkynyl groups such as ethynyl group, 1-propynyl group, 1-butynyl group and 1-pentynyl group; and aryl groups such as phenyl group, tolyl group, ethylphenyl group, n-propylphenyl group, i-propylphenyl group, n-butylphenyl group, sec-butylphenyl group, i-butylphenyl group, tert-butylphenyl group, trifluoromethylphenyl group, xylyl group, benzyl group, phenethyl group, methoxyphenyl group, ethoxyphenyl group and trifluoromethoxyphenyl group.

In particular, linear or branched alkyl groups having 2 to 15 carbon atoms and alkenyl groups having 2 to 4 carbon atoms are more preferable, linear or branched alkyl groups having 2 to 12 carbon atoms are still more preferable, and linear or branched alkyl groups having 4 to 11 carbon atoms are particularly preferable in view of the facts that such compounds have the cyano groups in a high proportion relative to the entirety of the molecule and provide high effects in the enhancement of battery characteristics.

Examples of the compounds represented by Formula (3-4-1) include propionitrile, butyronitrile, pentanenitrile, hexanenitrile, heptanenitrile, octanenitrile, pelargononitrile, decanenitrile, undecanenitrile, dodecanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile and 2-hexenenitrile.

From the points of view of the stability of the compounds, battery characteristics and production perspectives, pentanenitrile, octanenitrile, decanenitrile, dodecanenitrile and crotononitrile are preferable, pentanenitrile, decanenitrile, dodecanenitrile and crotononitrile are more preferable, and pentanenitrile, decanenitrile and crotononitrile are preferable.

The compounds of Formula (3-4-1) may be used singly, or two or more may be used in combination in an appropriate ratio. In 100 mass % of the nonaqueous electrolytic solution, the amount of the compound represented by Formula (3-4-1) (the total amount when two or more kinds of the compounds are used) may be 0.001 mass % or above, preferably 0.01 mass % or above, and more preferably 0.1 mass % or above, and may be 10 mass % or less, preferably 5 mass % or less, more preferably 3 mass % or less, still more preferably 2 mass % or less, particularly preferably 1 mass % or less, and most preferably 0.5 mass % or less. This content ensures easy control of characteristics such as output characteristics, load characteristics, low-temperature characteristics, cycle characteristics and high-temperature storage characteristics.

1-3-4-2. Compounds Represented by Formula (3-4-2)

$$\text{NC-}A^2\text{-CN} \quad (3\text{-}4\text{-}2)$$

(In the formula, $A^2$ is an organic group with 1 to 10 carbon atoms that is composed of one or more kinds of atoms selected from the group consisting of hydrogen atoms, carbon atoms, nitrogen atoms, oxygen atoms, sulfur atoms, phosphorus atoms and halogen atoms.)

The organic groups with 1 to 10 carbon atoms that are composed of one or more kinds of atoms selected from the group consisting of hydrogen atoms, carbon atoms, nitrogen atoms, oxygen atoms, sulfur atoms, phosphorus atoms and halogen atoms include not only those organic groups which are composed of carbon and hydrogen atoms, but also those organic groups which optionally further contain nitrogen, oxygen, sulfur, phosphorus or halogen atoms. Those organic groups which optionally further contain nitrogen, oxygen, sulfur, phosphorus or halogen atoms include those organic groups in which the carbon atoms in the hydrocarbon skeleton are partially substituted by such atoms, and those organic groups which have a substituent composed of such atoms.

The molecular weight of the compounds represented by Formula (3-4-2) is not particularly limited. The molecular weight is preferably 65 or more, more preferably 80 or more, and still more preferably 90 or more, and is preferably 270 or less, more preferably 160 or less, and still more preferably 135 or less. This range of molecular weights ensures that the compound of Formula (3-4-2) will exhibit solubility with respect to the nonaqueous electrolytic solution and the advantageous effects of the invention will be obtained prominently. The compounds of Formula (3-4-2) may be produced by any methods without limitation, and known production methods may be selected appropriately.

Examples of $A^2$ in the compounds of Formula (3-4-2) include alkylene groups and derivatives thereof, alkenylene groups and derivatives thereof, cycloalkylene groups and derivatives thereof, alkynylene groups and derivatives thereof, cycloalkenylene groups and derivatives thereof, arylene groups and derivatives thereof, carbonyl groups and derivatives thereof, sulfonyl groups and derivatives thereof, sulfinyl groups and derivatives thereof, phosphonyl groups and derivatives thereof, phosphinyl groups and derivatives thereof, amide groups and derivatives thereof, imide groups and derivatives thereof, ether groups and derivatives thereof, thioether groups and derivatives thereof, borinate groups and derivatives thereof, and borane groups and derivatives thereof.

From the point of view of enhancing battery characteristics, preferred groups are alkylene groups and derivatives thereof, alkenylene groups and derivatives thereof, cycloalkylene groups and derivatives thereof, alkynylene groups and derivatives thereof, and arylene groups and derivatives thereof. More preferably, $A^2$ is an optionally substituted alkylene group having 2 to 5 carbon atoms.

Examples of the compounds represented by Formula (3-4-2) include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile and 3,9-bis(2-cyanoethyl)-2,4,8,10-tetraoxaspiro[5,5]undecane.

Of these, malononitrile, succinonitrile, glutaronitrile, adiponitrile, pimelonitrile, suberonitrile, azelanitrile, sebaconitrile, undecanedinitrile, dodecanedinitrile, 3,9-bis(2-cyanoethyl)-2,4,8,10-tetraoxaspiro[5,5]undecane and fumaronitrile are preferable from the point of view of enhancing storage characteristics. Further, succinonitrile, glutaronitrile, adiponitrile, pimelonitrile, suberonitrile and 3,9-bis(2-cyanoethyl)-2,4,8,10-tetraoxaspiro[5,5]undecane are more preferable because these compounds have particularly high effects in the enhancement of storage characteristics and are less prone to degradation by side reactions on the electrodes. In the dinitrile compounds, the proportion of the cyano groups in the molecule is usually increased with decreasing molecular weight and consequently the molecules exhibit a higher viscosity, whilst the increase in molecular weight increases the boiling point of the compounds. Thus, succinonitrile, glutaronitrile, adiponitrile and pimelonitrile are more preferable from the point of view of enhancing the work efficiency.

The compounds of Formula (3-4-2) may be used singly, or two or more may be used in combination in an appropriate ratio. In 100 mass % of the electrolytic solution, the concentration of the compound represented by Formula (3-4-2) (the total concentration when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, and more preferably 3 mass % or less. The satisfaction of this concentration increases the effects in the enhancements of characteristics such as output characteristics, load characteristics, low-temperature characteristics, cycle characteristics and high-temperature storage characteristics.

1-3-4-3. Compounds Represented by Formula (3-4-3)

[Chem. 25]

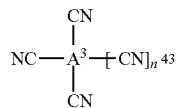

(3-4-3)

(In the formula, $A^3$ is an organic group with 1 to 12 carbon atoms that is composed of one or more kinds of atoms selected from the group consisting of hydrogen atoms, carbon atoms, nitrogen atoms, oxygen atoms, sulfur atoms, phosphorus atoms and halogen atoms, and $n^{43}$ is an integer of 0 to 5.)

The organic groups with 1 to 12 carbon atoms that are composed of one or more kinds of atoms selected from the group consisting of hydrogen atoms, carbon atoms, nitrogen atoms, oxygen atoms, sulfur atoms, phosphorus atoms and halogen atoms include not only those organic groups which are composed of carbon and hydrogen atoms, but also those organic groups which optionally further contain nitrogen, oxygen, sulfur, phosphorus or halogen atoms. Those organic groups which optionally further contain nitrogen, oxygen, sulfur, phosphorus or halogen atoms include those organic groups in which the carbon atoms in the hydrocarbon skeleton are partially substituted by such atoms, and those organic groups which have a substituent composed of such atoms.

$n^{43}$ is an integer of 0 to 5, preferably 0 to 3, more preferably 0 to 1, and particularly preferably 0.

Preferably, $A^3$ is an organic group with 1 to 12 carbon atoms that is composed of one or more kinds of atoms selected from the group consisting of hydrogen atoms, carbon atoms, nitrogen atoms, oxygen atoms and sulfur atoms. More preferably, $A^3$ is an organic group with 1 to 12 carbon atoms that is composed of one or more kinds of atoms selected from the group consisting of hydrogen atoms, carbon atoms and oxygen atoms. Still more preferably, $A^3$ is an optionally substituted aliphatic hydrocarbon group having 1 to 12 carbon atoms.

Here, the substituent is a group composed of one or more atoms selected from the group consisting of carbon atoms, hydrogen atoms, nitrogen atoms, oxygen atoms, sulfur atoms, phosphorus atoms and halogen atoms.

Examples of the substituents include halogen atoms; unsubstituted or halogenated alkyl groups, alkenyl groups, alkynyl groups, aryl groups or alkoxy groups; isocyanate groups; alkoxycarbonyloxy groups; acyl groups; carboxyl groups; alkoxycarbonyl groups; acyloxy groups; alkylsulfonyl groups; alkoxysulfonyl groups; dialkoxyphosphanetriyl groups; dialkoxyphosphoryl groups; and dialkoxyphosphoryloxy groups. Preferred substituents are halogen atoms; alkoxy groups; and unsubstituted or halogenated alkyl groups. Halogen atoms, and unsubstituted or halogenated alkyl groups are more preferable. Unsubstituted alkyl groups are still more preferable.

The aliphatic hydrocarbon groups are not particularly limited. The number of carbon atoms in the groups may be 1 or more, preferably 2 or more, and more preferably 3 or more, and may be 12 or less, preferably 8 or less, and more preferably 6 or less.

Examples of the aliphatic hydrocarbon groups, in accordance with $n^{43}$, include alkanetriyl groups, alkanetetrayl groups, alkanepentayl groups, alkanetetrayl groups, alkenetriyl groups, alkenetetrayl groups, alkenepentayl groups, alkenetetrayl groups, alkynetriyl groups, alkynetetrayl groups, alkynepentayl groups and alkynetetrayl groups.

Of these, saturated hydrocarbon groups such as alkanetriyl groups, alkanetetrayl groups, alkanepentayl groups and alkanetetrayl groups are more preferable, and alkanetriyl groups are still more preferable.

Further, the compounds represented by Formula (3-4-3) are more preferably represented by Formula (3-4-3').

[Chem. 26]

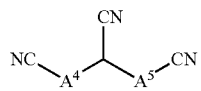

(3-4-3')

(In the formula, $A^4$ and $A^5$ are each a divalent group corresponding to $A^3$.)

More preferably, $A^4$ and $A^5$ are optionally substituted hydrocarbon groups having 1 to 5 carbon atoms.

Examples of the hydrocarbon groups include methylene group, ethylene group, trimethylene group, tetraethylene group, pentamethylene group, vinylene group, 1-propenylene group, 2-propenylene group, 1-butenylene group, 2-butenylene group, 1-pentenylene group, 2-pentenylene group, ethynylene group, propynylene group, 1-butynylene group, 2-butynylene group, 1-pentylene group and 2-pentylene group.

Of these, methylene group, ethylene group, trimethylene group, tetraethylene group and pentamethylene group are preferable, and methylene group, ethylene group and trimethylene group are more preferable.

It is preferable that $A^4$ and $A^5$ be not the same and differ from each other.

The molecular weight of the compounds represented by Formula (3-4-3) is not particularly limited. The molecular weight is preferably 90 or more, more preferably 120 or more, and still more preferably 150 or more, and is preferably 450 or less, more preferably 300 or less, and still more preferably 250 or less. This range of molecular weights ensures that the compound of Formula (3-4-3) will exhibit solubility with respect to the nonaqueous electrolytic solution and the advantageous effects of the invention will be obtained prominently. The compounds of Formula (3-4-3) may be produced by any methods without limitation, and known production methods may be selected appropriately.

Examples of the compounds represented by Formula (3-4-3) include the following compounds:

[Chem. 27]

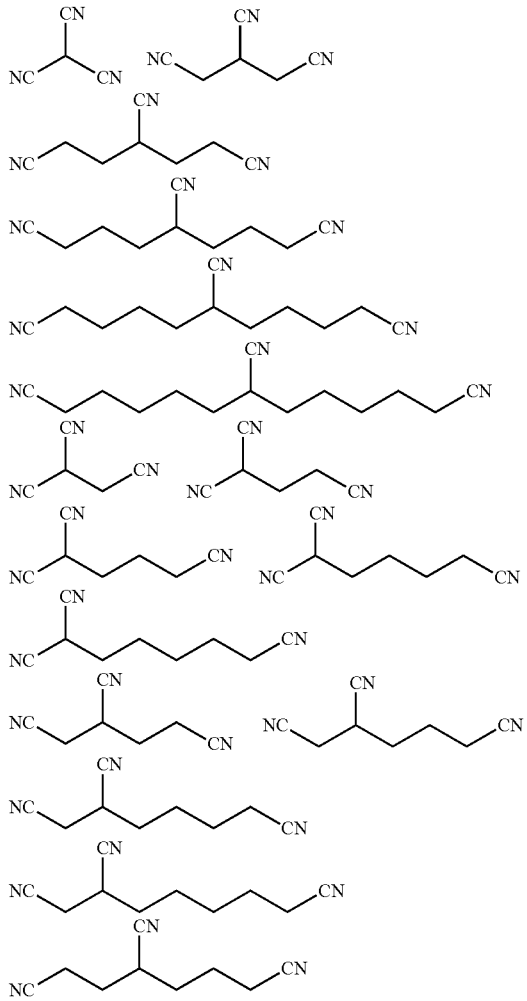

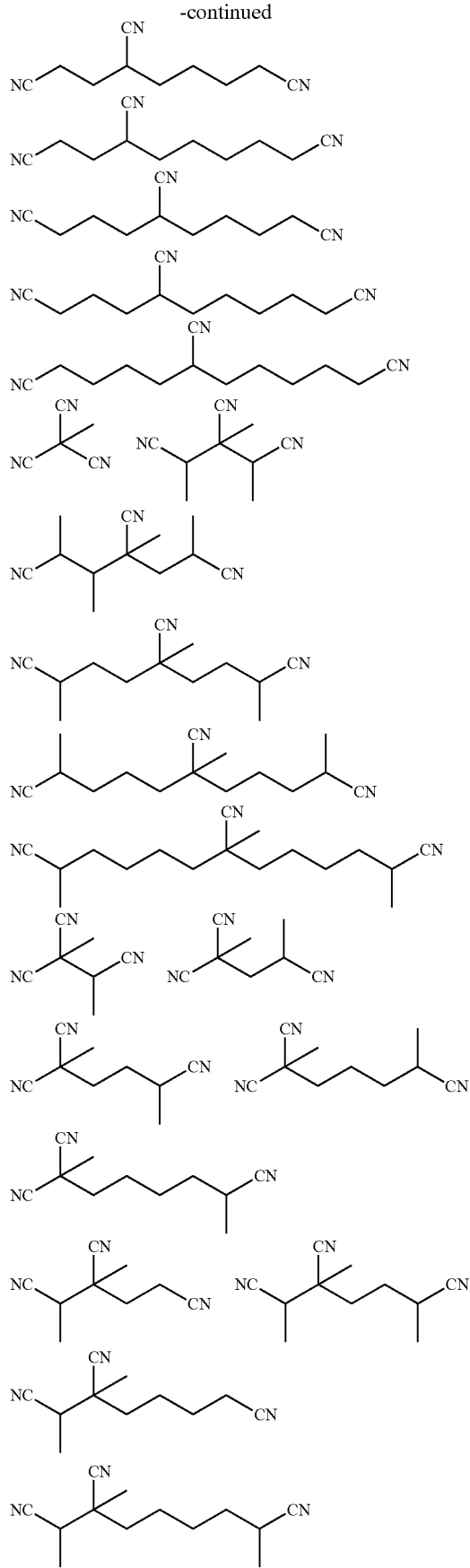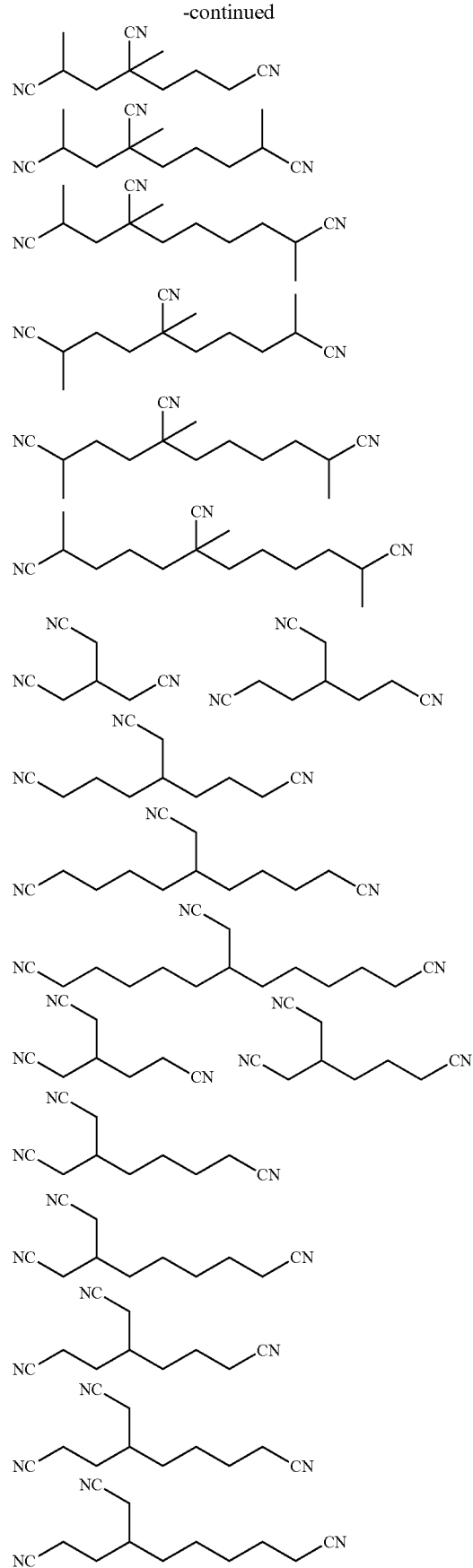

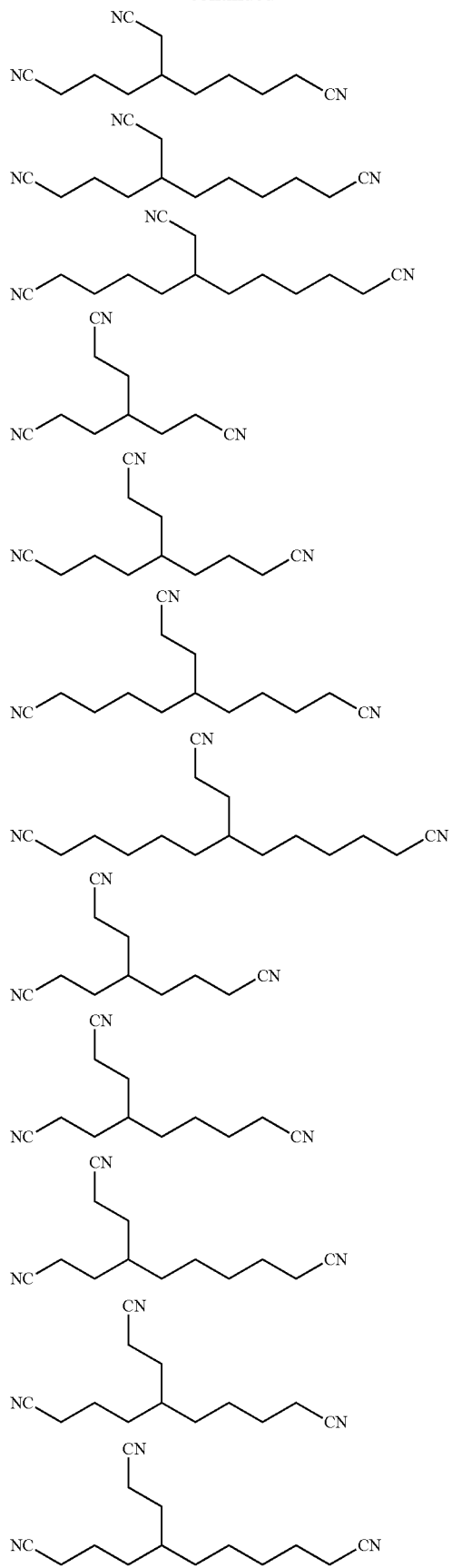
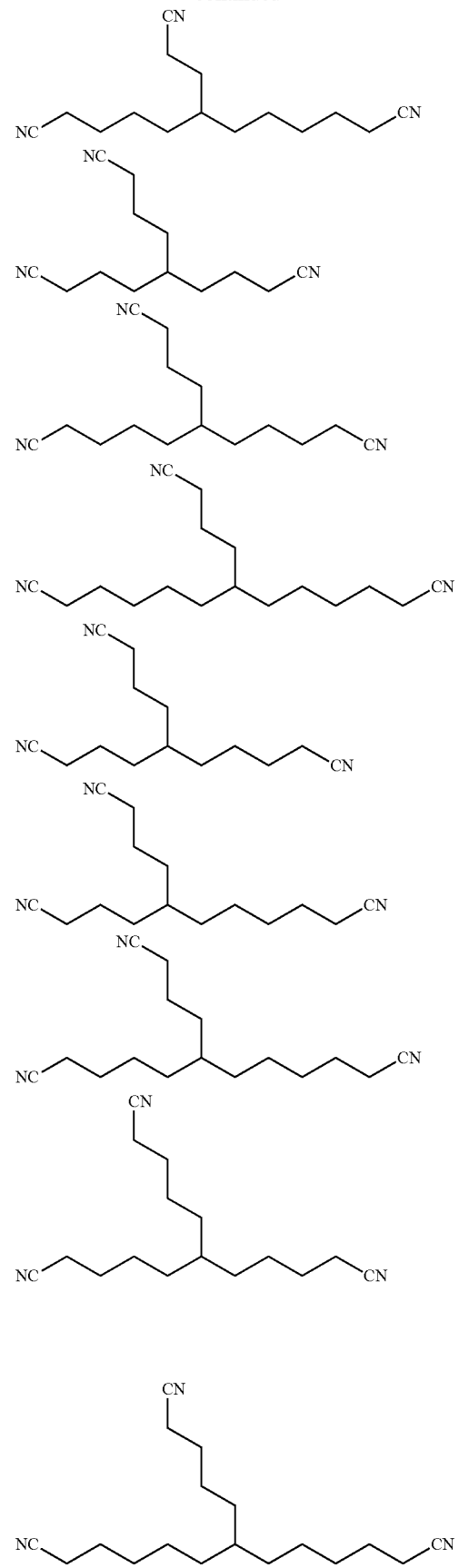

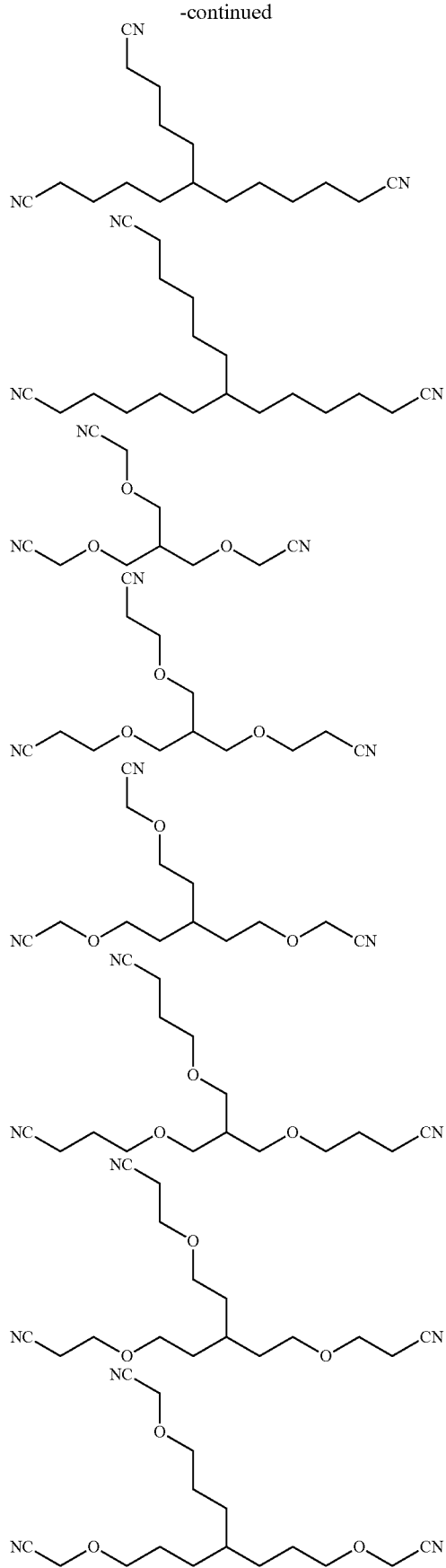
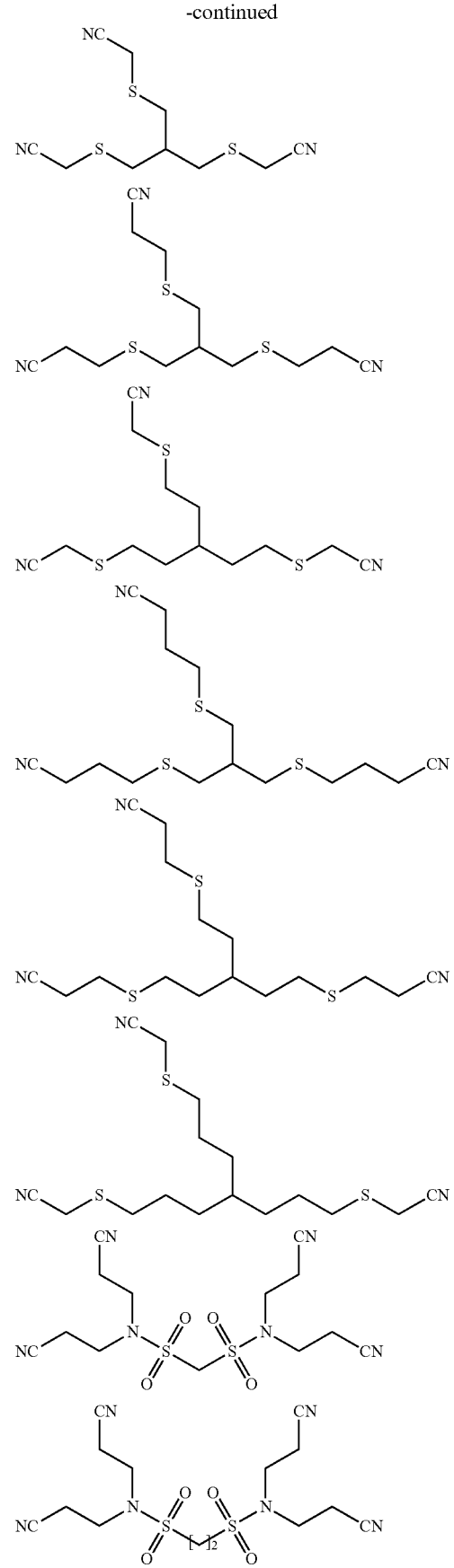

-continued
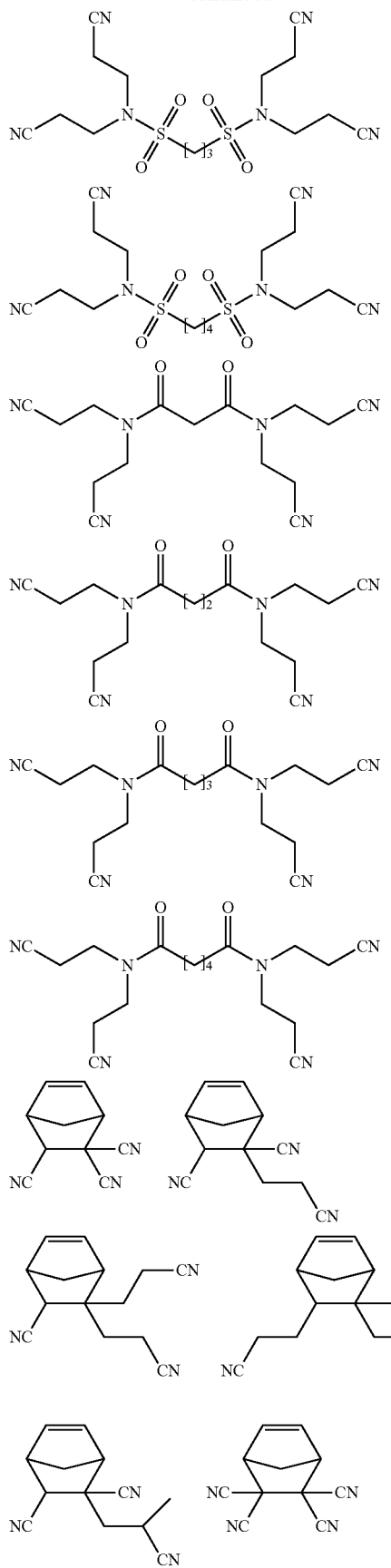
-continued
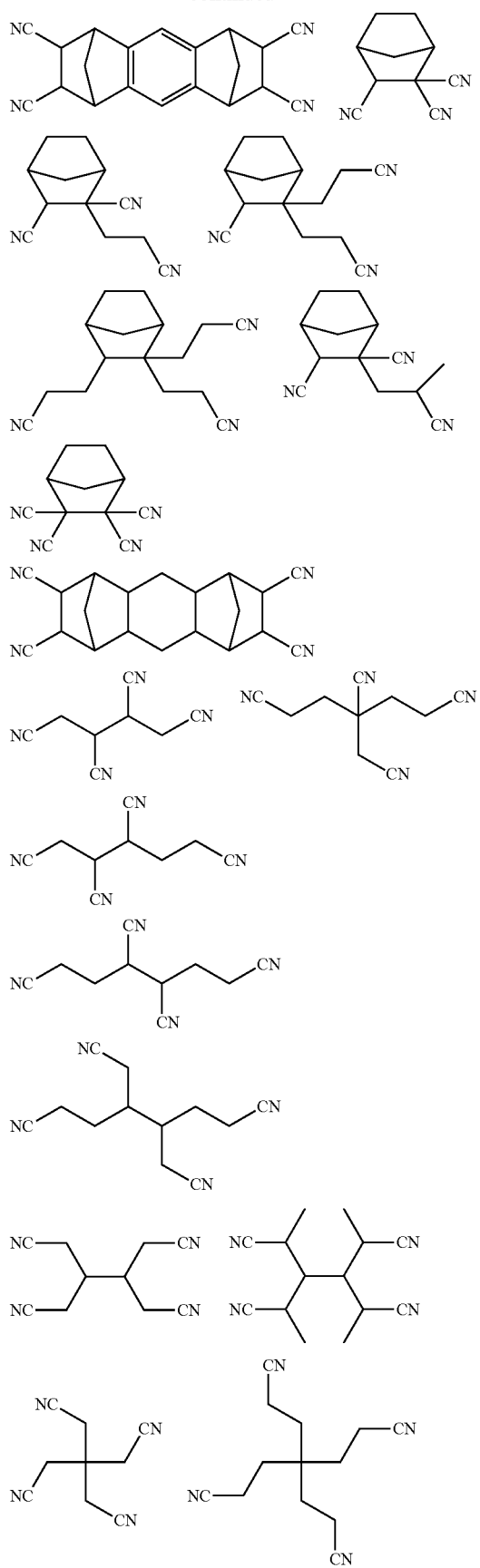

-continued
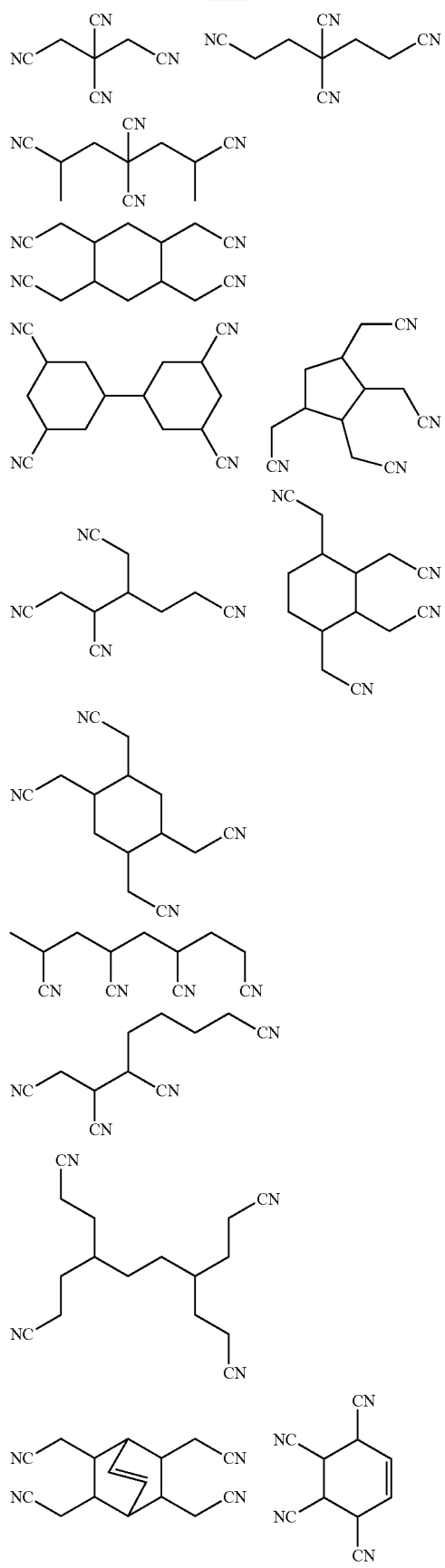
-continued
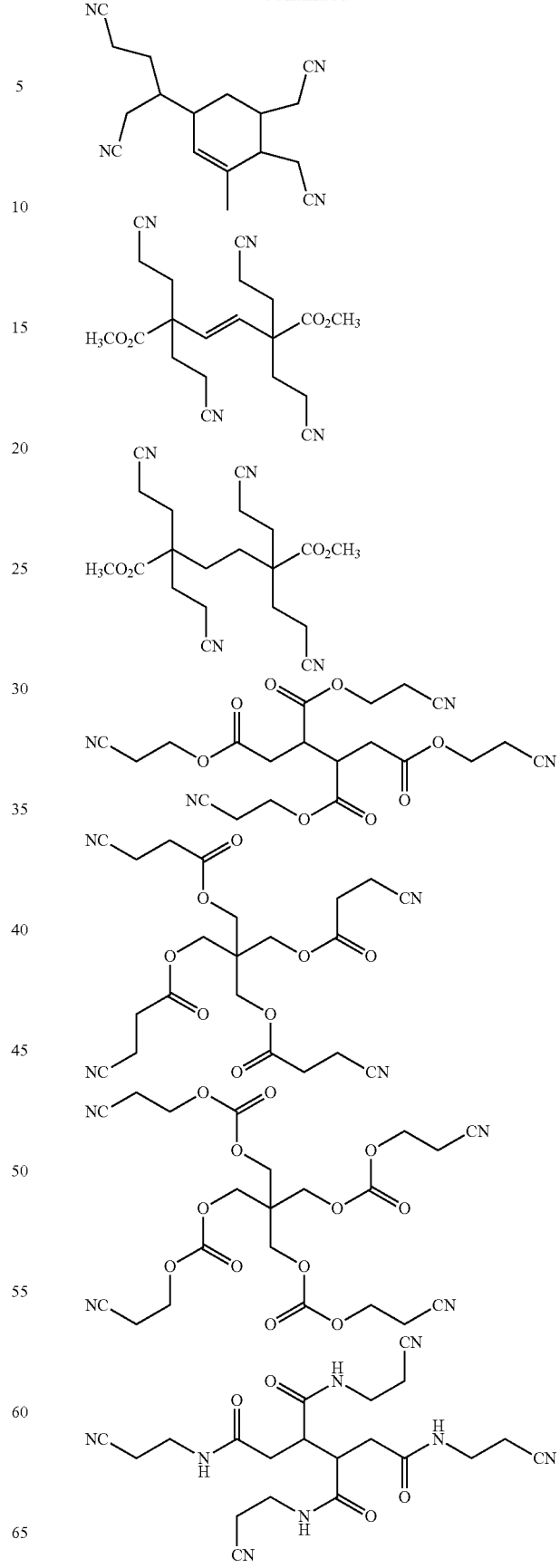

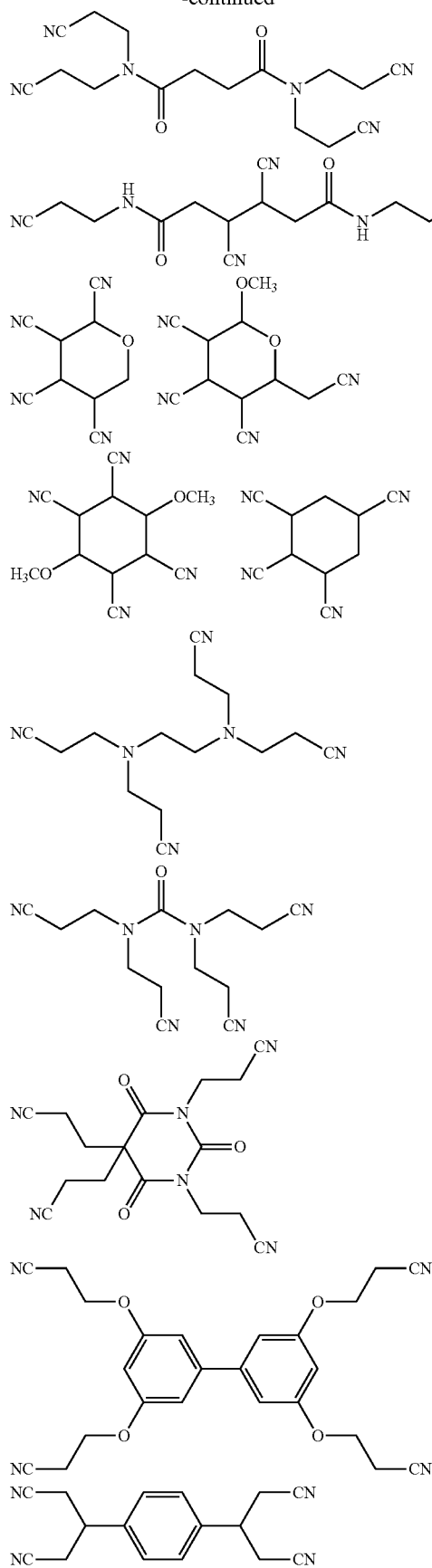
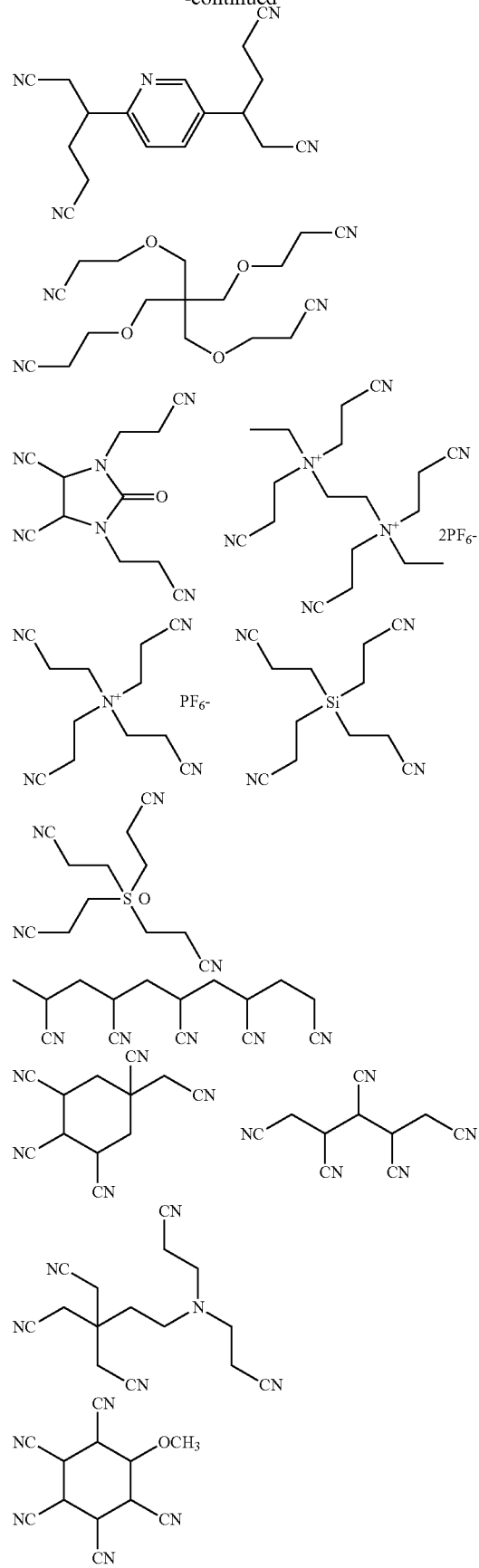

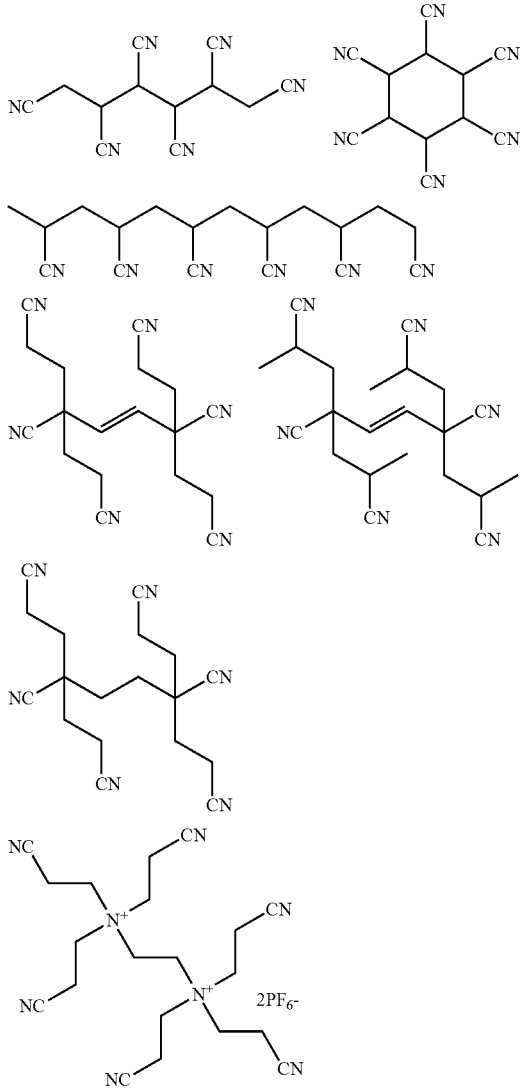

Of these, the following compounds are preferable from the point of view of enhancing storage characteristics.

[Chem. 28]

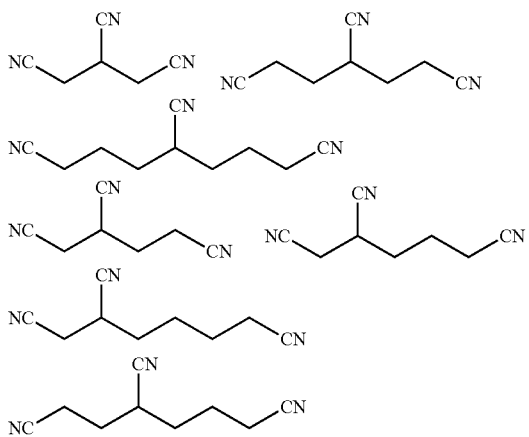

The cyano group-containing organic compounds may be used singly, or two or more may be used in combination in an appropriate ratio.

In 100 mass % of the electrolytic solution, the concentration of the compound represented by Formula (3-4-3) (the total concentration when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, and particularly preferably 2 mass % or less. This concentration ensures easy control of characteristics such as output characteristics, load characteristics, low-temperature characteristics, cycle characteristics and high-temperature storage characteristics.

The mass ratio between the aromatic carboxylate ester represented by Formula (2) and the cyano group-containing organic compound, namely, the aromatic carboxylate ester of Formula (2):cyano group-containing organic compound ratio is preferably 1:99 to 99:1, more preferably 5:95 to 95:5, still more preferably 10:90 to 90:10, particularly preferably 20:80 to 80:20, and highly preferably 30:70 to 70:30. This ratio ensures that battery characteristics, in particular, initial characteristics will be markedly enhanced. Although the mechanism of this effect is not clear, it is probable that the additives mixed in the above ratio are prevented from side reactions on the electrodes to the maximum extent.

1-3-5. Isocyanate Group-Containing Organic Compounds

The electrolytic solution of the invention may further include an isocyanate group-containing organic compound. The isocyanate group-containing organic compounds are not particularly limited as long as the compounds are organic and contain at least one isocyanate group in the molecule. The number of the isocyanate groups in the molecule is preferably 1 to 4, more preferably 2 to 3, and still more preferably 2.

In the electrolytic solution of the invention, the combined use of the aromatic carboxylate ester represented by Formula (2) and the isocyanate group-containing compound reduces the initial gas production in a battery containing the electrolytic solution, and also enhances the battery capacity after storage.

The isocyanate group-containing organic compounds are preferably such that the isocyanate groups are bonded to compounds having a linear or branched alkylene group, a cycloalkylene group, a structure in which a cycloalkylene group and an alkylene group are linked together, an aromatic hydrocarbon group, a structure in which an aromatic hydrocarbon group and an alkylene group are linked together, an ether structure (—O—), a structure in which an ether structure (—O—) and an alkylene group are linked together, a carbonyl group (—C(=O)—), a structure in which a carbonyl group and an alkylene group are linked together, a sulfonyl group (—S(=O)—), a structure in which a sulfonyl group and an alkylene group are linked together, or a structure resulting from the halogenation of any of the groups and structures described above. The isocyanate group-containing organic compounds are more preferably such that the isocyanate groups are bonded to a linear or branched alkylene group, a cycloalkylene group, a structure in which a cycloalkylene group and an alkylene group are linked together, an aromatic hydrocarbon group, or a structure in which an aromatic hydrocarbon group and an alkylene group are linked together, and are still more preferably such that the isocyanate groups are bonded to a structure in which a cycloalkylene group and an alkylene group are linked together. The molecular weight of the isocyanate group-containing organic compounds is not particularly limited. The molecular weight is preferably 80 or more, more preferably 115 or more, and still more preferably 170 or more, and is preferably 300 or less, and more preferably 230 or less. This range of molecular weights ensures that the isocyanate group-containing organic compound will exhibit solubility with respect to the nonaqueous electrolytic solution and the advantageous effects of the invention will be obtained prominently. The isocyanate group-containing organic compounds may be produced by any methods without limitation, and known production methods may be selected appropriately. Further, commercial products may be used.

Examples of the isocyanate group-containing organic compounds include organic compounds having one isocyanate group such as methyl isocyanate, ethyl isocyanate, propyl isocyanate, isopropyl isocyanate, butyl isocyanate, tert-butyl isocyanate, pentyl isocyanate, hexyl isocyanate, cyclohexyl isocyanate, vinyl isocyanate, allyl isocyanate, ethynyl isocyanate, propargyl isocyanate, phenyl isocyanate and fluorophenyl isocyanate; and organic compounds having two isocyanate groups such as monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, carbonyl diisocyanate, 1,4-diisocyanatobutane-1,4-dione, 1,5-diisocyanatopentane-1,5-dione, 2,2,4-trimethylhexamethylene diisocyanate and 2,4,4-trimethylhexamethylene diisocyanate.

Of these, those organic compounds having two isocyanate groups are preferable from the point of view of enhancing storage characteristics, with specific examples including monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, 2,2,4-trimethylhexamethylene diisocyanate and 2,4,4-trimethylhexamethylene diisocyanate. More preferred compounds are hexamethylene diisocyanate, 1,3-bis(isocyanatomethyl)cyclohexane, dicyclohexylmethane-4,4'-diisocyanate, bicyclo[2.2.1]heptane-2,5-diylbis(methyl isocyanate), bicyclo[2.2.1]heptane-2,6-diylbis(methyl isocyanate), isophorone diisocyanate, 2,2,4-trimethylhexamethylene diisocyanate and 2,4,4-trimethylhexamethylene diisocyanate. 1,3-Bis(isocyanatomethyl)cyclohexane, dicyclohexylmethane-4,4'-diisocyanate, bicyclo[2.2.1]heptane-2,5-diylbis(methyl isocyanate) and bicyclo[2.2.1]heptane-2,6-diylbis(methyl isocyanate) are still more preferable.

The isocyanate group-containing organic compounds may be trimer compounds that are derived from compounds having at least two isocyanate groups in the molecule, or may be aliphatic polyisocyanates that are adducts of the trimer compounds with polyhydric alcohols. Examples include biurets, isocyanurates, adducts and bifunctional modified polyisocyanates having the basic structures represented by Formulae (3-5-1) to (3-5-4) below.

[Chem. 29]

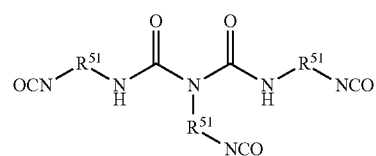
(3-5-1)

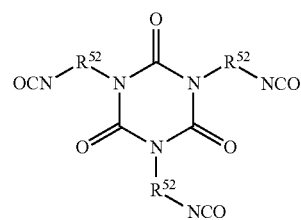
(3-5-2)

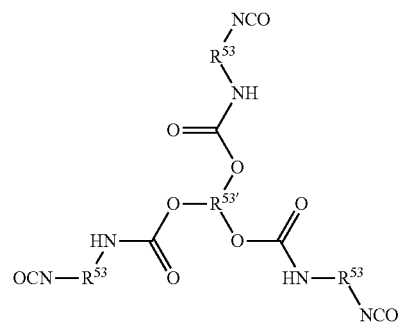
(3-5-3)

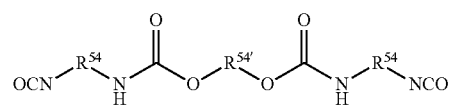
(3-5-4)

(In the formula, $R^{51}$ to $R^{54}$ and $R^{54'}$ independently at each occurrence are a divalent hydrocarbon group (for example, a tetramethylene group or a hexamethylene group), and $R^{53'}$ independently at each occurrence is a trivalent hydrocarbon group.)

The organic compounds having at least two isocyanate groups in the molecule include so-called blocked isocyanates in which functional groups are blocked with a blocking agent to increase storage stability. Examples of the blocking agents include alcohols, phenols, organic amines, oximes and lactams. Specific examples include n-butanol, phenol, tributylamine, diethylethanolamine, methyl ethyl ketoxime and ε-caprolactam.

To facilitate the reaction associated with the isocyanate group-containing organic compound and to obtain higher effects, it is preferable to use catalysts, for example, metal catalysts such as dibutyltin dilaurate, and amine catalysts such as 1,8-diazabicyclo[5.4.0]undecene-7.

The isocyanate group-containing organic compounds may be used singly, or two or more may be used in combination in an appropriate ratio.

In 100 mass % of the electrolytic solution, the amount of the isocyanate group-containing organic compound (the total amount when two or more kinds of the compounds are used) may be 0.001 mass % or above, preferably 0.1 mass % or above, and more preferably 0.3 mass % or above, and may be 10 mass % or less, preferably 5 mass % or less, and more preferably 3 mass % or less. This amount ensures easy control of characteristics such as output characteristics, load characteristics, low-temperature characteristics, cycle characteristics and high-temperature storage characteristics.

The mass ratio between the aromatic carboxylate ester represented by Formula (2) and the isocyanate group-containing organic compound, namely, the aromatic carboxylate ester of Formula (2):isocyanate group-containing organic compound ratio is preferably 1:99 to 99:1, more preferably 5:95 to 95:5, still more preferably 10:90 to 90:10, particularly preferably 20:80 to 80:20, and highly preferably 30:70 to 70:30. This ratio ensures that battery characteristics, in particular, initial characteristics will be markedly enhanced. Although the mechanism of this effect is not clear, it is probable that the additives mixed in the above ratio are prevented from side reactions on the electrodes to the maximum extent.

1-3-6. Silicon-Containing Compounds

The electrolytic solution of the invention may further include a silicon-containing compound. The silicon-containing compounds are not particularly limited as long as the compounds have at least one silicon atom in the molecule. In the electrolytic solution of the invention, the combined use of the aromatic carboxylate ester of Formula (2) with the silicon-containing compound enhances the initial high-rate discharge capacity and also enhances the capacity after storage.

The silicon-containing compounds are preferably represented by Formula (3-6) below:

[Chem. 30]

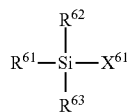

(3-6)

(In the formula, $R^{61}$, $R^{62}$ and $R^{63}$ are independently a hydrogen atom, a halogen atom or a hydrocarbon group having 10 or less carbon atoms, and $X^{61}$ is an organic group containing at least one atom selected from the group consisting of oxygen atoms, nitrogen atoms and silicon atoms.)

Examples and preferred examples of the hydrocarbon groups are similar to those of the hydrocarbon groups in Formula (1). $R^{61}$, $R^{62}$ and $R^{63}$ are preferably each a hydrogen atom, a fluorine atom, a methyl group, an ethyl group, an n-propyl group, an i-propyl group, an n-butyl group, a sec-butyl group, an i-butyl group, a tert-butyl group or a phenyl group, and more preferably a methyl group.

$X^{61}$ is an organic group containing at least one atom selected from the group consisting of oxygen atoms, nitrogen atoms and silicon atoms, and is preferably an organic group containing at least an oxygen atom or a silicon atom. Here, the organic group is a group composed of one or more atoms selected from the group consisting of carbon atoms, hydrogen atoms, nitrogen atoms, oxygen atoms, silicon atoms, sulfur atoms, phosphorus atoms and halogen atoms. Examples of the organic groups include alkyl groups, alkenyl groups, alkynyl groups, aryl groups, alkoxy groups, CN groups, isocyanate groups, fluoro groups, alkylsulfonate groups and trialkylsilyl groups. The monovalent organic group may be partially substituted with a halogen atom. The number of carbon atoms in the organic group may be 1 or more, preferably 3 or more, and more preferably 5 or more, and may be 15 or less, preferably 12 or less, and more preferably 8 or less.

Of the organic groups, alkylsulfonate groups, trialkylsilyl groups, borate groups, phosphate groups and phosphite groups are preferable.

Examples of the silicon-containing compounds include the following compounds:

borate compounds such as tris(trimethylsilyl) borate, tris(trimethoxysilyl) borate, tris(triethylsilyl) borate, tris(triethoxysilyl) borate, tris(dimethylvinylsilyl) borate and tris(diethylvinylsilyl) borate; phosphate compounds such as tris(trimethylsilyl) phosphate, tris(triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate and tris(diethylvinylsilyl) phosphate;

phosphite compounds such as tris(trimethylsilyl) phosphite, tris(triethylsilyl) phosphite, tris(tripropylsilyl) phosphite, tris(triphenylsilyl) phosphite, tris(trimethoxysilyl) phosphite, tris(triethoxysilyl) phosphite, tris(triphenoxysilyl) phosphite, tris(dimethylvinylsilyl) phosphite and tris(diethylvinylsilyl) phosphite;

sulfonate compounds such as trimethylsilyl methanesulfonate and trimethylsilyl tetrafluoromethanesulfonate; and disilane compounds such as hexamethyldisilane, hexaethyldisilane, 1,1,2,2-tetramethyldisilane, 1,1,2,2-tetraethyldisilane, 1,2-diphenyltetramethyldisilane and 1,1,2,2-tetraphenyldisilane.

Of these, tris(trimethylsilyl) borate, tris(trimethylsilyl) phosphate, tris(trimethylsilyl) phosphite, trimethylsilyl methanesulfonate, trimethylsilyl tetrafluoromethanesulfonate, hexamethyldisilane, hexaethyldisilane, 1,2-diphenyltetramethyldisilane and 1,1,2,2-tetraphenyldisilane are preferable, and tris(trimethylsilyl) borate, tris(trimethylsilyl) phosphate, tris(trimethylsilyl) phosphite and hexamethyldisilane are more preferable.

The silicon-containing compounds may be used singly, or two or more may be used in combination in an appropriate ratio.

In 100 mass % of the electrolytic solution, the amount of the silicon-containing compound (the total amount when two or more kinds of the compounds are used) may be 0.001 mass % or above, preferably 0.1 mass % or above, and more preferably 0.3 mass % or above, and may be 10 mass % or less, preferably 5 mass % or less, and more preferably 3 mass % or less. This amount ensures easy control of characteristics such as output characteristics, load characteristics, low-temperature characteristics, cycle characteristics and high-temperature storage characteristics.

The mass ratio between the aromatic carboxylate ester represented by Formula (2) and the silicon-containing compound (the total mass when two or more kinds of the compounds are used), namely, the aromatic carboxylate ester of Formula (2):silicon-containing compound(s) ratio is preferably 1:99 to 99:1, more preferably 5:95 to 95:5, still more preferably 10:90 to 90:10, particularly preferably 20:80 to 80:20, and highly preferably 30:70 to 70:30. This ratio ensures that battery characteristics, in particular, initial characteristics will be markedly enhanced. Although the mechanism of this effect is not clear, it is probable that the additives mixed in the above ratio are prevented from side reactions on the electrodes to the maximum extent.

1-3-7. Aromatic Compounds Other than Those of Formula (2)

The electrolytic solution of the invention may further include an aromatic compound other than those represented by Formula (2).

The aromatic compounds other than those of Formula (2) are not particularly limited as long as the compounds are organic compounds having at least one aromatic ring in the molecule and represented by other than Formula (2). Those aromatic compounds represented by any of Formulae (3-7-1) and (3-7-2) are preferable.

1-3-7-1. Aromatic Compounds Represented by Formula (3-7-1)

[Chem. 31]

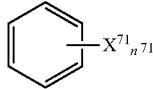

(3-7-1)

(In the formula, the substituent $X^{71}$ is a halogen atom or an organic group optionally having a halogen atom or a heteroatom. The organic group optionally having a heteroatom is a linear, branched or cyclic, saturated hydrocarbon group having 1 to 12 carbon atoms, a group having a carboxylate ester structure, a group having a carbonate structure, a phosphorus-containing group, a sulfur-containing group or a silicon-containing group. These substituents may be further substituted with a substituent such as a halogen atom, a hydrocarbon group, an aromatic group, a halogen-containing hydrocarbon group or a halogen-containing aromatic group. $n^{71}$ that indicates the number of the substituents $X^{71}$ is 1 to 6. When the compound has a plurality of substituents, the substituents may be the same as or different from one another and may form a ring.)

From the point of view of battery characteristics, linear, branched or cyclic, saturated hydrocarbon groups having 1 to 12 carbon atoms, groups having a carboxylate ester structure and groups having a carbonate structure are preferable. Linear, branched or cyclic, saturated hydrocarbon groups having 3 to 12 carbon atoms, and groups having a carboxylate ester structure are more preferable.

The number of the substituents $X^{71}$ indicated by $n^{71}$ is preferably 1 to 5, more preferably 1 to 3, still more preferably 1 to 2, and particularly preferably 1.

$X^{71}$ represents a halogen atom, or an organic group optionally having a halogen atom or a heteroatom.

Examples of the halogen atoms include chlorine and fluorine, with fluorine being preferable.

Examples of the organic groups having no heteroatoms include linear, branched or cyclic, saturated hydrocarbon groups having 3 to 12 carbon atoms. Such linear or branched groups may have a ring structure. Specific examples of the linear, branched or cyclic, saturated hydrocarbon groups having 1 to 12 carbon atoms include methyl group, ethyl group, propyl group, isopropyl group, butyl group, isobutyl group, tert-butyl group, pentyl group, tert-pentyl group, cyclopentyl group, cyclohexyl group and butylcyclohexyl group. The number of carbon atoms is preferably 3 to 12, more preferably 3 to 10, still more preferably 3 to 8, further preferably 3 to 6, and most preferably 3 to 5.

Examples of the heteroatoms present in the organic groups having a heteroatom include oxygen atoms, sulfur atoms, phosphorus atoms and silicon atoms. Examples of the oxygen-containing organic groups include groups having a carboxylate ester structure and groups having a carbonate structure. Examples of the sulfur-containing organic groups include groups having a sulfonate ester structure. Examples of the phosphorus-containing organic groups include groups having a phosphate ester structure and groups having a phosphonate ester structure. Examples of the silicon-containing organic groups include groups having a silicon-carbon structure.

Examples of the aromatic compounds represented by Formula (3-7-1) include the following compounds.

Examples of the compounds in which $X^{71}$ is a halogen atom or an organic group optionally having a halogen atom include:

chlorobenzene, fluorobenzene, difluorobenzene, trifluorobenzene, tetrafluorobenzene, pentafluorobenzene, hexafluorobenzene and benzotrifluoride. Fluorobenzene and hexafluorobenzene are preferable. Fluorobenzene is more preferable.

Examples of the compounds in which $X^{71}$ is a hydrocarbon group having 1 to 12 carbon atoms include:

2,2-diphenylpropane, 1,4-diphenylcyclohexane, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, propylbenzene, butylbenzene, tert-butylbenzene and tert-amylbenzene. Preferred compounds are 2,2-diphenylpropane, 1,4-diphenylcyclohexane, cyclopentylbenzene, cyclohexylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, toluene, ethylbenzene, propylbenzene, butylbenzene, tert-butylbenzene and tert-amylbenzene. More preferred compounds are 2,2-diphenylpropane, cyclopentylbenzene, cyclohexylbenzene, 1,1-diphenylcyclohexane, tert-butylbenzene and tert-amylbenzene. Cyclohexylbenzene, tert-butylbenzene and tert-amylbenzene are still more preferable.

Examples of the compounds in which $X^{71}$ is a group having a carboxylate ester structure include:

phenyl acetate, benzyl acetate, 2-phenylethyl acetate, 3-phenylpropyl acetate, 4-phenylbutyl acetate, phenyl propionate, benzyl propionate, 2-phenylethyl propionate, 3-phenylpropyl propionate, 4-phenylbutyl propionate, phenyl butyrate, benzyl butyrate, 2-phenylethyl butyrate, 3-phenylpropyl butyrate, 4-phenylbutyl butyrate, phenethyl phenylacetate and 2,2-bis(4-acetoxyphenyl)propane. Preferred compounds are 2-phenylethyl acetate, 3-phenylpropyl acetate, 2-phenylethyl propionate, 3-phenylpropyl propionate and 2,2-bis(4-acetoxyphenyl)propane. 2-Phenylethyl acetate and 3-phenylpropyl acetate are more preferable.

Examples of the compounds in which $X^{71}$ is a group having a carbonate structure include:

2,2-bis(4-methoxycarbonyloxyphenyl)propane, 1,1-bis (4-methoxycarbonyloxyphenyl)cyclohexane, diphenyl carbonate, methyl phenyl carbonate, ethyl phenyl carbonate, 2-tert-butylphenyl methyl carbonate, 2-tert-butylphenyl ethyl carbonate, bis(2-tert-butylphenyl) carbonate, 4-tert-butylphenyl methyl carbonate, 4-tert-butylphenyl ethyl carbonate, bis(4-tert-butylphenyl) carbonate, benzyl methyl carbonate, benzyl ethyl carbonate and dibenzyl carbonate. Preferred compounds are 2,2-bis(4-methoxycarbonyloxyphenyl)propane, 1,1-bis(4-methoxycarbonyloxyphenyl)cyclohexane, diphenyl carbonate and methyl phenyl carbonate. Diphenyl carbonate and methyl phenyl carbonate are more preferable. Methyl phenyl carbonate is still more preferable.

Examples of the compounds in which $X^{71}$ is a group having a sulfonate ester structure include:

methyl phenylsulfonate, ethyl phenylsulfonate, diphenyl sulfonate, phenyl methylsulfonate, 2-tert-butylphenyl methylsulfonate, 4-tert-butylphenyl methylsulfonate and cyclohexylphenyl methylsulfonate. Preferred compounds are methyl phenylsulfonate, diphenyl sulfonate, 2-tert-butylphenyl methylsulfonate, 4-tert-butylphenyl methylsulfonate and cyclohexylphenyl methylsulfonate. More preferred compounds are methyl phenylsulfonate, 2-tert-butylphenyl methylsulfonate, 4-tert-butylphenyl methylsulfonate and cyclohexylphenyl methylsulfonate.

Examples of the compounds in which $X^{71}$ is a group having a silicon-carbon structure include:

trimethylphenylsilane, diphenylsilane and diphenyltetramethyldisilane. Trimethylphenylsilane is preferable.

Examples of the compounds in which $X^{71}$ is a group having a phosphate ester structure include:

triphenyl phosphate, tris(2-tert-butylphenyl) phosphate, tris(3-tert-butylphenyl) phosphate, tris(4-tert-butylphenyl) phosphate, tris(2-tert-amylphenyl) phosphate, tris(3-tert-amylphenyl) phosphate, tris(4-tert-amylphenyl) phosphate, tris(2-cyclohexylphenyl) phosphate, tris(3-cyclohexylphenyl) phosphate, tris(4-cyclohexylphenyl) phosphate and diethyl(4-methylbenzyl) phosphonate. Preferred compounds are triphenyl phosphate, tris(2-tert-butylphenyl) phosphate, tris(3-tert-butylphenyl) phosphate, tris(4-tert-butylphenyl) phosphate, tris(2-tert-amylphenyl) phosphate, tris(3-tert-amylphenyl) phosphate, tris(4-tert-amylphenyl) phosphate, tris(2-cyclohexylphenyl) phosphate, tris(3-cyclohexylphenyl) phosphate and tris(4-cyclohexylphenyl) phosphate. More preferred compounds are tris(2-tert-butylphenyl) phosphate, tris(4-tert-butylphenyl) phosphate, tris(2-cyclohexylphenyl) phosphate and tris(4-cyclohexylphenyl) phosphate.

Examples of the compounds in which $X^{71}$ is a group having a phosphonate ester structure include:

dimethyl phenylphosphonate, diethyl phenylphosphonate, methyl phenyl phenylphosphonate, ethyl phenyl phenylphosphonate, diphenyl phenylphosphonate, dimethyl-(4-fluorophenyl)-phosphonate, dimethyl benzylphosphonate, diethyl benzylphosphonate, methyl phenyl benzylphosphonate, ethyl phenyl benzylphosphonate, diphenyl benzylphosphonate, dimethyl-(4-fluorobenzyl)phosphonate and diethyl-(4-fluorobenzyl)phosphonate. Preferred compounds are dimethyl phenylphosphonate, diethyl phenylphosphonate, dimethyl-(4-fluorophenyl)-phosphonate, dimethyl benzylphosphonate, diethyl benzylphosphonate, dimethyl-(4-fluorobenzyl)phosphonate and diethyl-(4-fluorobenzyl) phosphonate. More preferred compounds are dimethyl phenylphosphonate, diethyl phenylphosphonate, dimethyl benzylphosphonate, diethyl benzylphosphonate, dimethyl-(4-fluorobenzyl)phosphonate and diethyl-(4-fluorobenzyl) phosphonate.

Examples of the aromatic compounds represented by Formula (3-7-1) further include fluorides of the above aromatic compounds. Specific examples include: partial fluorides of the compounds having a hydrocarbon group such as 2-fluorotoluene, 3-fluorotoluene, 4-fluorotoluene, trifluoromethylbenzene, o-cyclohexylfluorobenzene and p-cyclohexylfluorobenzene; partial fluorides of the compounds having a carboxylate ester structure such as 2-fluorophenyl acetate and 4-fluorophenyl acetate; and partial fluorides of the compounds having an ether structure such as trifluoromethoxybenzene, 2-fluoroanisole, 3-fluoroanisole, 4-fluoroanisole, 2,4-difluoroanisole, 2,5-difluoroanisole, 2,6-difluoroanisole, 3,5-difluoroanisole and 4-trifluoromethoxyanisole. Preferred compounds are partial fluorides of the compounds having a hydrocarbon group such as trifluoromethylbenzene, 2-fluorotoluene, 3-fluorotoluene, 4-fluorotoluene, o-cyclohexylfluorobenzene and p-cyclohexylfluorobenzene; partial fluorides of the compounds having a carboxylate ester structure such as 2-fluorophenyl acetate and 4-fluorophenyl acetate; and partial fluorides of the compounds having an ether structure such as trifluoromethoxybenzene 2-fluoroanisole, 4-fluoroanisole, 2,4-difluoroanisole and 4-trifluoromethoxyanisole. More preferred compounds are partial fluorides of the compounds having a hydrocarbon group such as 2-fluorotoluene, 3-fluorotoluene and 4-fluorotoluene; partial fluorides of the compounds having a carboxylate ester structure such as 2-fluorophenyl acetate and 4-fluorophenyl acetate; and partial fluorides of the compounds having an ether structure such as trifluoromethoxybenzene, 2-fluoroanisole, 4-fluoroanisole, 2,4-difluoroanisole and 4-trifluoromethoxyanisole.

The aromatic compound represented by Formula (3-7-1) may be used singly, or two or more may be used in combination in an appropriate ratio. In 100 mass % of the electrolytic solution, the amount of the aromatic compound represented by Formula (3-7-1) (the total amount when two or more kinds of the compounds are used) may be 0.001 mass % or above, preferably 0.01 mass % or above, more preferably 0.1 mass % or above, and still more preferably 0.4 mass % or above, and may be 10 mass % or less, preferably 8 mass % or less, more preferably 5 mass % or less, still more preferably 4 mass % or less, and particularly preferably 4 mass % or less. This amount ensures that the advantageous effects of the invention will be obtained prominently and the increase in battery resistance will be prevented.

The mass ratio between the aromatic carboxylate ester represented by Formula (2) and the aromatic compound represented by Formula (3-7-1) (the total mass when two or more kinds of the compounds are used) is preferably 1:99 to 99:1, more preferably 10:90 to 90:10, and particularly preferably 20:80 to 80:20. This ratio ensures that overcharge characteristics may be enhanced without a decrease in battery characteristics.

1-3-7-2. Aromatic Compounds Represented by Formula (3-7-2)

[Chem. 32]

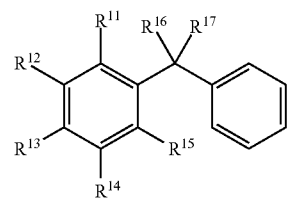

(3-7-2)

(In the formula, $R^{11}$ to $R^{15}$ are independently hydrogen, a halogen, or an unsubstituted or halogenated hydrocarbon group having 1 to 20 carbon atoms; $R^{16}$ and $R^{17}$ are independently a hydrocarbon group having 1 to 12 carbon atoms; and at least two of $R^{11}$ to $R^{17}$ may be bonded together to form a ring. Formula (3-7-2) satisfies at least one of the requirements (A) and (B):

(A) At least one of $R^{11}$ to $R^{15}$ is a halogen, or an unsubstituted or halogenated hydrocarbon group having 1 to 20 carbon atoms.

(B) The total number of carbon atoms in $R^{11}$ to $R^{17}$ is 3 to 20.) When at least two of $R^{11}$ to $R^{17}$ are bonded together to form a ring, it is preferable that the ring be formed by two of $R^{11}$ to $R^{17}$.

$R^{16}$ and $R^{17}$ are independently a hydrocarbon group having 1 to 12 carbon atoms (for example, an alkyl group or an aryl group). $R^{16}$ and $R^{17}$ may be bonded together to form a ring (for example, a cyclic hydrocarbon group). To obtain enhancements in initial efficiency, solubility and storage characteristics, $R^{16}$ and $R^{17}$ are preferably hydrocarbon groups having 1 to 12 carbon atoms or are bonded to each other to form a cyclic hydrocarbon group; $R^{16}$ and $R^{17}$ are more preferably each a methyl group, an ethyl group, a propyl group, a butyl group or a tert-butyl group or are bonded together to form a 5- to 8-membered cyclic hydrocarbon group; $R^{16}$ and $R^{17}$ are still more preferably each a methyl group or an ethyl group or are bonded together to form a cyclohexyl group or a cyclopentyl group; and $R^{16}$ and $R^{17}$ are most preferably each a methyl group or an ethyl group or are bonded together to form a cyclohexyl group.

$R^{11}$ to $R^{15}$ are independently hydrogen, a halogen, or an unsubstituted or halogenated hydrocarbon group having 1 to 20 carbon atoms (for example, an alkyl group, an aryl group or an aralkyl group). Two of these substituents may be bonded together to form a ring (for example, a cyclic hydrocarbon group). To obtain enhancements in initial efficiency, solubility and storage characteristics, these substituents are preferably each hydrogen, fluorine, or an unsubstituted or halogenated hydrocarbon group having 1 to 12 carbon atoms, more preferably each hydrogen, fluorine, or an unsubstituted or fluorinated hydrocarbon group having 1 to 10 carbon atoms, still more preferably each hydrogen, fluorine, a tert-butyl group, a tert-pentyl group, a tert-hexyl group, a tert-heptyl group, a methyl group, an ethyl group, a propyl group, a butyl group, a trifluoromethyl group, a nonafluoro-tert-butyl group, a 1-methyl-1-phenyl-ethyl group or a 1-ethyl-1-phenyl-propyl group, particularly preferably each hydrogen, fluorine, a tert-butyl group or a 1-methyl-1-phenyl-ethyl group, and most preferably each hydrogen, a tert-butyl group or a 1-methyl-1-phenyl-ethyl group.

One of $R^{11}$ to $R^{15}$, and $R^{16}$ may be bonded together to form a ring (for example, a cyclic hydrocarbon group). Preferably, $R^{11}$ and $R^{16}$ are bonded together to form a ring (for example, a cyclic hydrocarbon group). In this case, $R^{17}$ is preferably an alkyl group. Examples of the compounds in which $R^{17}$ is a methyl group, and $R^{11}$ and $R^{16}$ form a ring together include 1-phenyl-1,3,3-trimethylindane and 2,3-dihydro-1,3-dimethyl-1-(2-methyl-2-phenylpropyl)-3-phenyl-1H-indane.

Formula (3-7-2) satisfies at least one of the requirements (A) and (B):

(A) At least one of $R^{11}$ to $R^{15}$ is a halogen, or an unsubstituted or halogenated hydrocarbon group having 1 to 20 carbon atoms.

(B) The total number of carbon atoms in $R^{11}$ to $R^{17}$ is 3 to 20.

From the point of view of the suppression of oxidation on the positive electrode at normal battery operation voltages, it is preferable that Formula (3-7-2) satisfy the requirement (A). From the point of view of the solubility in the electrolytic solution, it is preferable that the formula satisfy the requirement (B). Formula (3-7-2) may satisfy both the requirements (A) and (B).

As long as the requirement (A) is satisfied, specifically, as long as at least one of $R^{11}$ to $R^{15}$ is a halogen, or an unsubstituted or halogenated hydrocarbon group having 1 to 20 carbon atoms, the other substituents may be hydrogen atoms or may form a ring. From the point of view of the solubility in the electrolytic solution, the number of carbon atoms in the unsubstituted or halogenated hydrocarbon group is preferably 1 to 10, more preferably 1 to 5, still more preferably 1 to 3, further preferably 1 or 2, and most preferably 1.

As long as the requirement (B) is satisfied, specifically, as long as the total number of carbon atoms in $R^{11}$ to $R^{17}$ is 3 to 20, at least two of $R^{11}$ to $R^{17}$ may be bonded together to form a ring. When at least two of $R^{11}$ to $R^{17}$ are bonded to each other to form a ring, the calculation of the total number of carbon atoms neglects the carbon atoms in the ring that do not correspond to $R^{11}$ to $R^{17}$ (the carbon atoms in the benzene ring to which $R^{11}$ to $R^{15}$ are bonded, and the benzyl carbon atom to which $R^{16}$ and $R^{17}$ are bonded). From the point of view of the solubility in the electrolytic solution, the total number of carbon atoms is preferably 3 to 14, and more preferably 3 to 10. Some of the compounds satisfying the requirement (B) are 1-phenyl-1,3,3-trimethylindane and 2,3-dihydro-1,3-dimethyl-1-(2-methyl-2-phenylpropyl)-3-phenyl-1H-indane mentioned above as examples of the compounds in which $R^{17}$ is a methyl group, and $R^{11}$ and $R^{16}$ form a ring together.

Examples of the aromatic compounds represented by Formula (3-7-2) include the following:

those compounds in which $R^{16}$ and $R^{17}$ are independently a hydrocarbon group having 1 to 20 carbon atoms (with the proviso that the total number of carbon atoms in $R^{16}$ and $R^{17}$ is 3 to 20), and $R^{11}$ to $R^{15}$ are hydrogen (satisfying the requirement (B));

2,2-diphenylbutane, 3,3-diphenylpentane, 3,3-diphenylhexane, 4,4-diphenylheptane, 5,5-diphenyloctane, 6,6-diphenylnonane, 1,1-diphenyl-1,1-di-tert-butyl-methane;

[Chem. 33]

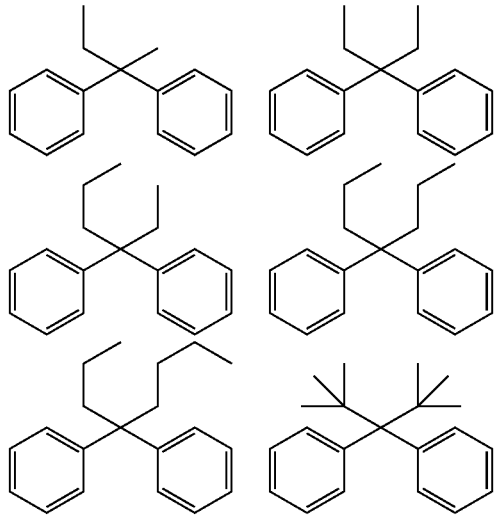

those compounds in which $R^{16}$ and $R^{17}$ are bonded together to form a ring, and $R^{11}$ to $R^{15}$ are hydrogen (satisfying the requirement (B));

1,1-diphenylcyclohexane, 1,1-diphenylcyclopentane and 1,1-diphenyl-4-methylcyclohexane.

Examples further include the following compounds (some of the compounds illustrated below are the same as those mentioned above):

[Chem. 34]

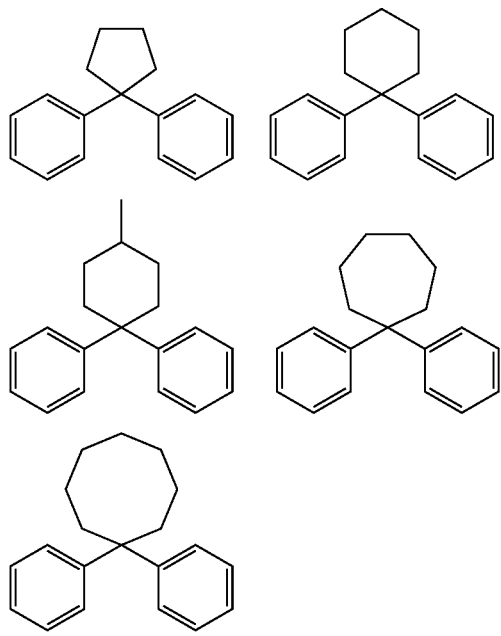

Examples further include those compounds in which at least one of $R^{11}$ to $R^{15}$ is a halogen, or an unsubstituted or halogenated hydrocarbon group having 1 to 20 carbon atoms (satisfying the requirement (A));

1,3-bis(1-methyl-1-phenylethyl)-benzene and 1,4-bis(1-methyl-1-phenylethyl)-benzene.

Examples further include the following compounds (some of the compounds illustrated below are the same as those mentioned above):

[Chem. 35]

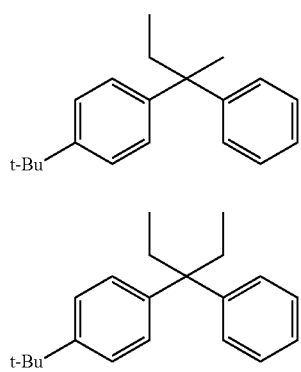

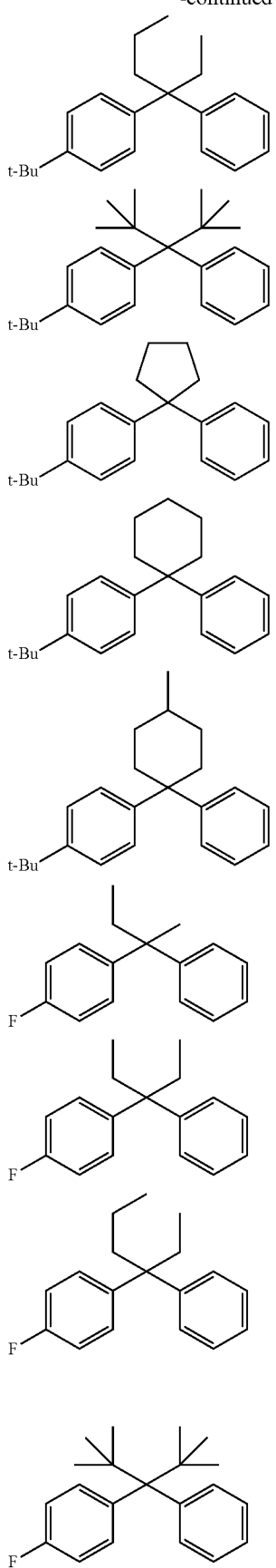

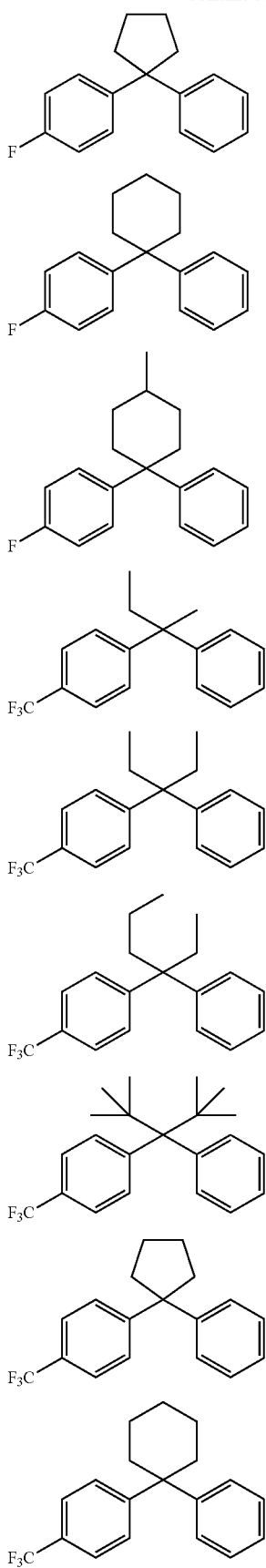
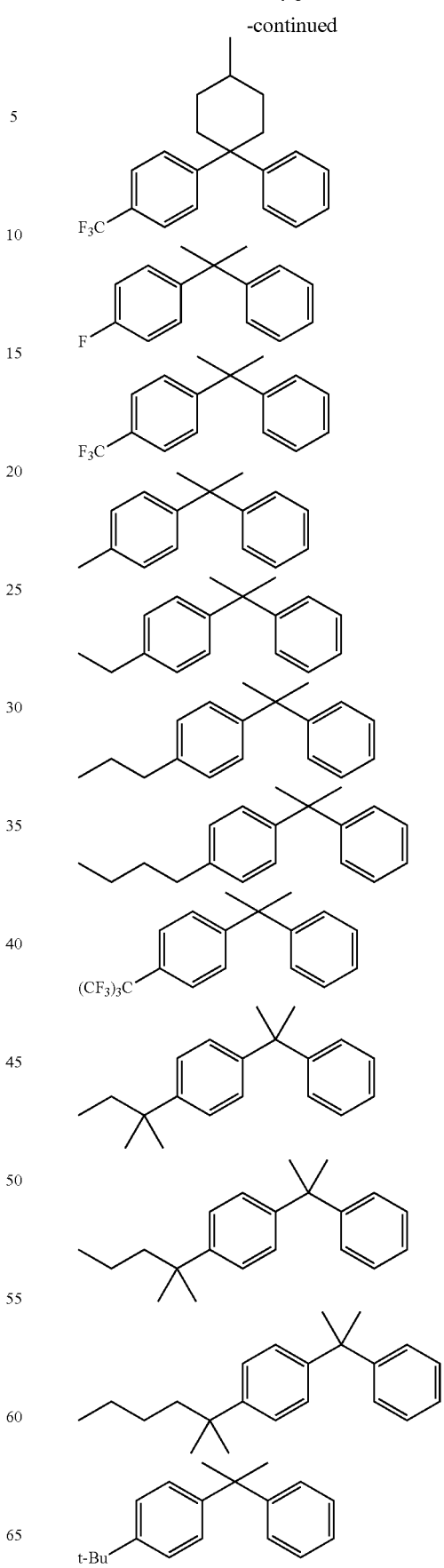

-continued

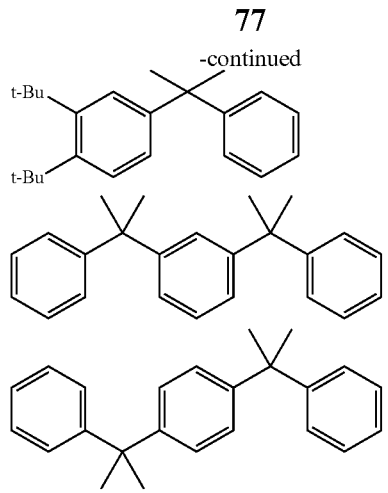

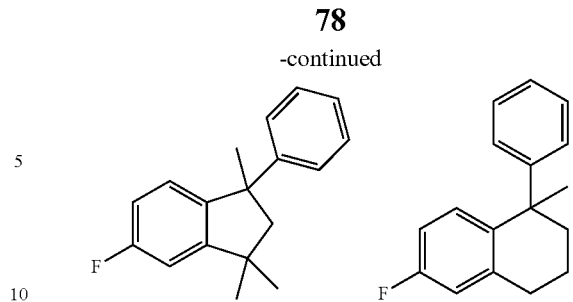

Examples further include those compounds in which $R^{17}$ is a hydrocarbon group having 1 to 20 carbon atoms (for example, an alkyl group having 1 to 20 carbon atoms, preferably a methyl group), and $R^{11}$ and $R^{16}$ are bonded together to form a ring (satisfying the requirement (B)); and 1-phenyl-1,3,3-trimethylindane.

Examples further include the following compounds (some of the compounds illustrated below are the same as those mentioned above):

[Chem. 36]

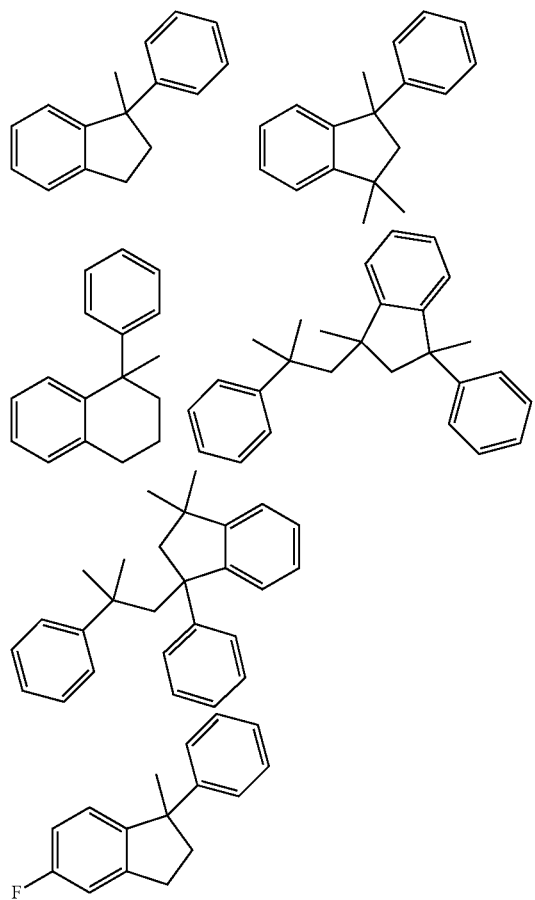

In particular, 2,2-diphenylbutane, 3,3-diphenylpentane, 1,1-diphenyl-1,1-di-tert-butyl-methane, 1,1-diphenylcyclohexane, 1,1-diphenylcyclopentane, 1,1-diphenyl-4-methylcyclohexane, 1,3-bis(1-methyl-1-phenylethyl)-benzene, 1,4-bis(1-methyl-1-phenylethyl)-benzene and 1-phenyl-1,3,3-trimethylindane are preferable from the point of view of the initial reducibility on the negative electrode.

Preferred examples further include the following compounds (some of the compounds illustrated below are the same as the above preferred compounds):

[Chem. 37]

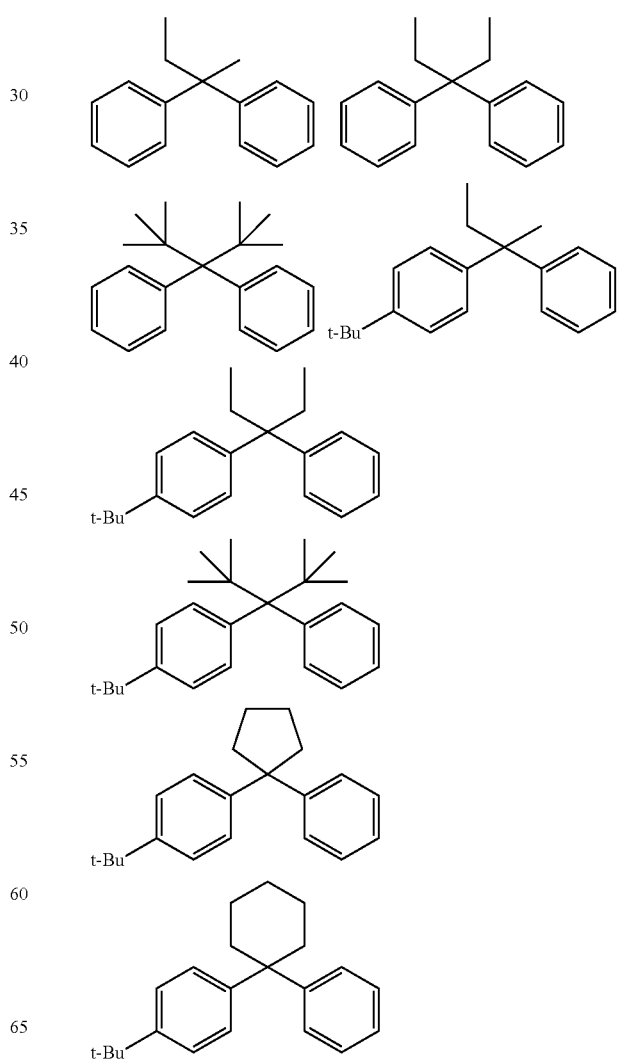

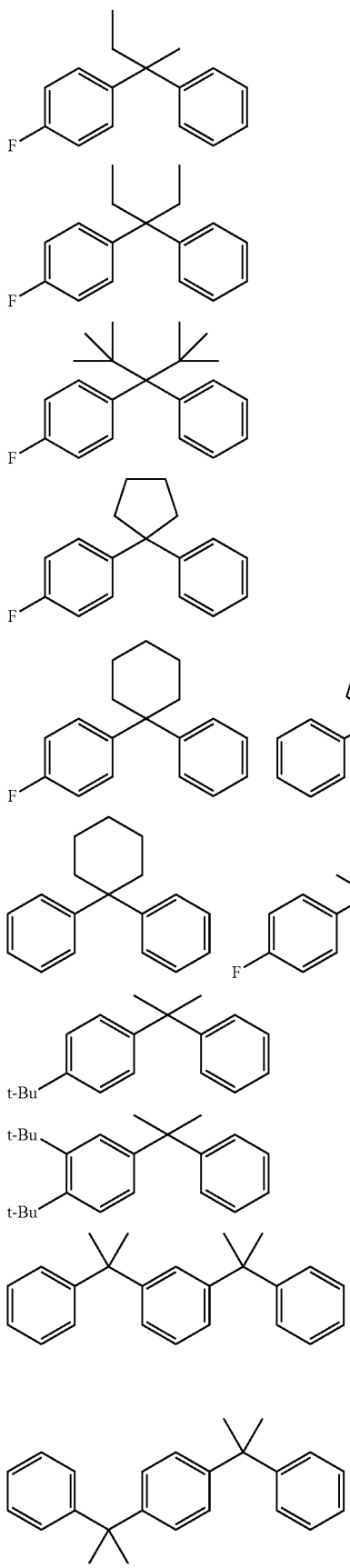
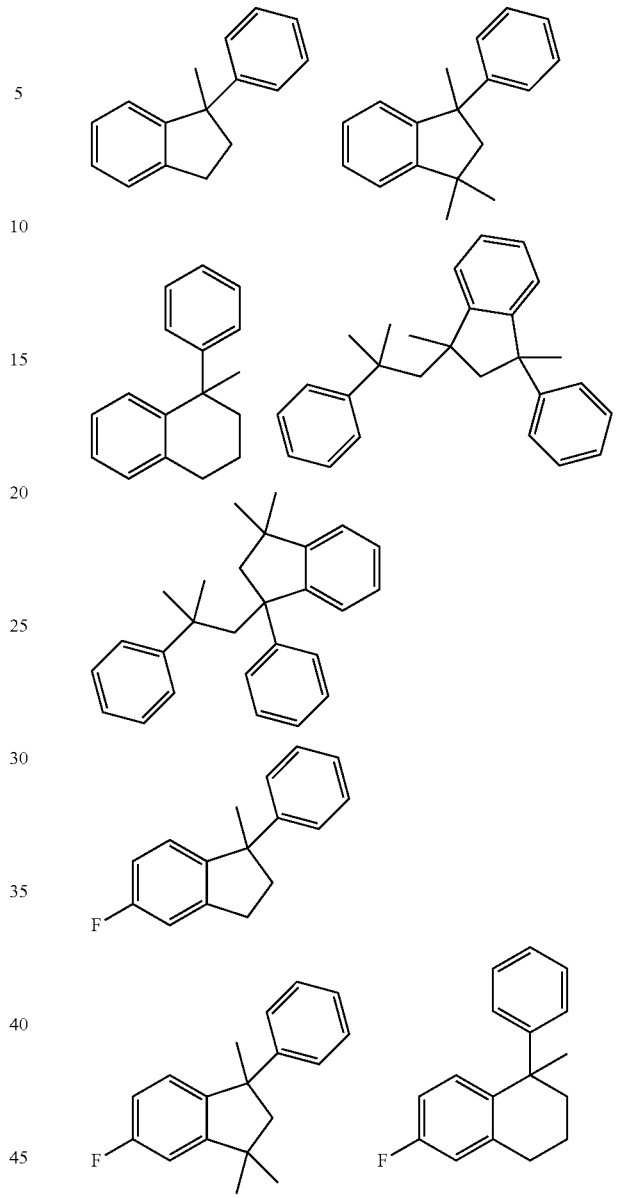
More preferred compounds are 2,2-diphenylbutane, 1,1-diphenylcyclohexane, 1,1-diphenyl-4-methylcyclohexane, 1,3-bis(1-methyl-1-phenylethyl)-benzene, 1,4-bis(1-methyl-1-phenylethyl)-benzene and 1-phenyl-1,3,3-trimethylindane.
More preferred examples further include the following compounds (some of the compounds illustrated below are the same as the above more preferred compounds):
[Chem. 38]
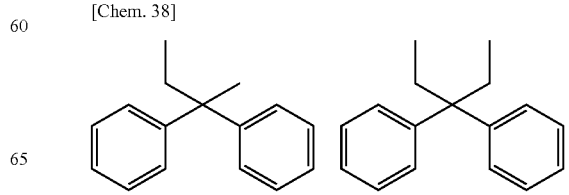

-continued

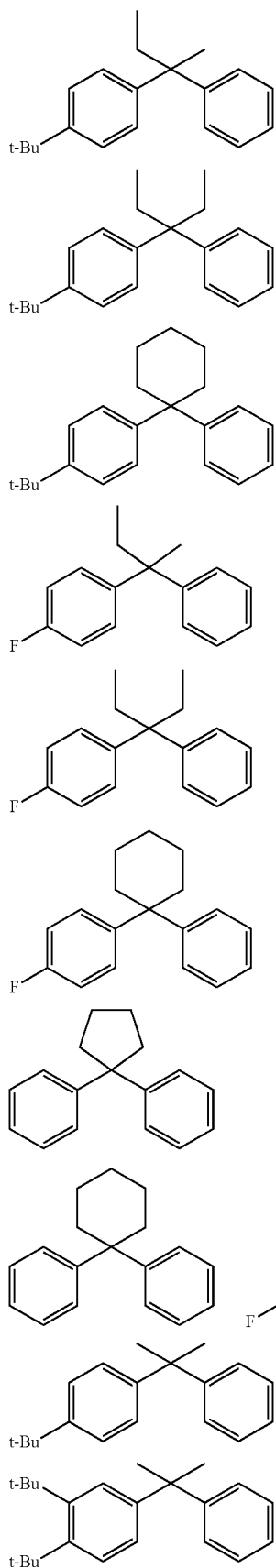

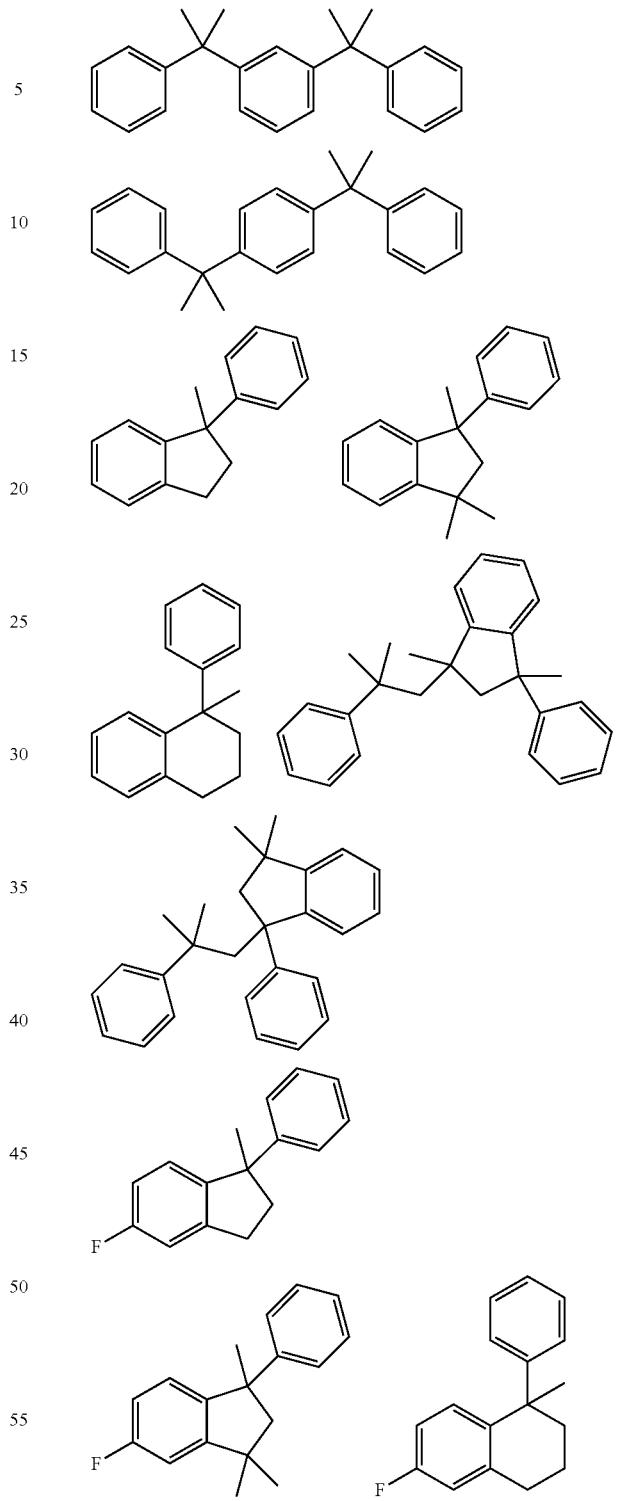

Still more preferred compounds are 1,1-diphenylcyclohexane, 1,1-diphenyl-4-methylcyclohexane, 1,3-bis(1-methyl-1-phenylethyl)-benzene, 1,4-bis(1-methyl-1-phenylethyl)-benzene and 1-phenyl-1,3,3-trimethylindane.

Still more preferred examples further include the following compounds (some of the compounds illustrated below are the same as the above still more preferred compounds):

[Chem. 39]

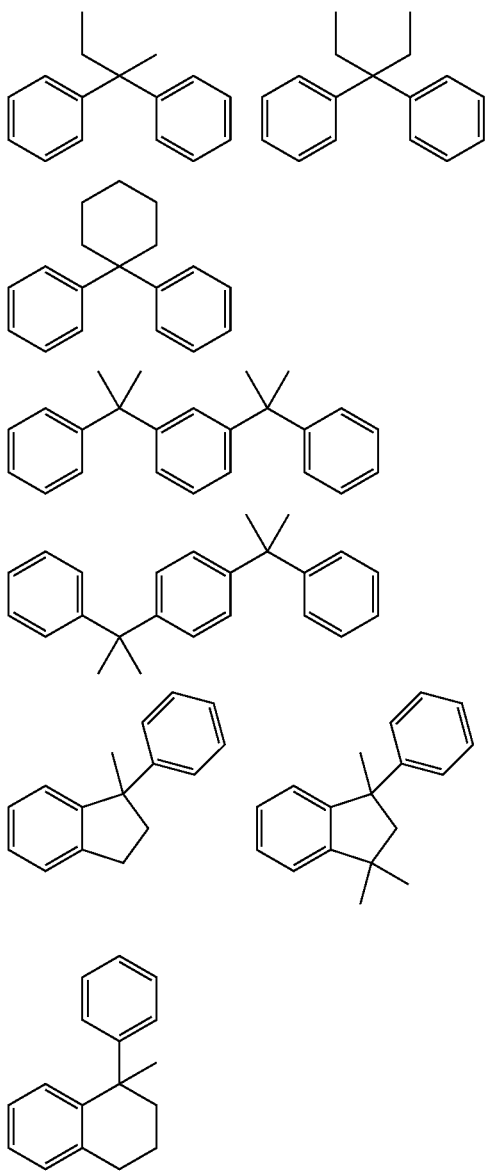

Particularly preferred compounds are 1,1-diphenylcyclohexane, 1,3-bis(1-methyl-1-phenylethyl)-benzene, 1,4-bis(1-methyl-1-phenylethyl)-benzene and 1-phenyl-1,3,3-trimethylindane represented by the following structural formulae:

[Chem. 40]

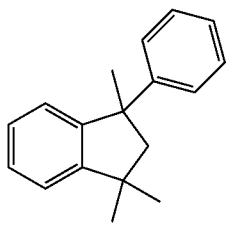

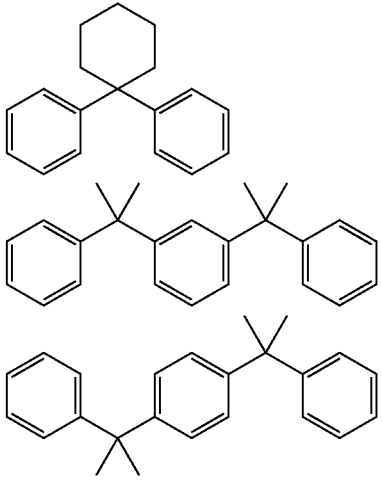

The most preferred compound is 1-phenyl-1,3,3-trimethylindane compound represented by the following structural formula:

[Chem. 41]

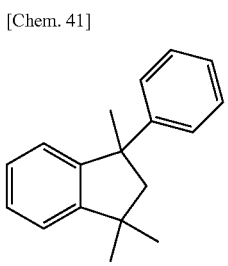

The aromatic compounds represented by Formula (3-7-2) may be used singly, or two or more may be used in combination. In the whole amount of the nonaqueous electrolytic solution (100 mass %), the amount of the aromatic compound represented by Formula (3-7-2) (the total amount when two or more kinds of the compounds are used) may be 0.001 mass % or above, preferably 0.01 mass % or above, more preferably 0.05 mass % or above, and still more preferably 0.1 mass % or above, and may be 10 mass % or less, preferably 8 mass % or less, more preferably 5 mass % or less, still more preferably 3 mass % or less, and particularly preferably 2.5 mass % or less. This amount ensures that the advantageous effects of the invention will be obtained prominently and the increase in battery resistance can be prevented.

1-3-8. Carboxylate Esters Represented by Formula (3)

[Chem. 42]

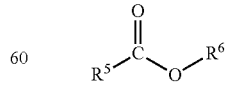

(3)

(In Formula (3), $R^5$ is a hydrocarbon group having 1 to 4 carbon atoms, and $R^6$ is an ethyl group, an n-propyl group or an n-butyl group.)

The hydrocarbon group with 1 to 4 carbon atoms represented by $R^5$ is not particularly limited. The number of carbon atoms is usually 1 or more, and preferably 2 or more, and is usually 4 or less, and preferably 3 or less. Specific examples of the hydrocarbon groups include alkyl groups, alkenyl groups and alkynyl groups. Of these, preferred groups are alkyl groups having 1 to 4 carbon atoms such as methyl group, ethyl group, n-propyl group, i-propyl group, n-butyl group, sec-butyl group, i-butyl group and tert-butyl group; alkenyl groups having 2 to 3 carbon atoms such as vinyl group, 1-propenyl group, 2-propenyl group, isopropenyl group, 1-butenyl group, 2-butenyl group and 3-butenyl group; and alkynyl groups having 2 to 4 carbon atoms such as ethynyl group, 1-propynyl group, 2-propynyl group, 1-butynyl group, 2-butynyl group and 3-butynyl group. Alkyl groups having 1 to 4 carbon atoms such as methyl group, ethyl group, n-propyl group, i-propyl group, n-butyl group, sec-butyl group, i-butyl group and tert-butyl group are more preferable. Methyl group, ethyl group, n-propyl group and n-butyl group are still more preferable, and ethyl group and n-propyl group are particularly preferable.

$R^6$ is an ethyl group, an n-propyl group or an n-butyl group, preferably an ethyl group or an n-propyl group, and more preferably an ethyl group.

Examples of the carboxylate esters represented by Formula (3) include ethyl acetate, n-propyl acetate, n-butyl acetate, ethyl propionate, n-propyl propionate, n-butyl propionate, ethyl butyrate, n-propyl butyrate, n-butyl butyrate, ethyl isobutyrate, n-propyl isobutyrate, n-butyl isobutyrate, ethyl valerate, n-propyl valerate, n-butyl valerate, ethyl hydroangelate, n-propyl hydroangelate, n-butyl hydroangelate, ethyl isovalerate, n-propyl isovalerate, n-butyl isovalerate, ethyl pivalate, n-propyl pivalate, n-butyl pivalate, ethyl acrylate, n-propyl acrylate, n-butyl acrylate, ethyl methacrylate, n-propyl methacrylate, n-butyl methacrylate, ethyl crotonate, n-propyl crotonate, n-butyl crotonate, ethyl 3-butenoate, n-propyl 3-butenoate, n-butyl 3-butenoate, ethyl 4-pentenoate, n-propyl 4-pentenoate, n-butyl 4-pentenoate, ethyl 3-pentenoate, n-propyl 3-pentenoate, n-butyl 3-pentenoate, ethyl 2-pentenoate, n-propyl 2-pentenoate, n-butyl 2-pentenoate, ethyl 2-propiolate, n-propyl 2-propiolate, n-butyl 2-propiolate, ethyl 3-butynoate, n-propyl 3-butynoate, n-butyl 3-butynoate, ethyl 2-butynoate, n-propyl 2-butynoate, n-butyl 2-butynoate, ethyl 4-pentynoate, n-propyl 4-pentynoate, n-butyl 4-pentynoate, ethyl 3-pentynoate, n-propyl 3-pentynoate, n-butyl 3-pentynoate, ethyl 2-pentynoate, n-propyl 2-pentynoate and n-butyl 2-pentynoate.

Of these, ethyl acetate, n-propyl acetate, n-butyl acetate, ethyl propionate, n-propyl propionate, n-butyl propionate, ethyl butyrate, n-propyl butyrate, n-butyl butyrate, ethyl isobutyrate, n-propyl isobutyrate, n-butyl isobutyrate, ethyl valerate, n-propyl valerate, n-butyl valerate, ethyl hydroangelate, n-propyl hydroangelate, n-butyl hydroangelate, ethyl isovalerate, n-propyl isovalerate, n-butyl isovalerate, ethyl pivalate, n-propyl pivalate and n-butyl pivalate are preferable in order to obtain enhancements in initial characteristics. Ethyl acetate, n-propyl acetate, n-butyl acetate, ethyl propionate, n-propyl propionate, n-butyl propionate, ethyl butyrate, n-propyl butyrate, n-butyl butyrate, ethyl valerate, n-propyl valerate, n-butyl valerate, ethyl isovalerate, n-propyl isovalerate and n-butyl isovalerate are preferable. Ethyl propionate, n-propyl propionate, n-butyl propionate, ethyl butyrate, n-propyl butyrate, n-butyl butyrate, ethyl valerate, n-propyl valerate and n-butyl valerate are more preferable. Ethyl propionate, n-propyl propionate, n-butyl propionate, ethyl butyrate, n-propyl butyrate and n-butyl butyrate are still more preferable.

The carboxylate esters represented by Formula (3) may be used singly, or two or more may be used in combination in an appropriate ratio.

In 100 mass % of the electrolytic solution, the amount of the carboxylate ester represented by Formula (3) (the total amount when two or more kinds of the esters are used) is preferably 0.1 mass % or above, more preferably 0.3 mass % or above, and still more preferably 0.4 mass % or above, and is preferably 10 mass % or less, more preferably 5 mass % or less, still more preferably 3 mass % or less, further preferably 2 mass % or less, and particularly preferably 1 mass % or less. When the carboxylate ester represented by Formula (3) is used as a nonaqueous solvent, the ratio thereof to the total nonaqueous solvent taken as 100 vol % is preferably 1 vol % or above, more preferably 5 vol % or above, still more preferably 10 vol % or above, and further preferably 20 vol % or above, and may be 50 vol % or less, more preferably 45 vol % or less, and still more preferably 40 vol % or less.

From the point of view of the formation of a composite interface protective film on the negative electrode, the mass ratio of the aromatic carboxylate ester represented by Formula (2) to the carboxylate ester represented by Formula (3) is preferably 1:99 to 99:1, more preferably 5:95 to 95:5, still more preferably 10:90 to 90:10, particularly preferably 20:80 to 80:20, and highly preferably 30:70 to 70:30. This ratio ensures that side reactions of the additives on the positive and negative electrodes can be prevented efficiently and battery characteristics will be enhanced. In particular, the above ratio is useful in order to suppress a decrease in initial characteristics and to enhance safety during overcharging.

1-3-9. Cyclic Compounds Having Plurality of Ether Bonds

The cyclic compounds having a plurality of ether bonds are not particularly limited as long as the compounds are cyclic and have a plurality of ether bonds in the molecule. Compounds represented by Formula (3-9) are preferable. The cyclic compounds having a plurality of ether bonds contribute to the improvement in high-temperature storage characteristics of batteries. In the electrolytic solution of the invention, the combined use thereof with the aromatic carboxylate ester of Formula (2) also provides good initial characteristics.

[Chem. 43]

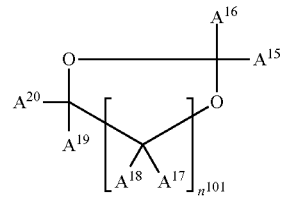

(3-9)

(In the formula, $A^{15}$ to $A^{20}$ are independently a hydrogen atom, a fluorine atom or an optionally substituted hydrocarbon group having 1 to 5 carbon atoms, and $n^{101}$ is an integer of 1 to 4. When $n^{101}$ is an integer of 2 or greater, the pluralities of $A^{17}$ and $A^{18}$ may be the same as or different from one another.)

Any two selected from $A^{15}$ to $A^{20}$ may be bonded together to form a ring. In this case, it is preferable that $A^{17}$ and $A^{18}$ form a ring structure. The total number of carbon atoms in $A^{15}$ to $A^{20}$ is preferably 0 to 8, more preferably 0 to 4, still more preferably 0 to 2, and particularly preferably 0 to 1.

Examples of the substituents include halogen atoms, optionally halogenated alkyl, alkenyl, alkynyl, aryl and alkoxy groups, cyano groups, isocyanate groups, ether groups, carbonate groups, carbonyl groups, carboxyl groups, alkoxycarbonyl groups, acyloxy groups, sulfonyl groups, phosphanetriyl groups and phosphoryl groups. Of these, halogen atoms, alkoxy groups, optionally halogenated alkyl, alkenyl and alkynyl groups, isocyanate groups, cyano groups, ether groups, carbonyl groups, alkoxycarbonyl groups and acyloxy groups are preferable. Unhalogenated alkyl groups, cyano groups and ether groups are more preferable.

In Formula (3-9), $n^{101}$ is preferably an integer of 1 to 3, and more preferably an integer of 1 to 2. Still more preferably, $n^{101}$ is 2.

Examples of the hydrocarbon groups with 1 to 5 carbon atoms represented by $A^{15}$ to $A^{20}$ include monovalent hydrocarbon groups such as alkyl groups, alkenyl groups, alkynyl groups and aryl groups; and divalent hydrocarbon groups such as alkylene groups, alkenylene groups, alkynylene groups and arylene groups. Of these, alkyl groups and alkylene groups are preferable, and alkyl groups are more preferable. Specific examples include:

alkyl groups having 1 to 5 carbon atoms such as methyl group, ethyl group, n-propyl group, i-propyl group, n-butyl group, sec-butyl group, i-butyl group, tert-butyl group, n-pentyl group, isopentyl group, sec-pentyl group, neopentyl group, 1-methylbutyl group, 2-methylbutyl group, 1,1-dimethylpropyl group and 1,2-dimethylpropyl group;

alkenyl groups having 2 to 5 carbon atoms such as vinyl group, I-propenyl group, 2-propenyl group, isopropenyl group, 1-butenyl group, 2-butenyl group, 3-butenyl group, 1-pentenyl group, 2-pentenyl group, 3-pentenyl group and 4-pentenyl group;

alkynyl groups having 2 to 5 carbon atoms such as ethynyl group, 1-propynyl group, 2-propynyl group, 1-butynyl group, 2-butynyl group, 3-butynyl group, 1-pentynyl group, 2-pentynyl group, 3-pentynyl group and 4-pentynyl group;

alkylene groups having 1 to 5 carbon atoms such as methylene group, ethylene group, trimethylene group, tetramethylene group and pentamethylene group;

alkenylene groups having 2 to 5 carbon atoms such as vinylene group, 1-propenylene group, 2-propenylene group, 1-butenylene group, 2-butenylene group, 1-pentenylene group and 2-pentenylene group; and alkynylene groups having 2 to 5 carbon atoms such as ethynylene group, propynylene group, 1-butynylene group, 2-butynylene group, 1-pentylene group and 2-pentylene group. Of these, preferred groups are alkylene groups having 1 to 5 carbon atoms such as methylene group, ethylene group, trimethylene group, tetramethylene group and pentamethylene group. Alkylene groups having 2 to 5 carbon atoms such as ethylene group, trimethylene group, tetramethylene group and pentamethylene group are more preferable. Alkylene groups having 3 to 5 carbon atoms such as trimethylene group, tetramethylene group and pentamethylene group are still more preferable.

$A^{15}$ to $A^{20}$ represent hydrogen atoms, fluorine atoms or hydrocarbon groups having 1 to 5 carbon atoms, specifically, hydrogen atoms, fluorine atoms or combinations of the aforementioned substituents and the above hydrocarbon groups having 1 to 5 carbon atoms. They preferably represent hydrogen atoms, unsubstituted hydrocarbon groups having 1 to 5 carbon atoms or etherified alkylene groups in which the carbon chains of the alkylene groups are partially substituted by ether groups, and more preferably represent hydrogen atoms.

Examples of the cyclic compounds having a plurality of ether bonds include the following compounds:

[Chem. 44]

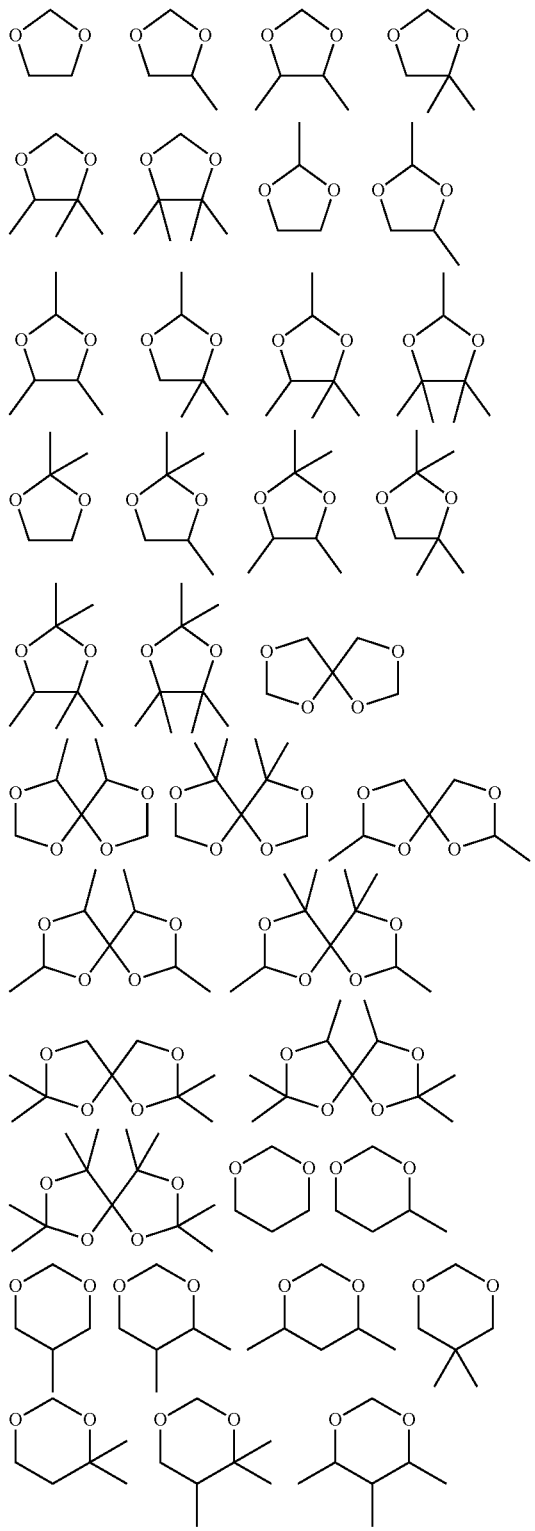

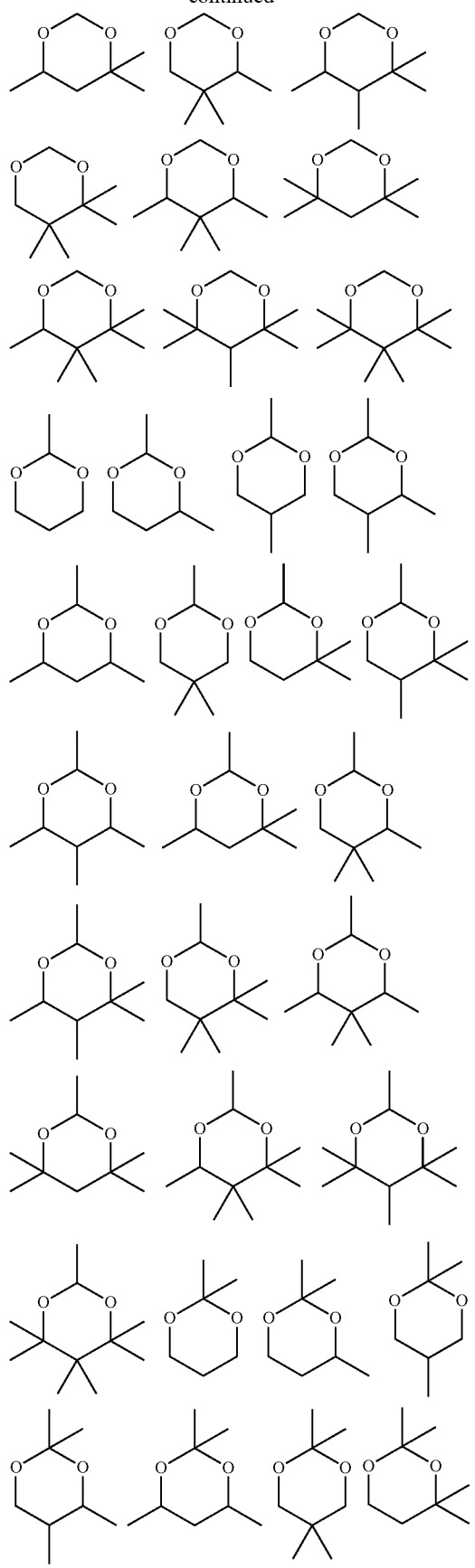
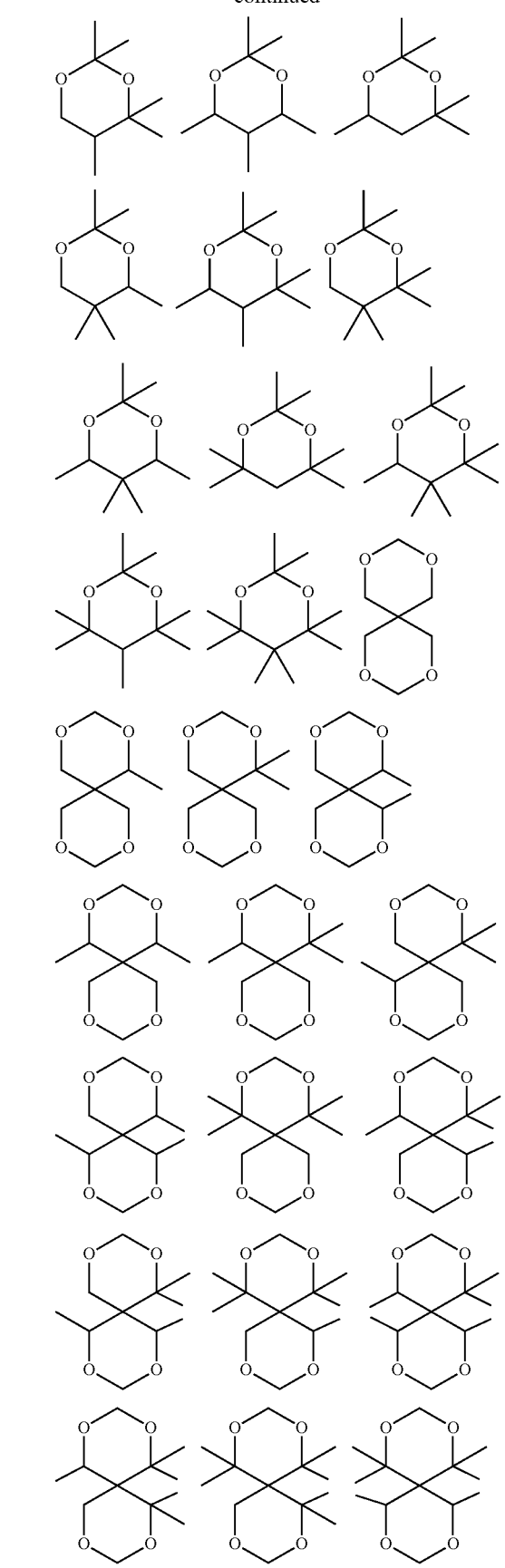

-continued

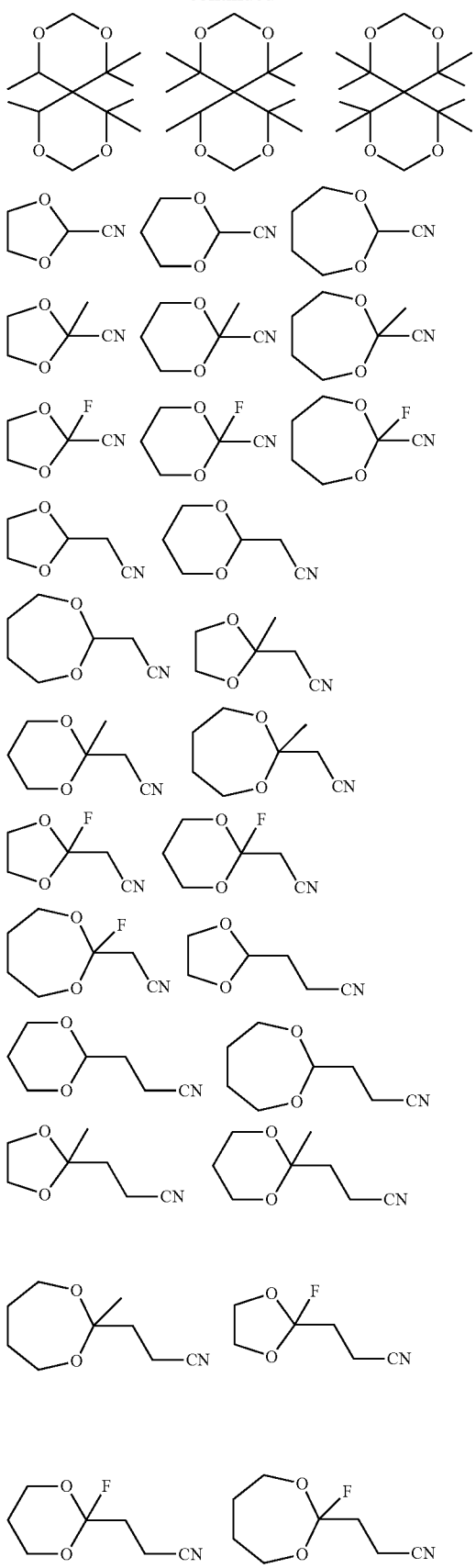

In particular, preferred compounds are:

[Chem. 45]

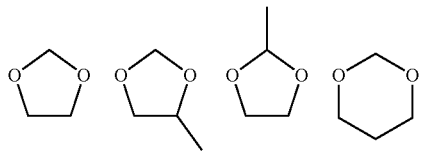

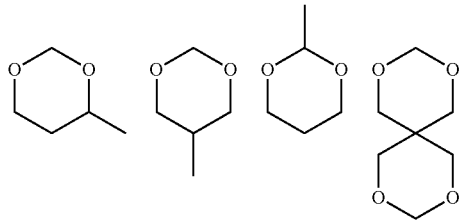

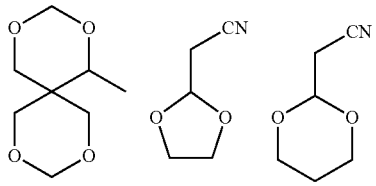

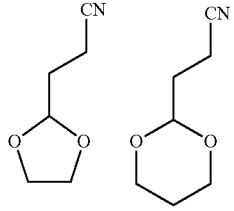

More preferred compounds are:

[Chem. 46]

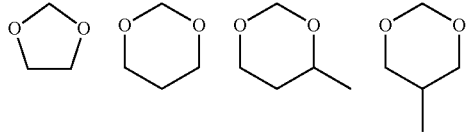

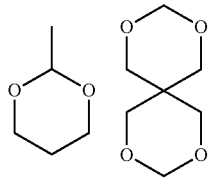

The cyclic compounds having a plurality of ether bonds may be used singly, or two or more may be used in combination in an appropriate ratio. In 100 mass % of the electrolytic solution, the amount of the cyclic compound having a plurality of ether bonds (the total amount when two or more kinds of the compounds are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, and still more preferably 2 mass % or less. This amount ensures easy control of characteristics such as output characteristics, load characteristics, low-temperature characteristics, cycle characteristics and high-temperature storage characteristics.

1-4. Electrolytes

The electrolytes are not particularly limited, and known electrolytes may be used appropriately. In the case of lithium secondary batteries, lithium salts are usually used. Specific examples include inorganic lithium salts such as $LiPF_6$, $LiBF_4$, $LiClO_4$, $LiAlF_4$, $LiSbF_6$, $LiTaF_6$ and $LiWF_7$; lithium tungsten oxides such as $LiWOF_5$; lithium carboxylate salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$ and $CF_3CF_2CF_2CF_2CO_2Li$; lithium sulfonate salts such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$ and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide and $LiN(CF_3SO_2)(C_4F_9SO_2)$; lithium methide salts such as $LiC(FSO_2)_3$, $LiC(CF_3SO_2)_3$ and $LiC(C_2F_5SO_2)_3$; lithium (malonato)borate salts such as lithium bis(malonato)borate and lithium difluoro(malonato) borate; lithium (malonato)phosphate salts such as lithium tris(malonato)phosphate, lithium difluorobis(malonato) phosphate and lithium tetrafluoro(malonato)phosphate; fluorine-containing organolithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$ and $LiBF_2(C_2F_5SO_2)_2$; lithium oxalatoborate salts such as lithium difluorooxalatoborate and lithium bis(oxalato)borate; and lithium oxalatophosphate salts such as lithium tetrafluorooxalatophosphate, lithium difluorobis(oxalato)phosphate and lithium tris(oxalato)phosphate.

In particular, for example, $LiPF_6$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluorooxalatoborate, lithium bis(oxalato) borate and lithium difluorobis(oxalato)phosphate are particularly preferable because of their effects of enhancing characteristics such as output characteristics, high-rate charge/discharge characteristics, high-temperature storage characteristics and cycle characteristics.

The concentration of these electrolytes in the nonaqueous electrolytic solution is not particularly limited as long as the advantageous effects of the invention are not impaired. In order to ensure good electric conductivity of the electrolytic solution and to ensure good battery performance, the total molar concentration of lithium in the nonaqueous electrolytic solution is preferably 0.3 mol/L or above, more preferably 0.4 mol/L or above, and still more preferably 0.5 mol/L or above, and is preferably 3 mol/L or less, more preferably 2.5 mol/L or less, and still more preferably 2.0 mol/L or less. With this concentration, the electrolytic solution contains an appropriate amount of lithium ions as charged particles and also exhibits an appropriate viscosity. Thus, good electric conductivity is easily ensured.

When two or more kinds of the electrolytes are used in combination, it is preferable that at least one be a salt selected from the group consisting of monofluorophosphate salts, difluorophosphate salts, borate salts, oxalate salts and fluorosulfonate salts, and it is more preferable that at least one be a salt selected from the group consisting of monofluorophosphate salts, difluorophosphate salts, oxalate salts and fluorosulfonate salts. Of these, lithium salts are preferred. The amount of the salt selected from the group consisting of monofluorophosphate salts, difluorophosphate salts, borate salts, oxalate salts and fluorosulfonate salts may be 0.01 mass % or above, and preferably 0.1 mass % or above, and may be 20 mass % or less, and preferably 10 mass % or less.

It is preferable that the electrolytes include one or more salts selected from the group consisting of monofluorophosphate salts, difluorophosphate salts, borate salts, oxalate salts and fluorosulfonate salts, and one or more additional salts. Examples of the additional salts include the lithium salts described above. In particular, preferred salts are $LiPF_6$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$ and $LiPF_3(C_2F_5)_3$, with $LiPF_6$ being more preferable. In order to ensure an appropriate balance between the conductivity and the viscosity of the electrolytic solution, the amount of the additional salt may be 0.01 mass % or above, and preferably 0.1 mass % or above, and may be 20 mass % or less, preferably 15 mass % or less, and more preferably 10 mass % or less.

To ensure good battery performance, the total amount of the electrolyte(s) in the nonaqueous electrolytic solution is preferably 0.3 mol/L or above, more preferably 0.4 mol/L or above, and still more preferably 0.5 mol/L or above, and is preferably 3 mol/L or less, more preferably 2.5 mol/L or less, still more preferably 2.0 mol/L or less, and particularly preferably 1.5 mol/L or less.

1-4-1. Monofluorophosphate Salts and Difluorophosphate Salts

The monofluorophosphate salts and the difluorophosphate salts are not particularly limited as long as the salts have at least one monofluorophosphate or difluorophosphate structure in the molecule. In the electrolytic solution of the invention, the combined use of the aromatic carboxylate ester of Formula (2) and one or more of the monofluorophosphate salts and the difluorophosphate salts results in a marked reduction in volume change after initial charging and discharging of batteries, and a further enhancement in overcharge safety. Further, the combined use makes it possible to reduce the initial irreversible capacity of batteries and to enhance discharge storage characteristics. At the same time, the batteries exhibit excellent high-temperature cycle characteristics.

The counter cations in the monofluorophosphate salts and the difluorophosphate salts are not particularly limited. Examples thereof include lithium, sodium, potassium, magnesium, calcium and ammonium represented by $NR^{121}R^{122}R^{123}R^{124}$ (wherein $R^{121}$ to $R^{124}$ are independently a hydrogen atom or an organic group having 1 to 12 carbon atoms). The organic groups with 1 to 12 carbon atoms represented by $R^{121}$ to $R^{124}$ in the ammonium are not particularly limited. Examples thereof include optionally halogenated alkyl groups, optionally halogenated or alkylated cycloalkyl groups, optionally halogenated or alkylated aryl groups, and optionally substituted, nitrogen-containing heterocyclic groups. In particular, it is preferable that $R^{121}$ to $R^{124}$ be independently a hydrogen atom, an alkyl group, a cycloalkyl group, a nitrogen-containing heterocyclic group or the like. Preferred counter cations are lithium, sodium and potassium. Lithium is particularly preferable.

Examples of the monofluorophosphate salts and the difluorophosphate salts include lithium monofluorophosphate, sodium monofluorophosphate, potassium monofluorophosphate, lithium difluorophosphate, sodium difluorophosphate and potassium difluorophosphate. Lithium monofluorophosphate and lithium difluorophosphate are preferable, and lithium difluorophosphate is more preferable.

The monofluorophosphate salts and the difluorophosphate salts may be used singly, or two or more may be used in combination in an appropriate ratio.

The amount of one or more salts selected from the monofluorophosphate salts and the difluorophosphate salts (the total amount when two or more kinds of the salts are used) may be 0.001 mass % or above, preferably 0.01 mass % or above, more preferably 0.1 mass % or above, still more preferably 0.2 mass % or above, and particularly preferably 0.3 mass % or above, and may be 5 mass % or less, preferably 3 mass % or less, more preferably 2 mass % or less, still more preferably 1.5 mass % or less, and particularly preferably 1 mass % or less. This amount ensures that the salts produce significant effects in the enhancement of initial irreversible capacity.

The mass ratio between the aromatic carboxylate ester represented by Formula (2) and one or more selected from the monofluorophosphate salts and the difluorophosphate salts (the total mass when two or more kinds of the salts are used) is preferably 1:99 to 99:1, more preferably 10:90 to 90:10, and particularly preferably 20:80 to 80:20. This ratio ensures that the target characteristics may be enhanced without causing a decrease in other battery characteristics.

1-4-2. Borate Salts

The borate salts are not particularly limited as long as the salts have at least one boron atom in the molecule. Those salts that correspond to oxalate salts are not categorized as the borate salts (1-4-2.) but are categorized as the oxalate salts (1-4-3.) described later. In the electrolytic solution of the invention, the combined use of the aromatic carboxylate ester of Formula (2) with the borate salt results in improvements in initial characteristics and storage characteristics, and also enhances the overcharge safety of batteries.

Examples of the counter cations in the borate salts include lithium, sodium, potassium, magnesium, calcium, rubidium, cesium and barium, with lithium being preferable.

Preferred borate salts are lithium salts. Lithium borate-containing salts may be also suitably used. Examples include $LiBF_4$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$ and $LiBF_2(C_2F_5SO_2)_2$. In particular, $LiBF_4$ is more preferable because of its effect of enhancing characteristics such as initial charge-discharge efficiency and high-temperature cycle characteristics.

The borate salts may be used singly, or two or more may be used in combination in an appropriate ratio.

The amount of the borate salt (the total amount when two or more kinds of the salts are used) may be 0.05 mass % or above, preferably 0.1 mass % or above, more preferably 0.2 mass % or above, still more preferably 0.3 mass % or above, and particularly preferably 0.4 mass % or above, and may be 10.0 mass % or less, preferably 5.0 mass % or less, more preferably 3.0 mass % or less, still more preferably 2.0 mass % or less, and particularly preferably 1.0 mass % or less. This amount ensures that side reactions on the negative electrode are suppressed and the increase in battery resistance is unlikely to occur.

The mass ratio between the aromatic carboxylate ester represented by Formula (2) and the borate salt is preferably 1:99 to 99:1, more preferably 10:90 to 90:10, and particularly preferably 20:80 to 80:20. This ratio ensures that side reactions on the positive and negative electrodes in batteries are suppressed and the increase in battery resistance is unlikely to occur.

When the borate salt and $LiPF_6$ are used as the electrolytes, the ratio of the molar content of the borate salt to the molar content of $LiPF_6$ in the nonaqueous electrolytic solution is preferably 0.001 to 12, more preferably 0.01 to 1.1, still more preferably 0.01 to 1.0, and further preferably 0.01 to 0.7. This ratio ensures that side reactions on the positive and negative electrodes in batteries will be prevented and the charge discharge efficiency of batteries will be enhanced.

1-4-3. Oxalate Salts

The oxalate salts are not particularly limited as long as the compounds have at least one oxalate structure in the molecule. In the electrolytic solution of the invention, the combined use of the aromatic carboxylate ester represented by Formula (2) and the oxalate salt results in batteries enhanced in initial characteristics and storage characteristics.

Preferred oxalate salts are metal salts represented by Formula (9) below which have an oxalate complex as the anion.

[Chem. 47]

(In the formula, $M^1$ is an element selected from the group consisting of Group 1 and Group 2 in the periodic table and aluminum (Al), $M^2$ is an element selected from the group consisting of transition metals, and Group 13, Group 14 and Group 15 in the periodic table, $R^{91}$ is a group selected from the group consisting of halogens, alkyl groups having 1 to 11 carbon atoms and halogenated alkyl groups having 1 to 11 carbon atoms, a and b are positive integers, c is 0 or a positive integer, and d is an integer of 1 to 3.)

From the point of view of battery characteristics obtained when the electrolytic solution of the invention is used for lithium secondary batteries, $M^1$ is preferably lithium, sodium, potassium, magnesium or calcium, and is particularly preferably lithium.

In terms of electrochemical stability in lithium secondary batteries, $M^2$ is particularly preferably boron or phosphorus.

Examples of $R^{91}$ include fluorine, chlorine, methyl group, trifluoromethyl group, ethyl group, pentafluoroethyl group, propyl group, isopropyl group, butyl group, sec-butyl group and tert-butyl group, with fluorine and trifluoromethyl group being preferable.

Examples of the metal salts represented by Formula (9) include the following:

lithium oxalatoborate salts such as lithium difluorooxalatoborate and lithium bis(oxalato)borate; and lithium oxalatophosphate salts such as lithium tetrafluorooxalatophosphate, lithium difluorobis(oxalato)phosphate and lithium tris(oxalato)phosphate.

Of these, lithium bis(oxalato)borate and lithium difluorobis(oxalato)phosphate are preferable, and lithium bis(oxalato)borate is more preferable.

The oxalate salts may be used singly, or two or more may be used in combination in an appropriate ratio.

The amount of the oxalate salt (the total amount when two or more kinds of the salts are used) may be 0.001 mass % or above, preferably 0.01 mass % or above, more preferably 0.1 mass % or above, and particularly preferably 0.3 mass % or above, and may be 10 mass % or less, preferably 5 mass % or less, more preferably 3 mass % or less, still more preferably 2 mass % or less, and particularly preferably 1 mass % or less. This amount ensures easy control of characteristics such as output characteristics, load characteristics, low-temperature characteristics, cycle characteristics and high-temperature storage characteristics.

The mass ratio between the aromatic carboxylate ester represented by Formula (2) and the oxalate salt is preferably 1:99 to 99:1, more preferably 10:90 to 90:10, and particularly preferably 20:80 to 80:20. This ratio ensures that side reactions on the positive and negative electrodes of batteries are suppressed with a good balance, and battery characteristics are enhanced easily.

1-4-4. Fluorosulfonate Salts

The fluorosulfonate salts are not particularly limited as long as the salts have at least one fluorosulfonate structure in the molecule. In the electrolytic solution of the invention, the combined use of the aromatic carboxylate ester represented by Formula (2) and the fluorosulfonate salt results in batteries enhanced in initial characteristics and storage characteristics.

The counter cations in the fluorosulfonate salts are not particularly limited. Examples thereof include lithium, sodium, potassium, rubidium, cesium, magnesium, calcium, barium and ammonium represented by $NR^{131}R^{132}R^{133}R^{134}$ (wherein $R^{131}$ to $R^{134}$ are independently a hydrogen atom or an organic group having 1 to 12 carbon atoms). Examples and preferred examples of $R^{131}$ to $R^{134}$ are similar to those of $R^{121}$ to $R^{124}$ described in 1-4-1. Preferred counter cations are lithium, sodium and potassium. Lithium is particularly preferable.

Examples of the fluorosulfonate salts include lithium fluorosulfonate, sodium fluorosulfonate, potassium fluorosulfonate, rubidium fluorosulfonate and cesium fluorosulfonate, with lithium fluorosulfonate being preferable. Imide salts having a fluorosulfonate structure such as lithium bis(fluorosulfonyl)imide may also be used as the fluorosulfonate salts.

The fluorosulfonate salts may be used singly, or two or more may be used in combination in an appropriate ratio.

The content of the fluorosulfonate salt (the total content when two or more kinds of the salts are used) may be 0.05 mass % or above, preferably 0.1 mass % or above, more preferably 0.2 mass % or above, still more preferably 0.3 mass % or above, and particularly preferably 0.4 mass % or above, and may be 10 mass % or less, preferably 8 mass % or less, more preferably 5 mass % or less, still more preferably 2 mass % or less, and particularly preferably 1 mass % or less. This content ensures that the occurrence of side reactions in batteries is reduced and the increase in resistance is unlikely to occur.

The mass ratio between the aromatic carboxylate ester represented by Formula (2) and the fluorosulfonate salt is preferably 1:99 to 99:1, more preferably 10:90 to 90:10, and particularly preferably 20:80 to 80:20. This ratio ensures that side reactions in batteries are appropriately suppressed and the decrease in high-temperature durability characteristics is unlikely to occur.

1-5. Nonaqueous Solvents

The nonaqueous solvents in the present invention are not particularly limited, and any known organic solvents may be used. Specific examples include fluorine-free cyclic carbonates, chain carbonates, cyclic and chain carboxylate esters, ether compounds and sulfone compounds.

In the specification, the volumes of the nonaqueous solvents are values measured at 25° C. For those solvents which are solid at 25° C. such as ethylene carbonate, volumes measured at the melting point are used.

1-5-1. Fluorine-Free Cyclic Carbonates

Examples of the fluorine-free cyclic carbonates include cyclic carbonates having an alkylene group with 2 to 4 carbon atoms.

Specific examples of the fluorine-free cyclic carbonates having an alkylene group with 2 to 4 carbon atoms include ethylene carbonate, propylene carbonate and butylene carbonate. Of these, ethylene carbonate and propylene carbonate are particularly preferable because using these solvents enhances the degree of the dissociation of lithium ions and results in an enhancement in battery characteristics.

The fluorine-free cyclic carbonates may be used singly, or two or more may be used in combination in an appropriate ratio.

The amount of the fluorine-free cyclic carbonates is not particularly limited and may be determined appropriately as long as the advantageous effects of the present invention are not significantly impaired. When used singly, the amount of the carbonate is 5 vol % or above, and more preferably 10 vol % or above in 100 vol % of the nonaqueous solvent. This amount makes it possible to avoid a decrease in electric conductivity due to the dielectric constant of the nonaqueous electrolytic solution being low, and makes it easy for nonaqueous electrolyte secondary batteries to achieve good characteristics such as high-current discharge characteristics, stability on negative electrodes and cycle characteristics. Further, the volume is 95 vol % or less, more preferably 90 vol % or less, and still more preferably 85 vol % or less. This amount ensures that the nonaqueous electrolytic solution will exhibit an appropriate viscosity to prevent the decrease in ion conductivity, and that the nonaqueous electrolyte secondary batteries will achieve good load characteristics.

1-5-2. Chain Carbonates

Preferred chain carbonates are those chain carbonates having 3 to 7 carbon atoms. Dialkyl carbonates having 3 to 7 carbon atoms are more preferable.

Examples of the chain carbonates include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, tert-butyl methyl carbonate, ethyl-n-propyl carbonate, n-butyl ethyl carbonate, isobutyl ethyl carbonate and tert-butyl ethyl carbonate.

Of these, dimethyl carbonate, diethyl carbonate, di-n-propyl carbonate, diisopropyl carbonate, n-propyl isopropyl carbonate, ethyl methyl carbonate and methyl-n-propyl carbonate are preferable. Dimethyl carbonate, diethyl carbonate and ethyl methyl carbonate are particularly preferable.

Further, chain carbonates having a fluorine atom (hereinafter, also written as "fluorinated chain carbonates") may also be suitably used.

The fluorinated chain carbonates may have one or more fluorine atoms without limitation. The number of fluorine atoms is usually 6 or less, and preferably 4 or less. When the fluorinated chain carbonate has a plurality of fluorine atoms, the fluorine atoms may be bonded to the same carbon atom or to different carbon atoms.

Examples of the fluorinated chain carbonates include fluorinated dimethyl carbonate and derivatives thereof, fluorinated ethyl methyl carbonate and derivatives thereof, and fluorinated diethyl carbonate and derivatives thereof.

Examples of the fluorinated dimethyl carbonate and the derivatives thereof include fluoromethyl methyl carbonate, difluoromethyl methyl carbonate, trifluoromethyl methyl carbonate, bis(fluoromethyl) carbonate, bis(difluoromethyl) carbonate and bis(trifluoromethyl) carbonate.

Examples of the fluorinated ethyl methyl carbonate and the derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate and ethyl trifluoromethyl carbonate.

Examples of the fluorinated diethyl carbonate and the derivatives thereof include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate and bis(2,2,2-trifluoroethyl) carbonate.

The chain carbonates may be used singly, or two or more may be used in combination in an appropriate ratio. In 100 vol % of the nonaqueous solvent, the amount of the chain carbonate(s) is preferably 5 vol % or above, more preferably 10 vol % or above, and still more preferably 15 vol % or above. This lower limit ensures that the nonaqueous electrolytic solution exhibits an appropriate viscosity and thus the decrease in ion conductivity is prevented, making it easy for nonaqueous electrolyte secondary batteries to achieve excellent high-current discharge characteristics. Further, the volume of the chain carbonate(s) in 100 vol % of the nonaqueous solvent is preferably 90 vol % or less, and more preferably 85 vol % or less. This upper limit makes it possible to avoid a decrease in electric conductivity due to the dielectric constant of the nonaqueous electrolytic solution being low, and makes it easy for nonaqueous electrolyte secondary batteries to achieve excellent high-current discharge characteristics.

1-5-3. Cyclic Carboxylate Esters

Preferred cyclic carboxylate esters are those having 3 to 12 carbon atoms.

Specific examples include gamma-butyrolactone, gamma-valerolactone, gamma-caprolactone and epsilon-caprolactone. Of these, gamma-butyrolactone is particularly preferable because the use thereof enhances the degree of the dissociation of lithium ions and results in an enhancement in battery characteristics.

The cyclic carboxylate esters may be used singly, or two or more may be used in combination in an appropriate ratio.

In 100 vol % of the nonaqueous solvent, the amount of the cyclic carboxylate ester(s) is preferably 5 vol % or above, and more preferably 10 vol % or above. This amount ensures that the electric conductivity of the nonaqueous electrolytic solution is improved to make it easy for nonaqueous electrolyte secondary batteries to achieve an enhancement in high-current discharge characteristics. The amount of the cyclic carboxylate ester(s) is preferably 50 vol % or less, and more preferably 40 vol % or less. This upper limit ensures that the nonaqueous electrolytic solution exhibits an appropriate viscosity, and the decrease in electric conductivity is avoided and the increase in negative electrode resistance is suppressed, making it easy for nonaqueous electrolyte secondary batteries to achieve excellent high-current discharge characteristics.

1-5-4. Ether Compounds

Preferred ether compounds are chain ethers having 3 to 10 carbon atoms and cyclic ethers having 3 to 6 carbon atoms. Part of the hydrogen atoms in the ether compounds may be substituted by fluorine atoms.

Examples of the chain ethers having 3 to 10 carbon atoms include:

diethyl ether, di(2-fluoroethyl) ether, di(2,2-difluoroethyl) ether, di(2,2,2-trifluoroethyl) ether, ethyl (2-fluoroethyl) ether, ethyl (2,2,2-trifluoroethyl) ether, ethyl (1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl-n-propyl ether, ethyl (3-fluoro-n-propyl) ether, ethyl (3,3,3-trifluoro-n-propyl) ether, ethyl (2,2,3,3-tetrafluoro-n-propyl) ether, ethyl (2,2,3,3,3-pentafluoro-n-propyl) ether, 2-fluoroethyl-n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl-n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl-n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2-tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether and diethylene glycol dimethyl ether.

Examples of the cyclic ethers having 3 to 6 carbon atoms include tetrahydrofuran, 2-methyltetrahydrofuran, 3-methyltetrahydrofuran, 1,4-dioxane and fluorides of these compounds.

In particular, dimethoxymethane, diethoxymethane, ethoxymethoxymethane, ethylene glycol di-n-propyl ether, ethylene glycol di-n-butyl ether and diethylene glycol dimethyl ether are preferable because of their high abilities to solvate lithium ions and to enhance the dissociation of the ions. Dimethoxymethane, diethoxymethane and ethoxymethoxymethane are particularly preferable because these solvents exhibit a low viscosity and provide high ion conductivity.

The ether compounds may be used singly, or two or more may be used in combination in an appropriate ratio.

In 100 vol % of the nonaqueous solvent, the amount of the ether compound(s) is preferably 5 vol % or above, more preferably 10 vol % or above, and still more preferably 15 vol % or above, and is preferably 70 vol % or less, more preferably 60 vol % or less, and still more preferably 50 vol % or less. This amount ensures that the ion conductivity will be enhanced due to the enhancement of the degree of lithium ion dissociation and the reduction in viscosity by virtue of the use of the chain ether. Further, the above amount ensures that in the case where the negative electrode active material is a carbonaceous material, the decrease in capacity due to the co-intercalation of the chain ether together with lithium ions will be avoided.

1-5-5. Sulfone Compounds

Preferred sulfone compounds are cyclic sulfones having 3 to 6 carbon atoms, and chain sulfones having 2 to 6 carbon atoms. The number of the sulfonyl groups in the molecule is preferably 1 or 2.

Examples of the cyclic sulfones having 3 to 6 carbon atoms include monosulfone compounds such as trimethylenesulfones, tetramethylenesulfones and hexamethylenesulfones; and disulfone compounds such as trimethylenedisulfones, tetramethylenedisulfones and hexamethylenedisulfones.

From the points of view of dielectric constant and viscosity, tetramethylenesulfones, tetramethylenedisulfones, hexamethylenesulfones and hexamethylenedisulfones are more preferable, and tetramethylenesulfones (sulfolanes) are particularly preferable.

Preferred sulfolanes are sulfolane and/or sulfolane derivatives (hereinafter, derivatives including sulfolane itself are sometimes written as "sulfolanes"). Preferred sulfolane derivatives are those in which one or more hydrogen atoms bonded to the carbon atoms constituting the sulfolane ring are substituted by fluorine atoms or alkyl groups.

In particular, some preferred sulfolanes having high ion conductivity and realizing high input and output characteristics are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethyisulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane and 5-fluoro-3-(trifluoromethyl)sulfolane.

Examples of the chain sulfones having 2 to 6 carbon atoms include:

dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, tert-butyl methyl sulfone, tert-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoromethyl sulfone, ethyl pentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethyl isopropyl sulfone, difluoromethyl isopropyl sulfone, trifluoromethyl isopropyl sulfone, trifluoroethyl-n-propyl sulfone, trifluoroethyl isopropyl sulfone, pentafluoroethyl-n-propyl sulfone, pentafluoroethyl isopropyl sulfone, trifluoroethyl-n-butyl sulfone, trifluoroethyl-tert-butyl sulfone, pentafluoroethyl-n-butyl sulfone and pentafluoroethyl-tert-butyl sulfone.

In particular, some preferred sulfones having high ion conductivity and realizing high input and output characteristics are dimethyl sulfone, ethyl methyl sulfone, diethyl sulfone, n-propyl methyl sulfone, isopropyl methyl sulfone, n-butyl methyl sulfone, tert-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-tert-butyl sulfone, trifluoromethyl-n-butyl sulfone and trifluoromethyl-tert-butyl sulfone.

The sulfone compounds may be used singly, or two or more may be used in combination in an appropriate ratio.

In 100 vol % of the nonaqueous solvent, the amount of the sulfone compound(s) is preferably 0.3 vol % or above, more preferably 1 vol % or above, and still more preferably 5 vol % or above, and is preferably 40 vol % or less, more preferably 35 vol % or less, and still more preferably 30 vol % or less. This amount ensures that durability such as cycle characteristics and storage characteristics will be enhanced, and that the nonaqueous electrolytic solution exhibits an appropriate viscosity to make it possible to avoid a decrease in electric conductivity. Thus, nonaqueous electrolyte secondary batteries may be charged and discharged with a high current density while avoiding a decrease in the retention of charge and discharge capacities.

1-5-6. Compositions of Nonaqueous Solvents

The nonaqueous solvent in the invention may be any one solvent selected from the nonaqueous solvents described above, or may be a combination of two or more kinds of the solvents in an appropriate ratio.

For example, a preferred combination of the nonaqueous solvents is one based on a fluorine-free cyclic carbonate and a chain carbonate.

In particular, the total of the fluorine-free cyclic carbonate and the chain carbonate is preferably 70 vol % or above, more preferably 80 vol % or above, and still more preferably 90 vol % or above of the whole nonaqueous solvent, and the proportion of the fluorine-free cyclic carbonate to the total of the cyclic carbonate and the chain carbonate is preferably 5 vol % or above, more preferably 10 vol % or above, and still more preferably 15 vol % or above, and is preferably 50 vol % or less, more preferably 35 vol % or less, still more preferably 30 vol % or less, and particularly preferably 25 vol % or less.

In some cases, the use of this combination of the nonaqueous solvents results in a good balance between cycle characteristics and high-temperature storage characteristics (in particular, retention of capacity after storage at high temperatures, and high-load discharge capacity) of batteries manufactured with the nonaqueous solvents.

Preferred examples of the combinations of the fluorine-free cyclic carbonates and the chain carbonates include:

ethylene carbonate and dimethyl carbonate; ethylene carbonate and diethyl carbonate; ethylene carbonate and ethyl methyl carbonate; ethylene carbonate, dimethyl carbonate and diethyl carbonate; ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

Of the combinations of the fluorine-free cyclic carbonates and the chain carbonates, those which include an asymmetric chain alkyl carbonate as the chain carbonate are more preferable. In particular, those which include ethylene carbonate, a symmetric chain carbonate and an asymmetric chain carbonate are preferable because a good balance is obtained between cycle characteristics and high-current discharge characteristics, with examples of such combinations including ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate.

In particular, those combinations in which the asymmetric chain carbonate is ethyl methyl carbonate are preferable, and the alkyl groups in the chain carbonate preferably have 1 to 2 carbon atoms.

Examples of the preferred combinations further include those combinations including propylene carbonate in the aforementioned combinations of ethylene carbonate and the chain carbonate(s).

When propylene carbonate is used, the volume ratio between ethylene carbonate and propylene carbonate is preferably 99:1 to 40:60, and particularly preferably 95:5 to 50:50. Further, the proportion of propylene carbonate in the whole nonaqueous solvent is preferably 0.1 vol % or above, more preferably 1 vol % or above, and still more preferably 2 vol % or above, and is preferably 20 vol % or less, more preferably 8 vol % or less, and still more preferably 5 vol % or less.

This concentration of propylene carbonate is advantageous in that low-temperature characteristics may be further enhanced at times while maintaining the characteristics obtained by the combination of ethylene carbonate and the chain carbonate.

When the nonaqueous solvent includes dimethyl carbonate, the proportion of dimethyl carbonate in the whole nonaqueous solvent is preferably 10 vol % or above, more preferably 20 vol % or above, still more preferably 25 vol % or above, and particularly preferably 30 vol % or above, and is preferably 90 vol % or less, more preferably 80 vol % or less, still more preferably 75 vol % or less, and particularly preferably 70 vol % or less. This concentration leads to an enhancement in load characteristics of batteries at times.

In particular, the use of a nonaqueous solvent which includes dimethyl carbonate and ethyl methyl carbonate and in which the content of dimethyl carbonate is higher than the content of ethyl methyl carbonate is preferable because battery characteristics after high-temperature storage are enhanced at times while maintaining the electric conductivity of the electrolytic solution.

In the whole nonaqueous solvent, the volume ratio of dimethyl carbonate to ethyl methyl carbonate (dimethyl carbonate/ethyl methyl carbonate) is preferably 1.1 or above, more preferably 1.5 or above, and still more preferably 2.5 or above in order to enhance the electric conductivity of the electrolytic solution and battery characteristics after storage. The above volume ratio (dimethyl carbonate/ethyl methyl carbonate) is preferably 40 or less, more preferably 20 or less, still more preferably 10 or less, and particularly preferably 8 or less in order to enhance battery characteristics at low temperatures.

The combinations based on the fluorine-free cyclic carbonates and the chain carbonates may include other solvents such as cyclic carboxylate esters, chain carboxylate esters, cyclic ethers, chain ethers, sulfur-containing organic solvents, phosphorus-containing organic solvents and fluorine-containing aromatic solvents.

1-6. Auxiliaries

In the electrolyte batteries according to the invention, auxiliaries may be used appropriately in accordance with the purpose in addition to the compounds described hereinabove. Examples of the auxiliaries include cyclic carbonates having a carbon-carbon unsaturated bond described below, and other auxiliaries described later.

1-6-1. Cyclic Carbonates Having Carbon-Carbon Unsaturated Bond

The cyclic carbonates having a carbon-carbon unsaturated bond (hereinafter, also written as "unsaturated cyclic carbonates") are not particularly limited and any unsaturated carbonates may be used as long as the cyclic carbonates have a carbon-carbon double bond or a carbon-carbon triple bond. Those cyclic carbonates which have an aromatic ring are also categorized as the unsaturated cyclic carbonates.

Examples of the unsaturated cyclic carbonates include vinylene carbonates, ethylene carbonates substituted with a substituent having an aromatic ring or a carbon-carbon double or triple bond, phenyl carbonates, vinyl carbonates, allyl carbonates and catechol carbonates.

Examples of the vinylene carbonates include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate and 4-allyl-5-fluorovinylene carbonate.

Specific examples of the ethylene carbonates substituted with a substituent having an aromatic ring or a carbon-carbon double or triple bond include vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate and 4-methyl-5-allylethylene carbonate.

Of these, unsaturated cyclic carbonates which are particularly suited for the combined use are vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate and 4-vinyl-5-ethynylethylene carbonate. Vinylene carbonate, vinylethylene carbonate and ethynylethylene carbonate are preferable because they form a highly stable interface protective film. Vinylene carbonate and vinylethylene carbonate are more preferable.

The molecular weight of the unsaturated cyclic carbonates is not particularly limited as long as the advantageous effects of the invention are not significantly impaired. The molecular weight is preferably 80 or above, and more preferably 85 or above, and is preferably 250 or less, and more preferably 150 or less. This range of molecular weights ensures that the unsaturated cyclic carbonate will exhibit solubility with respect to the nonaqueous electrolytic solution and the advantageous effects of the invention are obtained prominently.

The unsaturated cyclic carbonates may be produced by any methods without limitation, and known production methods may be selected appropriately.

The unsaturated cyclic carbonates may be used singly, or two or more may be used in combination in an appropriate ratio. The amount of the unsaturated cyclic carbonate(s) is not particularly limited and may be determined appropriately as long as the advantageous effects of the invention are not significantly impaired. In 100 mass % of the nonaqueous electrolytic solution, the amount of the unsaturated cyclic carbonate(s) is preferably 0.001 mass % or above, more preferably 0.01 mass % or above, and still more preferably 0.1 mass % or above, and is preferably 10 mass % or less, more preferably 5 mass % or less, still more preferably 4 mass % or less, and particularly preferably 3 mass % or less. This amount ensures that the obtainable nonaqueous electrolyte secondary batteries will achieve a sufficient enhancement in cycle characteristics and also reduces the probability that high-temperature storage characteristics are decreased to cause a heavy generation of gas and a poor retention of discharge capacity.

1-6-2. Other Auxiliaries

The electrolytic solution of the invention may contain other known auxiliaries. Examples of such additional auxiliaries include carbonate compounds such as erythritan carbonate, spiro-bis-dimethylene carbonate and methoxyethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride and phenylsuccinic anhydride; spiro compounds such as 3,9-divinyl-2,4,8,10-tetraoxaspiro[5.5]undecane; sulfur-containing compounds such as N,N-dimethylmethanesulfonamide and N,N-diethylmethanesulfonamide; phosphorus-containing compounds such as trimethyl phosphite, triethyl phosphite, triphenyl phosphite, trimethyl phosphate, triethyl phosphate, triphenyl phosphate, methyl dimethylphosphinate, ethyl diethylphosphinate, trimethylphosphine oxide and triethylphosphine oxide; nitrogen-containing compounds such as 1-methyl-2-pyrrolidinone, 1-methyl-2-piperidone, 3-methyl-2-oxazolidinone, 1,3-dimethyl-2-imidazolidinone and N-methylsuccinimide; and hydrocarbon compounds such as heptane, octane, nonane, decane and cycloheptane. These auxiliaries may be used singly, or two or more may be used in combination. The addition of these auxiliaries enhances the retention of capacity after high-temperature storage and cycle characteristics.

The amount of the additional auxiliaries is not particularly limited and may be determined appropriately as long as the advantageous effects of the invention are not significantly impaired. In 100 mass % of the nonaqueous electrolytic solution, the amount of the additional auxiliaries is preferably 0.01 mass % to 5 mass %. When added in this amount, the additional auxiliaries will sufficiently produce their effects while the decrease in battery characteristics such as high-load discharge characteristics will be avoided. The amount of the additional auxiliaries is more preferably 0.1 mass % or above, and still more preferably 0.2 mass % or above, and is more preferably 3 mass % or less, and still more preferably 1 mass % or less.

2. Battery Configurations

The electrolytic solution for nonaqueous electrolyte secondary batteries according to the present invention is suitably used for secondary batteries, for example, lithium secondary batteries. Hereinbelow, nonaqueous electrolyte secondary batteries involving the electrolytic solution of the invention will be described.

The electrolyte batteries of the invention may have a known structure. Typically, the electrolyte batteries include a negative electrode and a positive electrode capable of storing and releasing metal ions (for example, lithium ions), and the inventive electrolytic solution described above.

2-1. Negative Electrodes

Hereinbelow, negative electrode active materials used in the negative electrodes will be described. The negative electrode active materials are not particularly limited as long as the materials can electrochemically store and release metal ions (for example, lithium ions). Specific examples include carbonaceous materials, alloy materials and lithium-metal composite oxide materials. These materials may be used singly, or two or more may be used in combination.

(Negative Electrode Active Materials)

Examples of the negative electrode active materials include carbonaceous materials, alloy materials and lithium-metal composite oxide materials.

In terms of the balance between initial irreversible capacity and high-current density charge/discharge characteristics, the carbonaceous material used as the negative electrode active material is preferably selected from:

(1) natural graphites;

(2) carbonaceous materials obtained by heat treating artificial carbonaceous substances and artificial graphitic substances one or more times at 400 to 3200° C.;

(3) carbonaceous materials that form a negative electrode active material layer which is composed of at least two kinds of carbonaceous substances having different crystallinities and/or which has an interface formed by such different crystalline carbonaceous substances; and (4) carbonaceous materials that form a negative electrode active material layer which is composed of at least two kinds of carbonaceous substances having different orientations and/or which has an interface formed by such carbonaceous substances having different orientations.

The carbonaceous materials (1) to (4) may be used singly, or two or more may be used in combination in an appropriate ratio.

Examples of the artificial carbonaceous substances and the artificial graphitic substances used in (2) above include natural graphites, coal cokes, petroleum cokes, coal pitches, petroleum pitches, oxidation products of these pitches, needle cokes, pitch cokes, carbon materials obtained by the partial graphitization of these cokes, furnace blacks, acetylene blacks, pyrolysates of organic substances such as pitch-based carbon fibers, carbonizable organic substances, carbides of such substances, solutions of carbonizable organic substances in low-molecular organic solvents such as benzene, toluene, xylene, quinoline and n-hexane, and carbides obtained from such solutions.

The alloy materials used as the negative electrode active materials are not particularly limited as long as the materials can store and release lithium, and may be any of elemental lithium, elemental metals and alloys capable of forming lithium alloys, and compounds of these metals such as oxides, carbides, nitrides, silicides, sulfides and phosphides. The elemental metals and the alloys capable of forming lithium alloys are preferably materials including Group 13 and Group 14 metals and semimetals (except carbon), and are more preferably aluminum, silicon and tin (hereinafter, these metals are sometimes written as "specific metal elements"), and alloys and compounds including atoms of these elemental metals. These materials may be used singly, or two or more may be used in combination in an appropriate ratio.

Examples of the negative electrode active materials having atoms of at least one selected from the specific metal elements include individual elemental metals of the specific metal elements, alloys of two or more of the specific metal elements, alloys of one, or two or more of the specific metal elements and one, or two or more other metal elements, compounds containing one, or two or more of the specific metal elements, and composites such as oxides, carbides, nitrides, silicides, sulfides and phosphides of the above compounds. The use of these elemental metals, alloys or metal compounds as the negative electrode active materials realizes a high capacity of the batteries.

Examples further include compounds in which the above composites form complex bonds with elemental metals, alloys or several elements such as nonmetal elements. Specific examples include alloys of silicon and/or tin, with a metal having no negative electrode action. For example, use may be made of complex compounds which contain as many kinds of elements as 5 to 6 including tin, a metal(s) other than tin and silicon that serves as a negative electrode, a metal(s) having no negative electrode action, and a nonmetal element(s).

Of these negative electrode active materials, individual elemental metals of the specific metal elements, alloys of two or more of the specific metal elements, and compounds of the specific metal elements such as oxides, carbides and nitrides are preferable because the obtainable batteries exhibit a high capacity per unit mass. In particular, elemental silicon and/or tin, alloys of these elemental metals, and compounds such as oxides, carbides and nitrides are preferable from the points of view of the capacity per unit mass and the environmental load.

The lithium-metal composite oxide materials used as the negative electrode active materials are not particularly limited as long as the materials can store and release lithium. From the point of view of high-current density charge/discharge characteristics, those materials containing titanium and lithium are preferable, lithium-metal composite oxide materials that contain titanium are more preferable, and composite oxides of lithium and titanium (hereinafter, also written as "lithium-titanium composite oxides") are still more preferable. That is, the use of the negative electrode active material including a lithium-titanium composite oxide with a spinel structure is particularly preferable in that the output resistance of the obtainable nonaqueous electrolyte secondary batteries is significantly reduced.

It is also preferable that lithium and titanium in the lithium-titanium composite oxide be substituted by other metal element, for example, at least one element selected from the group consisting of Na, K, Co, Al, Fe, Ti, Mg, Cr, Ga, Cu, Zn and Nb.

It is preferable that the metal oxide be a lithium-titanium composite oxide represented by Formula (A) and in Formula (A), $0.7 \leq x \leq 1.5$, $1.5 \leq y \leq 2.3$, and $0 \leq z \leq 1.6$. The structure of such an oxide is stable during the doping and the dedoping of lithium ions.

$$Li_xTi_yM_zO_4 \quad (A)$$

[In Formula (A), M is at least one element selected from the group consisting of Na, K, Co, Al, Fe, Ti, Mg, Cr, Ga, Cu, Zn and Nb.]

Of the compositions represented by Formula (A), those in which:

(a) $1.2 \leq x \leq 1.4$, $1.5 \leq y \leq 1.7$, and $z=0$,
(b) $0.9 \leq x \leq 1.1$, $1.9 \leq y \leq 2.1$, and $z=0$, or
(c) $0.7 \leq x \leq 0.9$, $2.1 \leq y \leq 2.3$, and $z=0$ are particularly preferable because a good balance in battery performances is obtained.

Particularly preferred typical compositions of the compounds are $Li_{4/3}Ti_{5/3}O_4$ for (a), $Li_1Ti_2O_4$ for (b), and $Li_{4/5}Ti_{11/5}O_4$ for (c). Preferred examples of the structures in which $Z \neq 0$ include $Li_{4/3}Ti_{4/3}Al_{1/3}O_4$.

(Properties of Carbonaceous Materials)

The carbonaceous materials which may be used as the negative electrode active materials preferably have the following properties.

(X-Ray Parameters)

The d value (the interlayer distance) between lattice planes (002 planes) obtained by X-ray diffractometry according to GAKUSHIN method with respect to the carbonaceous material is preferably 0.335 nm or more, and is usually 0.360 nm or less, preferably 0.350 nm or less, and more preferably 0.345 nm or less. Further, the crystallite size (Lc) of the carbonaceous material determined by X-ray diffractometry according to GAKUSHIN method is preferably 1.0 nm or more, and more preferably 1.5 nm or more.

(Volume-Based Average Particle Diameter)

The Volume-Based (Volume-Based Average Particle Diameter)

The mass-based average particle diameter of the carbonaceous material is the average particle diameter (the median diameter) on volume basis determined by a laser diffraction/scattering method, and is usually 1 μm or more, preferably 3 μm or more, still more preferably 5 μm or more, and particularly preferably 7 μm or more, and is usually 100 μm or less, preferably 50 μm or less, more preferably 40 μm or less, still more preferably 30 μm or less, and particularly preferably 25 μm or less.

If the volume-based average particle diameter is below the above range, the irreversible capacity is so increased that the batteries may suffer an initial capacity loss at times. In terms of battery production steps, any average particle diameter exceeding the above range is not desirable at times because the application of an electrode-forming liquid containing such particles tends to result in uneven coatings.

The volume-based average particle diameter is measured in such a manner that the carbon powder is dispersed in a 0.2 mass % aqueous solution (approximately 10 mL) of polyoxyethylene (20) sorbitan monolaurate as a surfactant, and the dispersion is analyzed with a laser diffraction/scattering grain size distribution analyzer (LA-700 manufactured by Horiba, Ltd.).

(Raman R Value and Raman Half Width)

The Raman R value of the carbonaceous material is a value measured by an argon ion laser Raman spectroscopy method, and is usually 0.01 or more, preferably 0.03 or more, and more preferably 0.1 or more, and is usually 1.5 or less, preferably 1.2 or less, more preferably 1 or less, and particularly preferably 0.5 or less.

The Raman half width at near 1580 cm$^{-1}$ of the carbonaceous material is, although not particularly limited to, usually 10 cm$^{-1}$ or more, and preferably 15 cm$^{-1}$ or more, and is usually 100 cm$^{-1}$ or less, preferably 80 cm$^{-1}$ or less, more preferably 60 cm$^{-1}$ or less, and particularly preferably 40 cm$^{-1}$ or less.

The Raman R value and the Raman half width are indexes that indicate the crystallinity of the surface of the carbonaceous material. It is preferable that the carbonaceous material have appropriate crystallinity from the point of view of chemical stability, and that the crystallinity still provide interlayer sites for the intercalation and the deintercalation of lithium during charging and discharging, in other words, charge acceptability be not decreased. It is preferable to take into consideration the fact that when the carbonaceous material applied on a current collector is pressed to increase the density of the negative electrode, the crystals tend to be oriented in a direction parallel to the electrode plate. When the Raman R value or the Raman half width is in the above range, the crystals allow a good film to be formed on the surface of the negative electrode and thus make it possible to enhance storage characteristics, cycle characteristics and load characteristics and also make it possible to prevent the decrease in efficiency and the generation of gas associated with the reaction with the nonaqueous electrolytic solution.

A Raman spectrum is obtained using a Raman spectrometer (Raman Spectrometer manufactured by JASCO Corporation) in such a manner that the sample is allowed to fall into the measurement cell to fill the cell and the sample is analyzed while applying an argon ion laser beam to the surface of the sample in the cell and while rotating the cell in a plane perpendicular to the laser beam. With respect to the Raman spectrum obtained, the intensity IA of a peak PA near 1580 cm$^{-1}$ and the intensity IB of a peak PB near 1360 cm$^{-1}$ are measured and the ratio R of the intensities (R=IB/IA) is calculated.

The Raman measurement conditions are as follows:
Argon ion laser wavelength: 514.5 nm
Laser power on sample: 15 to 25 mW
Resolution: 10 to 20 cm$^{-1}$
Measurement range: 1100 cm$^{-1}$ to 1730 cm$^{-1}$
Raman R value and Raman half width analysis: background processing
Smoothing processing: simple averaging, convolution 5 points (BET Specific Surface Area)

The BET specific surface area of the carbonaceous material is a value of specific surface area measured by a BET method, and is usually 0.1 m$^2$·g$^{-1}$ or more, preferably 0.7 m$^2$·g$^{-1}$ or more, more preferably 1.0 m$^2$·g$^{-1}$ or more, and particularly preferably 1.5 m$^2$·g$^{-1}$ or more, and is usually 100 m$^2$·g$^{-1}$ or less, preferably 25 m$^2$·g$^{-1}$ or less, more preferably 15 m$^2$·g$^{-1}$ or less, and particularly preferably 10 m$^2$·g$^{-1}$ or less.

When the BET specific surface area is in the above range, the precipitation of lithium on the electrode surface can be prevented while the generation of gas by the reaction with the nonaqueous electrolytic solution can be suppressed.

The specific surface area is measured by the BET method using a surface area meter (an automatic surface area measuring apparatus manufactured by Okura Riken) in such a manner that the sample is preliminarily dried at 350° C. under a stream of nitrogen for 15 minutes and thereafter the analysis is performed by the nitrogen adsorption BET single point method by flowing a nitrogen-helium mixed gas prepared so that the pressure of nitrogen relative to the atmospheric pressure is exactly 0.3.

(Circularity)

The circularity which indicates how close the carbonaceous material is to a sphere is preferably in the range described below. The circularity is defined as "Circularity= (Circumferential length of equivalent circle having equal area to projection of particle)/(Actual circumferential length of projection of particle)". When the circularity is 1, the particle is theoretically spherical. For particles of the carbonaceous material having diameters in the range of 3 to 40 μm, the circularity is desirably as close to 1 as possible, and the circularity is preferably 0.1 or above, more preferably 0.5 or above, still more preferably 0.8 or above, further preferably 0.85 or above, and particularly preferably 0.9 or above. Because particles having a higher circularity can achieve a higher fill factor and the resistance between such particles is small, high-current density charge/discharge characteristics are enhanced with increasing circularity. Thus, particles having a higher circularity in the above range are more preferable.

The circularity is measured with a flow-type particle image analyzer (FPIA manufactured by Sysmex Corporation). Approximately 0.2 g of the sample is dispersed in a 0.2 mass % aqueous solution (approximately 50 mL) of polyoxyethylene (20) sorbitan monolaurate as a surfactant, the dispersion is irradiated with 28 kHz ultrasonic waves at an output of 60 W for 1 minute, and particles having diameters in the range of 3 to 40 μm are analyzed while setting the detection range to 0.6 to 400 μm.

The circularity may be increased by any method without limitation. A spheronization treatment is preferable because the obtainable sphere particles can form an electrode having a uniform shape of the gaps between the particles. Examples of the spheronization treatments include mechanical spheronization methods by the application of shear force or compressive force, and mechanical/physical treatment methods in which fine particles are unified with a binder or by the adhesion of the particles themselves.

(Tap Density)

The tap density of the carbonaceous material is usually 0.1 g·cm$^{-3}$ or above, preferably 0.5 g·cm$^{-3}$ or above, more preferably 0.7 g·cm$^{-3}$ or above, and particularly preferably 1 g·cm$^{-3}$ or above, and is preferably 2 g·cm$^{-3}$ or less, more preferably 1.8 g·cm$^{-3}$ or less, and particularly preferably 1.6 g·cm$^{-3}$ or less. When the tap density is in this range, the battery capacity can be ensured and the increase in the resistance between the particles can be suppressed.

The tap density is measured by allowing the particles to fall into a 20 cm$^3$ tapping cell through a sieve having a mesh opening of 300 μm until the sample reaches the upper end of the cell, and tapping the cell 1000 times with a stroke length of 10 mm with use of a powder density meter (for example, Tap Denser manufactured by Seishin Enterprise Co., Ltd.). The tap density is calculated based on the volume and the mass of the sample.

(Orientation Ratio)

The orientation ratio of the carbonaceous material is usually 0.005 or above, preferably 0.01 or above, and more preferably 0.015 or above, and is usually 0.67 or less. When the orientation ratio is in this range, excellent high-density charge/discharge characteristics can be ensured. The upper limit of the above range is the theoretical upper limit of the orientation ratio of the carbonaceous materials.

The orientation ratio is measured by X-ray diffractometry with respect to a compact of the sample. The sample weighing 0.47 g is packed into a molding machine 17 mm in diameter and is compressed at 58.8 MN·m$^{-2}$. With use of clay, the resultant compact is set so that the plane of the sample is on the same level as the plane of the measurement sample holder, and an X-ray diffraction spectrum is measured. Based on the peak intensities of (110) diffraction and (004) diffraction of carbon, the (110) diffraction peak intensity/(004) diffraction peak intensity ratio is calculated.

The X-ray diffractometry conditions are as follows. "2θ" indicates the diffraction angle.

Target: Cu (Kα ray) graphite monochromator
Slits:
   Divergence slit=0.5 degrees
   Receiving slit=0.15 mm
   Scattering slit=0.5 degrees
Measurement range and step angle/measurement time:
(110) Plane: 75 degrees≤2θ≤80 degrees, 1 degree/60 seconds
(004) Plane: 52 degrees≤2θ≤57 degrees, 1 degree/60 seconds (Aspect Ratio (Powder))

The aspect ratio of the carbonaceous material is usually 1 or more, and is usually 10 or less, preferably 8 or less, and more preferably 5 or less. This aspect ratio ensures that the material can be applied with enhanced uniformity while suppressing the occurrence of streaks on the electrodes in forming an electrode, thus making it possible to ensure excellent high-current density charge/discharge characteristics. The lower limit of the above range is the theoretical lower limit of the aspect ratio of the carbonaceous materials.

The aspect ratio is measured with respect to particles of the carbonaceous material enlarged on a scanning electron microscope. Fifty graphite particles are selected randomly from the particles fixed to an end of a metal having a thickness of 50 μm or less. The stage on which the sample is fixed is rotated and tilted to observe each of the particles three-dimensionally. The largest diameter A of the particle of the carbonaceous material and the smallest diameter B that is perpendicular to the largest diameter A are measured. The average of the A/B ratios is determined.

⟨Configurations and Methods for Fabrication of Negative Electrodes⟩

The electrodes may be produced by any known methods as long as the advantageous effects of the invention are not significantly impaired. For example, the electrode may be formed by combining the negative electrode active material with a binder, a solvent and optionally with additives such as a thickener, a conductive material and a filler to give a slurry, and applying the slurry to a current collector followed by drying and pressing.

In the case of using the alloy material, a thin layer containing the negative electrode active material (a negative electrode active material layer) may be formed by a technique such as deposition, sputtering or plating.

(Current Collectors)

The current collectors on which the negative electrode active material is held may be any known collectors. Examples of the negative electrode current collectors include metal materials such as aluminum, copper, nickel, stainless steel and nickel-plated steel. In terms of easy processing and cost, copper is particularly preferable.

Examples of the shapes of the metallic current collectors include metal foils, metal cylinders, metal coils, metal plates, metal thin films, expanded metals, punched metals and porous metals. Metal thin films are preferable, and copper foils are more preferable. Rolled copper foils obtained by a rolling method, and electrolytic copper foils obtained by an electrolytic method are still more preferable for use as the current collectors.

From the points of view of ensuring the battery capacity and handling properties, the thickness of the current collectors is usually 1 μm or more, and preferably 5 μm or more, and is usually 100 μm or less, and preferably 50 μm or less.

(Thickness Ratio of Negative Electrode Active Material Layer to Current Collector)

The thickness ratio of the negative electrode active material layer to the current collector is not particularly limited. It is, however, preferable that the value of "(Thickness of negative electrode active material layer per side immediately before pouring of nonaqueous electrolytic solution)/(Thickness of current collector)" be 150 or less, more preferably 20 or less, and particularly preferably 10 or less, and be 0.1 or more, more preferably 0.4 or more, and particularly preferably 1 or more. When the thickness ratio of the negative electrode active material layer to the current collector is in the above range, the battery capacity can be ensured while the generation of heat from the current collector during charging and discharging at a high current density can be suppressed.

(Binders)

The binders for binding the particles of the negative electrode active material are not particularly limited as long as the binders are stable to the nonaqueous electrolytic solution and the solvents used in the production of the electrodes.

Specific examples include resin polymers such as polyethylene, polypropylene, polyethylene terephthalate, polymethyl methacrylate, aromatic polyamide, polyimide, cellulose and nitrocellulose; rubber polymers such as SBR (styrene-butadiene rubber), isoprene rubber, butadiene rubber, fluororubber, NBR (acrylonitrile-butadiene rubber) and ethylene-propylene rubber, styrene-butadiene-styrene block copolymer and hydrogenated products thereof; thermoplastic elastomeric polymers such as EPDM (ethylene-propylene-diene terpolymer), styrene-ethylene-butadiene-styrene copolymer, styrene-isoprene-styrene block copolymer and hydrogenated products of these polymers; soft resin polymers such as syndiotactic 1,2-polybutadiene, polyvinyl acetate, ethylene-vinyl acetate copolymer and propylene-α-olefin copolymer; fluorine-containing polymers such as polyvinylidene fluoride, polytetrafluoroethylene, fluorinated polyvinylidene fluoride and polytetrafluoroethylene-ethylene copolymer, and polymer compositions having conductivity for alkali metal ions (in particular, lithium ions). These binders may be used singly, or two or more may be used in combination in an appropriate ratio.

The ratio of the binder to the negative electrode active material is preferably 0.1 mass % or above, more preferably 0.5 mass % or above, and particularly preferably 0.6 mass % or above, and is preferably 20 mass % or less, more preferably 15 mass % or less, still more preferably 10 mass % or less, and particularly preferably 8 mass % or less. This ratio of the binder to the negative electrode active material ensures a sufficient battery capacity and a sufficient strength of the negative electrodes.

When, in particular, the binder includes a rubber polymer such as SBR as the main component, the ratio of the binder to the negative electrode active material is usually 0.1 mass % or above, preferably 0.5 mass % or above, and more preferably 0.6 mass % or above, and is usually 5 mass % or less, preferably 3 mass % or less, and more preferably 2 mass % or less. When the binder includes a fluorine-containing polymer such as polyvinylidene fluoride as the main component, the ratio of the binder to the negative electrode active material is usually 1 mass % or above, preferably 2 mass % or above, and more preferably 3 mass % or above, and is usually 15 mass % or less, preferably 10 mass % or less, and more preferably 8 mass % or less.

(Slurry-Forming Solvents)

The solvents for forming the slurry may be any kinds of solvents without limitation as long as the negative electrode active material, the binder, and a thickener and a conductive material that are optionally used can be dissolved or dispersed in the solvents. The solvents may be aqueous solvents or organic solvents.

Examples of the aqueous solvents include water and alcohols. Examples of the organic solvents include N-methylpyrrolidone (NMP), dimethylformamide, dimethylacetamide, methyl ethyl ketone, cyclohexanone, methyl acetate, methyl acrylate, diethyltriamine, N,N-dimethylaminopropyiamine, tetrahydrofuran (THF), toluene, acetone, diethyl ether, hexamethylphosphoramide, dimethylsulfoxide, benzene, xylene, quinoline, pyridine, methylnaphthalene and hexane.

When, in particular, an aqueous solvent is used, it is preferable that the slurry be prepared while adding a dispersant in combination with a thickener and while using a latex of SBR. The solvents may be used singly, or two or more may be used in combination in an appropriate ratio.

(Thickeners)

The thickener is usually used to control the viscosity of the slurry. The thickeners are not particularly limited. Specific examples include carboxymethylcellulose, methylcellulose, hydroxymethylcellulose, ethylcellulose, polyvinyl alcohol, oxidized starch, phosphorylated starch, casein and salts of these compounds. The thickeners may be used singly, or two or more may be used in combination in an appropriate ratio.

When the thickener is used, the ratio of the thickener to the negative electrode active material is usually 0.1 mass % or above, preferably 0.5 mass % or above, and more preferably 0.6 mass % or above, and is usually 5 mass % or less, preferably 3 mass % or less, and more preferably 2 mass % or less. When the ratio of the thickener to the negative electrode active material is in this range, it is possible to suppress the decrease in battery capacity and the increase in resistance, and also to ensure good application properties.

(Electrode Density)

The electrode structure of the electrodes formed of the negative electrode active material is not particularly limited. It is, however, preferable that the density of the negative electrode active material present on the current collector be 1 g·cm$^{-3}$ or more, more preferably 1.2 g·cm$^{-3}$ or more, and particularly preferably 1.3 g·cm$^{-3}$ or more, and be 2.2 g·cm$^{-3}$ or less, more preferably 2.1 g·cm$^{-3}$ or less, still more preferably 2.0 g·cm$^{-3}$ or less, and particularly preferably 1.9 g·cm$^{-3}$ or less. When the density of the negative electrode active material present on the current collector is in this range, the particles of the negative electrode active material are prevented from breakage. Further, the above density makes it possible to prevent an increase in initial irreversible capacity and to suppress deteriorations in high-current density charge/discharge characteristics due to poor accessibility of the nonaqueous electrolytic solution to the vicinity of the current collector/negative electrode active material interface. Furthermore, the above density ensures that the decrease in battery capacity and the increase in resistance are prevented.

(Thickness of Negative Electrode Plates)

The thickness of the negative electrode plates is not particularly limited and is designed in accordance with the positive electrode plates that are used. The thickness of the mixture layer excluding the thickness of the metal foil as the core is usually 15 μm or more, preferably 20 μm or more, and more preferably 30 μm or more, and is usually 300 μm or less, preferably 280 μm or less, and more preferably 250 μm or less.

(Coatings on Surface of Negative Electrode Plates)

Substances having a composition different from that of the negative electrode plates may be attached to the surface of the negative electrode plates. Examples of such adherent substances include oxides such as aluminum oxide, silicon oxide, titanium oxide, zirconium oxide, magnesium oxide, calcium oxide, boron oxide, antimony oxide and bismuth oxide, sulfate salts such as lithium sulfate, sodium sulfate, potassium sulfate, magnesium sulfate, calcium sulfate and aluminum sulfate, and carbonate salts such as lithium carbonate, calcium carbonate and magnesium carbonate.

2-2. Positive Electrodes

<Positive Electrode Active Materials>

Hereinbelow, positive electrode active materials used in the positive electrodes will be described.

(Compositions)

The positive electrode active materials are not particularly limited as long as the materials can electrochemically store and release metal ions (for example, lithium ions). For example, materials containing lithium and at least one transition metal are preferable. Specific examples include lithium-transition metal composite oxides and lithium-transition metal phosphate compounds.

Preferred examples of the transition metals in the lithium-transition metal composite oxides include V, Ti, Cr, Mn, Fe, Co, Ni and Cu. Specific examples include lithium-cobalt composite oxides such as $LiCoO_2$, lithium-nickel composite oxides such as $LiNiO_2$, lithium-manganese composite oxides such as $LiMnO_2$, $LiMn_2O_4$ and $Li_2MnO_4$, lithium-nickel-manganese-cobalt composite oxides such as $LiNi_{1/3}Mn_{1/3}Co_{1/3}O_2$ and $LiNi_{0.5}Mn_{0.3}Co_{0.2}O_2$, and composite oxides corresponding to the above lithium-transition metal composite oxides except that the main transition metal atoms are partially substituted by other elements such as Na, K, B, F, Al, Ti, V, Cr, Mn, Fe, Co, Li, Ni, Cu, Zn, Mg, Ga, Zr, Si, Nb, Mo, Sn and W. Examples of such substituted composite oxides include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$ and $LiMn_{1.5}Ni_{0.5}O_4$.

Preferred examples of the transition metals in the lithium-transition metal phosphate compounds include V, Ti, Cr, Mn, Fe, Co, Ni and Cu. Specific examples of the compounds include iron phosphates such as $LiFePO_4$, $Li_3Fe_2(PO_4)_3$ and $LiFeP_2O_7$, cobalt phosphates such as $LiCoPO_4$, and compounds corresponding to the above lithium-transition metal phosphate compounds except that the main transition metal atoms are partially substituted by other elements such as Al, Ti, V, Cr, Mn, Fe, Co, Li, Ni, Cu, Zn, Mg, Ga, Zr, Nb and Si.

The addition of lithium phosphate to the positive electrode active material advantageously enhances continuous charging characteristics. The manner in which lithium phosphate is used is not limited. Preferably, lithium phosphate is used as a mixture with the positive electrode active material described above. With respect to the total of the positive electrode active material and lithium phosphate, the lower limit of the amount of lithium phosphate is preferably 0.1 mass % or above, more preferably 0.3 mass % or above, and still more preferably 0.5 mass % or above, and the upper limit is preferably 10 mass % or less, more preferably 8 mass % or less, and still more preferably 5 mass % or less.

(Surface Coatings)

Substances having a composition different from that of the positive electrode active material may be attached to the surface of the positive electrode active material. Examples of such adherent substances include oxides such as aluminum oxide, silicon oxide, titanium oxide, zirconium oxide, magnesium oxide, calcium oxide, boron oxide, antimony oxide and bismuth oxide, sulfate salts such as lithium sulfate, sodium sulfate, potassium sulfate, magnesium sulfate, calcium sulfate and aluminum sulfate, carbonate salts such as lithium carbonate, calcium carbonate and magnesium carbonate, and carbon.

For example, these adherent substances may be attached to the surface of the positive electrode active material by a method in which the positive electrode active material is impregnated with a solution or suspension of the substance in a solvent, and the wet material is dried; a method in which the positive electrode active material is impregnated with a solution or suspension of an adherent substance precursor in a solvent, and the wet material is treated by heating or the like to perform the reaction of the precursor; and a method in which the substance is added to a positive electrode active material precursor and the mixture is calcined together. In the case of carbon, for example, a carbonaceous substance may be mechanically attached in the form of activated carbon or the like after the production of the active material.

The lower limit of the mass of the adherent substance relative to the positive electrode active material is preferably 0.1 ppm or more, more preferably 1 ppm or more, and still more preferably 10 ppm or more, and the upper limit thereof is preferably 20% or less, more preferably 10% or less, and still more preferably 5% or less. The adherent substance can suppress the oxidation reaction of the electrolytic solution on the surface of the positive electrode active material, thereby extending the battery life. If the amount of the substance attached is too small, these effects may not be obtained sufficiently. If present in an excessively large amount, the adherent inhibits the entry and exit of lithium ions to cause an increase in resistance at times.

In the invention, the positive electrode active materials carrying an adherent substance with a different composition on the surface are also written as the "positive electrode active materials".

(Shapes)

The shapes of the particles of the positive electrode active material may be conventional shapes such as bulky masses, polyhedrons, spheres, ellipses, plates, needles and columns. Further, primary particles may be aggregated to form secondary particles.

(Tap Density)

The tap density of the positive electrode active material is preferably 0.5 $g/cm^3$ or above, more preferably 0.8 $g/cm^3$ or above, and still more preferably 1.0 $g/cm^3$ or above. When the tap density of the positive electrode active material is in this range, it is possible to reduce the amounts of a dispersion medium, a conductive material and a binder required to form positive electrode active material layers, and consequently it is possible to ensure a high fill factor of the positive electrode active material and a high battery capacity. Dense positive electrode active material layers may be formed by using a composite oxide powder having a high tap density. In general, a higher tap density is more preferable, and the upper limit is not particularly limited. It is, however, preferable that the tap density be 4.0 $g/cm^3$ or less, more preferably 3.7 $g/cm^3$ or less, and still more preferably 3.5 $g/cm^3$ or less. This tap density ensures that the decrease in load characteristics is prevented.

In the invention, the tap density is measured in such a manner that 5 to 10 g of the positive electrode active material powder is placed into a 10 ml glass graduated cylinder, which is then tapped 200 times with a stroke of about 20 mm, and the packing density (the tap density) of the powder is measured in terms of g/cc.

(Median Diameter d50)

The median diameter d50 of the particles of the positive electrode active material (the secondary particle diameter when the primary particles are aggregated into secondary particles) is preferably 0.3 μm or more, more preferably 0.5 μm or more, still more preferably 0.8 μm or more, and most preferably 1.0 μm or more, and the upper limit is preferably 30 μm or less, more preferably 27 μm or less, still more preferably 25 μm or less, and most preferably 22 μm or less. This median diameter ensures that a high tap density is obtained and the decrease in battery performance is prevented, and also ensures that a slurry of the active material and other components such as a conductive material and a binder in a solvent can be applied to form thin films as positive electrodes of batteries while preventing the occurrence of problems such as streaks. The fill factor in the fabrication of positive electrodes may be further enhanced by using a mixture of two or more kinds of the positive electrode active materials having different median diameters d50.

In the invention, the median diameter d50 is measured with a known laser diffraction/scattering grain size distribution analyzer. When LA-920 manufactured by Horiba, Ltd. is used as the grain size distribution analyzer, the particles are dispersed in a 0.1 mass % aqueous sodium hexametaphosphate solution as the dispersion medium by the application of ultrasonic waves for 5 minutes, and the diameters are measured while setting the refractive index at 1.24.

(Average Primary Particle Diameter)

When the primary particles are aggregated into secondary particles, the average primary particle diameter of the positive electrode active material is preferably 0.05 μm or more, more preferably 0.1 μm or more, and still more preferably 0.2 μm or more, and the upper limit is preferably 5 μm or less, more preferably 4 μm or less, still more preferably 3 μm or less, and most preferably 2 μm or less. This average diameter ensures that a good fill factor and a sufficient specific surface area of the powder are obtained and the decrease in battery performance is prevented, and also ensures that the particles have appropriate crystallinity to ensure reversibility of charging and discharging.

In the invention, the primary particle diameters are measured by observation using a scanning electron microscope (SEM). Specifically, the largest length of a segment defined by a horizontal straight line intersecting the primary particle is measured with respect to fifty primary particles randomly selected in a x10000 photograph, the results being averaged.

(BET Specific Surface Area)

The BET specific surface area of the positive electrode active material is preferably 0.1 $m^2/g$ or more, more preferably 0.2 $m^2/g$ or more, and still more preferably 0.3 $m^2/g$ or more, and the upper limit is 50 $m^2/g$ or less, preferably 40 $m^2/g$ or less, and more preferably 30 $m^2/g$ or less. When the BET specific surface area is in this range, a good battery performance is ensured while maintaining good application properties of the positive electrode active material.

In the invention, the BET specific surface area is defined as a value measured using a surface area meter (for example, an automatic surface area measuring apparatus manufactured by Okura Riken) in such a manner that the sample is preliminarily dried at 150° C. under a stream of nitrogen for 30 minutes and thereafter the analysis is performed by the nitrogen adsorption BET single point method by flowing a nitrogen-helium mixed gas prepared so that the pressure of nitrogen relative to the atmospheric pressure is exactly 0.3.

(Methods for Producing Positive Electrode Active Materials)

The positive electrode active material may be produced by a common method for the production of inorganic compounds. In particular, while various methods may be used to produce spherical or elliptical active materials, an exemplary method is such that a transition metal raw material is dissolved or is crushed and dispersed in a solvent such as water, the pH is adjusted while performing stirring so as to form a spherical precursor, which is then recovered and dried as required, thereafter a Li source such as LiOH, $Li_2CO_3$ or $LiNO_3$ is added, and the mixture is calcined at a high temperature to give the active material.

In the production of positive electrodes, the positive electrode active materials described hereinabove may be used singly or in combination with one or more positive electrode active materials having a different composition in an appropriate ratio. In this case, some preferred combinations are combinations of $LiCoO_2$ with $LiMn_2O_4$ or a similar structure such as $LiNi_{0.33}Co_{0.33}Mn_{0.33}O_2$ resulting from partial substitution of Mn by other metals such as transition metals, or with $LiCoO_2$ or a similar structure resulting from partial substitution of Co by other metals such as transition metals.

⟨Configurations and Methods for Fabrication of Positive Electrodes⟩

Hereinbelow, configurations of positive electrodes will be described. In the invention, the positive electrode may be fabricated by forming a positive electrode active material layer containing the positive electrode active material and a binder, onto a current collector. The positive electrodes may be produced using the positive electrode active material by a conventional method. That is, the positive electrode may be obtained by dry-mixing the positive electrode active material, a binder and optionally other components such as a conductive material and a thickener, and compression bonding a sheet of the mixture to a positive electrode current collector, or by dissolving or dispersing these materials in a liquid medium to give a slurry, applying the slurry onto a positive electrode current collector, and drying the wet film to form a positive electrode active material layer on the current collector.

In the positive electrode active material layer, the content of the positive electrode active material is preferably 80 mass % or above, more preferably 82 mass % or above, and particularly preferably 84 mass % or above. The upper limit is preferably 99 mass % or less, and more preferably 98 mass % or less. With this content, the electrical capacity of the positive electrode active material in the positive electrode active material layer may be ensured, and also the strength of the positive electrodes may be maintained. In order to increase the packing density of the positive electrode active material, it is preferable that the positive electrode active material layer formed by application and drying be pressed with a device such as a hand press or a roller press. The lower limit of the density of the positive electrode active material layer is preferably 1.5 g/cm³, more preferably 2 g/cm³, and still more preferably 2.2 g/cm³, and the upper limit is preferably 5 g/cm³, more preferably 4.5 g/cm³, and still more preferably 4 g/cm³. This density ensures that good charge and discharge characteristics may be obtained and the increase in electrical resistance may be suppressed.

(Conductive Materials)

The conductive materials may be any known conductive materials. Specific examples include metal materials such as copper and nickel; and carbon materials, for example, black leads (graphites) such as natural graphite and artificial graphite, carbon blacks such as acetylene black, and amorphous carbons such as needle cokes. These materials may be used singly, or two or more may be used in combination in an appropriate ratio. The content of the conductive material(s) in the positive electrode active material layer is usually 0.01 mass % or above, preferably 0.1 mass % or above, and more preferably 1 mass % or above, and the upper limit is usually 50 mass % or less, preferably 30 mass % or less, and more preferably 15 mass % or less. This content ensures that sufficient conductive properties and sufficient battery capacity may be obtained.

(Binders)

The binders used in the production of the positive electrode active material layers are not particularly limited. When the layers are formed by an application method, any binders which may be dissolved or dispersed in the liquid media used in the electrode production may be used. Specific examples include resin polymers such as polyethylene, polypropylene, polyethylene terephthalate, polymethyl methacrylate, polyimide, aromatic polyamide, cellulose and nitrocellulose; rubber polymers such as SBR (styrene-butadiene rubber), NBR (acrylonitrile-butadiene rubber), fluororubber, isoprene rubber, butadiene rubber and ethylene-propylene rubber; thermoplastic elastomeric polymers such as styrene-butadiene-styrene block copolymer and hydrogenated products thereof, EPDM (ethylene-propylene-diene terpolymer), styrene-ethylene-butadiene-ethylene copolymer, and styrene-isoprene-styrene block copolymer and hydrogenated products thereof; soft resin polymers such as syndiotactic 1,2-polybutadiene, polyvinyl acetate, ethylene-vinyl acetate copolymer and propylene-α-olefin copolymer; fluorine-containing polymers such as polyvinylidene fluoride (PVdF), polytetrafluoroethylene, fluorinated polyvinylidene fluoride and polytetrafluoroethylene-ethylene copolymer, and polymer compositions having conductivity for alkali metal ions (in particular, lithium ions). These binders may be used singly, or two or more may be used in combination in an appropriate ratio.

The proportion of the binder in the positive electrode active material layer is usually 0.1 mass % or above, preferably 1 mass % or above, and more preferably 1.5 mass % or above, and the upper limit is usually 80 mass % or less, preferably 60 mass % or less, more preferably 40 mass % or less, and most preferably 10 mass % or less. When used in an excessively low proportion, the binder fails to hold the positive electrode active material sufficiently and the mechanical strength of the positive electrode is decreased, possibly resulting in a decrease in battery performance such as cycle characteristics. On the other hand, adding an excessively large amount of the binder results in a decrease in battery capacity or conductive properties at times.

(Slurry-Forming Solvents)

The solvents for forming the slurry may be any kinds of solvents without limitation as long as the positive electrode active material, the conductive material, the binder and an optional thickener can be dissolved or dispersed in the solvents. The solvents may be aqueous solvents or organic solvents. Examples of the aqueous media include water, and mixed media of alcohols and water. Examples of the organic media include aliphatic hydrocarbons such as hexane; aromatic hydrocarbons such as benzene, toluene, xylene and methylnaphthalene; heterocyclic compounds such as quinoline and pyridine; ketones such as acetone, methyl ethyl ketone and cyclohexanone; esters such as methyl acetate and methyl acrylate; amines such as diethylenetriamine and N,N-dimethylaminopropylamine; ethers such as diethyl ether, propylene oxide and tetrahydrofuran (THF); amides such as N-methylpyrrolidone (NMP), dimethylformamide and dimethylacetamide; and aprotic polar solvents such as hexamethylphosphoramide and dimethylsulfoxide.

When, in particular, an aqueous medium is used, it is preferable that the slurry be prepared while adding a thickener and while using a latex of styrene-butadiene rubber (SBR). The thickener is usually used to control the viscosity of the slurry. The thickeners are not particularly limited. Specific examples include carboxymethylcellulose, methylcellulose, hydroxymethylcellulose, ethylcellulose, polyvinyl alcohol, oxidized starch, phosphorylated starch, casein and salts of these compounds. The thickeners may be used singly, or two or more may be used in combination in an appropriate ratio. When the thickener is used, the ratio of the thickener to the active material is 0.1 mass % or above, preferably 0.2 mass % or above, and more preferably 0.3 mass % or above, and the upper limit is 5 mass % or less, preferably 3 mass % or less, and more preferably 2 mass % or less. This ratio ensures that good application properties may be obtained, and the decrease in battery capacity and the increase in resistance may be prevented.

(Current Collectors)

The materials of the positive electrode current collectors are not particularly limited, and any known materials may be used. Specific examples include metal materials such as aluminum, stainless steel, nickel plating, titanium and tantalum; and carbon materials such as carbon cloth and carbon paper. Of these, metal materials are preferable, and aluminum is particularly preferable.

Examples of the shapes of the metallic current collectors include metal foils, metal cylinders, metal coils, metal plates, metal thin films, expanded metals, punched metals and porous metals. Examples of the shapes of the carbon current collectors include carbon plates, carbon thin films and carbon cylinders. Of these, metal thin films are preferable. The thin films may be in the form of meshed films as appropriate. The thickness of the thin films is not limited. From the points of view of the strength and the handling properties of the current collectors, the thickness is usually 1 μm or more, preferably 3 μm or more, and more preferably 5 μm or more, and the upper limit is usually 1 mm or less, preferably 100 μm or less, and more preferably 50 μm or less.

In order to reduce the electronic contact resistance between the current collector and the positive electrode active material layer, it is also preferable that the surface of the current collector be coated with a conductive auxiliary. Examples of the conductive auxiliaries include carbon and noble metals such as gold, platinum and silver.

The thickness ratio of the positive electrode active material layer to the current collector is not particularly limited. It is, however, preferable that the value of (Thickness of positive electrode active material layer per side immediately before pouring of electrolytic solution)/(Thickness of current collector) be 20 or less, more preferably 15 or less, and most preferably 10 or less, and the lower limit be 0.5 or more, more preferably 0.8 or more, and most preferably 1 or more. If the ratio is above this range, the current collector may generate Joule heat during charging and discharging at a high current density. The satisfaction of the above range ensures that the generation of heat from the current collector during charging and discharging at a high current density may be suppressed and the battery capacity may be ensured.

(Electrode Area)

In order to increase the output and the stability at high temperatures in the use of the electrolytic solution of the invention, it is preferable that the area of the positive electrode active material layers be larger than the outer surface area of a battery exterior case. Specifically, the total of the electrode areas of the positive electrode is preferably 15 times or more, and more preferably 40 times or more larger than the surface area of the exterior of the secondary battery. In the case of a bottomed square case, the outer surface area of the exterior case is the total area calculated from the length, the width and the thickness of the case accommodating the electricity-generating element except the projections of the terminals. In the case of a bottomed cylindrical case, the outer surface area is the geometric surface area obtained by approximating that the case accommodating the electricity-generating element except the projections of the terminals is a cylinder. The total of the electrode areas of the positive electrode is the geometric surface area of the positive electrode mixture layer(s) opposed to the mixture layer(s) including the negative electrode active material. In the case where the positive electrode mixture layers are formed on both sides of the current collector foil, the total of the electrode areas is the total of the areas of the surfaces calculated separately.

(Thickness of Positive Electrode Plates)

The thickness of the positive electrode plates is not particularly limited. From the points of view of high capacity and high output, the lower limit of the thickness of the mixture layers per side of the current collector obtained by subtracting the thickness of the metal foil as the core is preferably 10 μm or more, and more preferably 20 μm or more, and the upper limit is preferably 500 μm or less, and more preferably 450 μm or less.

(Coatings on Surface of Positive Electrode Plates)

Substances having a composition different from that of the positive electrode plates may be attached to the surface of the positive electrode plates. Examples of such adherent substances include oxides such as aluminum oxide, silicon oxide, titanium oxide, zirconium oxide, magnesium oxide, calcium oxide, boron oxide, antimony oxide and bismuth oxide, sulfate salts such as lithium sulfate, sodium sulfate, potassium sulfate, magnesium sulfate, calcium sulfate and aluminum sulfate, carbonate salts such as lithium carbonate, calcium carbonate and magnesium carbonate, and carbon.

2-3. Separators

A separator is usually disposed between the positive electrode and the negative electrode to prevent short-circuits. In this case, the separator is usually impregnated with the electrolytic solution of the invention.

The materials and the shapes of the separators are not particularly limited, and known materials and shapes may be used appropriately as long as the advantageous effects of the invention are not significantly impaired. In particular, use may be made of those materials which are stable to the electrolytic solution of the invention such as resins, glass fibers and inorganic substances. Those having excellent liquid retention properties such as porous sheets and nonwoven fabrics are preferably used.

Examples of the materials for the resin and glass fiber separators include polyolefins such as polyethylene and polypropylene, aromatic polyamide, polytetrafluoroethylene, polyethersulfone and glass filters. In particular, glass filters and polyolefins are preferable, polyolefins are more preferable, and polypropylene is particularly preferable.

These materials may be used singly, or two or more may be mixed or stacked together in an appropriate ratio. Specific examples of the stacks of two or more materials include three-layer separators in which polypropylene, polyethylene and polypropylene are stacked together in this order.

The thickness of the separators is not limited, but is usually 1 µm or more, preferably 5 µm or more, and more preferably 8 µm or more, and is usually 50 µm or less, preferably 40 µm or less, and more preferably 30 µm or less. This thickness ensures insulating properties and mechanical strength, and also ensures battery performance such as rate characteristics and energy density.

When a porous separator such as a porous sheet or a nonwoven fabric is used, the porosity of the separator is not limited, but is usually 20% or more, preferably 35% or more, and more preferably 45% or more, and is usually 90% or less, preferably 85% or less, and more preferably 75% or less. This porosity ensures insulating properties and mechanical strength and also ensures that the film resistance may be reduced and good rate characteristics may be obtained.

The average pore diameter of the separators is not limited, but is usually 0.5 µm or less, and preferably 0.2 µm or less, and is usually 0.05 µm or more. Any average pore diameter exceeding the above range increases the probability of short-circuits. The above average pore diameter ensures that the film resistance is low and good rate characteristics are obtained while preventing the occurrence of short-circuits. Examples of the inorganic substances as the materials include oxides such as alumina and silicon dioxide, nitrides such as aluminum nitride and silicon nitride, and sulfate salts such as barium sulfate and calcium sulfate. Particulate or fibrous inorganic substances are used.

The forms of such separators may be thin films such as nonwoven fabrics, woven fabrics and microporous films. Thin-film separators having a pore diameter of 0.01 to 1 µm and a thickness of 5 to 50 µm are suitably used. While the separators may be independent thin films as described above, composite porous layers including particles of the inorganic substance and a resin binder may be formed as the separators on the surface of the positive electrodes and/or the negative electrodes. For example, porous layers may be formed on both sides of the positive electrode using alumina particles having a D90 particle diameter of less than 1 µm and a fluororesin as a binder.

2-4. Battery Designs

⟨Electrode Assemblies⟩

The electrode assembly may be a stack of the positive electrode plate and the negative electrode plate through the separator, or may be a structure in which the positive electrode plate and the negative electrode plate are wound through the separator into a coil. The proportion of the volume of the electrode assembly to the inner volume of the battery (hereinafter, written as the electrode assembly occupancy rate) is usually 40% or above, and preferably 50% or above, and is usually 90% or less, and preferably 80% or less. When the electrode assembly occupancy rate is in this range, it is possible to ensure the battery capacity and to prevent inconveniences associated with the increase in internal pressure, for example, deteriorations in characteristics such as charge-discharge repetition characteristics and high-temperature storage characteristics, and the actuation of gas release valves.

⟨Current-Collecting Structures⟩

The current-collecting structures are not particularly limited. Such structures that the resistance at wirings and joints is low are preferable. In the case of a stack electrode assembly, the current-collecting structure is suitably formed by welding bundles of the metallic cores of the respective electrode layers to terminals. In view of the fact that a large electrode has a high internal resistance, it is preferable that a plurality of terminals be disposed in such an electrode to decrease the resistance. In the case of a wound electrode assembly, a plurality of leads may be provided on each of the positive and the negative electrodes and the bundles of the leads may be connected to respective terminals, thereby reducing the internal resistance.

⟨Exterior Cases⟩

The materials of the exterior cases are not particularly limited as long as they are stable to the nonaqueous electrolytic solution used. Specific examples include metals such as nickel-plated steel sheets, stainless steel, aluminum, aluminum alloys and magnesium alloys, and resin/aluminum foil stack films (laminate films). From the point of view of weight reduction, metals such as aluminum and aluminum alloys, and laminate films are suitably used.

Examples of the metallic exterior cases include tightly sealed structures formed by welding the metals by laser welding, resistance welding or ultrasonic welding, and structures formed by caulking or crimping the metals via resin gaskets. Examples of the laminate-film exterior cases include tightly sealed structures formed by fusion bonding the resin layers. To enhance sealing properties, the resin layers may be fusion bonded through a resin different from the resin used in the laminate film. When, in particular, a sealed structure is produced by fusion bonding the resin layers while the current-collecting terminals are interposed between the resin layers, a polar group-containing resin or a resin modified by the introduction of a polar group is suitably used to mediate the bond between the metal and the resin. The shapes of the exterior bodies are not limited and may be, for example, any of cylindrical shapes, prismatic shapes, laminate shapes, coin shapes and large shapes.

⟨Protective Elements⟩

Protective elements may be used such as PTC (positive temperature coefficient) detectors, thermal fuses and thermistors that increase resistance in the event of abnormal heat generation or overcurrent, and valves (current cutoff valves) that interrupt the flow of current passing through the circuits upon a rapid increase in internal pressure or internal temperature in the batteries due to abnormal heat generation. It is preferable to select protective elements that do not operate at a high current under normal conditions. It is more preferable to design the batteries so that any abnormal heat generation or thermal runaway does not occur even in the absence of protective elements.

EXAMPLES

Hereinbelow, the present invention will be described in greater detail based on Examples and Comparative Examples. The scope of the invention is not limited to such Examples.

The structures of aromatic carboxylate esters of Formula (1) used in Examples are illustrated below.

[Chem. 48]

(Compound 1-1)

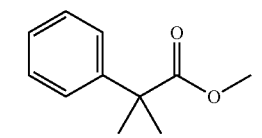

Methyl 2, 2-dimethyl-phenylacetate (Compound 1-2)

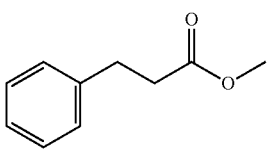

Methyl 3-phenylpropionate (Compound 1-3)

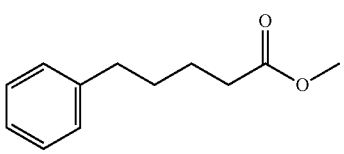

Methyl 5-phenylvalerate (Compound 1-4)

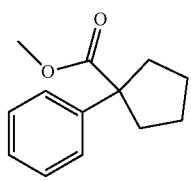

Methyl 1-phenylcyclopentanecarboxylate

The structures of aromatic carboxylate esters of Formula (2) used in Examples are illustrated below.

[Chem. 49]

(Compound 2-1)

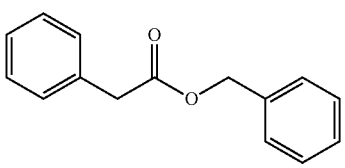

Benzyl phenylacetate (Compound 2-2)

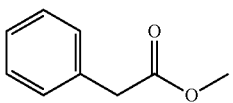

Methyl phenylacetate

The structures of other compounds used are illustrated below.

[Chem. 50]

(Compound 3-1)

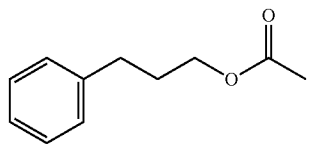

3-Phenylpropyl acetate (Compound 3-2)

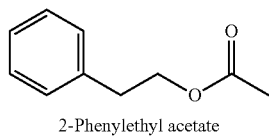

2-Phenylethyl acetate (Compound 3-3)

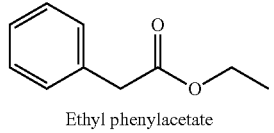

Ethyl phenylacetate (Compound 3-4)

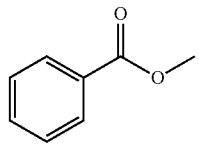

Methyl benzoate

⟨Example 1-1, and Comparative Examples 1-1 and 1-2⟩

Example 1-1

[Preparation of Nonaqueous Electrolytic Solution]

In a dry argon atmosphere, LiPF$_6$ as an electrolyte was dissolved into a mixed solvent including ethylene carbonate (also written as "EC"), ethyl methyl carbonate (also written as "EMC") and dimethyl carbonate (also written as "DMC") (volume ratio 3:4:3) so that its concentration would be 1.0 mol/L, thus forming a basic electrolytic solution. Further, 1.0 mass % of the compound (1-1) as an additive was added to the basic electrolytic solution. In this manner, a nonaqueous electrolytic solution of Example 1-1 was prepared.

[Fabrication of Positive Electrode]

In N-methylpyrrolidone solvent, 90 mass % of lithium cobalt nickel manganese oxide (LiNi$_{1/3}$Co$_{1/3}$Mn$_{1/3}$O$_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Fabrication of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated.

In the dried negative electrode, the mass ratio of amorphous coated graphite:sodium carboxymethylcellulose:styrene butadiene rubber was 97.5:1.5:1.

[Fabrication of Secondary Battery]

The positive electrode and the negative electrode described above, and a polypropylene separator were stacked in the order of the negative electrode, the separator and the positive electrode, thus forming a battery element. The battery element was inserted into a bag which was made of a laminate film of aluminum (thickness 40 µm) coated with resin layers on both sides, while ensuring that the terminals of the positive electrode and the negative electrode extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

The nonaqueous electrolyte secondary battery was immersed in an ethanol bath, and the initial volume of the battery was measured based on the buoyancy (Archimedes' principle). While being pressed between glass plates, the battery was charged at 25° C. and at a constant current corresponding to 0.2 C to 4.1 V and then at the constant voltage (such charging is also written as "CC-CV charging") (0.05 C cutoff), and was discharged to 3.0 V at a constant current of ⅓ C. Thereafter, the battery was CC-CV charged at a current corresponding to ⅓ C to 4.1 V (0.05 C cutoff) and was allowed to stand at 60° C. for 12 hours. After being cooled sufficiently, the battery was discharged at a constant current of ⅓ C to 3.0 V. Next, the battery was CC-CV charged at ⅓ C to 4.2 V (0.05 C cutoff) and was discharged again at ⅓ C to 3.0 V. In this manner, initial battery characteristics were stabilized. Thereafter, the battery was CC-CV charged at 0.2 C to 4.2 V (0.05 C cutoff) and was discharged at ⅓ C to 3.0 V, thereby determining the initial ⅓ C capacity. Thereafter, the battery was immersed in an ethanol bath and the volume was measured. The initial gas production was obtained by determining the change in volume from the initial volume of the battery.

Here, 1 C indicates a value of current at which a reference capacity of a battery is discharged in 1 hour. For example, 0.2 C indicates a current that is ⅕ of the 1 C current.

[Evaluation of Overcharge Characteristics]

After the evaluation of initial battery characteristics, the nonaqueous electrolyte secondary battery was CC-CV charged at 25° C. and at a constant current of ⅓ C to 4.2 V (0.05 C cutoff). Thereafter, the battery was overcharged at 45° C. and at a constant current of 1 C for 48 minutes. After being cooled sufficiently, the open circuit voltage (OCV) of the battery was measured. The OCV after overcharging was thus obtained.

The OCV of a battery after overcharge testing mainly reflects the potential of a positive electrode. Specifically, a lower OCV after overcharging indicates a smaller charge depth in a positive electrode. Usually, the increase in the charge depth in a positive electrode results in the dissolution of metal and the release of oxygen from the positive electrode, thus initiating a thermal runaway of the battery. Thus, the safety of overcharged batteries may be ensured by the reduction of the OCV after overcharging.

The nonaqueous electrolyte secondary battery fabricated hereinabove was tested to evaluate the initial battery characteristics and the overcharge characteristics. The evaluation results are shown in Table 1 relative to the results of Comparative Example 1-1 taken as 100.0%. The OCV after overcharging is indicated as the difference from the value in Comparative Example 1-1. The same applies hereinafter.

Comparative Example 1-1

A nonaqueous electrolyte secondary battery was fabricated and tested in the same manner as in Example 1-1, except that the electrolytic solution of Example 1-1 did not contain the compound (1-1).

Comparative Example 1-2

A nonaqueous electrolyte secondary battery was fabricated and tested in the same manner as in Example 1-1, except that the compound (1-1) used in the electrolytic solution of Example 1-1 was replaced by 1.0 mass % of the compound (3-2).

TABLE 1

| | Additive | Initial ⅓ C capacity/% | Initial gas production/% | OCV after overcharging/V |
|---|---|---|---|---|
| Ex. 1-1 | Compound (1-1) 1.0 mass % | 100.3 | 90.1 | −69.0 |
| Comp. Ex. 1-1 | — | 100.0 | 100.0 | 0.0 |
| Comp. Ex. 1-2 | Compound (3-2) 1.0 mass % | 100.1 | 102.3 | −34.5 |

From Table 1, the use of the nonaqueous electrolytic solution of Example 1-1 according to the invention resulted in a higher initial ⅓ C capacity and a smaller initial gas production than when no esters of Formula (1) had been added (Comparative Example 1-1). Further, the battery had a low OCV after overcharging as compared to Comparative Example 1-1, achieving higher safety. That is, the use of the inventive electrolytic solutions makes it possible to obtain batteries having excellent initial battery characteristics and excellent safety after overcharge resistance testing.

When the aromatic compound outside the category of the esters represented by Formula (1) was used (Comparative Example 1-2), the initial rate 1/3 capacity was enhanced as compared to Comparative Example 1-1 but the improvement was smaller than that obtained in Example 1-1. Further, the initial gas production was increased as compared to Comparative Example 1-1. Furthermore, the OCV after overcharging was lower than that in Comparative Example 1-1 but was inferior to Example 1-1. It is thus clear that the use of the inventive electrolytic solutions provides excellent battery characteristics.

⟨Examples 2-1 to 2-3 and Comparative Examples 2-1 to 2-3⟩

Example 2-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and dimethyl carbonate (DMC) (volume ratio 3:4:3) so that its concentration would be 1.0 mol/L, thus forming a basic electrolytic solution. Further, 4.5 mass % of the compound (1-1) as an additive was added to the basic electrolytic solution. In this manner, a nonaqueous electrolytic solution of Example 2-1 was prepared.

[Fabrication of Positive Electrode]

In N-methylpyrrolidone solvent, 90 mass % of lithium cobalt nickel manganese oxide ($LiNi_{1/3}Co_{1/3}Mn_{1/3}O_2$) as a positive electrode active material, 7 mass % of acetylene black as a conductive material and 3 mass % of polyvinylidene fluoride (PVdF) as a binder were mixed together with use of a disperser to give a slurry. The slurry was uniformly applied onto a surface of a 15 μm thick aluminum foil, and was dried and pressed. A positive electrode was thus fabricated.

[Fabrication of Negative Electrode]

A slurry was prepared by mixing an amorphous coated graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of amorphous coated graphite:sodium carboxymethylcellulose:styrene butadiene rubber was 97.5:1.5:1.

[Fabrication of Secondary Battery]

The positive electrode and the negative electrode described above, and a polypropylene separator were stacked in the order of the negative electrode, the separator and the positive electrode, thus forming a battery element. The battery element was inserted into a bag which was made of a laminate film of aluminum (thickness 40 μm) coated with resin layers on both sides, while ensuring that the terminals of the positive electrode and the negative electrode extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.2 C to 4.1 V and then at the constant voltage (such charging is also written as "CC-CV charging") (0.05 C cutoff), and was discharged to 3.0 V at a constant current of ⅓ C. The ratio of the discharge capacity to the charge capacity obtained during this process was determined as the first efficiency (%). Thereafter, the battery was CC-CV charged at a current corresponding to ⅓ C to 4.1 V (0.05 C cutoff) and was allowed to stand at 60° C. for 12 hours. After being cooled sufficiently, the battery was discharged at a constant current of ⅓ C to 3.0 V. Next, the battery was CC-CV charged at ⅓ C to 4.2 V (0.05 C cutoff) and was discharged again at ⅓ C to 3.0 V. In this manner, initial battery characteristics were stabilized.

Here, 1 C indicates a value of current at which a reference capacity of a battery is discharged in 1 hour. For example, 0.2 C indicates a current that is ⅕ of the 1 C current.

[Evaluation of Overcharge Characteristics]

After the evaluation of initial battery characteristics, the nonaqueous electrolyte secondary battery was CC-CV charged at 25° C. and at a constant current of ⅓ C to 4.2 V (0.05 C cutoff). The battery was then immersed in an ethanol bath, and the volume of the battery before overcharging was measured based on the buoyancy (Archimedes' principle). Thereafter, the battery was overcharged at 45° C. and at a constant current of 1 C for 48 minutes. After being cooled sufficiently, the battery was immersed in an ethanol bath and its volume was measured. The change in battery volume from before the overcharging was obtained as the overcharge gas production.

In such types of batteries in which a safety valve is operated upon a detection of an unusual increase in internal pressure due to abnormalities such as overcharging, the generation of a larger amount of overcharge gas is more advantageous because the safety valve can be operated early and consequently the battery safety in the event of overcharging can be ensured.

The nonaqueous electrolyte secondary battery fabricated hereinabove was tested to evaluate the initial battery characteristics and the overcharge characteristics. The evaluation results are shown in Table 2 relative to the results of Comparative Example 2-1 taken as 100.0%. The same applies hereinafter.

Example 2-2

A nonaqueous electrolyte secondary battery was fabricated and tested in the same manner as in Example 2-1, except that the compound (1-1) used in the electrolytic solution of Example 2-1 was replaced by 4.1 mass % of the compound (1-2). The substance amount of the compound (1-2) used in Example 2-2 was the same as that of the compound (1-1) used in Example 2-1.

Example 2-3

A nonaqueous electrolyte secondary battery was fabricated and tested in the same manner as in Example 2-1, except that the compound (1-1) used in the electrolytic solution of Example 2-1 was replaced by 4.8 mass % of the compound (1-3). The substance amount of the compound (1-3) used in Example 2-3 was the same as that of the compound (1-1) used in Example 2-1.

Comparative Example 2-1

A nonaqueous electrolyte secondary battery was fabricated and tested in the same manner as in Example 2-1, except that the electrolytic solution of Example 2-1 did not contain the compound (1-1).

Comparative Example 2-2

A nonaqueous electrolyte secondary battery was fabricated and tested in the same manner as in Example 2-1, except that the compound (1-1) used in the electrolytic solution of Example 2-1 was replaced by 4.1 mass % of the compound (3-3). The substance amount of the compound (3-3) used in Comparative Example 2-2 was the same as that of the compound (1-1) used in Example 2-1.

Comparative Example 2-3

A nonaqueous electrolyte secondary battery was fabricated and tested in the same manner as in Example 2-1, except that the compound (1-1) used in the electrolytic solution of Example 2-1 was replaced by 3.4 mass % of the compound (3-4). The substance amount of the compound (3-4) used in Comparative Example 2-3 was the same as that of the compound (1-1) used in Example 2-1.

TABLE 2

| | Additive | First efficiency/% | Overcharge gas production/% |
|---|---|---|---|
| Ex. 2-1 | Compound (1-1) 4.5 mass % | 100.06 | 427.4 |
| Ex. 2-2 | Compound (1-2) 4.1 mass % | 100.74 | 305.9 |
| Ex. 2-3 | Compound (1-3) 4.8 mass % | 100.05 | 350.4 |
| Comp. Ex. 2-1 | — | 100.00 | 100.0 |

TABLE 2-continued

| | Additive | First efficiency/% | Overcharge gas production/% |
|---|---|---|---|
| Comp. Ex. 2-2 | Compound (3-3) 4.1 mass % | 98.84 | 205.9 |
| Comp. Ex. 2-3 | Compound (3-4) 3.4 mass % | 76.24 | 888.9 |

From Table 2, the use of the nonaqueous electrolytic solutions of Examples 2-1 to 2-3 according to the invention resulted in higher first efficiency than when no esters of Formula (1) had been added (Comparative Example 2-1). Further, the batteries had a large overcharge gas production as compared to Comparative Example 2-1, achieving higher safety. That is, the use of the inventive electrolytic solutions makes it possible to obtain batteries having excellent initial battery characteristics and excellent safety after overcharge durability testing.

The use of the aromatic compound other than those of Formula (1) alone (Comparative Examples 2-2 and 2-3) resulted in an increase in overcharge gas production as compared to Comparative Example 2-1 but also resulted in a significant decrease in initial efficiency from the level of Comparative Example 2-1. It is thus clear that the use of the inventive electrolytic solutions provides excellent battery characteristics.

⟨Examples 3-1 and 3-2, and Comparative Example 3-1⟩

Example 3-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and dimethyl carbonate (DMC) (volume ratio 15:5:80) so that its concentration would be 1.4 mol/L, thus forming a basic electrolytic solution. Further, 1.5 mass % of the compound (1-4) as an additive was added to the basic electrolytic solution. In this manner, a nonaqueous electrolytic solution of Example 3-1 was prepared.

[Fabrication of Positive Electrode]

In N-methylpyrrolidone solvent, 97 mass % of a nickel-containing transition metal oxide as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polyethylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 4 hours and was discharged at a constant current of 0.2 C to 2.5 V. Further, the battery was charged at a constant current corresponding to 0.1 C to 4.1 V and was discharged at a constant current of 0.2 C to 2.5 V. Next, the battery was CC-CV charged at 0.2 C to 4.1 V (0.05 C cutoff) and was discharged to 2.5 V at a constant current of 0.2 C. Next, the battery was CC-CV charged at 0.2 C to 4.1 V (0.05 C cutoff) and was allowed to stand at 45° C. for 72 hours. Thereafter, the battery was discharged again at 25° C. and at 0.2 C to 2.5 V. In this manner, initial battery characteristics were stabilized. The initial capacity loss was obtained by determining the difference between the total of the charge capacities in the four charging processes and the total of the discharge capacities in the four discharging processes.

Here, 1 C indicates a value of current at which a reference capacity of a battery is discharged in 1 hour. For example, 0.2 C indicates a current that is ⅕ of the 1 C current.

[Evaluation of Overcharge Characteristics]

After the evaluation of initial battery characteristics, the nonaqueous electrolyte secondary battery was CC-CV charged at 25° C. and at 0.2 C to 4.2 V (0.05 C cutoff). The battery was then immersed in an ethanol bath, and the volume of the battery before overcharging was measured based on the buoyancy (Archimedes' principle). Thereafter, the battery was charged at 45° C. and at a constant current of 1 C for 15 minutes. After being cooled sufficiently, the battery was immersed in an ethanol bath and its volume was measured. The change in battery volume from before the overcharging was obtained as the overcharge gas production.

In such types of batteries in which a safety valve is operated upon a detection of an unusual increase in internal pressure due to abnormalities such as overcharging, the generation of a larger amount of overcharge gas is more advantageous because the safety valve can be operated early and consequently the battery safety in the event of overcharging can be ensured.

The nonaqueous electrolyte secondary battery fabricated hereinabove was tested to evaluate the initial battery characteristics and the overcharge characteristics. The evaluation results are shown in Table 3 relative to the results of Comparative Example 3-1 taken as 100.0%. The same applies hereinafter.

Example 3-2

A nonaqueous electrolyte secondary battery was fabricated and tested to evaluate initial battery characteristics and overcharge characteristics in the same manner as in Example 3-1, except that 1.5 mass % of the compound (1-4) used in the electrolytic solution of Example 3-1 was replaced by 2.5 mass % of the compound (1-4). The evaluation results are shown in Table 3 relative to the results of Comparative Example 3-1 taken as 100.0%. The same applies hereinafter.

Comparative Example 3-1

A nonaqueous electrolyte secondary battery was fabricated and tested in the same manner as in Example 3-1, except that the electrolytic solution of Example 3-1 did not contain the compound (1-4).

TABLE 3

| | Additive | Initial capacity loss/% | Overcharge gas production/% |
|---|---|---|---|
| Ex. 3-1 | Compound (1-4) 1.5 mass % | 93.4 | 135.6 |
| Ex. 3-2 | Compound (1-4) 2.5 mass % | 99.7 | 155.6 |
| Comp. Ex. 3-1 | — | 100.0 | 100.0 |

From Table 3, the use of the nonaqueous electrolytic solutions of Examples 3-1 and 3-2 according to the invention resulted in lower initial capacity losses than when no esters of Formula (1) had been added (Comparative Example 3-1). Further, the batteries had a large overcharge gas production as compared to Comparative Example 3-1, achieving higher safety. That is, the use of the inventive electrolytic solutions makes it possible to obtain batteries having excellent initial battery characteristics and excellent safety after overcharge durability testing.

⟨Examples 4-1 to 4-3 and Comparative Examples 4-1 to 4-3⟩

Example 4-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (also written as "DEC") (volume ratio 3:4:3) so that its concentration would be 1.2 mol/L. As additives, 2.0 mass % of monofluoroethylene carbonate (also written as "MP2") and 2.0 mass % of vinylene carbonate (also written as "VC") were dissolved therein, thus forming a basic electrolytic solution. Further, 0.5 mass % of the compound (1-1) was added. In this manner, a nonaqueous electrolytic solution of Example 4-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite:sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was allowed to stand at 45° C. for 72 hours. Thereafter, the battery was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff) and was discharged at 0.2 C to 3.0 V, thereby determining the initial 0.2 C capacity. Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was immersed in an ethanol bath, and the volume of the battery before the testing of high-temperature storage durability was measured based on the buoyancy (Archimedes' principle). Thereafter, the battery was stored at a high temperature of 60° C. for 7 days. After being cooled sufficiently, the battery was immersed in an ethanol bath, and its volume was measured. Based on the volume change before and after the high-temperature storage durability test, the storage gas production was determined.

The nonaqueous electrolyte secondary battery fabricated hereinabove was tested to evaluate the initial battery characteristics and the high-temperature storage durability. The evaluation results are shown in Table 4 relative to the results of Comparative Example 4-1 taken as 100.0%. The same applies hereinafter.

Example 4-2

A nonaqueous electrolyte secondary battery was fabricated and tested in the same manner as in Example 4-1, except that 0.5 mass % of the compound (1-1) used in the electrolytic solution of Example 4-1 was replaced by 1.0 mass % of the compound (1-1).

Example 4-3

A nonaqueous electrolyte secondary battery was fabricated and tested in the same manner as in Example 4-1, except that 0.5 mass % of the compound (1-1) used in the electrolytic solution of Example 4-1 was replaced by 1.0 mass % of the compound (1-1) and 3.0 mass % of 1-phenyl-1,3,3-trimethylindane (also written as "MP12").

Comparative Example 4-1

A nonaqueous electrolyte secondary battery was fabricated and tested in the same manner as in Example 4-1, except that the electrolytic solution of Example 4-1 did not contain the compound (1-1).

Comparative Example 4-2

A nonaqueous electrolyte secondary battery was fabricated and tested in the same manner as in Example 4-3, except that the electrolytic solution of Example 4-3 did not contain the compound (1-1).

Comparative Example 4-3

A nonaqueous electrolyte secondary battery was fabricated and tested in the same manner as in Example 4-1, except that 0.5 mass % of the compound (1-1) used in the electrolytic solution of Example 4-1 was replaced by 1.0 mass % of the compound (3-2).

TABLE 4

| | Additives | | Initial 0.2 C capacity/% | Storage gas production/% |
|---|---|---|---|---|
| Ex. 4-1 | Compound (1-1) | 0.5 mass % | 100.28 | 73.3 |
| Ex. 4-2 | Compound (1-1) | 1.0 mass % | 100.42 | 81.9 |
| Ex. 4-3 | Compound (1-1) MP12 | 1.0 mass % 3.0 mass % | 100.37 | 99.0 |
| Comp. Ex. 4-1 | — | | 100.00 | 100.0 |
| Comp. Ex. 4-2 | MP12 | 3.0 mass % | 100.32 | 107.6 |
| Comp. Ex. 4-3 | Compound (3-2) | 1.0 mass % | 100.17 | 112.4 |

From Table 4, the use of the nonaqueous electrolytic solutions of Example 4-1, Example 4-2 and Example 4-3 according to the invention resulted in higher initial 0.2 C capacities and smaller storage gas productions during the high-temperature storage durability test than when no esters of Formula (1) had been added (Comparative Example 4-1). That is, the use of the inventive electrolytic solutions makes it possible to obtain batteries having excellent initial battery characteristics and excellent battery characteristics after the testing of high-temperature storage durability.

When the aromatic compound other than the compounds represented by Formula (1) or the aromatic compound outside the category of the esters represented by Formula (2) was used alone (Comparative Example 4-2 or Comparative Example 4-3), the initial 0.2 C capacity was enhanced from the level in Comparative Example 4-1 but an increased amount of storage gas was generated as compared to Comparative Example 4-1. It is thus clear that the use of the inventive electrolytic solutions provides excellent battery characteristics.

⟨Examples 5-1 to 5-4 and Comparative Examples 5-1 to 5-3⟩

Example 5-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 1.0 mass % of the compound (1-1) was added. In this manner, a nonaqueous electrolytic solution of Example 5-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 21 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 12 μm thick copper foil, and was dried and pressed. A negative electrode was thus fabricated. In the dried negative electrode, the mass ratio of natural graphite:sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was allowed to stand at 45° C. for 72 hours. Thereafter, the battery was discharged at a constant current of 0.2 C to 3 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff) and was discharged at 0.2 C to 3.0 V, thereby determining the initial 0.2 C capacity. Further, the battery was CC-CV charged at 0.2 C to 4.4 V (0.05 C cutoff) and was discharged at 0.5 C to 3.0 V, thereby determining the initial 0.5 C capacity. The ratio of the initial 0.5 C capacity to the initial 0.2 C capacity was obtained as the initial rate characteristic (%).

Here, 1 C indicates a value of current at which a reference capacity of a battery is discharged in 1 hour. For example, 0.2 C indicates a current that is 1/5 of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Overcharge Characteristics after Testing of High-Temperature Storage Durability]

After the testing of high-temperature storage durability as an evaluation of battery characteristics, the nonaqueous electrolyte secondary battery was CC-CV charged at 25° C. and at a constant current of 0.2 C to 4.4 V (0.05 C cutoff). Thereafter, the battery was overcharged at 45° C. and at a constant current of 0.2 C to 5.0 V. After the battery had been cooled sufficiently, the open circuit voltage (OCV) was measured. The OCV after overcharging was thus obtained.

The OCV of a battery after overcharge testing mainly reflects the potential of a positive electrode. Specifically, a lower OCV after overcharging indicates a smaller charge depth in a positive electrode. Usually, the increase in the charge depth in a positive electrode results in the dissolution of metal and the release of oxygen from the positive electrode, thus initiating a thermal runaway of the battery. Thus, the safety of overcharged batteries may be ensured by the reduction of the OCV after overcharging.

The nonaqueous electrolyte secondary battery fabricated hereinabove was tested to evaluate the initial battery characteristics, the high-temperature storage durability and the overcharge characteristics after the testing of high-temperature storage durability. The evaluation results are shown in Table 5 relative to the results of Comparative Example 5-1 taken as 100.0%. The OCV after overcharging is indicated as the difference from the value in Comparative Example 5-1. The same applies hereinafter.

Example 5-2

A nonaqueous electrolyte secondary battery was fabricated and tested in the same manner as in Example 5-1, except that the electrolytic solution of Example 5-1 containing the compound (1-1) further contained 2.0 mass % of monofluoroethylene carbonate (hereinafter, also written as "MP2").

Example 5-3

A nonaqueous electrolyte secondary battery was fabricated and tested in the same manner as in Example 5-2, except that the electrolytic solution of Example 5-2 containing the compound (1-1) and MP2 further contained 2.0 mass % of vinylene carbonate (hereinafter, also written as "VC").

Example 5-4

A nonaqueous electrolyte secondary battery was fabricated and tested in the same manner as in Example 5-3, except that the compound (1-1) used in the electrolytic solution of Example 5-3 was replaced by 1.0 mass % of the compound (1-4).

Comparative Example 5-1

A nonaqueous electrolyte secondary battery was fabricated and tested in the same manner as in Example 5-1, except that the electrolytic solution of Example 5-1 did not contain the compound (1-1).

Comparative Example 5-2

A nonaqueous electrolyte secondary battery was fabricated and tested in the same manner as in Example 5-2, except that the electrolytic solution of Example 5-2 did not contain the compound (1-1).

Comparative Example 5-3

A nonaqueous electrolyte secondary battery was fabricated and tested in the same manner as in Example 5-4, except that the electrolytic solution of Example 5-4 did not contain the compound (1-4).

TABLE 5

| | Additives | | Initial 0.2 C capacity/% | Initial rate characteristic/% | OCV after overcharging/mV |
|---|---|---|---|---|---|
| Ex. 5-1 | Compound (1-1) | 1.0 mass % | 100.11 | 100.11 | −153.8 |
| Ex. 5-2 | Compound (1-1) | 1.0 mass % | 98.67 | 101.29 | −164.0 |
| | MP2 | 2.0 mass % | | | |
| Ex. 5-3 | Compound (1-1) | 1.0 mass % | 98.25 | 101.87 | −174.2 |
| | MP2 | 2.0 mass % | | | |
| | VC | 2.0 mass % | | | |
| Ex. 5-4 | Compound (1-4) | 1.0 mass % | 98.16 | 101.73 | −159.8 |
| | MP2 | 2.0 mass % | | | |
| | VC | 2.0 mass % | | | |
| Comp. Ex. 5-1 | — | | 100.00 | 100.00 | 0.0 |
| Comp. Ex. 5-2 | MP2 | 2.0 mass % | 98.45 | 101.25 | −5.3 |
| Comp. Ex. 5-3 | MP2 | 2.0 mass % | 97.91 | 101.71 | −23.6 |
| | VC | 2.0 mass % | | | |

From Table 5, the use of the nonaqueous electrolytic solution of Example 5-1 according to the invention resulted in a higher initial 0.2 C capacity and a higher initial rate characteristic than when no esters of Formula (1) had been added (Comparative Example 5-1). Further, as compared to Comparative Example 5-1, the battery had a low OCV after the battery had been overcharged after the testing of high-temperature storage durability, achieving higher safety. That is, the use of the inventive electrolytic solutions makes it possible to obtain batteries having excellent initial battery characteristics and excellent battery characteristics and safety after the testing of high-temperature storage durability.

When the ester of Formula (1) was used together with the fluorine-containing cyclic carbonate or the cyclic carbonate having a carbon-carbon unsaturated bond (Examples 5-2 to 5-4), the initial 0.2 C capacity and the initial rate characteristic were enhanced as compared to when no esters of Formula (1) had been added (Comparative Examples 5-2 and 5-3). Further, as compared to Comparative Examples 5-2 and 5-3, the batteries had a low OCV after the batteries had been overcharged after the testing of high-temperature storage durability, achieving higher safety. That is, the use of the inventive electrolytic solutions makes it possible to obtain batteries having excellent initial battery characteristics and excellent battery characteristics and safety after the testing of high-temperature storage durability.

The above results have confirmed that battery characteristics are specifically improved by the synergetic effect of the combined use of the esters of Formula (1) and fluorine-containing cyclic carbonates or cyclic carbonates having a carbon-carbon unsaturated bond.

⟨Example 6-1 and Comparative Examples 6-1 to 6-3⟩

Example 6

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of triethyl phosphonoacetate (also written as "MP1") as additives were added to the basic electrolytic solution. In this manner, a nonaqueous electrolytic solution of Example 6-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

The nonaqueous electrolyte secondary battery was immersed in an ethanol bath, and the initial volume of the battery was measured based on the buoyancy (Archimedes' principle). While being pressed between glass plates, the battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3 V. Next, the battery was CC-CV charged at 0.2 C to 4.40 V (0.05 C cutoff) and was discharged again at 0.2 C to 3 V. In this manner, initial battery characteristics were stabilized. Thereafter, the battery was immersed in an ethanol bath and the volume was measured. The initial gas production was obtained by determining the change from the initial volume of the battery. Thereafter, the battery was CC-CV charged at 0.2 C to 4.40 V (0.05 C cutoff) and was discharged at 0.2 C to 3 V, thereby determining the initial 0.2 C capacity. Further, the battery was CC-CV charged at 0.2 C to 4.40 V (0.05 C cutoff) and was discharged at 0.5 C to 3 V, thereby determining the initial 0.5 C capacity. The ratio of the initial 0.5 C capacity to the initial 0.2 C capacity was obtained as the initial rate characteristic (%).

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.40 V (0.05 C cutoff). Thereafter, the battery was stored at a high temperature of 85° C. for 1 day. After being cooled sufficiently, the battery was discharged at 25° C. and at 0.2 C to 3 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff). Thereafter, the battery was discharged again at 0.2 C to 3 V. The capacity was obtained as the recovered 0.2 C capacity.

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 6 relative to the results of Comparative Example 6-1 taken as 100.0%. The same applies hereinafter.

Comparative Example 6-1

A nonaqueous electrolyte secondary battery was fabricated and tested in the same manner as in Example 6-1, except that the electrolytic solution of Example 6-1 did not contain the compound (2-1) and MP1.

Comparative Example 6-2

A nonaqueous electrolyte secondary battery was fabricated and tested in the same manner as in Example 6-1, except that the electrolytic solution of Example 6-1 did not contain MP1.

Comparative Example 6-3

A nonaqueous electrolyte secondary battery was fabricated and tested in the same manner as in Example 6-1, except that the electrolytic solution of Example 6-1 did not contain the compound (2-1).

TABLE 6

| | Additives | | Initial gas production/% | Initial rate characteristic/% | Recovered 0.2 C capacity/% |
|---|---|---|---|---|---|
| Ex. 6-1 | Compound (2-1) | 0.5 mass % | 136.0 | 100.38 | 102.14 |
| | MP1 | 0.5 mass % | | | |
| Comp. Ex. 6-1 | — | | 100.0 | 100.00 | 100.00 |
| Comp. Ex. 6-2 | Compound (2-1) | 0.5 mass % | 140.0 | 100.25 | 100.74 |
| Comp. Ex. 6-3 | MP1 | 0.5 mass % | 158.7 | 100.34 | 101.22 |

From Table 6, the use of the nonaqueous electrolytic solution of Example 6-1 according to the invention resulted in a high initial rate characteristic and a high recovered 0.2 C capacity after the testing of high-temperature storage durability as compared to when no esters of Formula (2) and no phosphonate esters had been added at the same time (Comparative Example 6-1). That is, the use of the inventive electrolytic solutions makes it possible to obtain batteries having excellent initial battery characteristics and excellent battery characteristics after the testing of high-temperature storage durability.

When the ester of Formula (2) was used alone (Comparative Example 6-2), the battery exhibited an enhanced initial rate characteristic as compared to Comparative Example 6-1 but the initial gas production was increased from the level in Example 6-1. While the recovered 0.2 C capacity was enhanced as compared to Comparative Example 6-1, the improvement was smaller than that obtained in Example 6-1. It is thus clear that the use of the inventive electrolytic solutions provides excellent battery characteristics.

When the phosphonate ester was used alone (Comparative Example 6-3), the battery exhibited an enhanced initial rate characteristic as compared to Comparative Example 6-1 but the initial gas production was increased from the level in Example 6-1. While the recovered 0.2 C capacity was enhanced as compared to Comparative Example 6-1, the improvement was smaller than that obtained in Example 6-1. It is thus clear that the use of the inventive electrolytic solutions provides excellent battery characteristics.

The above results have confirmed that battery characteristics are specifically improved by the synergetic effect of the combined use of the esters of Formula (2) and phosphonate esters.

⟨Example 7-1 and Comparative Examples 7-1 to 7-3⟩

Example 7-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of monofluoroethylene carbonate (also written as "MP2") as additives were added to the basic electrolytic solution. In this manner, a nonaqueous electrolytic solution of Example 7-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

The nonaqueous electrolyte secondary battery was immersed in an ethanol bath, and the initial volume of the battery was measured based on the buoyancy (Archimedes' principle). While being pressed between glass plates, the battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff). The nonaqueous electrolyte secondary battery was then immersed in an ethanol bath and the volume was measured. The initial gas production was obtained by determining the change from the initial volume of the battery.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Overcharge Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff). The battery was then immersed in an ethanol bath, and the volume of the battery before overcharging was measured based on the buoyancy. Thereafter, the battery was overcharged at 45° C. and at a constant current of 0.2 C to 5.0 V. After being cooled sufficiently, the battery was immersed in an ethanol bath and its volume was measured. The change in battery volume from before the overcharging was obtained as the overcharge gas production.

In such types of batteries in which a safety valve is operated upon a detection of an unusual increase in internal pressure due to abnormalities such as overcharging, the generation of a larger amount of overcharge gas is more advantageous because the safety valve can be operated early and consequently the battery safety in the event of overcharging can be ensured.

The nonaqueous electrolyte secondary battery fabricated hereinabove was tested to evaluate the initial battery characteristics, the high-temperature storage durability and the overcharge characteristics after the testing of high-temperature storage durability. The evaluation results are shown in Table 7 relative to the results of Comparative Example 7-1 taken as 100.0%. The same applies hereinafter.

Comparative Example 7-1

A nonaqueous electrolyte secondary battery was fabricated and tested in the same manner as in Example 7-1, except that the electrolytic solution of Example 7-1 did not contain the compound (2-1) and MP2.

Comparative Example 7-2

A nonaqueous electrolyte secondary battery was fabricated and tested in the same manner as in Example 7-1, except that the electrolytic solution of Example 7-1 did not contain MP2.

Comparative Example 7-3

A nonaqueous electrolyte secondary battery was fabricated and tested in the same manner as in Example 7-1, except that the electrolytic solution of Example 7-1 did not contain the compound (2-1).

TABLE 7

| | Additives | | Initial gas production/ % | Overcharge gas production/ % |
|---|---|---|---|---|
| Ex. 7-1 | Compound (2-1) | 0.5 mass % | 74.7 | 333.3 |
| | MP2 | 0.5 mass % | | |
| Comp. Ex. 7-1 | — | | 100.0 | 100.0 |
| Comp. Ex. 7-2 | Compound (2-1) | 0.5 mass % | 140.0 | 311.1 |
| Comp. Ex. 7-3 | MP2 | 0.5 mass % | 84.0 | 66.7 |

From Table 7, the use of the nonaqueous electrolytic solution of Example 7-1 according to the invention resulted in a small initial gas production and a large overcharge gas production after the testing of high-temperature storage durability as compared to when no esters of Formula (2) and no fluorine-containing cyclic carbonates had been added at the same time (Comparative Example 7-1). That is, the use of the inventive electrolytic solutions makes it possible to obtain batteries having excellent initial battery characteristics and excellent overcharge characteristics evaluated after the testing of high-temperature storage durability.

The use of the ester of Formula (2) alone (Comparative Example 7-2) resulted in an increase in initial gas production from the level in Comparative Example 7-1. While the overcharge gas production was increased as compared to Comparative Example 7-1, the improvement was smaller than that obtained in Example 7-1. It is thus clear that the use of the inventive electrolytic solutions provides excellent battery characteristics.

While the use of the fluorine-containing cyclic carbonate alone (Comparative Example 7-3) reduced the initial gas production as compared to the level in Comparative Example 7-1, the improvement was smaller than that obtained in Example 7-1. Further, the overcharge gas production was smaller than Comparative Example 7-1. It is thus clear that the use of the inventive electrolytic solutions provides excellent battery characteristics.

The above results have confirmed that battery characteristics are specifically improved by the synergetic effect of the combined use of the esters of Formula (2) and fluorine-containing cyclic carbonates.

⟨Example 8-1 and Comparative Examples 8-1 to 8-3⟩

Example 8-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of lithium fluorosulfonate (also written as "MP3") as additives were added to the basic electrolytic solution. In this manner, a nonaqueous electrolytic solution of Example 8-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff) and was discharged at 1 C to 3.0 V, thereby determining the initial 1 C capacity.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff). Thereafter, the battery was discharged again at 0.2 C to 3.0 V. The capacity was obtained as the recovered 0.2 C capacity.

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 8 relative to the results of Comparative Example 8-1 taken as 100.0%. The same applies hereinafter.

Comparative Example 8-1

A nonaqueous electrolyte secondary battery was fabricated and tested in the same manner as in Example 8-1, except that the electrolytic solution of Example 8-1 did not contain the compound (2-1) and MP3.

Comparative Example 8-2

A nonaqueous electrolyte secondary battery was fabricated and tested in the same manner as in Example 8-1, except that the electrolytic solution of Example 8-1 did not contain MP3.

Comparative Example 8-3

A nonaqueous electrolyte secondary battery was fabricated and tested in the same manner as in Example 8-1, except that the electrolytic solution of Example 8-1 did not contain the compound (2-1).

TABLE 8

| | Additives | | Initial 1 C capacity/% | Recovered 0.2 C capacity/% |
|---|---|---|---|---|
| Ex. 8-1 | Compound (2-1) MP3 | 0.5 mass % 0.5 mass % | 100.69 | 100.79 |
| Comp. Ex. 8-1 | — | | 100.00 | 100.00 |
| Comp. Ex. 8-2 | Compound (2-1) | 0.5 mass % | 100.17 | 100.74 |
| Comp. Ex. 8-3 | MP3 | 0.5 mass % | 100.59 | 100.52 |

From Table 8, the use of the nonaqueous electrolytic solution of Example 8-1 according to the invention resulted in a high initial 1 C capacity and a high recovered 0.2 C capacity after the testing of high-temperature storage durability as compared to when no esters of Formula (2) and no fluorosulfonate salts had been added at the same time (Comparative Example 8-1). That is, the use of the inventive electrolytic solutions makes it possible to obtain batteries having excellent initial battery characteristics and excellent battery characteristics after the testing of high-temperature storage durability.

When the ester of Formula (2) was used alone (Comparative Example 8-2), the battery exhibited an enhanced initial 1 C capacity as compared to Comparative Example 8-1 but the improvement was smaller than that obtained in Example 8-1. While the recovered 0.2 C capacity was enhanced as compared to Comparative Example 8-1, the improvement was smaller than that obtained in Example 8-1. It is thus clear that the use of the inventive electrolytic solutions provides excellent battery characteristics.

When the fluorosulfonate salt was used alone (Comparative Example 8-3), the battery exhibited an enhanced initial 1 C capacity as compared to Comparative Example 8-1 but the improvement was smaller than that obtained in Example 8-1. While the recovered 0.2 C capacity was enhanced as compared to Comparative Example 8-1, the improvement was smaller than that obtained in Example 8-1. It is thus clear that the use of the inventive electrolytic solutions provides excellent battery characteristics.

The above results have confirmed that battery characteristics are specifically improved by the synergetic effect of the combined use of the esters of Formula (2) and fluorosulfonate salts.

Example 9-1 and Comparative Examples 9-1 to 9-3

Example 9-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of 1,3-bis(isocyanatomethyl)cyclohexane (also written as "MP4") as additives were added to the basic electrolytic solution. In this manner, a nonaqueous electrolytic solution of Example 9-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

The nonaqueous electrolyte secondary battery was immersed in an ethanol bath, and the initial volume of the battery was measured based on the buoyancy (Archimedes' principle). While being pressed between glass plates, the battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff). The battery was then immersed in an ethanol bath and the volume was measured. The initial gas production was obtained by determining the change from the initial volume of the battery.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff). Thereafter, the battery was discharged again at 0.2 C to 3.0 V. The capacity was obtained as the recovered 0.2 C capacity.

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 9 relative to the results of Comparative Example 9-1 taken as 100.0%. The same applies hereinafter.

Comparative Example 9-1

A nonaqueous electrolyte secondary battery was fabricated and tested in the same manner as in Example 9-1, except that the electrolytic solution of Example 9-1 did not contain the compound (2-1) and MP4.

Comparative Example 9-2

A nonaqueous electrolyte secondary battery was fabricated and tested in the same manner as in Example 9-1, except that the electrolytic solution of Example 9-1 did not contain MP4.

Comparative Example 9-3

A nonaqueous electrolyte secondary battery was fabricated and tested in the same manner as in Example 9-1, except that the electrolytic solution of Example 9-1 did not contain the compound (2-1).

TABLE 9

| | Additives | | Initial gas production/% | Recovered 0.2 C capacity/% |
|---|---|---|---|---|
| Ex. 9-1 | Compound (2-1) | 0.5 mass % | 66.7 | 100.80 |
| | MP4 | 0.5 mass % | | |
| Comp. Ex. 9-1 | — | | 100.0 | 100.00 |
| Comp. Ex. 9-2 | Compound (2-1) | 0.5 mass % | 140.0 | 100.74 |
| Comp. Ex. 9-3 | MP4 | 0.5 mass % | 81.3 | 100.12 |

From Table 9, the use of the nonaqueous electrolytic solution of Example 9-1 according to the invention resulted in a small initial gas production and a high recovered 0.2 C capacity after the testing of high-temperature storage durability as compared to when no esters of Formula (2) and no isocyanate group-containing organic compounds had been added at the same time (Comparative Example 9-1). That is, the use of the inventive electrolytic solutions makes it possible to obtain batteries having excellent initial battery characteristics and excellent battery characteristics after the testing of high-temperature storage durability.

When the ester of Formula (2) was used alone (Comparative Example 9-2), the initial gas production was increased from the level in Comparative Example 9-1. While the recovered 0.2 C capacity was enhanced as compared to Comparative Example 9-1, the improvement was smaller than that obtained in Example 9-1. It is thus clear that the use of the inventive electrolytic solutions provides excellent battery characteristics.

When the isocyanate group-containing organic compound was used alone (Comparative Example 9-3), the initial gas production was decreased from the level in Comparative Example 9-1 but was larger than that in Example 9-1. While the recovered 0.2 C capacity was enhanced as compared to Comparative Example 9-1, the improvement was smaller than that obtained in Example 9-1. It is thus clear that the use of the inventive electrolytic solutions provides excellent battery characteristics.

The above results have confirmed that battery characteristics are specifically improved by the synergetic effect of the combined use of the esters of Formula (2) and isocyanate group-containing organic compounds.

⟨Example 10-1 and Comparative Examples 10-1 to 10-3⟩

Example 10-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of adiponitrile (also written as "MP5") as additives were added to the basic electrolytic solution. In this manner, a nonaqueous electrolytic solution of Example 10-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethyicellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff) and was discharged at 0.5 C to 3.0 V, and the ratio of the discharge capacity to the charge capacity obtained during this process was determined as the initial 0.5 C efficiency (%).

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff). Thereafter, the battery was discharged again at 0.05 C to 3.0 V. The ratio of the discharge capacity to the charge capacity obtained during this process was determined as the recovered 0.05 C efficiency (%).

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 10 relative to the results of Comparative Example 10-1 taken as 100.0%. The same applies hereinafter.

Comparative Example 10-1

A nonaqueous electrolyte secondary battery was fabricated and tested in the same manner as in Example 10-1, except that the electrolytic solution of Example 10-1 did not contain the compound (2-1) and MP5.

Comparative Example 10-2

A nonaqueous electrolyte secondary battery was fabricated and tested in the same manner as in Example 10-1, except that the electrolytic solution of Example 10-1 did not contain MP5.

Comparative Example 10-3

A nonaqueous electrolyte secondary battery was fabricated and tested in the same manner as in Example 10-1, except that the electrolytic solution of Example 10-1 did not contain the compound (2-1).

TABLE 10

| | Additives | | Initial 0.5 C efficiency/% | Recovered 0.05 C efficiency/% |
|---|---|---|---|---|
| Ex. 10-1 | Compound (2-1) MP5 | 0.5 mass % 0.5 mass % | 100.0 | 100.8 |
| Comp. Ex. 10-1 | — | | 100.0 | 100.0 |
| Comp. Ex. 10-2 | Compound (2-1) | 0.5 mass % | 99.9 | 99.9 |
| Comp. Ex. 10-3 | MP5 | 0.5 mass % | 99.9 | 100.5 |

From Table 10, the use of the nonaqueous electrolytic solution of Example 10-1 according to the invention prevented a decrease in initial 0.5 C efficiency and provided an excellent recovered 0.05 C efficiency after the testing of high-temperature storage durability as compared to when no esters of Formula (2) and no cyano group-containing organic compounds had been added at the same time (Comparative Example 10-1). That is, the use of the inventive electrolytic solutions makes it possible to obtain batteries having excellent initial battery characteristics and excellent battery characteristics after the testing of high-temperature storage durability.

When the ester of Formula (2) was used alone (Comparative Example 10-2), the initial 0.5 C efficiency was decreased from the level in Comparative Example 10-1. Further, the recovered 0.05 C efficiency was lower than that in Comparative Example 10-1. It is thus clear that the use of the inventive electrolytic solutions provides excellent battery characteristics.

When the cyano group-containing organic compound was used alone (Comparative Example 10-3), the initial 0.5 C efficiency was decreased from the level in Comparative Example 10-1. While the recovered 0.05 C efficiency was enhanced as compared to Comparative Example 10-1, the improvement was smaller than that obtained in Example 10-1. It is thus clear that the use of the inventive electrolytic solutions provides excellent battery characteristics.

The above results have confirmed that battery characteristics are specifically improved by the synergetic effect of the combined use of the esters of Formula (2) and cyano group-containing organic compounds.

⟨Example 11-1 and Comparative Examples 11-1 to 11-3⟩

Example 11-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of hexamethyldisilane (also written as "MP6") as additives were added to the basic electrolytic solution. In this manner, a nonaqueous electrolytic solution of Example 11-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.4 V (0.05 C cutoff) and was discharged at 1 C to 3.0 V, thereby determining the initial 1 C capacity.

Here, 1 C indicates a value of current at which a reference capacity of a battery is discharged in 1 hour. For example, 0.2 C indicates a current that is 1/5 of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff). Thereafter, the battery was discharged again at 0.05 C to 3.0 V, and the capacity was obtained as the recovered 0.05 C capacity. Further, the ratio of the discharge capacity to the charge capacity obtained during this process was determined as the recovered 0.05 C efficiency (%).

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 11 relative to the results of Comparative Example 11-1 taken as 100.0%. The same applies hereinafter.

Comparative Example 11-1

A nonaqueous electrolyte secondary battery was fabricated and tested in the same manner as in Example 11-1, except that the electrolytic solution of Example 11-1 did not contain the compound (2-1) and MP6.

Comparative Example 11-2

A nonaqueous electrolyte secondary battery was fabricated and tested in the same manner as in Example 11-1, except that the electrolytic solution of Example 11-1 did not contain MP6.

Comparative Example 11-3

A nonaqueous electrolyte secondary battery was fabricated and tested in the same manner as in Example 11-1, except that the electrolytic solution of Example 11-1 did not contain the compound (2-1).

TABLE 11

| | Additives | | Initial 1 C capacity/ % | Recovered 0.05 C capacity/ % | Recovered 0.05 C efficiency/ % |
|---|---|---|---|---|---|
| Ex. 11-1 | Compound (2-1) | 0.5 mass % | 100.50 | 100.65 | 100.5 |
| | MP6 | 0.5 mass % | | | |
| Comp. Ex. 11-1 | — | | 100.00 | 100.00 | 100.0 |
| Comp. Ex. 11-2 | Compound (2-1) | 0.5 mass % | 100.17 | 100.63 | 99.9 |
| Comp. Ex. 11-3 | MP6 | 0.5 mass % | 100.35 | 99.96 | 100.4 |

From Table 11, the use of the nonaqueous electrolytic solution of Example 11-1 according to the invention resulted in a high initial 1 C capacity and also resulted in an excellent recovered 0.05 capacity and an excellent recovered 0.05 C efficiency after the testing of high-temperature storage durability as compared to when no esters of Formula (2) and no silicon-containing compounds had been added at the same time (Comparative Example 11-1). That is, the use of the inventive electrolytic solutions makes it possible to obtain batteries having excellent initial battery characteristics and excellent battery characteristics after the testing of high-temperature storage durability.

When the ester of Formula (2) was used alone (Comparative Example 11-2), the initial 1 C capacity was enhanced as compared to Comparative Example 11-1 but the improvement was smaller than that obtained in Example 11-1. Further, the recovered 0.05 C capacity was enhanced as compared to Comparative Example 11-1 but was lower than that in Example 11-1. Furthermore, the recovered 0.05 C efficiency was lower than that in Comparative Example 11-1. It is thus clear that the use of the inventive electrolytic solutions provides excellent battery characteristics.

When the silicon-containing compound was used alone (Comparative Example 11-3), the initial 1 C capacity was enhanced as compared to Comparative Example 11-1 but the improvement was smaller than that obtained in Example 11-1. Further, the recovered 0.05 C capacity was decreased from the level in Comparative Example 11-1. While the recovered 0.05 C efficiency was enhanced as compared to Comparative Example 11-1, the improvement was smaller than that obtained in Example 11-1. It is thus clear that the use of the inventive electrolytic solutions provides excellent battery characteristics.

The above results have confirmed that battery characteristics are specifically improved by the synergetic effect of the combined use of the esters of Formula (2) and silicon-containing compounds.

⟨Example 12-1 and Comparative Examples 12-1 to 12-3⟩

Example 12-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L, thus forming a basic electrolytic solution. Further, 0.5 mass % of the compound (2-1) and 0.5 mass % of lithium tetrafluoroborate (also written as "MP7") as additives were added to the basic electrolytic solution. In this manner, a nonaqueous electrolytic solution of Example 12-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.4 V (0.05 C cutoff) and was discharged again at 0.2 C to 3.0 V. In this manner, initial battery characteristics were stabilized. Thereafter, the battery was CC-CV charged at 0.2 C to 4.40 V (0.05 C cutoff) and was discharged at 1 C to 3.0 V, thereby determining the initial 1 C capacity.

Here, 1 C indicates a value of current at which a reference capacity of a battery is discharged in 1 hour. For example, 0.2 C indicates a current that is 1/5 of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.4 V (0.05 C cutoff) and was discharged again at 0.2 C to 3.0 V. The ratio of the discharge capacity to the charge capacity obtained during this process was determined as the recovered 0.2 C efficiency (%).

[Evaluation of Overcharge Characteristics after Testing of High-Temperature Storage Durability]

After the testing of high-temperature storage durability and the evaluation of battery characteristics, the nonaqueous electrolyte secondary battery was CC-CV charged at 25° C. and at a constant current of 0.2 C to 4.4 V (0.05 C cutoff). Thereafter, the battery was overcharged at 45° C. and at a constant current of 0.2 C to 5.0 V. After the battery had been cooled sufficiently, the open circuit voltage (OCV) was measured. The OCV after overcharging was thus obtained.

The OCV of a battery after overcharge testing mainly reflects the potential of a positive electrode. Specifically, a lower OCV after overcharging indicates a smaller charge depth in a positive electrode. Usually, the increase in the charge depth in a positive electrode results in the dissolution of metal and the release of oxygen from the positive electrode, thus initiating a thermal runaway of the battery. Thus, the safety of overcharged batteries may be ensured by the reduction of the OCV after overcharging.

The nonaqueous electrolyte secondary battery fabricated hereinabove was tested to evaluate the initial battery characteristics, the high-temperature storage durability, the battery characteristics after the testing of high-temperature storage durability, and the overcharge characteristics after the testing of high-temperature storage durability. The evaluation results are shown in Table 12 relative to the results of Comparative Example 12-1 taken as 100.0%. The OCV after overcharging is indicated as the difference from the value in Comparative Example 12-1. The same applies hereinafter.

Comparative Example 12-1

A nonaqueous electrolyte secondary battery was fabricated and tested in the same manner as in Example 12-1, except that the electrolytic solution of Example 12-1 did not contain the compound (2-1) and MP7.

Comparative Example 12-2

A nonaqueous electrolyte secondary battery was fabricated and tested in the same manner as in Example 12-1, except that the electrolytic solution of Example 12-1 did not contain MP7.

Comparative Example 12-3

A nonaqueous electrolyte secondary battery was fabricated and tested in the same manner as in Example 12-1, except that the electrolytic solution of Example 12-1 did not contain the compound (2-1).

TABLE 12

| Additives | | Initial 1 C capacity/% | Recovered 0.2 C efficiency/% | OCV after overcharging/mV |
|---|---|---|---|---|
| Ex. 12-1 | Compound (2-1) 0.5 mass % MP7 0.5 mass % | 100.36 | 100.1 | −27.5 |
| Comp. Ex. 12-1 | — | 100.00 | 100.0 | 0.0 |
| Comp. Ex. 12-2 | Compound (2-1) 0.5 mass % | 100.17 | 100.1 | −25.4 |
| Comp. Ex. 12-3 | MP7 0.5 mass % | 100.24 | 99.7 | −8.8 |

From Table 12, the use of the nonaqueous electrolytic solution of Example 12-1 according to the invention resulted in a high initial 1 C capacity and a high recovered 0.2 C efficiency after the testing of high-temperature storage durability as compared to when no esters of Formula (2) and no borate salts had been added at the same time (Comparative Example 12-1). Further, as compared to Comparative Example 12-1, the battery had a low OCV after the battery had been overcharged after the testing of high-temperature storage durability, achieving higher safety. That is, the use of the inventive electrolytic solutions makes it possible to obtain batteries having excellent initial battery characteristics and excellent battery characteristics and safety after the testing of high-temperature storage durability.

When the ester of Formula (2) was used alone (Comparative Example 12-2), the initial 1 C capacity was enhanced as compared to Comparative Example 12-1 but the improvement was smaller than that obtained in Example 12-1. The OCV after overcharging was lower than that in Comparative Example 12-1 but compared unfavorably to that in Example 12-1. It is thus clear that the use of the inventive electrolytic solutions provides excellent battery characteristics.

When the borate salt was used alone (Comparative Example 12-3), the initial 1 C capacity was enhanced as compared to Comparative Example 12-1 but the improvement was smaller than that obtained in Example 12-1. Further, the recovered 0.2 C efficiency was lower than that in Comparative Example 12-1. The OCV after overcharging was lower than that in Comparative Example 12-1 but compared unfavorably to that in Example 12-1. It is thus clear that the use of the inventive electrolytic solutions provides excellent battery characteristics.

The above results have confirmed that battery characteristics are specifically improved by the synergetic effect of the combined use of the esters of Formula (2) and borate salts.

⟨Example 13-1 and Comparative Examples 13-1 to 13-3⟩

Example 13-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and dimethyl carbonate (DMC) (volume ratio 3:4:3) so that its concentration would be 1.0 mol/L, thus forming a basic electrolytic solution. Further, 0.5 mass % of the compound (2-1) and 0.5 mass % of 1,3-propanesultone (also written as "MP8") as additives were added to the basic electrolytic solution. In this manner, a nonaqueous electrolytic solution of Example 13-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.2 V (0.05 C cutoff) and was discharged again at 0.2 C to 3.0 V. In this manner, initial battery characteristics were stabilized. Thereafter, the battery was CC-CV charged at 0.2 C to 4.2 V (0.05 C cutoff) and was discharged at 0.2 C to 3.0 V, and the ratio of the discharge capacity to the charge capacity obtained during this process was determined as the initial 0.2 C efficiency (%).

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.2 V (0.05 C cutoff).

Thereafter, the battery was stored at a high temperature of 85° C. for 1 day. After being cooled sufficiently, the battery was discharged at 25° C. and at 0.2 C to 3.0 V.

[Evaluation of Overcharge Characteristics after Testing of High-Temperature Storage Durability]

After the testing of high-temperature storage durability, the nonaqueous electrolyte secondary battery was CC-CV charged at 25° C. and at a constant current of 0.2 C to 4.2 V (0.05 C cutoff). The battery was then immersed in an ethanol bath, and the volume of the battery before overcharging was measured based on the buoyancy (Archimedes' principle). Thereafter, the battery was overcharged at 45° C. and at a constant current of 0.5 C to 5.0 V. After being cooled sufficiently, the battery was immersed in an ethanol bath and its volume was measured. The change in battery volume from before the overcharging was obtained as the overcharge gas production.

In such types of batteries in which a safety valve is operated upon a detection of an unusual increase in internal pressure due to abnormalities such as overcharging, the generation of a larger amount of overcharge gas is more advantageous because the safety valve can be operated early and consequently the battery safety in the event of overcharging can be ensured.

The nonaqueous electrolyte secondary battery fabricated hereinabove was tested to evaluate the initial battery characteristics, the high-temperature storage durability and the overcharge characteristics after the testing of high-temperature storage durability. The evaluation results are shown in Table 13 relative to the results of Comparative Example 13-1 taken as 100.0%. The same applies hereinafter.

Comparative Example 13-1

A nonaqueous electrolyte secondary battery was fabricated and tested in the same manner as in Example 13-1, except that the electrolytic solution of Example 13-1 did not contain the compound (2-1) and MP8.

Comparative Example 13-2

A nonaqueous electrolyte secondary battery was fabricated and tested in the same manner as in Example 13-1, except that the electrolytic solution of Example 13-1 did not contain MP8.

Comparative Example 13-3

A nonaqueous electrolyte secondary battery was fabricated and tested in the same manner as in Example 13-1, except that the electrolytic solution of Example 13-1 did not contain the compound (2-1).

TABLE 13

| | Additives | | Initial 0.2 C efficiency/% | Overcharge gas production/% |
|---|---|---|---|---|
| Ex. 13-1 | Compound (2-1) | 0.5 mass % | 100.2 | 466.7 |
| | MP8 | 0.5 mass % | | |
| Comp. Ex. 13-1 | — | | 100.0 | 100.0 |
| Comp. Ex. 13-2 | Compound (2-1) | 0.5 mass % | 100.0 | 366.7 |
| Comp. Ex. 13-3 | MP8 | 0.5 mass % | 100.1 | 133.3 |

From Table 13, the use of the nonaqueous electrolytic solution of Example 13-1 according to the invention resulted in an excellent initial 0.2 C efficiency and a large overcharge gas production after the testing of high-temperature storage durability as compared to when no esters of Formula (2) and no sulfur-containing organic compounds had been added at the same time (Comparative Example 13-1). That is, the use of the inventive electrolytic solutions makes it possible to obtain batteries having excellent initial battery characteristics and excellent overcharge characteristics evaluated after the testing of high-temperature storage durability.

When the ester of Formula (2) was used alone (Comparative Example 13-2), the initial 0.2 C efficiency was unchanged from the result obtained in Comparative Example 13-1. While the overcharge gas production was increased as compared to Comparative Example 13-1, the improvement was smaller than that obtained in Example 13-1. It is thus clear that the use of the inventive electrolytic solutions provides excellent battery characteristics.

When the sulfur-containing organic compound was used alone (Comparative Example 13-3), the initial 0.2 C efficiency was enhanced as compared to Comparative Example 13-1 but the improvement was smaller than that obtained in Example 13-1. While the overcharge gas production was increased as compared to Comparative Example 13-1, the improvement was smaller than that obtained in Example 13-1. It is thus clear that the use of the inventive electrolytic solutions provides excellent battery characteristics.

The above results have confirmed that battery characteristics are specifically improved by the synergetic effect of the combined use of the esters of Formula (2) and sulfur-containing organic compounds.

⟨Example 14-1 to 14-2 and Comparative Examples 14-1 to 14-6⟩

Example 14-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and dimethyl carbonate (DMC) (volume ratio 3:4:3) so that its concentration would be 1.0 mol/L, thus forming a basic electrolytic solution. Further, 0.5 mass % of the compound (2-1) and 0.5 mass % of ethyl propionate (also written as "MP9") as additives were added to the basic electrolytic solution. In this manner, a nonaqueous electrolytic solution of Example 14-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. In this manner, initial battery characteristics were stabilized. Thereafter, the battery was CC-CV charged at 0.2 C to 4.4 V (0.05 C cutoff) and was discharged at 0.2 C to 3.0 V, thereby determining the initial 0.2 C capacity.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.4 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Overcharge Characteristics after Testing of High-Temperature Storage Durability]

After the testing of high-temperature storage durability, the nonaqueous electrolyte secondary battery was CC-CV charged at 25° C. and at a constant current of 0.2 C to 4.2 V (0.05 C cutoff). The battery was then immersed in an ethanol bath, and the volume of the battery before overcharging was measured based on the buoyancy (Archimedes' principle). Thereafter, the battery was overcharged at 45° C. and at a constant current of 0.5 C to 5.0 V. After being cooled sufficiently, the battery was immersed in an ethanol bath and its volume was measured. The change in battery volume from before the overcharging was obtained as the overcharge gas production.

In such types of batteries in which a safety valve is operated upon a detection of an unusual increase in internal pressure due to abnormalities such as overcharging, the generation of a larger amount of overcharge gas is more advantageous because the safety valve can be operated early and consequently the battery safety in the event of overcharging can be ensured.

The nonaqueous electrolyte secondary battery fabricated hereinabove was tested to evaluate the initial battery characteristics, the high-temperature storage durability and the overcharge characteristics after the testing of high-temperature storage durability. The evaluation results are shown in Table 14 relative to the results of Comparative Example 14-1 taken as 100.0%. The same applies hereinafter.

Example 14-2

A nonaqueous electrolyte secondary battery was fabricated and tested in the same manner as in Example 14-1, except that MP9 used in the electrolytic solution of Example 14-1 was replaced by 0.5 mass % of n-propyl propionate (also written as "MP9'").

Comparative Example 14-1

A nonaqueous electrolyte secondary battery was fabricated and tested in the same manner as in Example 14-1, except that the electrolytic solution of Example 14-1 did not contain the compound (2-1) and MP9.

Comparative Example 14-2

A nonaqueous electrolyte secondary battery was fabricated and tested in the same manner as in Example 14-1, except that the electrolytic solution of Example 14-1 did not contain MP9.

Comparative Example 14-3

A nonaqueous electrolyte secondary battery was fabricated and tested in the same manner as in Example 14-1, except that the electrolytic solution of Example 14-1 did not contain the compound (2-1).

Comparative Example 14-4

A nonaqueous electrolyte secondary battery was fabricated and tested in the same manner as in Example 14-2, except that the electrolytic solution of Example 14-2 did not contain the compound (2-1).

Comparative Example 14-5

A nonaqueous electrolyte secondary battery was fabricated and tested in the same manner as in Example 14-1, except that MP9 used in the electrolytic solution of Example 14-1 was replaced by 0.5 mass % of methyl propionate (also written as "MP").

Comparative Example 14-6

A nonaqueous electrolyte secondary battery was fabricated and tested in the same manner as in Comparative Example 14-5, except that the electrolytic solution of Comparative Example 14-5 did not contain the compound (2-1).

TABLE 14

| | Additives | | Initial 0.2 C capacity/% | Overcharge gas production/% |
|---|---|---|---|---|
| Ex. 14-1 | Compound (2-1) | 0.5 mass % | 100.46 | 780.0 |
| | MP9 | 0.5 mass % | | |
| Ex. 14-2 | Compound (2-1) | 0.5 mass % | 100.30 | 800.0 |
| | MP9' | 0.5 mass % | | |
| Comp. Ex. 14-1 | — | | 100.00 | 100.0 |
| Comp. Ex. 14-2 | Compound (2-1) | 0.5 mass % | 99.66 | 580.0 |
| Comp. Ex. 14-3 | MP9 | 0.5 mass % | 99.83 | 20.0 |
| Comp. Ex. 14-4 | MP9' | 0.5 mass % | 100.22 | 60.0 |

TABLE 14-continued

| | Additives | | Initial 0.2 C capacity/% | Overcharge gas production/% |
|---|---|---|---|---|
| Comp. Ex. 14-5 | Compound (2-1) | 0.5 mass % | 99.58 | 680.0 |
| | MP | 0.5 mass % | | |
| Comp. Ex. 14-6 | MP | 0.5 mass % | 100.27 | 60.0 |

From Table 14, the use of the nonaqueous electrolytic solutions of Examples 14-1 and 14-2 according to the invention resulted in excellent initial 0.2 C capacities and large overcharge gas productions after the testing of high-temperature storage durability as compared to when no aromatic carboxylate esters of Formula (2) and no carboxylate esters of Formula (3) had been added at the same time (Comparative Example 14-1). That is, the use of the inventive electrolytic solutions makes it possible to obtain batteries having excellent initial battery characteristics and excellent overcharge characteristics evaluated after the testing of high-temperature storage durability.

When the aromatic carboxylate ester of Formula (2) was used alone (Comparative Example 14-2), the initial 0.2 C capacity was decreased from the level in Comparative Example 14-1. While the overcharge gas production was increased as compared to Comparative Example 14-1, the improvement was smaller than that obtained in Examples 14-1 and 14-2. It is thus clear that the use of the inventive electrolytic solutions provides excellent battery characteristics.

When the carboxylate ester of Formula (3) was used alone (Comparative Examples 14-3 and 14-4), the overcharge gas productions were decreased from the level in Comparative Example 14-1 and were far below the amount obtained in Example 14-1. It is thus clear that the use of the inventive electrolytic solutions provides excellent battery characteristics.

When the aromatic compound outside the category of the carboxylate esters represented by Formula (3), and the aromatic carboxylate ester represented by Formula (2) were added at the same time (Comparative Example 14-5), the initial 0.2 C capacity was decreased from the level in Comparative Example 14-1 and was far below the capacities obtained in Examples 14-1 and 14-2. It is thus clear that the use of the inventive electrolytic solutions provides excellent battery characteristics.

The above results have confirmed that battery characteristics are specifically improved by the synergetic effect of the combined use of the aromatic carboxylate esters of Formula (2) and the carboxylate esters of Formula (3).

⟨Example 15-1 and Comparative Examples 15-1 to 15-3⟩

Example 15-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and dimethyl carbonate (DMC) (volume ratio 3:4:3) so that its concentration would be 1.0 mol/L, thus forming a basic electrolytic solution. Further, 0.5 mass % of the compound (2-1) and 0.5 mass % of lithium difluorophosphate (also written as "MP10") as additives were added to the basic electrolytic solution. In this manner, a nonaqueous electrolytic solution of Example 15-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite:sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

The nonaqueous electrolyte secondary battery was immersed in an ethanol bath, and the initial volume of the battery was measured based on the buoyancy (Archimedes' principle). While being pressed between glass plates, the battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.2 V (0.05 C cutoff) and was discharged again at 0.2 C to 3.0 V. In this manner, initial battery characteristics were stabilized. Thereafter, the battery was CC-CV charged at 0.2 C to 4.2 V (0.05 C cutoff). The nonaqueous electrolyte secondary battery was then immersed in an ethanol bath, and the volume was measured. The initial gas production was obtained by determining the change in volume from the initial volume of the battery.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.2 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Overcharge Characteristics after Testing of High-Temperature Storage Durability]

After the testing of high-temperature storage durability, the nonaqueous electrolyte secondary battery was CC-CV charged at 25° C. and at a constant current of 0.2 C to 4.2 V (0.05 C cutoff). The battery was then immersed in an ethanol bath, and the volume of the battery before overcharging was measured based on the buoyancy (Archimedes' principle). Thereafter, the battery was overcharged at 45° C. and at a constant current of 0.5 C to 5.0 V. After being cooled sufficiently, the battery was immersed in an ethanol bath and its volume was measured. The change in battery volume from before the overcharging was obtained as the overcharge gas production.

In such types of batteries in which a safety valve is operated upon a detection of an unusual increase in internal pressure due to abnormalities such as overcharging, the generation of a larger amount of overcharge gas is more advantageous because the safety valve can be operated early and consequently the battery safety in the event of overcharging can be ensured.

The nonaqueous electrolyte secondary battery fabricated hereinabove was tested to evaluate the initial battery characteristics, the high-temperature storage durability and the overcharge characteristics after the testing of high-temperature storage durability. The evaluation results are shown in Table 15 relative to the results of Comparative Example 15-1 taken as 100.0%. The same applies hereinafter.

Comparative Example 15-1

A nonaqueous electrolyte secondary battery was fabricated and tested in the same manner as in Example 15-1, except that the electrolytic solution of Example 15-1 did not contain the compound (2-1) and MP10.

Comparative Example 15-2

A nonaqueous electrolyte secondary battery was fabricated and tested in the same manner as in Example 15-1, except that the electrolytic solution of Example 15-1 did not contain MP10.

Comparative Example 15-3

A nonaqueous electrolyte secondary battery was fabricated and tested in the same manner as in Example 15-1, except that the electrolytic solution of Example 15-1 did not contain the compound (2-1).

TABLE 15

| | Additives | | Initial gas production/% | Overcharge gas production/% |
|---|---|---|---|---|
| Ex. 15-1 | Compound (2-1) | 0.5 mass % | 73.5 | 400.0 |
| | MP10 | 0.5 mass % | | |
| Comp. Ex. 15-1 | — | | 100.0 | 100.0 |
| Comp. Ex. 15-2 | Compound (2-1) | 0.5 mass % | 129.9 | 366.7 |
| Comp. Ex. 15-3 | MP10 | 0.5 mass % | 79.5 | 33.3 |

From Table 15, the use of the nonaqueous electrolytic solution of Example 15-1 according to the invention resulted in a small initial gas production and a large overcharge gas production after the testing of high-temperature storage durability as compared to when no esters of Formula (2) and no lithium difluorophosphate had been added at the same time (Comparative Example 15-1). That is, the use of the inventive electrolytic solutions makes it possible to obtain batteries having excellent initial battery characteristics and excellent overcharge characteristics evaluated after the testing of high-temperature storage durability.

When the ester of Formula (2) was used alone (Comparative Example 15-2), the initial gas production was increased from the level in Comparative Example 15-1. While the overcharge gas production was increased as compared to Comparative Example 15-1, the improvement was smaller than that obtained in Example 15-1. It is thus clear that the use of the inventive electrolytic solutions provides excellent battery characteristics.

When the lithium difluorophosphate was used alone (Comparative Example 15-3), the initial gas production was small as compared to Comparative Example 15-1 but the improvement was smaller than that obtained in Example 15-1. Further, the overcharge gas production was decreased from the level in Comparative Example 15-1. It is thus clear that the use of the inventive electrolytic solutions provides excellent battery characteristics.

The above results have confirmed that battery characteristics are specifically improved by the synergetic effect of the combined use of the esters of Formula (2) and lithium difluorophosphate.

Example 16-1 and Comparative Examples 16-1 to 16-3

Example 16-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and dimethyl carbonate (DMC) (volume ratio 3:4:3) so that its concentration would be 1.0 mol/L, thus forming a basic electrolytic solution. Further, 0.5 mass % of the compound (2-1) and 0.5 mass % of lithium bis(oxalato)borate (also written as "MP11") as additives were added to the basic electrolytic solution. In this manner, a nonaqueous electrolytic solution of Example 16-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 μm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

The nonaqueous electrolyte secondary battery was immersed in an ethanol bath, and the initial volume of the battery was measured based on the buoyancy (Archimedes' principle). While being pressed between glass plates, the battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was discharged at a constant current of 0.2 C to 3.0 V. Next, the battery was CC-CV charged at 0.2 C to 4.2 V (0.05 C cutoff) and was discharged again at 0.2 C to 3.0 V. In this manner, initial battery characteristics were stabilized. Thereafter, the battery was CC-CV charged at 0.2 C to 4.2 V (0.05 C cutoff) and was discharged at 0.2 C to 3.0 V, and the ratio of the discharge capacity to the charge capacity obtained during this process was determined as the initial 0.2 C efficiency (%). Subsequently, the battery was CC-CV charged at 0.2 C to 4.4 V (0.05 C cutoff). The nonaqueous electrolyte secondary battery was then immersed in an ethanol bath, and the volume was measured. The initial gas production was obtained by determining the change in volume from the initial volume of the battery.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.20 V (0.05 C cutoff). Thereafter, the battery was stored at a high temperature of 85° C. for 1 day. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.2 V (0.05 C cutoff). Thereafter, the battery was discharged again at 0.2 C to 3.0 V. The ratio of the discharge capacity to the charge capacity obtained during this process was determined as the recovered 0.2 C efficiency (%).

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 16 relative to the results of Comparative Example 16-1 taken as 100.0%. The same applies hereinafter.

Comparative Example 16-1

A nonaqueous electrolyte secondary battery was fabricated and tested in the same manner as in Example 16-1, except that the electrolytic solution of Example 16-1 did not contain the compound (2-1) and MP11.

Comparative Example 16-2

A nonaqueous electrolyte secondary battery was fabricated and tested in the same manner as in Example 16-1, except that the electrolytic solution of Example 16-1 did not contain MP11.

Comparative Example 16-3

A nonaqueous electrolyte secondary battery was fabricated and tested in the same manner as in Example 16-1, except that the electrolytic solution of Example 16-1 did not contain the compound (2-1).

TABLE 16

| | Additives | | Initial 0.2 C efficiency/% | Recovered 0.2 C efficiency/% |
|---|---|---|---|---|
| Ex. 16-1 | Compound (2-1) | 0.5 mass % | 100.2 | 100.2 |
| | MP11 | 0.5 mass % | | |
| Comp. Ex. 16-1 | — | | 100.0 | 100.0 |
| Comp. Ex. 16-2 | Compound (2-1) | 0.5 mass % | 100.0 | 100.0 |
| Comp. Ex. 16-3 | MP11 | 0.5 mass % | 100.0 | 100.0 |

From Table 16, the use of the nonaqueous electrolytic solution of Example 16-1 according to the invention resulted in an excellent initial 0.2 C efficiency and an excellent recovered 0.2 C efficiency after the testing of high-temperature storage durability as compared to when no esters of Formula (2) and no oxalate salts had been added at the same time (Comparative Example 16-1). That is, the use of the inventive electrolytic solutions makes it possible to obtain batteries having excellent initial battery characteristics and excellent battery characteristics evaluated after the testing of high-temperature storage durability.

When the ester of Formula (2) was used alone (Comparative Example 16-2), the initial 0.2 C efficiency was unchanged from the result obtained in Comparative Example 16-1. Further, the recovered 0.2 C efficiency was the same as the result obtained in Comparative Example 16-1. It is thus clear that the use of the inventive electrolytic solutions provides excellent battery characteristics.

When the oxalate salt was used alone (Comparative Example 16-3), the initial 0.2 C efficiency was unchanged from the result obtained in Comparative Example 16-1. Further, the recovered 0.2 C efficiency was the same as the result obtained in Comparative Example 16-1. It is thus clear that the use of the inventive electrolytic solutions provides excellent battery characteristics.

The above results have confirmed that battery characteristics are specifically improved by the synergetic effect of the combined use of the esters of Formula (2) and oxalate salts.

⟨Examples 17-1 and 17-2, and Comparative Examples 17-1 to 17-4⟩

Example 17-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L. As an additive, 5.0 mass % of monofluoroethylene carbonate (MP2) was dissolved, thus forming a basic electrolytic solution. Further, 1.0 mass % of the compound (2-1) was added. In this manner, a nonaqueous electrolytic solution of Example 17-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 15 µm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 10 µm thick copper foil, and was dried and pressed. A negative electrode was thus fabricated. In the dried negative electrode, the mass ratio of natural graphite: sodium carboxymethylcellulose:styrene butadiene rubber was 98:1:1.

[Fabrication of Secondary Battery]

The positive electrode and the negative electrodes described above, and polypropylene separators were stacked in the order of the negative electrode, the separator, the positive electrode, the separator and the negative electrode, thus forming a battery element. The battery element was inserted into a bag which was made of a laminate film of aluminum (thickness 40 µm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was allowed to stand at 45° C. for 72 hours. Thereafter, the battery was discharged at a constant current of 0.2 C to 3.0 V. Next, the battery was CC-CV charged at 0.2 C to 4.35 V (0.05 C cutoff) and was discharged again at 0.2 C to 3.0 V. In this manner, initial battery characteristics were stabilized. Thereafter, the battery was CC-CV charged at 0.2 C to 4.35 V (0.05 C cutoff) and was discharged at 0.2 C to 3.0 V, thereby determining the initial 0.2 C capacity. Further, the battery was CC-CV charged at 0.2 C to 4.35 V (0.05 C cutoff) and was discharged at 0.5 C to 3.0 V, thereby determining the initial 0.5 C capacity. The ratio of the initial 0.5 C capacity to the initial 0.2 C capacity was determined as the initial rate characteristic (%).

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.35 V (0.05 C cutoff). Thereafter, the battery was stored at a high temperature of 60° C. for 7 days. After being cooled sufficiently, the battery was discharged at 25° C. and at 0.2 C to 3.0 V.

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.35 V (0.05 C cutoff). Thereafter, the battery was discharged again at 0.2 C to 3.0 V, thereby determining the recovered 0.2 C capacity. Further, the battery was CC-CV charged at 0.2 C to 4.35 V (0.05 C cutoff) and was discharged at 0.5 C to 3.0 V, thereby determining the recovered 0.5 C capacity. The ratio of the recovered 0.5 C capacity to the recovered 0.2 C capacity was determined as the rate characteristic (%) after storage.

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 17 relative to the results of Comparative Example 17-1 taken as 100.0%. The same applies hereinafter.

Example 17-2

A nonaqueous electrolyte secondary battery was fabricated and tested in the same manner as in Example 17-1, except that 3.0 mass % of 1-phenyl-1,3,3-trimethylindane (also written as "MP12") was further added to the electrolytic solution of Example 17-1.

Comparative Example 17-1

A nonaqueous electrolyte secondary battery was fabricated and tested in the same manner as in Example 17-1, except that the electrolytic solution of Example 17-1 did not contain the compound (2-1).

Comparative Example 17-2

A nonaqueous electrolyte secondary battery was fabricated and tested in the same manner as in Example 17-2, except that the electrolytic solution of Example 17-2 did not contain the compound (2-1).

Comparative Example 17-3

A nonaqueous electrolyte secondary battery was fabricated and tested in the same manner as in Example 17-1, except that the compound (2-1) used in the electrolytic solution of Example 17-1 was replaced by 1.0 mass % of the compound (3-1).

Comparative Example 17-4

A nonaqueous electrolyte secondary battery was fabricated and tested in the same manner as in Example 17-2, except that the compound (2-1) used in the electrolytic solution of Example 17-2 was replaced by 1.0 mass % of the compound (3-1).

TABLE 17

|  | Additives |  | Initial rate characteristic/% | Rate characteristic after storage/% |
|---|---|---|---|---|
| Ex. 17-1 | Compound (2-1) | 1.0 mass % | 100.03 | 100.02 |
| Ex. 17-2 | Compound (2-1) | 1.0 mass % | 100.09 | 100.81 |
|  | MP12 | 3.0 mass % |  |  |
| Comp. Ex. 17-1 | — |  | 100.00 | 100.00 |
| Comp. Ex. 17-2 | MP12 | 3.0 mass % | 99.98 | 100.69 |
| Comp. Ex. 17-3 | Compound (3-1) | 1.0 mass % | 100.03 | 99.76 |
| Comp. Ex. 17-4 | Compound (3-1) | 1.0 mass % | 100.03 | 94.86 |
|  | MP12 | 3.0 mass % |  |  |

From Table 17, the use of the nonaqueous electrolytic solution of Example 17-1 according to the invention resulted in an excellent initial rate characteristic and an excellent rate characteristic evaluated after the battery had been stored during the testing of high-temperature storage durability, as compared to when the fluorine-containing cyclic carbonate had been used alone (Comparative Example 17-1). That is, the use of the inventive electrolytic solutions makes it possible to obtain batteries having excellent initial battery characteristics and excellent battery characteristics evaluated after the testing of high-temperature storage durability.

Further, the use of the nonaqueous electrolytic solution of Example 17-2 according to the invention resulted in an excellent initial rate characteristic and an excellent rate characteristic evaluated after the battery had been stored during the testing of high-temperature storage durability, as compared to when no esters of Formula (2) and no aromatic compounds other than those of Formula (2) had been added at the same time (Comparative Example 17-1). It should be noted that the improvement obtained in this case was higher than that obtained in Example 17-1. As demonstrated here, the use of the inventive electrolytic solutions makes it possible to obtain batteries having highly excellent initial battery characteristics and highly excellent battery characteristics evaluated after the testing of high-temperature storage durability.

When the aromatic compound other than those of Formula (2) was used alone (Comparative Example 17-2), the initial rate characteristic was decreased from the level in Comparative Example 17-1. While the rate characteristic after storage was enhanced as compared to Comparative Example 17-1, the improvement was smaller than that obtained in Example 17-2. It is thus clear that the use of the inventive electrolytic solutions provides excellent battery characteristics.

When the aromatic compound outside the category of the esters of Formula (2) was used alone or in combination with the aromatic compound other than those of Formula (2) (Comparative Example 17-3, 17-4), the initial rate characteristic was enhanced as compared to Comparative Example 17-1 but the rate characteristic after storage was decreased. It is thus clear that the use of the inventive electrolytic solutions provides excellent battery characteristics.

The above results have confirmed that battery characteristics are specifically improved by the synergetic effect of the combined use of the esters of Formula (2) and aromatic compounds other than those of Formula (2).

⟨Example 18-1 and Comparative Example 18-1⟩

Example 18-1

[Preparation of Nonaqueous Electrolytic Solution]

In a dry argon atmosphere, LiPF$_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L. As an additive, 5.0 mass % of monofluoroethylene carbonate (MP2) was dissolved, thus forming a basic electrolytic solution. Further, 3.0 mass % of the compound (2-2) was added. In this manner, a nonaqueous electrolytic solution of Example 18-1 was prepared.

[Fabrication of Positive Electrode]

In N-methylpyrrolidone solvent, 97 mass % of lithium cobalt oxide (LiCoO$_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 21 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 12 μm thick copper foil, and was dried and pressed. A negative electrode was thus fabricated. In the dried negative electrode, the mass ratio of natural graphite:sodium carboxymethylcellulose:styrene butadiene rubber was 98:1:1.

[Fabrication of Secondary Battery]

The positive electrode and the negative electrodes described above, and polyethylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was allowed to stand at 45° C. for 72 hours. Thereafter, the battery was discharged at a constant current of 0.2 C to 3.0 V. Next, the battery was CC-CV charged at 0.2 C to 4.35 V (0.05 C cutoff) and was discharged again at 0.2 C to 3.0 V. In this manner, initial battery characteristics were stabilized. Thereafter, the battery was CC-CV charged at 0.2 C to 4.35 V (0.05 C cutoff) and was discharged at 0.2 C to 3.0 V, thereby determining the initial 0.2 C capacity.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.35 V (0.05 C cutoff). Thereafter, the battery was immersed in an ethanol bath, and the volume of the battery before the testing of high-temperature storage durability was measured based on the buoyancy (Archimedes' principle). Thereafter, the battery was stored at a high temperature of 60° C. for 7 days. After being cooled sufficiently, the battery was immersed in an ethanol bath, and its volume was measured. Based on the volume change before and after the high-temperature storage durability test, the storage gas production was determined. Next, the battery was discharged at 25° C. and at 0.2 C to 3.0 V, and the capacity remaining after the testing of high-temperature storage durability was measured. The ratio of the capacity to the initial 0.2 C capacity was determined as the residual ratio (%).

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.35 V (0.05 C cutoff) and was discharged again at 0.2 C to 3.0 V. The ratio of the discharge capacity to the charge capacity obtained during this process was determined as the recovered 0.2 C efficiency (%).

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 18 relative to the results of Comparative Example 18-1 taken as 100.0%. The same applies hereinafter.

Comparative Example 18-1

A nonaqueous electrolyte secondary battery was fabricated and tested in the same manner as in Example 18-1, except that the electrolytic solution of Example 18-1 did not contain the compound (2-2).

TABLE 18

| | Additive | | Initial 0.2 C capacity/% | Storage gas production/% | Residual ratio/% | Recovered 0.2 C efficiency/% |
|---|---|---|---|---|---|---|
| Ex. 18-1 | Compound (2-2) | 3.0 mass % | 100.33 | 56.7 | 109.74 | 109.33 |
| Comp. Ex. 18-1 | — | | 100.00 | 100.0 | 100.00 | 100.00 |

From Table 18, the use of the nonaqueous electrolytic solution of Example 18-1 according to the invention resulted in an excellent initial 0.2 C capacity, a small storage gas production, a high residual ratio and an excellent recovered 0.2 C efficiency evaluated after the testing of high-temperature storage durability, as compared to when the fluorine-containing cyclic carbonate had been used alone (Comparative Example 18-1). That is, the use of the inventive electrolytic solutions makes it possible to obtain batteries having excellent initial battery characteristics and excellent battery characteristics evaluated after the testing of high-temperature storage durability.

The above results have confirmed that battery characteristics are specifically improved by the synergetic effect of the combined use of the esters of Formula (2) and fluorine-containing cyclic carbonates.

⟨Example 19-1 and Comparative Example 19-1⟩

Example 19-1

[Preparation of Nonaqueous Electrolytic Solution]

In a dry argon atmosphere, $LiPF_6$ as an electrolyte was dissolved into a mixed solvent including ethylene carbonate (EC), ethyl methyl carbonate (EMC) and diethyl carbonate (DEC) (volume ratio 3:4:3) so that its concentration would be 1.2 mol/L. As additives, 5.0 mass % of monofluoroethylene carbonate (MP2), 2.0 mass % of 1,3-propanesultone (MP8) and 3.0 mass % of adiponitrile (MP5) were dissolved, thus forming a basic electrolytic solution. Further, 2.0 mass % of the compound (2-2) was added. In this manner, a nonaqueous electrolytic solution of Example 19-1 was prepared.

[Fabrication of Positive Electrode]

In N-methylpyrrolidone solvent, 97 mass % of lithium cobalt oxide ($LiCoO_2$) as a positive electrode active material, 1.5 mass % of acetylene black as a conductive material and 1.5 mass % of polyvinylidene fluoride (PVdF) as a binder were mixed together with use of a disperser to give a slurry. The slurry was uniformly applied to both sides of a 21 μm thick aluminum foil, and was dried and pressed. A positive electrode was thus fabricated.

[Fabrication of Negative Electrode]

A slurry was prepared by mixing a natural graphite powder as a negative electrode active material, an aqueous dispersion of sodium carboxymethylcellulose as a thickener (sodium carboxymethylcellulose concentration: 1 mass %), and an aqueous dispersion of styrene butadiene rubber as a binder (styrene butadiene rubber concentration: 50 mass %) with use of a disperser. The slurry was uniformly applied onto a surface of a 12 μm thick copper foil, and was dried and pressed. A negative electrode was thus fabricated. In the dried negative electrode, the mass ratio of natural graphite:sodium carboxymethylcellulose:styrene butadiene rubber was 98:1:1.

[Fabrication of Secondary Battery]

The positive electrode and the negative electrodes described above, and polyethylene separators were stacked in the order of the negative electrode, the separator, the positive electrode, the separator and the negative electrode, thus forming a battery element. The battery element was inserted into a bag which was made of a laminate film of aluminum (thickness 40 μm) coated with resin layers on both sides, while ensuring that the terminals of the positive electrode and the negative electrodes extended beyond the bag. Thereafter, the nonaqueous electrolytic solution was poured into the bag, and the bag was vacuum sealed. In this manner, a sheet-shaped nonaqueous electrolyte secondary battery was fabricated.

[Evaluation of Initial Battery Characteristics]

While being pressed between glass plates, the nonaqueous electrolyte secondary battery was charged at 25° C. and at a constant current corresponding to 0.05 C for 6 hours and was discharged at a constant current of 0.2 C to 3.0 V. Further, the battery was charged at a constant current corresponding to 0.2 C to 4.1 V and then at the constant voltage (such charging is also written as "CC-CV charging") (0.05 C cutoff) and was allowed to stand at 45° C. for 72 hours. Thereafter, the battery was discharged at a constant current of 0.2 C to 3 V. Next, the battery was CC-CV charged at 0.2 C to 4.35 V (0.05 C cutoff) and was discharged again at 0.2 C to 3 V. In this manner, initial battery characteristics were stabilized. Thereafter, the battery was CC-CV charged at 0.2 C to 4.35 V (0.05 C cutoff) and was discharged at 0.2 C to 3 V, thereby determining the initial 0.2 C capacity.

Here, 1 C indicates a value of current at which a reference capacity of a battery is discharged in 1 hour. For example, 0.2 C indicates a current that is ⅕ of the 1 C current.

[Testing of High-Temperature Storage Durability]

After the evaluation of initial battery characteristics, the nonaqueous electrolyte secondary battery was CC-CV charged at 25° C. and at 0.2 C to 4.35 V (0.05 C cutoff). Thereafter, the battery was stored at a high temperature of 60° C. for 7 days. After being cooled sufficiently, the battery was discharged at 25° C. and at 0.2 C to 3 V, and the capacity remaining after the testing of high-temperature storage durability was measured. The ratio of the capacity to the initial 0.2 C capacity was determined as the residual ratio (%).

[Evaluation of Battery Characteristics after Testing of High-Temperature Storage Durability]

After the testing of high-temperature storage durability, the nonaqueous electrolyte secondary battery was CC-CV charged at 25° C. and at a constant current of 0.2 C to 4.35 V (0.05 C cutoff) and was discharged again at 0.2 C to 3 V. The capacity of the battery after the testing of high-temperature storage durability was measured and was expressed as a ratio to the initial 0.2 C capacity. In this manner, the recovery ratio (%) was determined.

The nonaqueous electrolyte secondary battery fabricated hereinabove was tested to evaluate the initial battery characteristics, the high-temperature storage durability and the battery characteristics after the testing of high-temperature storage durability. The evaluation results are shown in Table 19 relative to the results of Comparative Example 19-1 taken as 100.0%. The same applies hereinafter.

Comparative Example 19-1

A nonaqueous electrolyte secondary battery was fabricated and tested in the same manner as in Example 19-1, except that the compound (2-2) used in the electrolytic solution of Example 19-1 was replaced by 2.4 mass % of the compound (3-1). The substance amount of the compound (3-1) used in Comparative Example 19-1 was the same as that of the compound (2-2) used in Example 19-1.

TABLE 19

| | Additive | | Initial 0.2 C capacity/% | Residual ratio/% | Recovery ratio/% |
|---|---|---|---|---|---|
| Ex. 19-1 | Compound (2-2) | 2.0 mass % | 100.6 | 101.9 | 101.37 |

TABLE 19-continued

| | Additive | | Initial 0.2 C capacity/% | Residual ratio/% | Recovery ratio/% |
|---|---|---|---|---|---|
| Comp. Ex. 19-1 | Compound (3-1) | 2.4 mass % | 100.0 | 100.0 | 100.00 |

From Table 19, the use of the nonaqueous electrolytic solution of Example 19-1 according to the invention resulted in an excellent initial 0.2 C capacity, a high residual ratio and an excellent recovery ratio after the testing of high-temperature storage durability, as compared to when the aromatic compound outside the category of the esters of Formula (2) had been used together with the fluorine-containing cyclic carbonate, the sulfur-containing organic compound and the cyano group-containing organic compound (Comparative Example 19-1). That is, the use of the inventive electrolytic solutions makes it possible to obtain batteries having excellent initial battery characteristics and excellent battery characteristics evaluated after the testing of high-temperature storage durability.

The above results have confirmed that battery characteristics are specifically improved by the synergetic effect of the combined use of the esters of Formula (2) with fluorine-containing cyclic carbonates, sulfur-containing organic compounds or cyano group-containing organic compounds.

INDUSTRIAL APPLICABILITY

The nonaqueous electrolytic solutions of the present invention allow nonaqueous electrolyte secondary batteries to achieve high initial battery characteristics and excellent battery characteristics after durability testing, making it possible to reduce the size of and to enhance the performance and safety of the nonaqueous electrolyte secondary batteries. The nonaqueous electrolytic solutions and the nonaqueous electrolyte secondary batteries of the present invention may be used in various known applications, with specific examples including notebook computers, pen-input computers, mobile computers, electronic book players, mobile phones, mobile fax machines, mobile copy machines, portable printers, headphone stereos, video movie machines, liquid crystal televisions, handy cleaners, portable CD players, mini-disc players, transceivers, electronic organizers, calculators, memory cards, portable tape recorders, radios, back-up power supplies, motors, automobiles, motorcycles, motor bikes, bicycles, lighting equipment, toys, game machines, watches, power tools, electronic flashes, cameras, load leveling power supplies, natural energy storage power supplies and lithium ion capacitors.

The invention claimed is:

1. A nonaqueous electrolytic solution, comprising an electrolyte, a nonaqueous solvent and an aromatic carboxylate ester represented by formula (1):

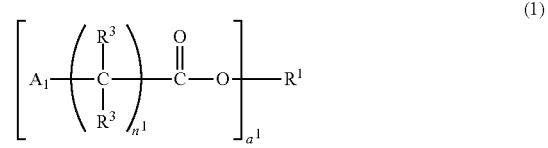

wherein

A¹ is an optionally substituted aryl group, n¹ is an integer of 1 or greater,

R² and R³ are each independently a hydrogen atom, a halogen atom or an optionally substituted hydrocarbon group having 1 to 12 carbon atoms and may be bonded to each other to form a ring wherein when a plurality of R²s are present, R²s may be the same as or different from one another and when a plurality of R³s are present, R³s may be the same as or different from one another, a¹ is an integer of 1 or 2, when a¹ is 1, R¹ is an optionally substituted hydrocarbon group having 1 to 12 carbon atoms, when a¹ is 2, R¹ is an optionally substituted hydrocarbon group having 1 to 12 carbon atoms and A¹s may be the same as or different from each other, when n¹ is 1, at least one of R² and R³ is an optionally substituted hydrocarbon group having 1 to 12 carbon atoms, and when n¹ is 2 and R²s and R³s are all hydrogen atoms, R¹ is an optionally substituted aliphatic hydrocarbon group having 1 to 12 carbon atoms.

2. The nonaqueous electrolytic solution according to claim 1, wherein a¹ in formula (1) is 1.

3. The nonaqueous electrolytic solution according to claim 1, wherein A¹ in formula (1) is a phenyl group.

4. The nonaqueous electrolytic solution according to claim 1, wherein the nonaqueous electrolytic solution contains the aromatic carboxylate ester represented by formula (1) in 0.001 mass % to 10 mass %.

5. The nonaqueous electrolytic solution according to claim 1, wherein the nonaqueous electrolytic solution further comprises at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of formula (1), cyclic carbonates having a carbon-carbon unsaturated bond, carboxylate esters other than those of formula (1), cyclic compounds having a plurality of ether bonds, monofluorophosphate salts, difluorophosphate salts, borate salts, oxalate salts and fluorosulfonate salts.

6. The nonaqueous electrolytic solution according to claim 1, wherein the nonaqueous electrolytic solution comprises 0.001 mass % to 20 mass % of at least one compound selected from the group consisting of fluorine-containing cyclic carbonates, sulfur-containing organic compounds, phosphonate esters, cyano group-containing organic compounds, isocyanate group-containing organic compounds, silicon-containing compounds, aromatic compounds other than those of formula (1), cyclic carbonates having a carbon-carbon unsaturated bond, carboxy late esters other than those of formula (1), cyclic compounds having a plurality of ether bonds, monofluorophosphate salts, difluorophosphate salts, borate salts, oxalate salts and fluorosulfonate salts.

7. A nonaqueous electrolyte secondary battery, comprising:

a negative electrode and a positive electrode capable of storing and releasing lithium ions; and a nonaqueous electrolytic solution comprising an electrolyte and a nonaqueous solvent, the nonaqueous electrolytic solution being the nonaqueous electrolytic solution according to claim 1.

\* \* \* \* \*